US006278451B1

(12) United States Patent
Suzuki

(10) Patent No.: US 6,278,451 B1
(45) Date of Patent: *Aug. 21, 2001

(54) IMAGE PROCESSOR

(75) Inventor: Takuya Suzuki, Tokyo (JP)

(73) Assignee: Casio Computer Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/639,516

(22) Filed: Apr. 29, 1996

(30) Foreign Application Priority Data

May 10, 1995 (JP) .......... 7-136129
May 10, 1995 (JP) .......... 7-137224
May 10, 1995 (JP) .......... 7-137258
May 10, 1995 (JP) .......... 7-137271
May 10, 1995 (JP) .......... 7-137286

(51) Int. Cl.[7] .......... G06F 15/00
(52) U.S. Cl. .......... 345/339; 395/124
(58) Field of Search .......... 345/326–358, 345/439

(56) References Cited

U.S. PATENT DOCUMENTS 4,333,152 6/1982 Best .......... 364/521
4,445,187 4/1984 Best .......... 364/521
4,569,026 2/1986 Best .......... 364/521
4,789,962 * 12/1988 Berry et al. .......... 345/338
4,791,581 12/1988 Ohba .......... 364/521
4,885,702 12/1989 Ohba .......... 364/521
5,111,409 5/1992 Gasper et al. .......... 395/135
5,247,610 9/1993 Oshima et al. .......... 395/152
5,287,448 * 2/1994 Nicol et al. .......... 345/338 X
5,428,733 * 6/1995 Carr .......... 345/338 X

FOREIGN PATENT DOCUMENTS 0 761 265 A1 3/1997 (EP) .......... A63F/9/22

OTHER PUBLICATIONS

"Balloon Windows For Supplementary Dialogues and Information", IBM Technical Disclosure Bulletin, vol. 33, No. 10A, Mar. 1, 1991, pp. 263–265.

* cited by examiner

*Primary Examiner*—Steven Sax
(74) *Attorney, Agent, or Firm*—Frishuaf, Holtz, Goodman, Langer & Chick, P.C.

(57) ABSTRACT

An image processing device which displays an image of a letter string input on a display screen, and either the image of a frame which surrounds the letter string or an image of a letter string modifying figure which modifies the letter string. The attribute of the frame image is determined in accordance with the input letter string to thereby omit the operation of deciding the frame attribute. Letter string division information is provided to start a new line of a letter string at a position that the user desires and display position information is provided which determines the display position of each letter of the letter string. When a letter string is input, it is selected from a plurality of letter strings prepared beforehand. The selected letter string is edited to omit the operation of inputting the individual letters. A letter string to be selected is used as the title of a file which stores edited image data. The same image data is used to display an input speech, file title and others on a letter input display screen. The input display screen simultaneously displays a letter list which displays input letters, and the image of a frame which surrounds the input letter string, and displays images of letters selectively input from the letter list into the image of the frame.

2 Claims, 127 Drawing Sheets

HIERARCHICAL DISPLAY SCREEN STRUCTURE

FIG.5

| DISPLAY SCREEN | MODE SELECT | QUESTION-NAIRE | FILE OPERATION | BASIC SYSTEM | LETTER INPUT |
|---|---|---|---|---|---|
| BG-A | BACKGROUND | BACKGROUND | BACKGROUND | BACKGROUND | BACKGROUND |
| BM-B | | | | BACK HAIR<br>OUTLINE<br>NECK | |
| OBJ-A | | | | NOSE<br>EYES<br>MOUTH | |
| BM-A | | | | FRONT HAIR | |
| OBJ-B | EXPLAN-ATORY BALLOON LETTERS | EXPLAN-ATORY BALLOON LETTERS | | EYEBROWS<br>SPEECH<br>SPEECH FRAME | |
| BG-B | SYSTEM | SYSTEM | SYSTEM EXPLAN-ATORY BALLOON LETTERS | SYSTEM EXPLAN-ATORY BALLOON LETTERS | SYSTEM EXPLAN-ATORY BALLOON LETTERS |

ARRANGEMENT OF VARIOUS DATA STORED IN PROGRAM/DATA ROM (PART 1)

ARRANGEMENT OF VARIOUS IMAGE DATA STORED IN PROGRAM/DATA ROM (PART 2)

| NOSE (40) |
|---|
| ⋮ |
| NOSE (46) |
| EYES (30) |
| ⋮ |
| EYES (36) |
| MOUTH (50) |
| ⋮ |
| MOUTH (56) |

( 2 )  OBJ-A

| EYEBROWS (30) |
|---|
| ⋮ |
| EYEBROWS (36) |
| SPEECH TEXT (80) |
| ⋮ |
| SPEECH TEXT (86) |
| SPEECH FRAME (90) |
| ⋮ |
| SPEECH FRAME (96) |
| SPEECH LETTERS (L-1) |
| SPEECH LETTERS (L-2) |
| SPEECH LETTERS (L-3) |
| ⋮ |

( 3 )  OBJ-B

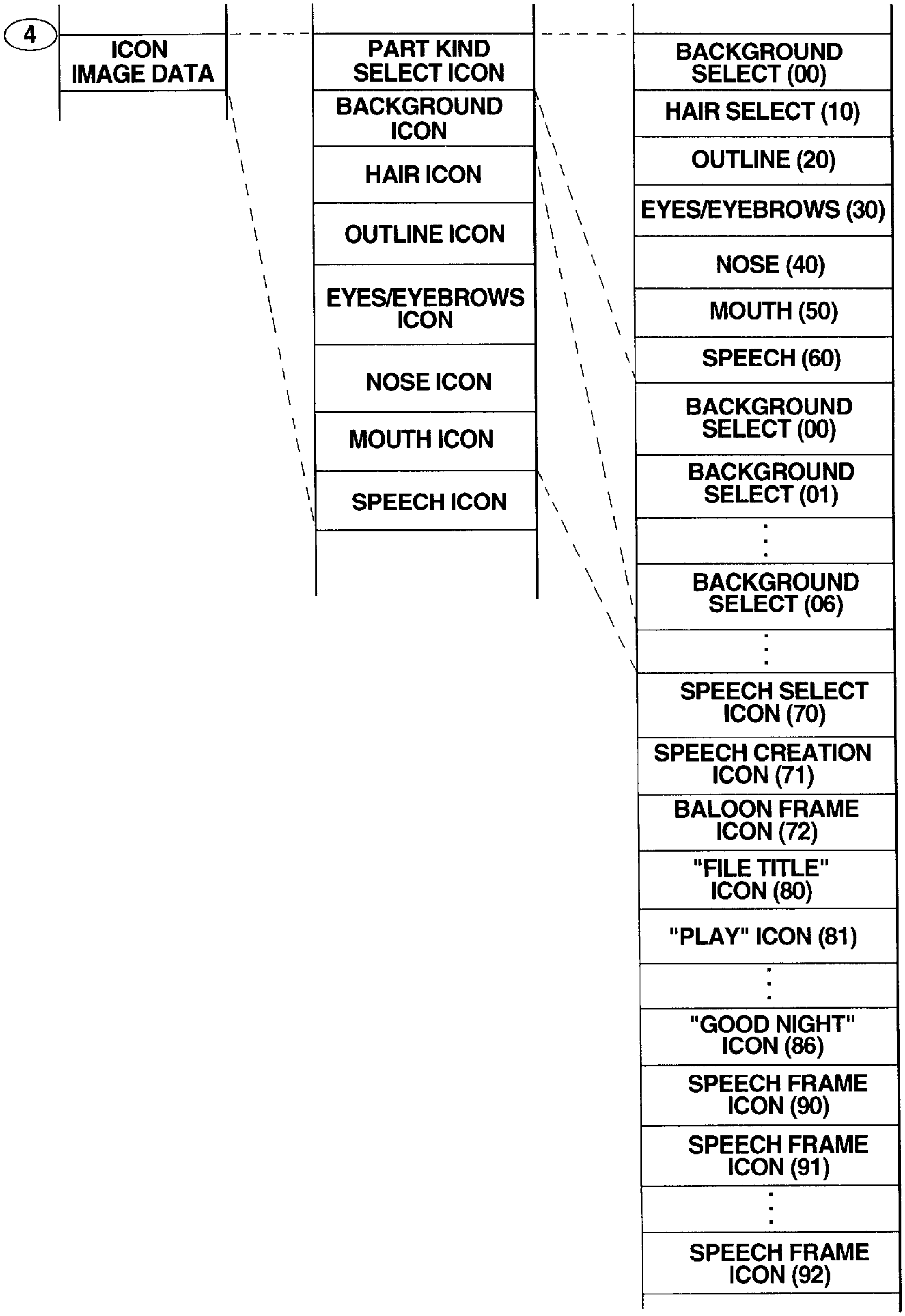

FIG.8
ARRANGEMENT OF VARIOUS DATA STORED IN
PROGRAM/DATA ROM (PART 3)

④ ICON IMAGE DATA

| PART KIND SELECT ICON |
|---|
| BACKGROUND ICON |
| HAIR ICON |
| OUTLINE ICON |
| EYES/EYEBROWS ICON |
| NOSE ICON |
| MOUTH ICON |
| SPEECH ICON |

| |
|---|
| BACKGROUND SELECT (00) |
| HAIR SELECT (10) |
| OUTLINE (20) |
| EYES/EYEBROWS (30) |
| NOSE (40) |
| MOUTH (50) |
| SPEECH (60) |
| BACKGROUND SELECT (00) |
| BACKGROUND SELECT (01) |
| ⋮ |
| BACKGROUND SELECT (06) |
| ⋮ |
| SPEECH SELECT ICON (70) |
| SPEECH CREATION ICON (71) |
| BALOON FRAME ICON (72) |
| "FILE TITLE" ICON (80) |
| "PLAY" ICON (81) |
| ⋮ |
| "GOOD NIGHT" ICON (86) |
| SPEECH FRAME ICON (90) |
| SPEECH FRAME ICON (91) |
| ⋮ |
| SPEECH FRAME ICON (92) |

FIG.9

ARRANGEMENT OF IMAGE DATA STORED IN WORK RAM

| Address | Data |
|---|---|
| AD1 | BACK-GROUND |
| AD1+1 | BACK HAIRE |
| AD1+2 | OUTLINE |
| AD1+3 | EYES/ EYEBROWS |
| AD1+4 | NOSE |
| AD1+5 | MOUTH |
| AD1+6 | SPEECH TEXT |
| AD1+7 | SPEECH FRAME |
| | |
| AD2 | SELECT ICON 1 |
| AD2+1 | SELECT ICON 2 |
| AD2+2 | SELECT ICON 3 |
| AD2+3 | SELECT ICON 4 |
| AD2+4 | SELECT ICON 5 |
| AD2+5 | SELECT ICON 6 |
| AD2+6 | SELECT ICON 7 |

| Address | Data |
|---|---|
| AD3 | CURRENT FILE |
| | |
| AD4 | INPUT LETTER (1) |
| AD4+1 | INPUT LETTER (2) |
| AD4+2 | INPUT LETTER (3) |
| | |
| AD4+11 | INPUT LETTER (12) |
| | |
| AD5 | CONVERTED LETTER (1) |
| AD5+1 | CONVERTED LETTER (2) |
| AD5+2 | CONVERTED LETTER (3) |
| AD5+3 | CONVERTED LETTER (4) |
| | |
| AD5+10 | CONVERTED LETTER (11) |
| AD5+11 | CONVERTED LETTER (12) |
| | |
| AD6 | FILE TITLE LETTER (1) |
| AD6+1 | FILE TITLE LETTER (2) |
| | |
| AD6+7 | FILE TITLE LETTER (8) |

| Address | Data |
|---|---|
| AD7~ AD7+7 | FILE TITLE (No.1) |
| AD7+8~ AD7+15 | FILE TITLE (No.2) |
| AD7+16~ AD7+23 | FILE TITLE (No.3) |
| AD7+24~ AD7++31 | FILE TITLE (No.4) |
| AD7+32~ AD7+39 | FILE TITLE (No.5) |
| AD7+40~ AD7+47 | FILE TITLE (No.6) |
| | |
| AD8~ AD8+7 | PART KIND (No.1) |
| AD8+8~ AD8+15 | PART KIND (No.2) |
| AD8+16~ AD8+23 | PART KIND (No.3) |
| AD8+24~ AD8+31 | PART KIND (No.4) |
| AD8+32~ AD8+39 | PART KIND (No.5) |
| AD8+40~ AD8+47 | PART KIND (No.6) |
| | |
| AD9~ AD9+11 | SPEECH TEXT (No.1) |
| AD9+12~ AD9+23 | SPEECH TEXT |
| AD9+24~ AD9+35 | SPEECH TEXT |
| AD9+36~ AD9+47 | SPEECH TEXT |
| AD9+48~ AD9+59 | SPEECH TEXT |
| AD9+60~ AD9+71 | SPEECH TEXT |

OBJECT ATTRIBUTE MEMORY STRUCTURE

| OBJECT NUMBER | ARRANGEMENT COORDINATE | |
|---|---|---|
| # 0 | Y COORDINATE | ⎫ |
| | X COORDINATE | |
| # 1 | Y COORDINATE | ⎬ FOR OBJ-A |
| | X COORDINATE | |
| ⋮ | ⋮ | |
| # N | Y COORDINATE | |
| | X COORDINATE | ⎭ |
| # N + 1 | Y COORDINATE | ⎫ |
| | X COORDINATE | |
| ⋮ | ⋮ | ⎬ FOR OBJ-B |
| # 127 | Y COORDINATE | |
| | X COORDINATE | ⎭ |

FIG.11

DATA FORMAT IN DISPLAY CONTROL REGISTER

| 7 | 6 | 5 | 4 | 3 | 2 | 1 | 0 |
|---|---|---|---|---|---|---|---|
| OBJ -B | OBJ -A | | BM -B | | BM -A | BG -B | BG -A |

1: ON (DISPLAYED)
0: OFF (NOT DISPLAYED)

DISPLAY SCREEN DISPLAY TIMING

ENTIRE OPERATION FLOW CHART

FILE LOADING PROCESS (PART 2)

FILE LOADING PROCESS (PART 3)

QUESTIONNAIRE SCREEN OPERATING PROCESS (PART 2)

QUESTIONNAIRE SCREEN OPERATING PROCESS (PART 3)

QUESTIONNAIRE SCREEN OPERATING PROCESS (PART 4)

QUESTIONNAIRE SCREEN OPERATING PROCESS (PART 5)

QUESTIONNAIRE SCREEN DISPLAYING PROCESS

FACE IMAGE CREATING PROCESS (PART 1)

FACE IMAGE CREATING PROCESS (PART 2)

FACE IMAGE CREATING PROCESS (PART 3)

FACE IMAGE CREATING PROCESS (PART 4)

FACE IMAGE CREATING PROCESS (PART 5)

FACE IMAGE CREATING PROCESS (PART 6)

FACE IMAGE CREATING PROCESS (PART 7)

FACE IMAGE CREATING PROCESS (PART 8)

FACE IMAGE CREATING PROCESS (PART 9)

FACE IMAGE CREATING PROCESS (PART 10)

FACE IMAGE CREATING PROCESS (PART 11)

FACE IMAGE CREATING PROCESS (PART 12)

BASIC SYSTEM SCREEN DISPLAY PROCESS (PART 1)

BASIC SYSTEM SCREEN DISPLAY PROCESS (PART 2)

FACE IMAGE DISPLAY PROCESS (PART 2)

CHARACTER INPUTTING PROCESS (PART 3)

FILE SAVING PROCESS (PART 2)

LAYOUT OF FILE OPERATION SCREEN

LAYOUT OF QUESTIONNAIRE SCREEN

LAYOUT OF BASIC SYSTEM SCREEN

LAYOUT OF BG-A PLANE
IN BASIC SYSTEM SCREEN

LAYOUT OF BM-B PLANE
IN BASIC SYSTEM SCREEN

LAYOUT OF OBJ-A PLANE IN BASIC SYSTEM SCREEN

LAYOUT OF BM-A PLANE IN BASIC SYSTEM SCREEN

LAYOUT OF OB-J PLANE
IN BASIC SYSTEM SCREEN

LAYOUT OF BG-B PLANE IN BASIC SYSTEM SCREEN

CONTENTS OF EXAPLANATORY BALLOON
IN MODE SELECTION PROCESS

CONTENTS OF EXPLANATORY BALLOON
IN FILE LOADING PROCESS

CONTENTS OF EXPLANATORY BALLOON IN QUESTIONNAIRE SCREEN OPERATING PROCESS (PART 1)

CONTENTS OF EXPLANATORY BALLOON IN QUESTIONNAIRE SCREEN OPERATING PROCESS (PART 2)

CONTENTS OF EXPLANATORY BALLOON
IN BASIC SYSTEM SCREEN (PART 1)

CONTENTS OF EXPLANATORY BALLOON
IN BASIC SYSTEM SCREEN (PART 2)

CONTENTS OF EXPLANATORY BALLOON
IN BASIC SYSTEM SCREEN (PART 3)

CONTENTS OF EXPLANATOR
BALLOON IN BASIC SYSTEM (PART 4)

CONTENTS OF EXPLANATORY BALLOON IN LETTER INPUT SCREEN

CONTENTS OF EXPLANATORY BALLOON IN FILE SAVING PROCESS

SELECT ICONS

SELECT ICONS

FIG.69A: BACK-GROUND | HAIR | OUTLINE | EYES/EYEBROWS | NOSE | MOUTH | BALLOON

FIG.69B: SPEECH SELECT | SPEECH CREATE | SPEECH FRAME

FIG.69C: FILE TITLE | PLAY | LET'S PLAY | THANK YOU | GOOD MORNING | HELLEO | GOOD NIGHT

CHANGES IN BALLOON SHAPE AND SPEECH

STANDARD

REQUEST

IMAGINATIVE

COURTEOUS

FIG.71

DISPLAY SCREEN ASSIGNMENT

| DISPLAY PLANE | DISPLAY CONTENTS |
|---|---|
| BG-B | BACKGROUND |
| BG-B | BACK HAIR<br>OUTLINE<br>NECK |
| OBJ-A | NOSE<br>EYES<br>MOUTH |
| BM-A | BACK HAIR |
| OBJ-B | EYEBROWS<br>SPEECH<br>SPEECH FRAME |
| BG-B | SYSTEM |

FORMAT OF IMAGE DATA STORED IN PROGRAM/DATA ROM (PART 2)

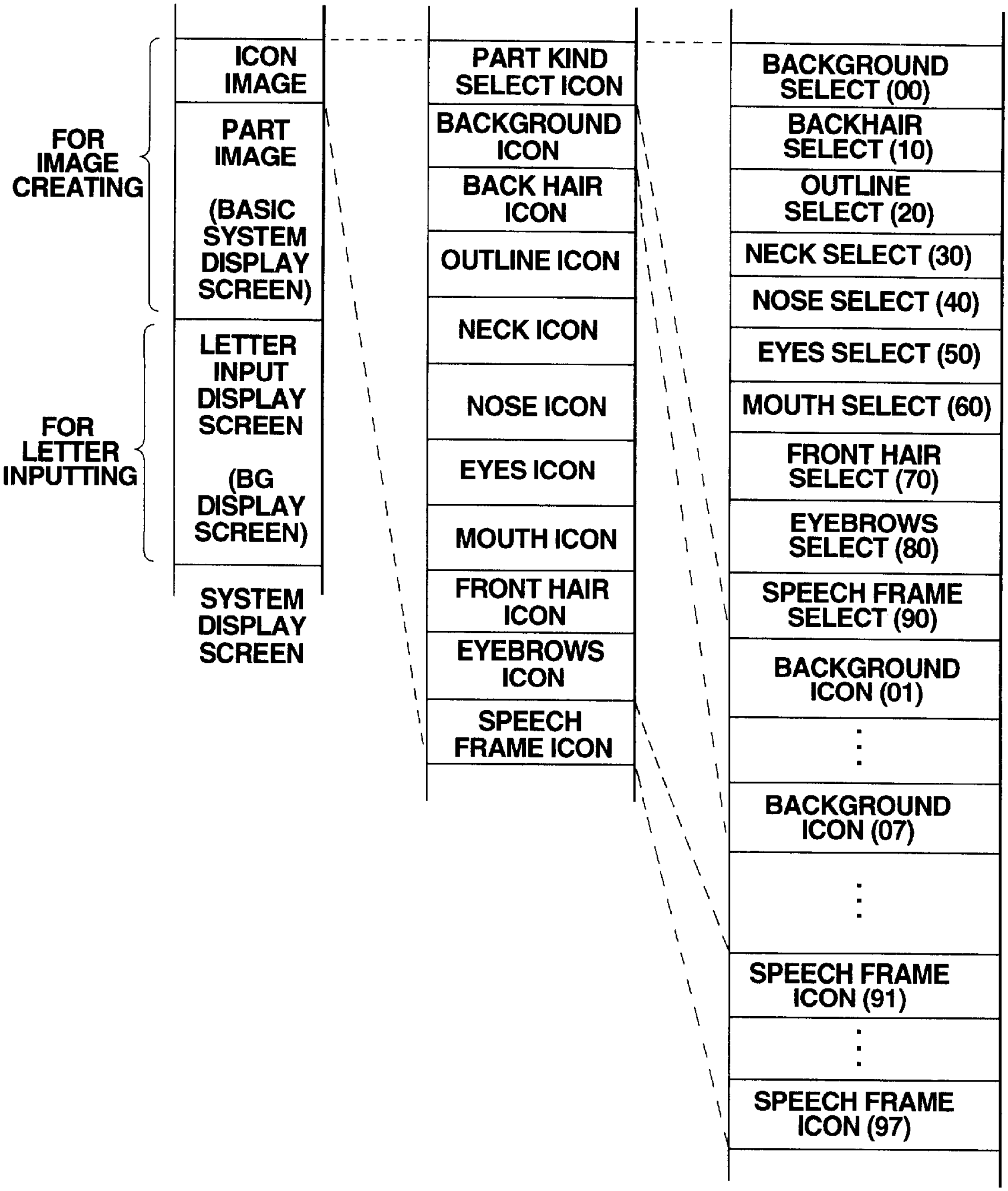

FIG.74

FORMAT OF IMAGE DATA STORED IN PROGRAM/DATA ROM (PART 3)

| | | | |
|---|---|---|---|
| FOR IMAGE CREATING | ICON IMAGE | PART KIND SELECT ICON | BACKGROUND SELECT (00) |
| | PART IMAGE (BASIC SYSTEM DISPLAY SCREEN) | BACKGROUND ICON | BACKHAIR SELECT (10) |
| | | BACK HAIR ICON | OUTLINE SELECT (20) |
| | | OUTLINE ICON | NECK SELECT (30) |
| | | | NOSE SELECT (40) |
| FOR LETTER INPUTTING | LETTER INPUT DISPLAY SCREEN (BG DISPLAY SCREEN) | NECK ICON | EYES SELECT (50) |
| | | NOSE ICON | MOUTH SELECT (60) |
| | | EYES ICON | FRONT HAIR SELECT (70) |
| | | MOUTH ICON | EYEBROWS SELECT (80) |
| | SYSTEM DISPLAY SCREEN | FRONT HAIR ICON | SPEECH FRAME SELECT (90) |
| | | EYEBROWS ICON | BACKGROUND ICON (01) |
| | | SPEECH FRAME ICON | ⋮ |
| | | | BACKGROUND ICON (07) |
| | | | ⋮ |
| | | | SPEECH FRAME ICON (91) |
| | | | ⋮ |
| | | | SPEECH FRAME ICON (97) |

FORMAT OF IMAGE DATA TO BE STORED IN DP-RAM

FIG.77

FORMAT OF DATA TO BE STORED IN WORK RAM

| | | |
|---|---|---|
| AD1 | BACK-GROUND | No. |
| AD1+1 | BACK HAIRE | No. |
| AD1+2 | OUTLINE | No. |
| AD1+3 | NECK | No. |
| AD1+4 | NOSE | No. |
| AD1+5 | EYES | No. |
| AD1+6 | MOUTH | No. |
| AD1+7 | FRONT HAIR | No. |
| AD1+8 | EYEBROWS | No. |
| AD1+9 | SPEECH FRAME | No. |
| AD1+10 | SPEECH LETTER | (1)No. |
| AD1+11 | SPEECH LETTER | (2)No. |
| AD1+12 | SPEECH LETTER | (3)No. |
| AD1+13 | SPEECH LETTER | (4)No. |
| AD1+14 | SPEECH LETTER | (5)No. |
| AD1+15 | SPEECH LETTER | (6)No. |
| AD1+16 | SPEECH LETTER | (7)No. |
| AD1+17 | SPEECH LETTER | (8)No. |
| AD1+18 | SPEECH LETTER | (9)No. |
| AD1+19 | SPEECH LETTER | (10)No. |
| AD1+20 | SPEECH LETTER | (11)No. |
| AD1+21 | SPEECH LETTER | (12)No. |
| | ⋮ | |

| | | |
|---|---|---|
| AD2 | SELECT ICON | 1 |
| AD2+1 | SELECT ICON | 2 |
| AD2+2 | SELECT ICON | 3 |
| AD2+3 | SELECT ICON | 4 |
| AD2+4 | SELECT ICON | 5 |
| AD2+5 | SELECT ICON | 6 |
| AD2+6 | SELECT ICON | 7 |
| | | |
| AD3 | | (1) |
| AD3+1 | | (2) |
| AD3+2 | | (3) |
| AD3+3 | | (4) |
| AD3+4 | | (5) |
| AD3+5 | | (6) |
| AD3+6 | | (7) |
| AD3+7 | | (8) |
| AD3+8 | | (9) |
| AD3+9 | | (10) |
| AD3+10 | | (11) |
| AD3+11 | | (12) |
| | ⋮ | |
| AD4 | SPEECH FRAME KIND No. | |

FLOW CHART INDICATIVE OF WHOLE OPERATION

CURSOR SWITCH OPERATING PROCESS (PART 1)

CURSOR SWITCH OPERATING PROCESS (PART 2)

CURSOR SWITCH CREATING PROCESS (PART 3)

SEL SWITCH OPERATING PROCESS

ENTER SWITCH OPERATING PROCESS (PART 1)

ENTER SWITCH OPERATING PROCESS (PART 2)

ENTER SWITCH OPERATING PROCESS (PART 3)

ENTER SWITCH OPERATING PROCESS (PART 4)

ENTER SWITCH OPERATING PROCESS (PART 5)

BALLOONED FACE IMAGE TRANSFER PROCESS (PART 2)

BALLOONED FACE IMAGE TRANSFER PROCESS (PART 3)

VERTICAL BLANK INTERRUPT PROCESS (PART 2)

VERTICAL BLANK INTERRUPT PROCESS (PART 3)

VERTICAL BLANK INTERRUPT PROCESS (PART 4)

LAYOUT OF BASIC SYSTEM SCREEN
(INITIAL DISPLAY SCREEN)

LAYOUT OF BG-B PLANE IN BASIC SYSTEM SCREEN

LAYOUT OF OBJ-B PLANE
IN BASIC SYSTEM SCREEN

LAYOUT OF BASIC SYSTEM SCREEN
(WHEN DISPLAY SCREEN IS CREATED)
(PART 1)

LAYOUT OF BASIC SYSTEM SCREEN (WHEN DISPLAY SCREEN IS CREATED) (PART 2)

LAYOUT OF BASIC SYSTEM SCREEN
(WHEN DISPLAY SCREEN IS CREATED)
(PART 3)

LAYOUT OF LETTER INPUT SCREEN (PART1)

LAYOUT OF LETTER INPUT SCREEN (PART2)

DISPLAYED EXAMPLE OF BALLOON
(PART 1)

(THERE IS NO NEW LINE)

(THERE IS A NEW LINE)

DISPLAYED EXAMPLE OF BALLOON
(PART 2)

8 LETTERS

14 LETTERS

4 LETTERS

3 LETTERS

LAYOUT OF BASIC SYSTEM SCREEN
(AFTER DISPLAY SCREEN HAS BEEN CREATED)

LAYOUT OF ANOTHER BASIC SYSTEM SCREEN

ENTER SWITCH OPERATING PROCESS (PART 4)

ENTER SWITCH OPERATING PROCESS (PART 5)

ARRANGEMENT OF LETTERS IN EACH BALLOON FRAME

BALLOONED FACE IMAGE TRANSFER PROCESS (PART 3)

FIG.113

LETTER COORINATE CONVERSION TABLE

| SPEECH FRAME NO. | ( X, Y ) |
|---|---|
| 1 | (0, 0) (5, 0) (10, 0) (15, 0) (20, 0) (30, 0) (35, 0) (40, 0) |
| 2 | (0, 0) (5, 0) (10, 0) (15, 0) (20, 0) (0, 5) (5, 5) (10, 5) |
| 3 | (0, 0) (5, 0) (10, 0) (15, 0) (20, 0) (0, 5) (0, 10) (0, 15) |
| 4 | . . . |

FIG.120A
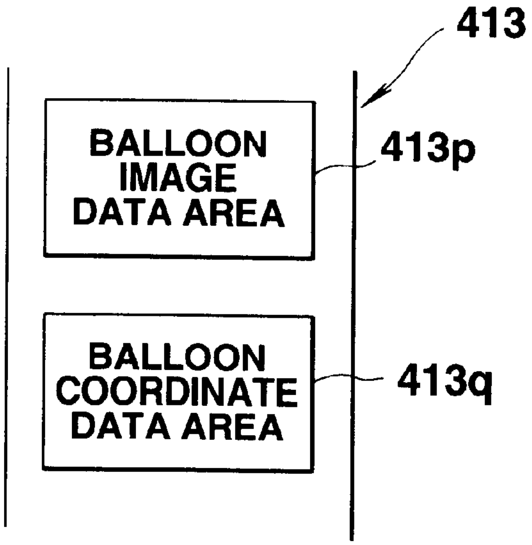
FIG.120B
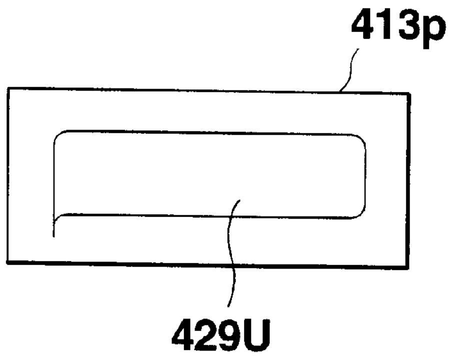
FIG.120C
| | | |
|---|---|---|
| 00 | X COORDINATE | Y COORDINATE |
| 01 | X COORDINATE | Y COORDINATE |
| 02 | X COORDINATE | Y COORDINATE |
| 03 | X COORDINATE | Y COORDINATE |
413q 408
NOTHING IS DISPLAYED WHEN BALLOON POSITION IS SET.
UPPER BALLOON 429U
LETTER LIST 428

408
428 LETTER LIST
429D LOWER BALLOON
NOTHING IS DISPLAYED WHEN BALLOON POSITION IS SET.

NOTHING IS DISPLAYED WHEN BALLOON POSITION IS SET.
428 LETTER LIST
408
429L LEFT BALLOON

NOTHING IS DISPLAYED WHEN BALLOON POSITION IS SET.
429R RIGHT BALLOON
408
428 LETTER LIST

FIG.123A

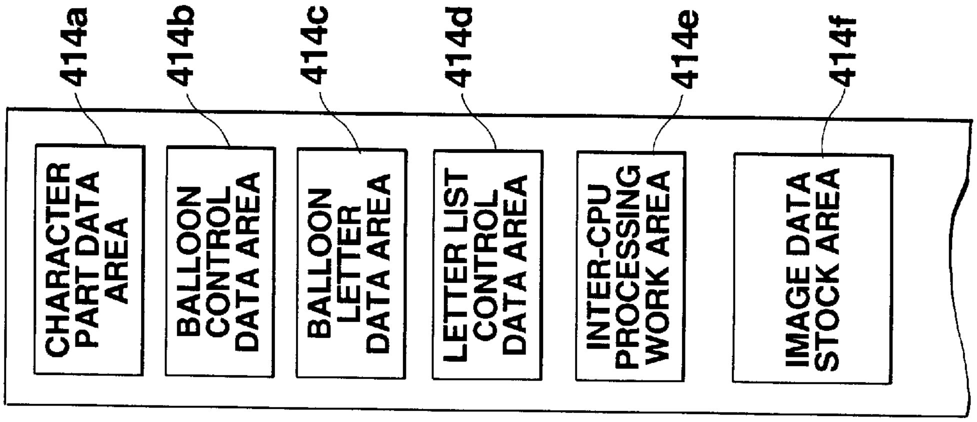

FIG.123B

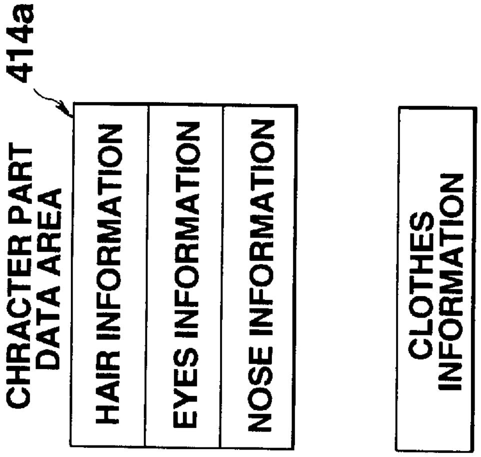

FIG.123C

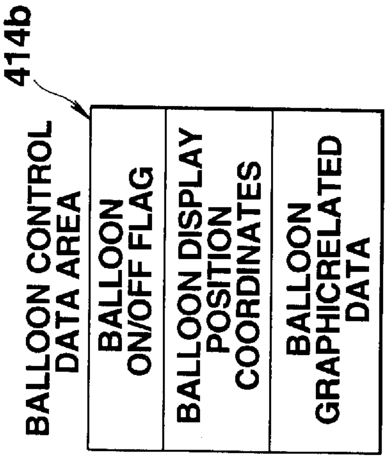

FIG.123D

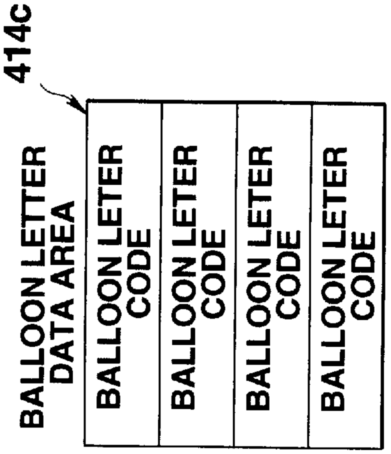

FIG.123E

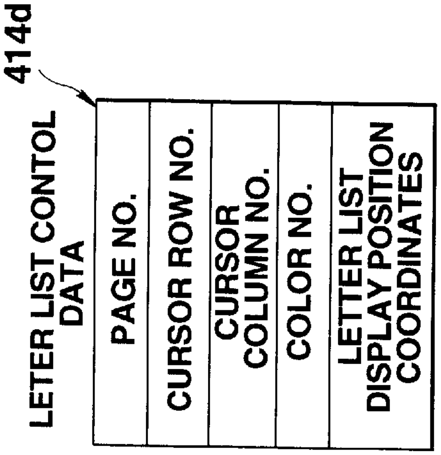

414c

BALLOON LETTER DATA AREA
- BALLOON LETTER CODE
- BALLOON LETTER CODE
- BALLOON LETTER CODE
- BALLOON LETTER CODE

414d

LETTER LIST CONTROL DATA
- PAGE NO.
- CURSOR ROW NO.
- CURSOR COLUMN NO.
- COLOR NO.
- LETTER LIST DISPLAY POSITION COORDINATES

414a

CHARACTER PART DATA AREA
- HAIR INFORMATION
- EYES INFORMATION
- NOSE INFORMATION

CLOTHES INFORMATION

414b

BALLOON CONTROL DATA AREA
- BALLOON ON/OFF FLAG
- BALLOON DISPLAY POSITION COORDINATES
- BALLOON GRAPHIC RELATED DATA

- 414a CHARACTER PART DATA AREA
- 414b BALLOON CONTROL DATA AREA
- 414c BALLOON LETTER DATA AREA
- 414d LETTER LIST CONTROL DATA AREA
- 414e INTER-CPU PROCESSING WORK AREA
- 414f IMAGE DATA STOCK AREA

IMAGE PROCESSOR

BACKGROUND OF THE INVENTION

1. Field of the Invention

The present invention concerns image processors which display and/or edit graphics or letter strings and, more particularly, to a technique for displaying a balloon in accordance with a letter string inputted by a user.

2. Description of the Related Art

In a conventional personal computer or game machine, the images of sprites (objects) and backgrounds can be edited and the images designated by a user can be displayed on a television screen. Such an apparatus can create a desired image by an optional combination of the images of objects, data on which is previously stored. For example, the user can create a face image of a desired person by optionally selecting part images of a face such as eyes and mouths as objects, from among many images of parts of the face, data on which is stored is a memory, and combining them.

In recent years, image processors can display not only the created face image but also provide images of higher quality by displaying various images in combination.

As an image to be displayed in combination with the face image, its background is first mentioned, and a balloon is second mentioned as the form of expression used frequently in cartoons or animations. The balloon comprises a letter string (speech) and a balloon frame surrounding the letter string, which is used generally to visually emphasize matters to be conveyed such as conversation or what is thought mentally to distinguish them from other matters displayed.

When the balloon image is displayed together with the face image, it looks as if a message were uttered from the face image to further enhance the force of expression of the face image.

However, various problems would arise when the balloon image is displayed together with face image.

At first, it has been known that the impression to be given differs greatly depending on the shape of the balloon frame even when the speech is fixed. In view of the above, it has been proposed to previously store a data on a plurality of different balloon images such that a user can select and display a desired balloon frame image among them so as to satisfy users various demands.

However, this arrangement requires troublesome operations in the creation of the entire balloon, such as selection of a balloon frame image, inputting of a letter string that constitutes the speech and, further, designation of the size and display position of each letter of the letter string such that the letter string can be accommodated within the selected balloon frame image.

Particularly, in order to place the letter string that constitutes a speech within a selected balloon frame, the inputted letter string is parted into partial letter strings in accordance with the shape of the balloon frame and the parted partial letter strings are arranged for side by side display. However, this method results in a problem that a line is started at a position not intended by the user.

If a new line of the speech is started at an unintended position, for example, partition of a word may sometimes becomes obscure, thereby making it difficult to understand the meaning of the speech. Such a problem may be avoided by inputting the speech while taking the shape of the balloon frame into consideration, but the user is required to input the speech after recognizing the number of letters, the contents of the speech, and the shape of the balloon frame, which is extremely troublesome in the actual operation.

Further, each time it is tried to replace a balloon frame image with another after a letter string has been placed and displayed in the balloon frame image, selection of size of the letters and the positional alignment of the letters and balloon frame must be performed. Further, when the number of letters of the speech is input, the letters are required to be positioned again in accordance with the changed number of letters, which would cause a troublesome operation.

On the other hand, the letter string indicative of the speech in the balloon must be optionally inputtable by the user. However, the operation of inputting the letter string is extremely troublesome. Especially, the operability of equipment such as game machines intended for young users is very bad.

Further, in order to input a letter string, an independent letter input screen is required for selecting letters and editing a letter string. On the other hand, when the created face image is saved into and later loaded on a file, a letter input screen is also necessary for designating the file title. In this case, generally, the letter input screen for inputting the letter string used in a balloon and the letter string input screen for other uses such as designation of the file title are constituted in separate data formats.

However, when those letter input screens are constituted in separate data formats, image data corresponding to the respective formats are required, which increases the memory capacity for storing the image data to thereby increase the cost. On the other hand, if the letter input screens are constituted in the same data format, it cannot be discerned whether the letter string is being now inputted into the balloon or for another application such as designation of a file title.

Further, most of formats in the letter string input screens merely contain a letter list and the user cannot previously recognize a region where a letter string to be inputted can be displayed, from the letter input screen. For instance, a letter string of small number of constituent letters such as a file title does not greatly influence on the images in the case of synthetic display of the letter string and the images, so that it is not required to perform the input operation of the letter string while previously recognizing an input region for the letter string. In contrast, when the number of letters of a speech of a balloon as compared with that of the file title or the like, the user can not determine the length of the speech if the user can not previously recognize the display area for the inputted letter string. Accordingly, when the letter string which constitutes the speech later and the face image are synthesized and displayed, the speech-constituting letter string may be excessively longer or shorter to possibly render it difficult to display a speech of an appropriate length in accordance with the face images.

SUMMARY OF THE INVENTION

One object of the present invention is to facilitate and simplify the operation required for the user to create a desired balloon.

According to one aspect of the present invention, there is provided an image control device comprising:

letter string inputting means for inputting a letter string to the image control device;

frame deciding means for deciding an attribute of a frame surrounding the letter string inputted by the letter string inputting means in accordance with the letter string; and displaying means for displaying the image of a frame having the attribute decided by the frame deciding means and the image of the letter string inputted by the letter string inputting means.

According to the above arrangement, since the attribute of the balloon frame is determined automatically in accordance with the inputted letter string, the user is free from consideration to and operation of decision of the shape of a balloon frame which is considered optimum to the inputted letter string and the operation of creating the balloon is facilitated and simplified.

Another object of the present invention is to facilitate and simplify the operation required for the user to create a desired balloon, as well as to prevent the contents of the speech in the created balloon from becoming unclear.

According to one aspect of the present invention, there is provided an image processor comprising:

letter string inputting means for inputting a letter string to the image processor, frame displaying means for displaying a frame image for surrounding the letter string inputted by the letter string inputting means;

parting information inputting means for inputting parting information of parting the letter string inputted by the letter string inputting means into a plurality of partial letter strings; and letter string displaying means for parting the letter string inputted by the letter string inputting means into partial letter strings in accordance with the parting information inputted by the parting information inputting means, and allocating and displaying the images of the partial letter strings to and in the frame image displayed by the frame display signal outputting means.

With this arrangement, since the letter string representing the speech is parted into a plurality of partial letter strings and the parted partial letter strings can be allocated and displayed to and in the balloon frame, the letter string can be parted and a new line can be started at a position intended by the user. Therefore, the meaning of the speech represented by the letter string is no more made obscure by the starting of the new line.

Another object of the present invention is to eliminate positional adjustment of the letters in the balloon frame and further to facilitate and simplify the user's operation required for creating a balloon even when the shape of the balloon frame is changed later.

According to a further aspect of the present invention, there is provided an image control device comprising:

letter string inputting means for inputting a letter string to the image control device;

frame displaying means for displaying a frame image for surrounding the letter string inputted by the letter string inputting means;

letter position acquiring means for acquiring display position information for each of letters in the frame image displayed by the frame displaying means; and letter displaying means for displaying individual letter images constituting the letter string inputted by the letter string inputting means in the frame image displayed by the frame displaying means in accordance with the display position information obtained by the letter position acquiring means.

With this arrangement, when the user designates a balloon frame, individual letters constituting the letter string inputted by the user are arranged in accordance with the display position information for the letters set in the balloon frame. Thus, designating the display positions of the inputted letters individually is omitted to thereby facilitate and simplify creation of the balloon.

A further object of the present invention is to render unnecessary the operation for inputting individually letters of a letter string constituting a speech in the balloon to thereby simplifying the letter inputting operation.

According to one aspect of the present invention, there is provided an image control device comprising:

letter string selecting means for selecting at least one letter string from among a plurality of different letter strings;

letter modifying figure image displaying means for displaying a letter modifying figure image for modifying the letter string selected by the letter string selecting means;

letter string displaying means for displaying the letter string selected by the letter string selecting means with a letter string image corresponding to the letter modifying figure image displayed by the letter modifying figure image displaying means; and letter string editing means for editing the letter string displayed as the letter string image by the letter string displaying means.

With this arrangement, a letter string corresponding to the letter modifying graphic may be selected from among the plurality of previously provided letter strings and it is no more required to input letters individually from the beginning, to thereby simplify the operation of inputting the letters constituting the speech of the balloon.

A further object of the present invention is to simplify the operation of inputting letters constituting a speech in the balloon, as well as to facilitate the correspondence between an image displaying a balloon and the title of a file for saving the image.

According to a further aspect of the present invention, there is provided an image control device comprising:

letter string selecting means for selecting at least one letter string from among a plurality of different letter strings;

letter modifying figure displaying means for displaying a letter modifying figure image for modifying the letter string selected by the letter string selecting means;

letter string displaying means for displaying the letter string selected by the letter string selecting means with a letter string image corresponding to the letter modifying figure image displayed by the letter modifying figure displaying means, letter string editing means for editing the letter string to be displayed as a letter string image by the letter string displaying means;

figure displaying means for displaying a desired figure image;

file designating means for designating a file corresponding to the letter string selected by the letter string selecting means; and control means for saving or loading the desired figure image to be displayed by the figure displaying means into or from of a file designated by the file designating means.

With this arrangement, the letter string inputted as the file title can be utilized as a portion of the letter string constituting the speech of the balloon, so that it is no more necessary to individually input the letters constituting the speech from the beginning, and the file title, the balloon image with the balloon and the file title in which the image is saved can be intuitively put in a corresponding relationship.

It is a further object of the present invention to use, a common letter input screen both for inputting letters constituting a speech in the balloon and for inputting letters in other applications, thereby reducing the capacity of a memory used and hence the cost.

According to one aspect of the present invention, there is provided an image control device comprising;

first letter input screen displaying means for displaying a first letter input screen by using predetermined image data, letter modifying figure displaying means for displaying a letter modifying figure image for modifying letters to be displayed, first letter inputting means for inputting letters in correspondence to the letter modifying figure image to be displayed by the letter modifying figure displaying means when the first letter input screen has been displayed by the first letter input screen displaying means, second letter input screen displaying means for displaying a second letter input screen, for a letter inputting operation other than the letter inputting operation by the first letter inputting means, using the same image data as that used by the first letter input screen displaying means; and second letter inputting means for inputting letters when the second letter inputting screen is displayed by the second letter inputting screen displaying means.

With this arrangement, since common image data is used as the image data used for displaying the letter input screen for inputting letters in correspondence to a letter modifying figure such as a balloon and as the image data for displaying a letter inputting screen for inputting other letters, for example, of a file title to be saved, the memory capacity and hence the cost area reduced as compared with the existent constitution having the separate image data.

It is a further object of the present invention to enable an easy inputting operation of an appropriate speech when a speech in a balloon which requires a letter string of relatively many letters is inputted.

According to one aspect of the present invention, there is provided an image processor comprising:

frame displaying means for displaying a frame image in a desired area on a display screen;

letter list displaying means for displaying a letter list comprising a plurality of different letter images in a area different from the predetermined area on the display screen;

letter inputting means for sequentially selecting and inputting letter images from among the plurality of different letter images in the letter list displayed on the display screen by the letter list displaying means; and letter displaying means for displaying letter images inputted sequentially by the letter inputting means within the frame image displayed by the frame displaying means.

With this arrangement, since not only the letter list but also the frame defining a area where a letter string is displayable are displayed on the display screen upon inputting the letter string is inputted, letters can be inputted into the frame while previously recognizing the number of letters displayable and the layout letters. This enables to input a letter string having an appropriate length and layout in a limited area. As a result, a speech of an appropriate length can be displayed easily in the connection with the image when a letter string constituting a speech and the image, for example, of a face displayed together with the speech are combined and displayed.

BRIEF DESCRIPTION OF THE DRAWINGS

These and other objects, as well as advantageous features of the present invention will be apparent to those skilled in the art from the description of preferred embodiments according to the present invention in conjunction with the appended drawings, wherein

FIG. 5 is a view showing a display area assignment on a display screen;

FIG. 8 shows a format image data stored in program/data ROM 107 (part 3):

FIG. 9 shows a format of image data stored in a work RAM;

FIG. 11 shows a data arrangement of a display control register;

FIG. 71 is a view illustrating a screen assignmentin a second embodiment of the present invention;

FIG. 74 illustrates the format of image data stored in program/data ROM (part 3);

FIG. 77 illustrates a format of image data stored in work RAM;

FIGS. 105A and 104B show a display example of balloon (part 2);

FIG. 113 illustrates a letter coordinate conversion table;

FIGS. 120A–120C illustrate a portion of ROM data;

FIGS. 121A–121C illustrate the relationship between display position of a balloon and display position of the letter list;

FIG. 122 shows a displayed character when delineated;

FIGS. 123A–123E illustrate the constitution of a RAM area;

FIG. 124 is a flow chart illustrating a main flow;

FIG. 125 is a flow chart illustrating the contents of an initial process;

FIG. 126 is a flow chart illustrating the contents of a key selection and data setting process;

FIG. 127 is a flow chart illustrating the contents of balloon preparation process;

FIG. 128 is a flow chart illustrating the contents of balloon position setting process;

FIG. 129 is a flow chart illustrating the contents of a letter inputting process;

FIG. 130 is a flow chart illustrating the contents of a letter list display process;

FIG. 131 is a flow chart illustrating the contents of an index skip process; and FIG. 132 is a flow chart illustrating the contents of a letter list control process.

DESCRIPTION OF PREFERRED EMBODIMENTS

The present invention will be described in detail by way of a first embodiment thereof with reference to the drawings.

(Entire Constitution of a Circuit of a First Embodiment)

Figure 1:
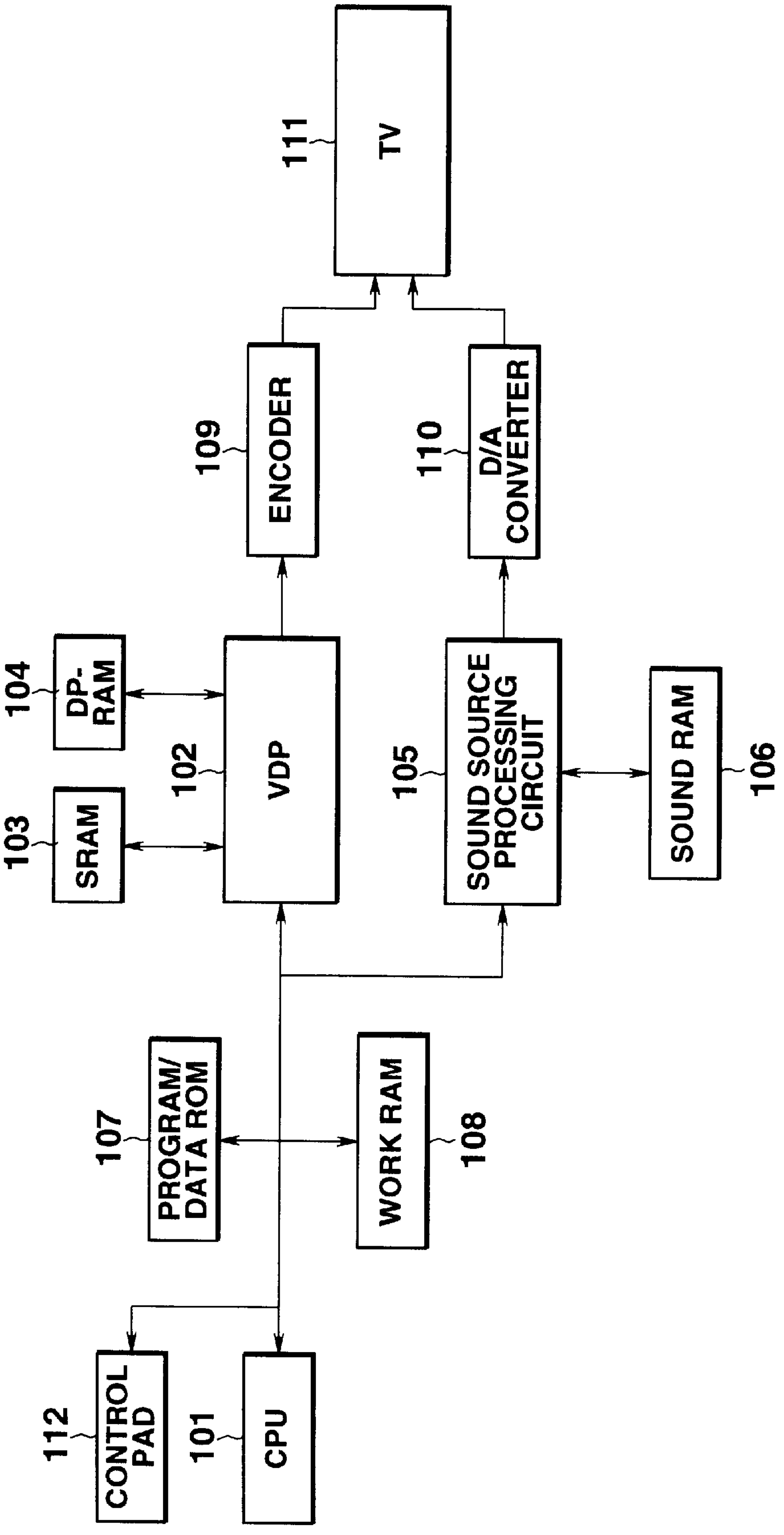
FIG. 1 is an entire schematic of a circuit of a portrait creation device as a preferred embodiment according to the present invention.

FIG. 1 is an entire constitutional view of a circuit of a preferred embodiment of the present invention, which is embodied as a portrait creation device having the appearance of a game machine, which is intended for young users and its components are disposed within the same casing except for a television receiver 111.

VDP (Video Display Processor) 102 controls image processing operations regarding sprites (objects), a background, a bit map, etc.

SRAM (Static RAM) 103 stores image data for the sprites (objects) and the background. DP-RAM (Dual Port RAM) 104 stores image data for the bit map. SRAM 103 and DP-RAM 104 are accessed from VDP 102.

A sound source processing circuit 105 generates data for music sounds generated together with images.

Sound RAM 106 stores music sound waveform data to be processed in the sound source processing circuit 105 and control data therefor.

Program/data ROM 107 contains a program to be executed by CPU 101 and various data used in the program. CPU 101 controls VDP 102 and sound source processing circuit 105 in accordance with the program, using work RAM 108.

Encoder 109 converts RGB analog video signals sent from VDP 102 to television-standard video signals (NTSC signal).

D/A converter 110 converts digital sound data sent from sound source process circuit 105 to an analog sound signal.

Television receiver 111 reproduces video signals outputted by way of video output terminal 104 shown in FIG. 1 from encoder 109 and sound signals outputted by way of audio output terminal 103 shown in FIG. 1 from D/A converter 110.

Figure 2:
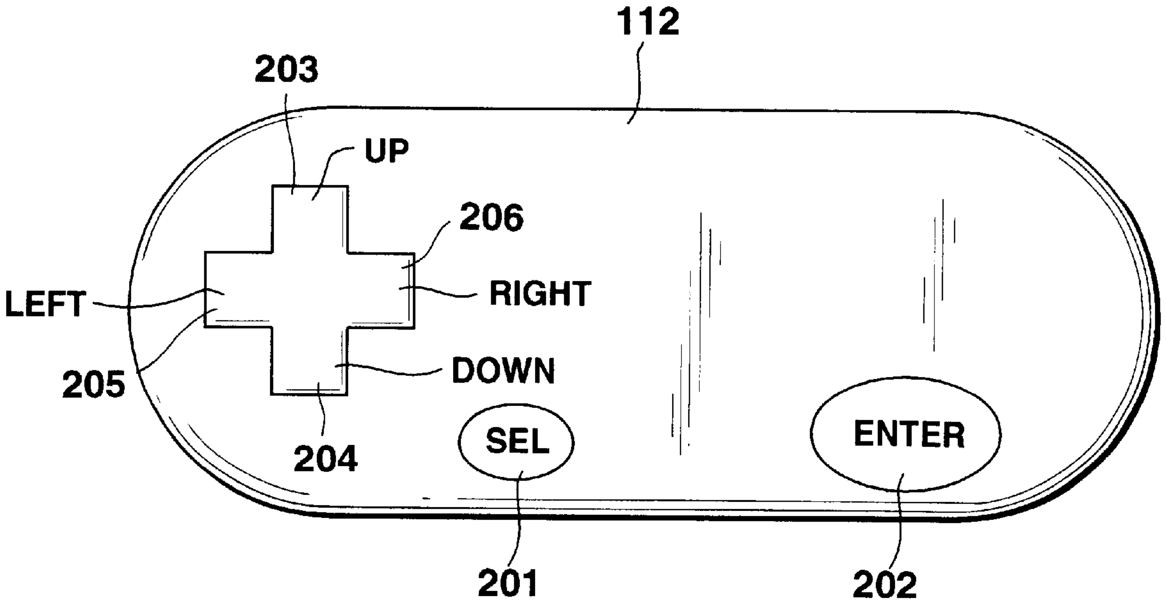
FIG. 2 shows the appearance of control pad 112.

Control pad 112 has the appearance shown in FIG. 2 for causing the user to conduct various operations. As shown in FIG. 2, control pad 112 has thereon SEL switch 201, ENTER switch 202 and U (UP), D (DOWN), L (LEFT) and R (RIGHT) switches 203–206.

(Constitution of VDP 102)

Figure 3:
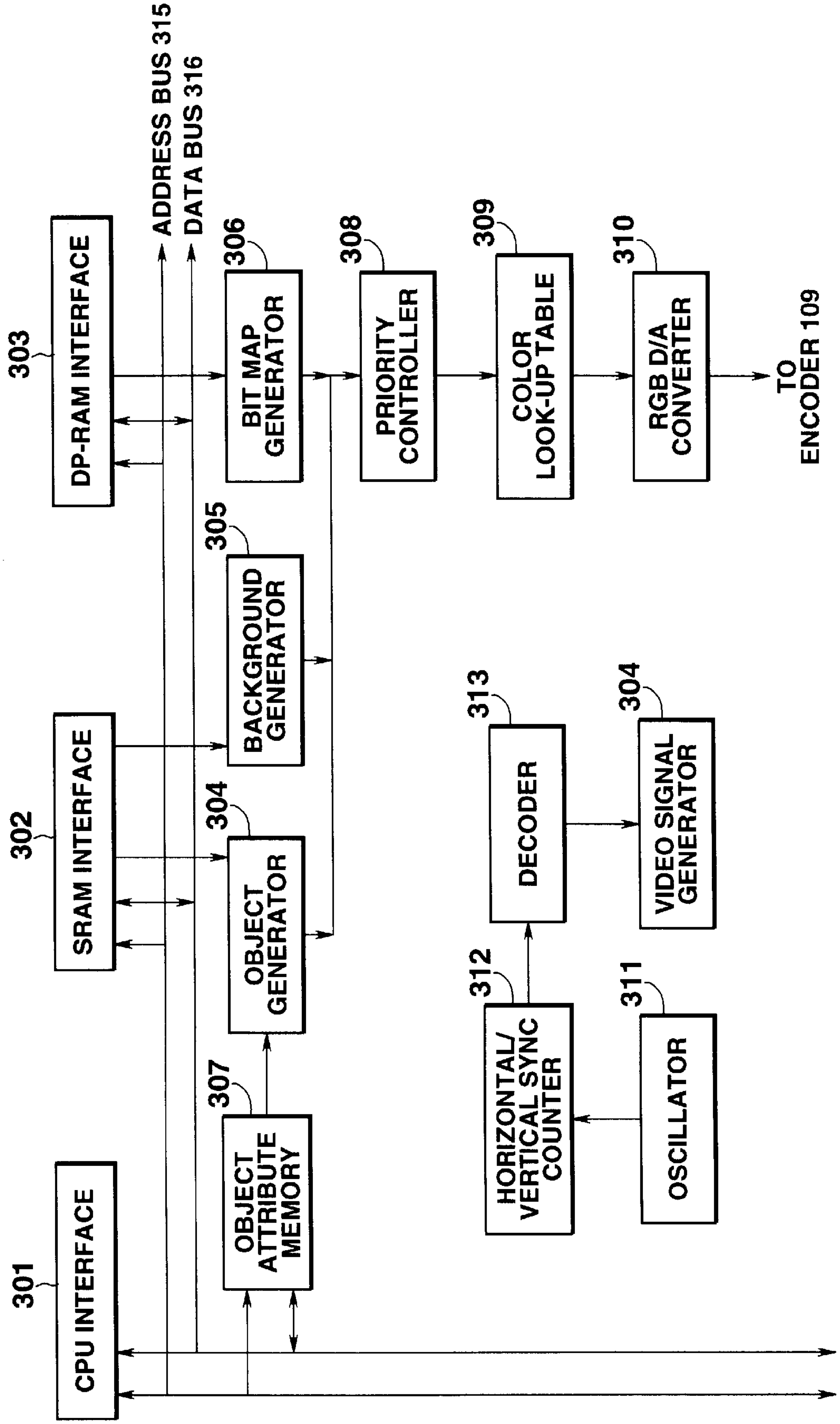
FIG. 3 is a schematic of VDP.

FIG. 3 is a schematic of VDP 102 shown in FIG. 1.

VDP 102 controls the display of a sprite (object) mainly which expresses a movable character, the background and a bit map on television receiver 111 (FIG. 1) when the portrait is created.

CPU interface 301 controls an interface through which data is transferred between CPU 101 and VDP 2 in FIG. 1.

SRAM interface 302 controls an interface through which object generator 304 or background generator 305 to be described later accesses image data on the sprites (objects) or the back ground stored in SRAM 103 in FIG. 1.

DP-RAM interface 303 controls an interface through which bit map generator 306 to be described later accesses image data on the bit map stored in DP-RAM 104 in FIG. 1.

Object generator 304, background generator 305 and bit map generator 306 read, in each horizontal period (refer to FIG. 12 described later), the color codes of the sprite (object), the background or the bit map disposed at display coordinates corresponding to each of dot display timings in the next horizontal display period from SRAM 103 or DP-RAM 104 in FIG. 1 and stores the codes in the respective internal buffers thereof.

Further, object attribute memory 307 stores data on display coordinates corresponding to the timing when object generator 304 reads data on a sprite (object) from SRAM 103 through SRAM interface 302.

Priority controller 308 selects and outputs one of the color codes read by object generator 304, background generator 305 and bit map generator 306 at each dot in each of the horizontal display periods in accordance with a predetermined priority.

Color look-up table 309 converts the color code outputted from priority controller 308 to R (red), G (green) and B (blue) digital data and outputs same.

RGB D/A converter 310 converts RGB digital data outputted from priority controller 308 to RGB analog video signals and outputs same.

Oscillator 311 generates various clocks required for VDP 102.

Horizontal/vertical sync counter 312 is a counter circuit for generating a horizontal sync counter value (horizontal sync signal) and a vertical sync counter value (vertical sync signal) required for image display in accordance with clocks outputted from oscillator 311.

Decoder 313 decodes a counter value outputted from horizontal/vertical sync counter 312 to a horizontal sync counter value and a vertical sync counter value and supplies data on those values to the respective blocks concerned of VDP 102.

Video signal generator 314 generates video signals, required for encoder 100 in FIG. 1, from the horizontal sync counter value and the vertical sync counter value outputted from decoder 313 and supplies the video signals to encoder 109.

(Constitution of Image Data)

Figure 4:
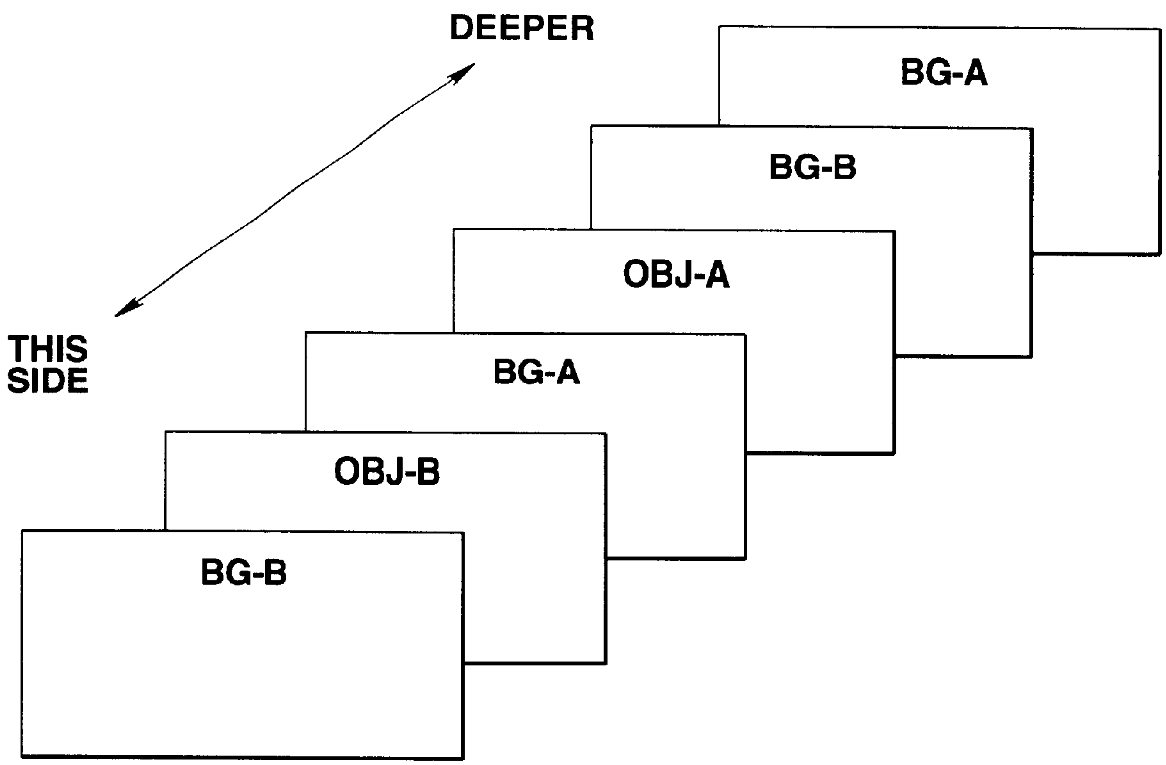
FIG. 4 illustrates a hierarchical structure of a display screen.

At first, the display screen in this embodiment has a constitution, as shown in FIG. 4, in which six virtual display planes overlap. The display planes are disposed from the deeper side to this side in the order of background plane A (BG-A plane), bit map plane B (BM-B plane), object plane A (OBJ-A plane), bit map plane A (BM-A plane), object plane B (OBJ-B plane) and background plane B (BG-B plane). An image assigned nearer this side has a higher prior of display and is displayed while concealing images assigned to other deeper display planes.

FIG. 5 shows the relationship between kind of image data (part) assigned to each of the display planes and screen mode. Various kinds of image data displayed on BG-A, BG-B, BM-A, BM-B, OBJ-A and OBJ-B planes are stored in program/data ROM 107 shown in FIG. 1 in the data formats shown in FIG. 6 to FIG. 8. The image data on BG-A, BG-B, OBJ-A and OBJ-B planes are transferred by CPU 101 shown in FIG. 1 from program/data ROM 107 through work RAM 108, CPU interface 301, address bus 315, data bus 316 and SRAM interface 302 shown in FIG. 3 to SRAM 103. Similarly, image data on BM-A and BM-B planes are transferred by CPU 101 shown in FIG. 1 from program/data ROM 107 through work RAM 108, CPU interface 301, address bus 315, data bus 316 and DP-RAM interface 303 in FIG. 3 to SRAM 103. FIG. 9 shows data formats in which various kinds of image data are stored in work RAM 108 during transfer.

In this embodiment, in order to reproduce small area images and a larger image comprising repeated small area images, in view of an data compression effect, the original image is partitioned into smaller area images which are then stored in SRAM 103 or DP-RAM 104 and which are reproduced once or by optional repetition into a larger image. The smaller area is hereinafter referred to as a cell.

On the BG plane, the cells are arranged in the form of a map (matrix) to synthesize an image of an aimed size. If it is desired to change only a portion of the images, only data on the corresponding cells of SRAM 103 may be rewritten by CPU 101 and hence no effects on other cells are produced. In this embodiment, the BG plane data can be outputted for two planes. They are hereinafter referred to BG-A plane and BG-B plane.

Plane OBJ is used not for data compression but for simply changing the display positions of the small area images with no effect (for example, no re-drawing effect) on other images (background or the like), or providing respective priorities for a plurality of sprites (objects) (the number of simultaneous display of sprites is 128 in this embodiment). Since the image on OBJ plane is of a small area and small data amount (a small number of dots), a memory access time to image data on that plane can be short and a large number of image data can be reproduced accordingly. The image on OBJ plane is also composed of cells like the images on the BG plane. Further, in this embodiment, the OBJ plane data can be outputted for two planes. They are hereinafter referred to as OBJ-A plane and OBJ-B plane.

While the BM area has image having a measure of area, it is a plane suitable to the case where the number of elements to be reproduced repeatedly is small. In this case, it is unnecessary to constitute an image with cells and it is also unnecessary for to provide map information. In this embodiment, BM plane data can be outputted for two planes. They are hereinafter referred to as a BM-A plane and a BM-B plane.

(Outline of VDP 102 and CPU 101 Operations)

The operation of CPU 101 and VDP 102 will be outlined next.

Object generator 304 and background generator 305 of FIG. 3 access SRAM interface 302 at each of time-shared timings in each horizontal period. In the access, object generator 304 reads from SRAM 103 of FIG. 1 the color codes of sprites (objects) to be arranged respectively at display coordinates on the OBJ-A plane and display coordinates on the OBJ-B plane corresponding to a display timing for each dot in the next horizontal display period and stores the color codes in line buffers corresponding to the display planes in object generator 304. Similarly, background generator 305 reads from SRAM 103 of FIG. 1 the color codes of the background to be disposed respectively at a display coordinate on BG-A plane and at display coordinates on the BG-B plane corresponding to a display timing for each dot in the next horizontal display period and stores the color codes in the line buffers corresponding to the respective display planes in background generator 305.

Figure 7:
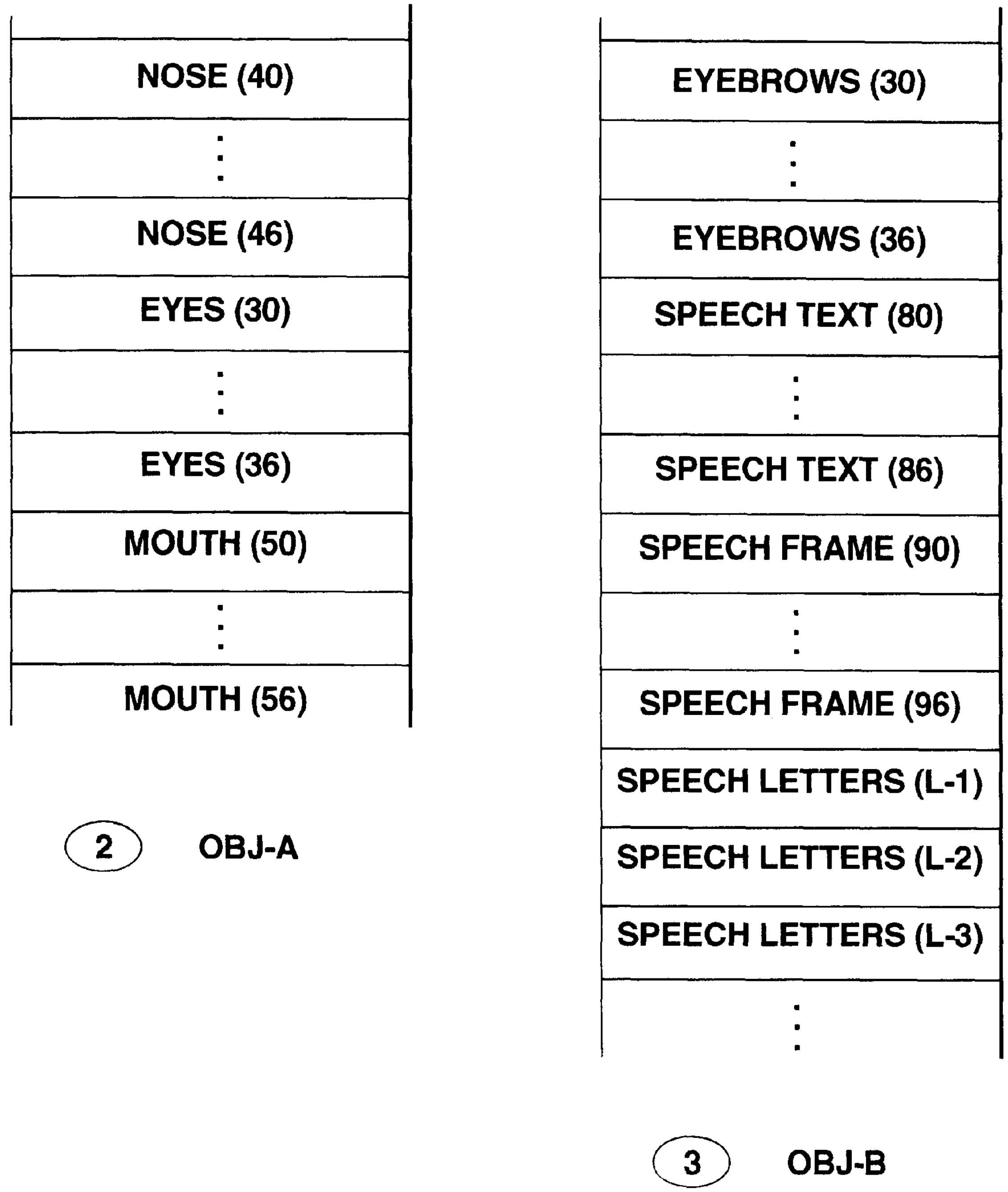
FIG. 7 shows a format of image data stored in program/data ROM 107 (part 2)
Figure 10:
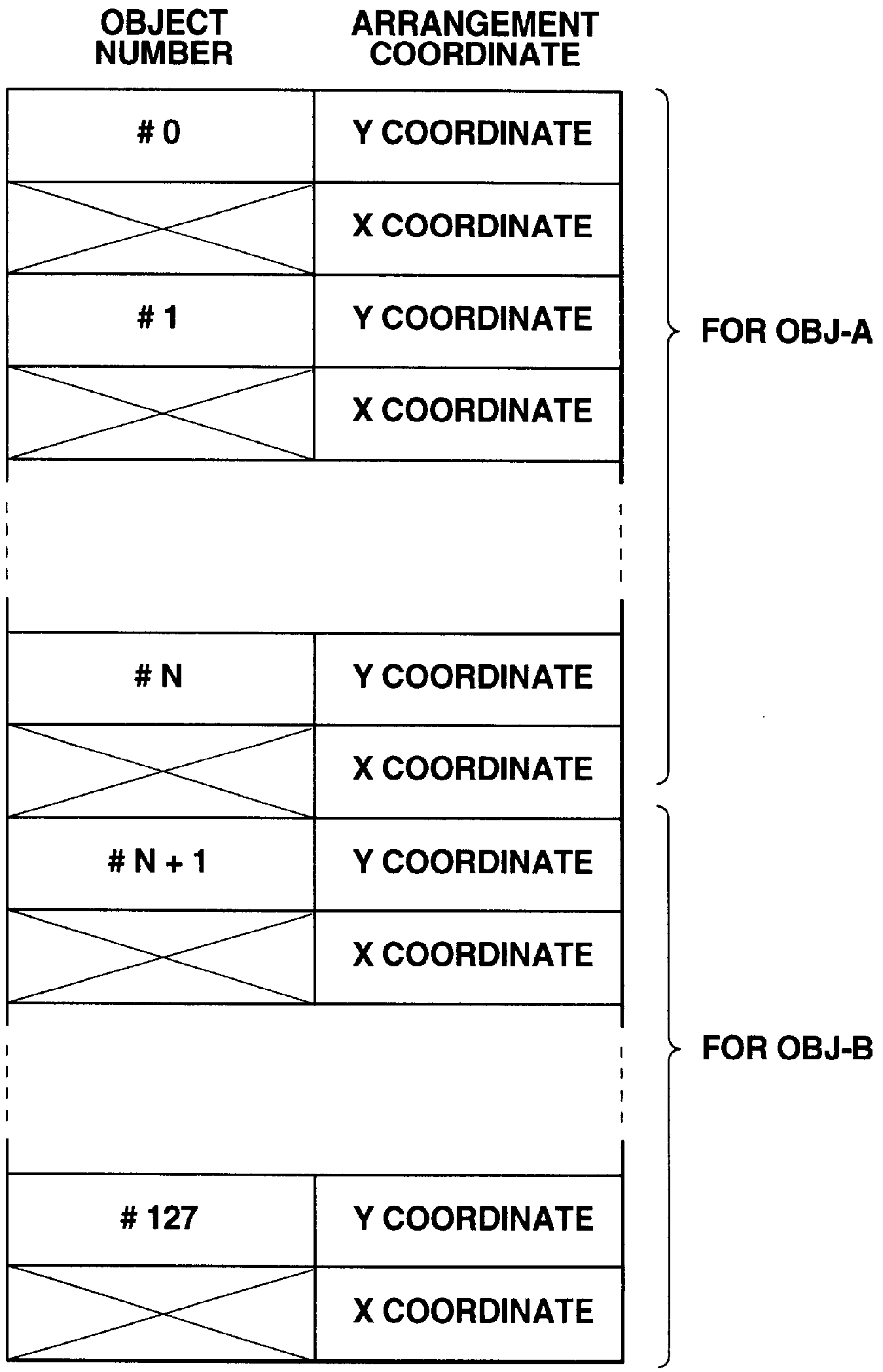
FIG. 10 shows a data arrangement in an object attribute memory.

In the operation described above, CPU 101 shown in FIG. 1 stores, in the data format of FIG. 10, data on the coordinates on OBJ-A plane or OBJ-B plane in which the respective ones of the maximum of 128 sprites (objects) stored in the data format shown in FIG. 7 in SRAM 103 shown in FIG. 1 are arranged in object attribute memory 307 through CPU interface 301, address bus 315, and data bus 316. Then, object generator 304 calculates a reading timing corresponding to the coordinates of each of the sprites (objects) stored in object attribute memory 307 and reads out data on the sprites (objects) from SRAM 103 at the calculated timing and stores the sprites into the line buffers.

On the other hand, bit map generator 306 accesses DP-RAM interface 303 at each time-shared timing in each horizontal sync period independently of the accessing operation of object generator 304 and background generator 305. In the access, background generator 305 reads from DP-RAM 104 of FIG.1 the color codes of the bit maps to be arranged respectively at display coordinates on BM-A plane and at display coordinates on BM-B plane corresponding to a display timing for each dot in the next horizontal display period and stores the color codes into the line buffers corresponding to the display planes in bit map generator 306.

As described above, in each horizontal period, the color codes of the sprites (objects) for the next one line to be disposed respectively on OBJ-A plane and OBJ-B plane are obtained in the two line buffers in object generator 304, the color code of sprites (objects) for next one line to be disposed respectively on BG-A plane and BG-B plane are obtained in the two line buffers in object generator 305, and the color codes of a bit map for next one line to be arranged respectively on BM-A plane and BM-B plane are obtained in the four line buffers in bit map generator 306.

CPU 101 in FIG. 1 sets, in a display control register, not particularly shown, in VDP 102 having the data format shown in FIG. 11, data on whether each of the display planes shown in FIG. 4 is used or not. Object generator 304, background generator 305 and bit map generator 306 in FIG. 3 decide whether the image data (color code) corresponding to each display phase is to be read out of SRAM 103 or DP-RAM 104 or not, by reference to the content of the display control register.

Figure 12:
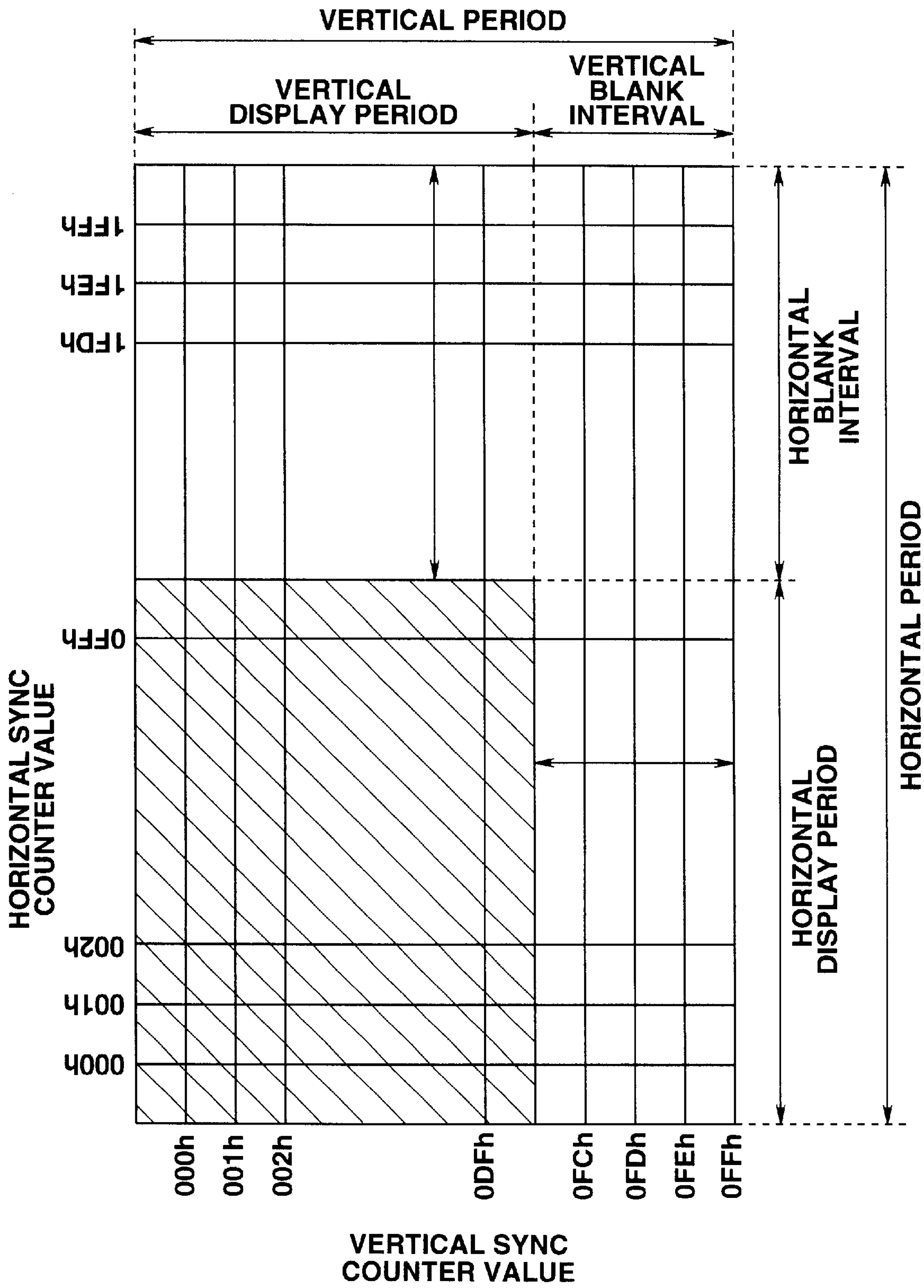
FIG. 12 illustrates screen display timings.

FIG. 12 illustrates screen display timing.

A period in which the horizontal sync counter value outputted from decoder 313 in FIG. 3 changes from 000h to 1FFh ("h" represents a hexadecimal number) is 1 horizontal period. In the 1 horizontal period, a period corresponding to the horizontal sync counter value for 256 counts of 000h to 0FFh is a horizontal display period for 1 line of 256 dots and a period corresponding to other horizontal sync counter value is a horizontal blank period. Further, a period in which the vertical sync counter value outputted from decoder 313 changes from 000h to 1FFh is 1 vertical period, which constitutes a display period for one screen on television receiver 111 in FIG. 1. Then, the period corresponding to the vertical sync counter value of 224 counts for 000h to 0DFh is a vertical display period for 224 vertical lines and the period corresponding to other vertical sync counter value is a vertical blank period.

A set of RGB data are outputted from color look-up table 309 of FIG. 3 to RGB D/A converter 310 each time of the horizontal sync counter value counts up.

(Details of the Operation of CPU 101)

The operation of CPU 101 in FIG. 1 is will be explained in detail. Each of operational flow charts to be explained indicates CPU 101 execution of the control program stored in program/data ROM 107. The functional elements of the arrangement shown in FIG. 1 to FIG. 3 are involved in this operation unless otherwise referred to.

Entire Operation Flow

Figure 13:
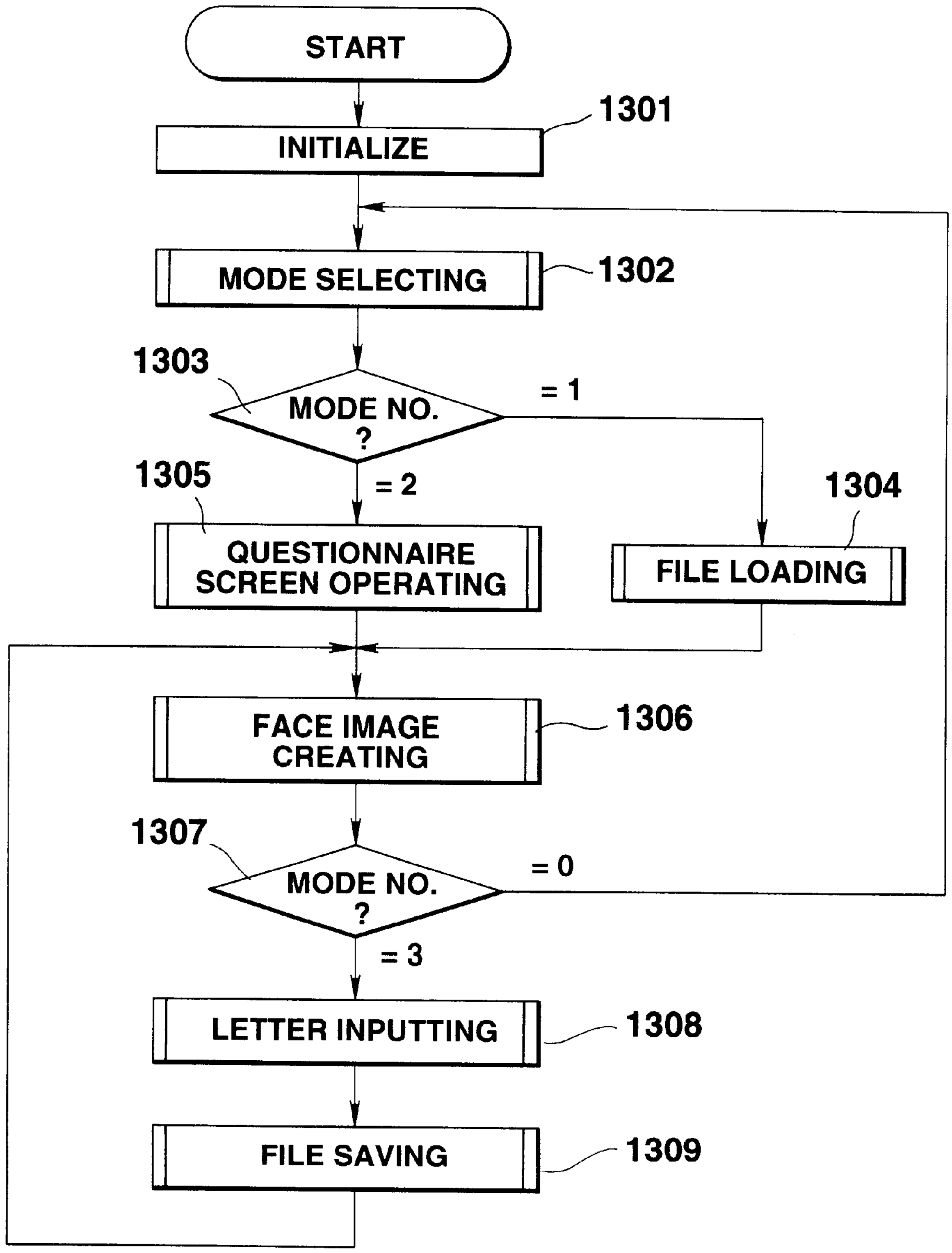
FIG. 13 is a flow chart for the entire operation.

FIG. 13 is an entire operation flow chart executed by CPU 101.

When a system power source is turned on, work RAM 108, object attribute memory 307 and various registers (not shown particularly) in VDP 102 and SRAM 103 and DP-RAM 104 are initialized at step 1301.

Then, at step 1302, a mode selection is executed. At this step, a mode selection screen is displayed for causing a user to select either an questionnaire screen or a file load screen to thereby determine the kind of the switch turned on by user on control pad 112 and change the display of the mode selection screen depending on the turned on switch.

If the user turns on ENTER switch 202 when the selection area of the questionnaire screen or the selection area of the file load screen on the mode selection screen is displayed emphatically, the current mode number set in a register (not particularly illustrated) is deter mined at step 1303.

If the current mode number is determined as "1", a process for the file operation screen is executed for loading the file at step 1304.

On the other hand, if the current mode number is determined as "2", a process for the questionnaire screen is executed at step 1305.

If the user ends the file operation screen displayed on television receiver 111 at step 1304 or the question naire screen displayed on television screen 111 at step 1305, a process for the creation of a portrait is executed at step 1306.

If the user turns on ENTER switch 203 when an icon "return to the mode selection screen" which is a command icon to be described later is displayed emphatically at step 1306, the control returns to the mode selection at step 1302.

On the other hand, at step 1306, if the user turns on ENTER switch 202 when the "save" icon which is a command icon to be described later is displayed emphatically, process for saving the created portrait to the file is executed at steps 1308 and 1309. In this case, letters are at first inputted at step 1308 for causing the user to input a file title and, when the user has input the file name, the file is saved at step 1309 and, subsequently, the control returns to the portrait creation at step 1306.

Mode Selection Flow

Figure 14:
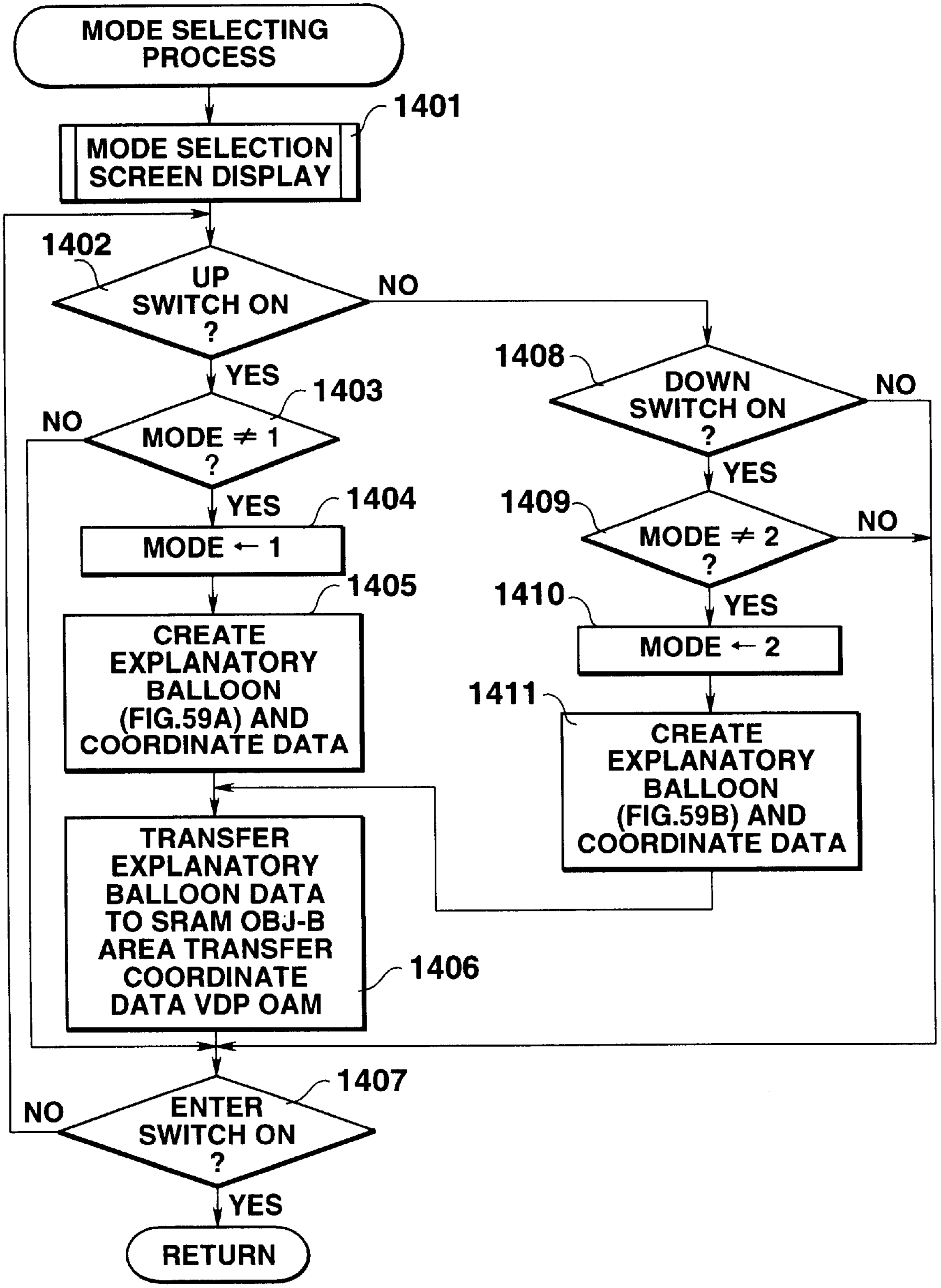
FIG. 14 is a flow chart for a mode selection process.

FIG. 14 is a flow chart for mode selection executed as the process at step 1302 in FIG. 13.

Figure 15:
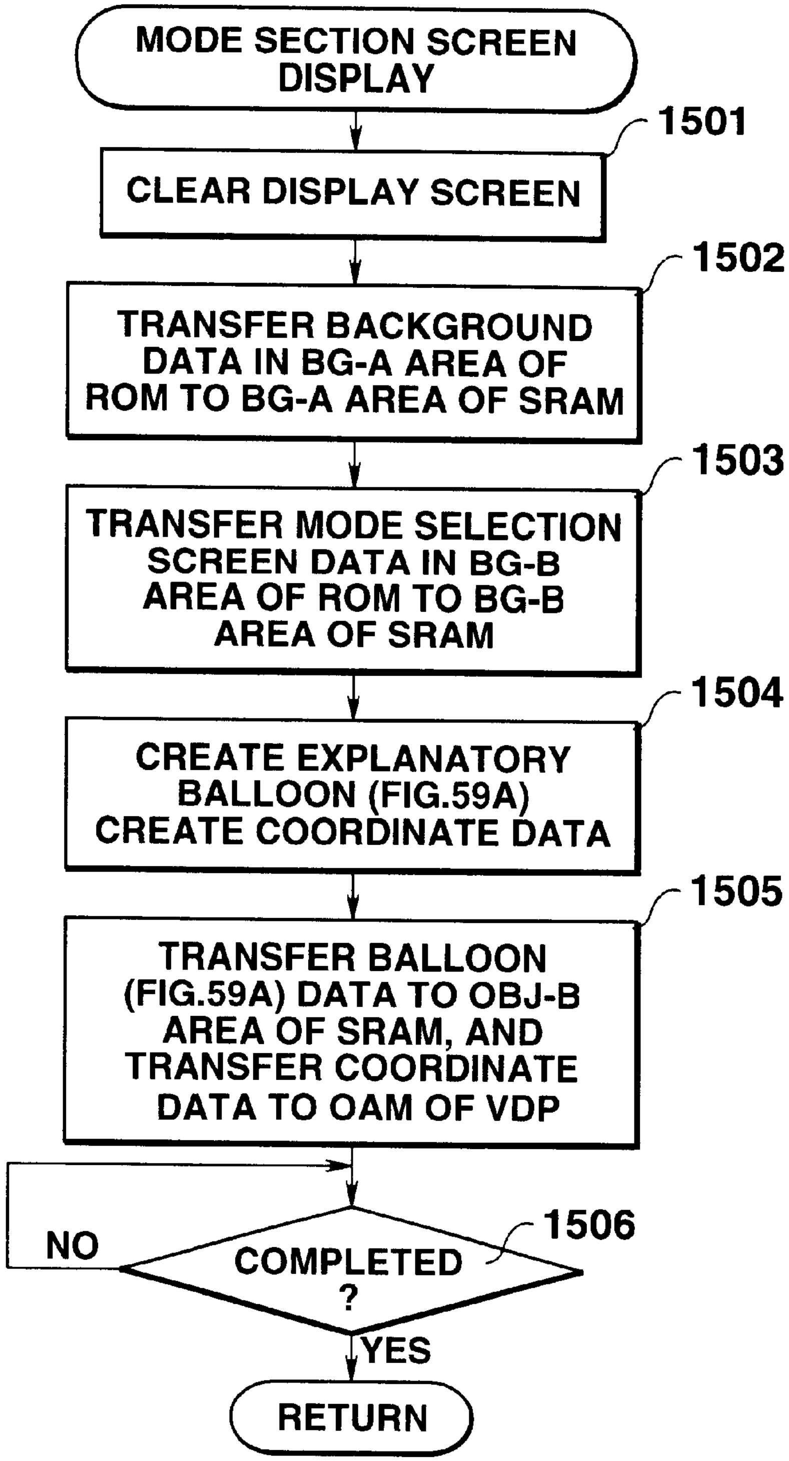
FIG. 15 is a flow chart for a mode selection screen display process.

At first, the mode selection screen is displayed at step 1401. FIG. 15 shows a detailed flow chart for the display process.

In FIG. 15, CPU 101 delivers an output screen clear instruction to VDP 102 at step 1501. As a result, the screen display of television receiver 111 is cleared.

Figure 6:
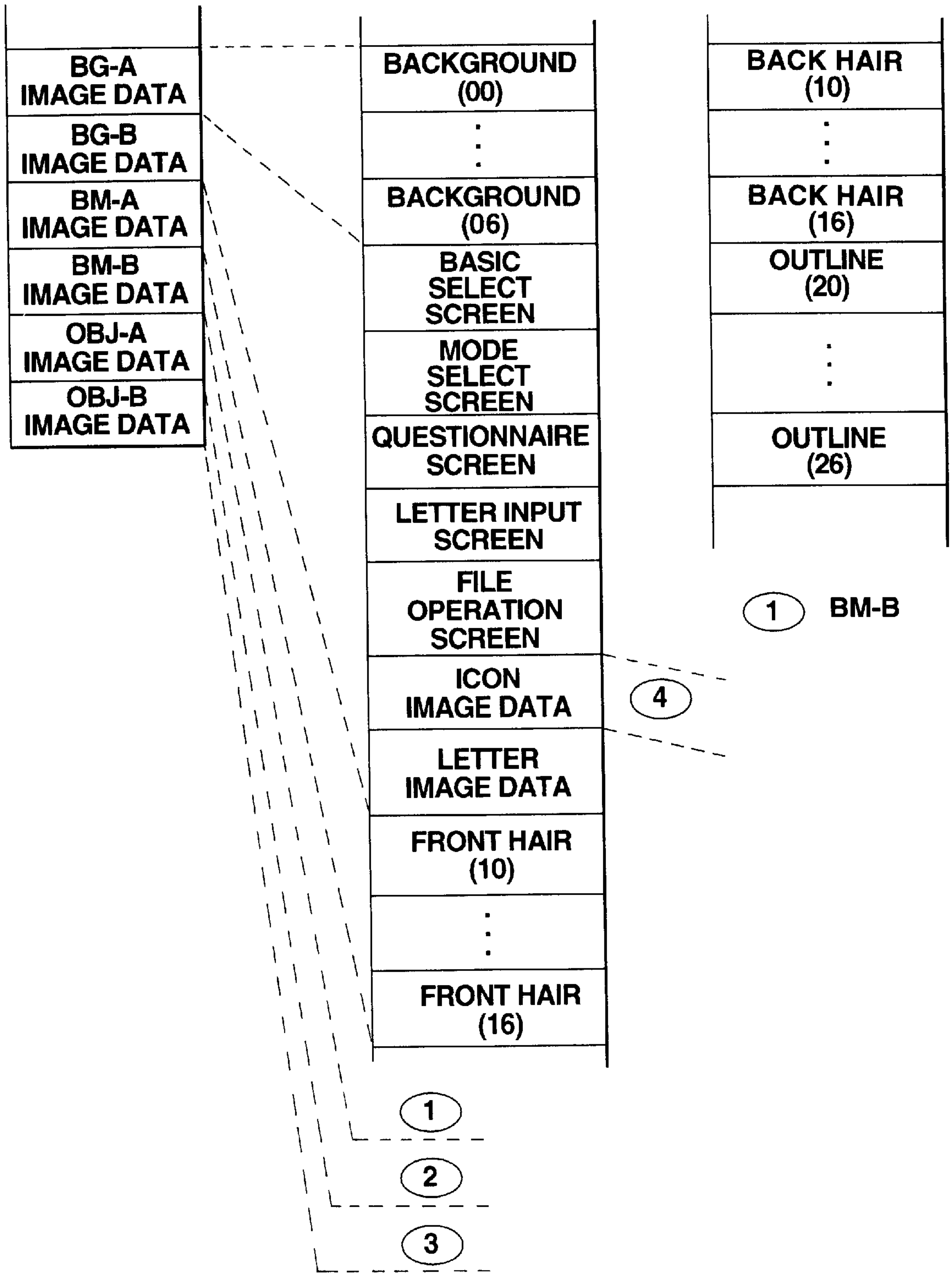
FIG. 6 is a view for showing a format of image data stored in a program/data ROM 107 (part 1)

At step 1502, CPU 101 transfers the background image data for the BG-A plane shown in FIG. 6 of program/data ROM 107 (see the mode selection screen in FIG. 5) through CPU interface 301, address bus 315, data bus 316 and SRAM interface 302 to memory area of the BG-A plane of SRAM 103.

At step 1503, CPU 101 transfers, in the same manner as at step 1502, the mode selection screen data as the back ground image data for the BG-B area (system screen data) shown in FIG. 6 of program/data ROM 107 (refer to mode selection screen in FIG. 5) through CPU interface 301, address bus 315, data bus 316 and SRAM interface 302 to the BG-B plane memory area of SRAM 103.

Further, at step 1504, data on an explanatory balloon on the mode select screen and data on its coordinates are prepared. More specifically, CPU 101 determines, as explanatory balloon data, data corresponding to an image shown in FIG. 59A, which are data on the speech sentence and data on the speech frame shown in FIG. 7 which are object image data for OBJ-B plane shown in FIG. 6 of program/data ROM 107. Further, CPU 101 prepares in the internal register thereof coordinate data indicative of the display positions of the object image data.

Figure 59A:
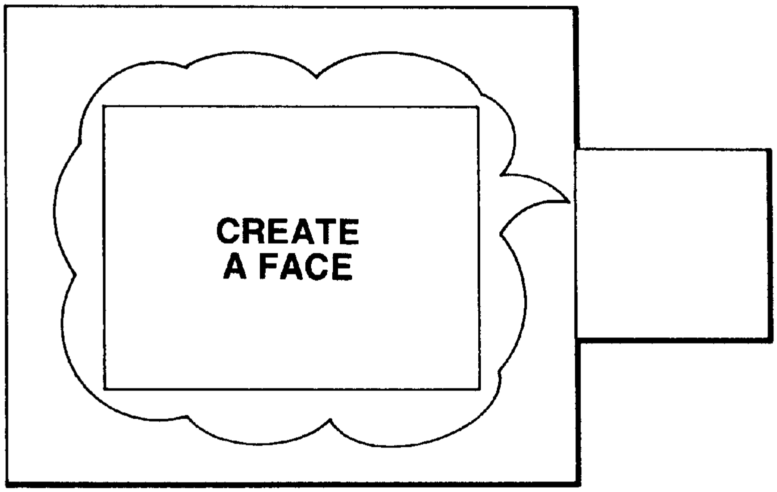
FIGS. 59A–59B illustrate the contents of an explanatory balloon in a mode selection process.

At step 1505, CPU 101 transfers the determined object image data for the explanatory balloon shown in FIG. 59A from program/data ROM 107 through CPU interface 301, address bus 315, data bus 316 and SRAM interface 302 to an empty OBJ-B plane object memory area of SRAM 103 (refer to the mode select screen in FIG. 5). Further, CPU 101 transfers coordinate data indicative of the display positions of the object image data prepared in the internal register through CPU interface 301, address bus 315 and data bus 316 to object attribute memory (OAM) 307.

At step 1506, it is determined whether the series of the transfer processes described above has been completed, whereupon the completion of transfer is determined, the mode select screen display process at step 1401 in FIG. 14 is ended. As a result, VDP 102 having the constitution shown in FIG. 3 displays on the television 111 the image data for mode select screen transferred to each of the BG-A, BG-B, OBJ-B plane memory areas of SRAM 103 in the above-mentioned manner. Although not illustrated particularly, selection areas for selecting modes 1 and 2 are displayed on the mode select screen. When the mode select screen is displayed at first, the selection area, for example, for mode 1 is displayed emphatically. Further, the mode select screen also displays the explanatory balloon shown in FIG. 59A.

Then, during repeating of steps 1402–1407 in FIG. 14, the kind of the switch on control pad 112 turned on by the user is determined and the display of the mode select screen is changed in accordance with the turned on switch.

That is, if the user turns on UP switch (SW) 203, determination at step 1402 is YES (Y) and, further, if the mode number (#) set in the register MODE (not particularly shown) is not "1", determination at step 1403 is also YES. As a result, at step 104, the mode number (#) set in the register MODE is set at "1". If the mode number is already "1", determination at step 1403 is NO (N) and the mode number does not change.

At steps 1405 and 1406, like at steps 1504 and 1505 in FIG. 15 described above, data on an explanatory balloon on the mode select screen shown in FIG. 59A and the coordinate data therefor are prepared and transferred to empty OBJ-B plane object memory areas of SRAM 103 and object attribute memory 307.

As a result, the mode "1" selection area is displayed emphatically and the explanatory balloon shown in FIG. 59A is displayed.

When the user turns on D (Down) switch 204, determination at step 1408 is YES, and the mode number (#) "2" is set in the register MODE at step 1410. If the mode number is already "2", determination at 1409 is NO (N) and the mode number does not change.

Figure 59B:
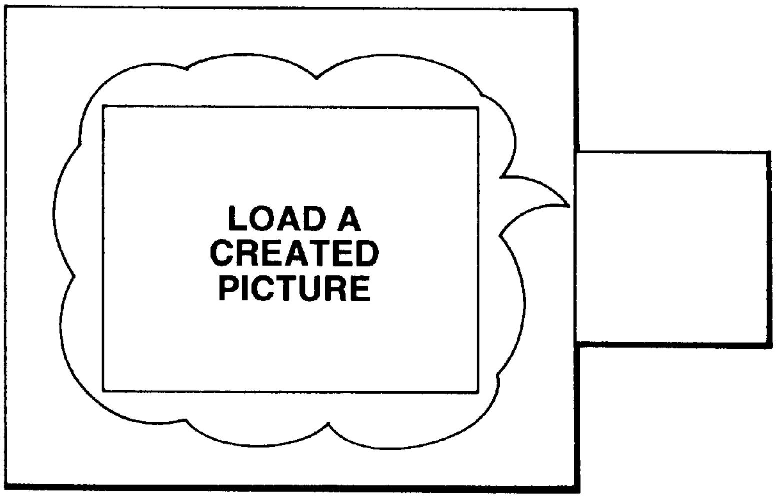

At steps 1411 and 1406, like at steps 1504 and 1505 in FIG. 15 as described above, data on an explanatory balloon on the mode screen shown in FIG. 59B and the coordinate data therefor are prepared and transferred to an empty OBJ-B plane object memory area of SRAM 103 and object attribute memory 307.

As a result, the mode "2" selection area is displayed emphatically and the explanatory balloon shown in FIG. 59B is displayed.

Until the user turns on ENTER switch 202 on control pad 112, the processes at steps 1402–1407 are repeated. When the user turns on ENTER switch 202, determination at step 1407 is YES and the mode selection at step 1302 in FIG. 13 is completed.

File Loading Flow

FIG. 16 to FIG. 19 are operation flow charts showing file loading process executed at step 1304 in FIG. 13. On the file operation screen displayed in this process, the user can load an image data file for the portrait, which is previously preset or prepared and stored by the user himself, into SRAM 103 or DP-RAM 104 from battery-backed up work RAM 108.

Figure 49:
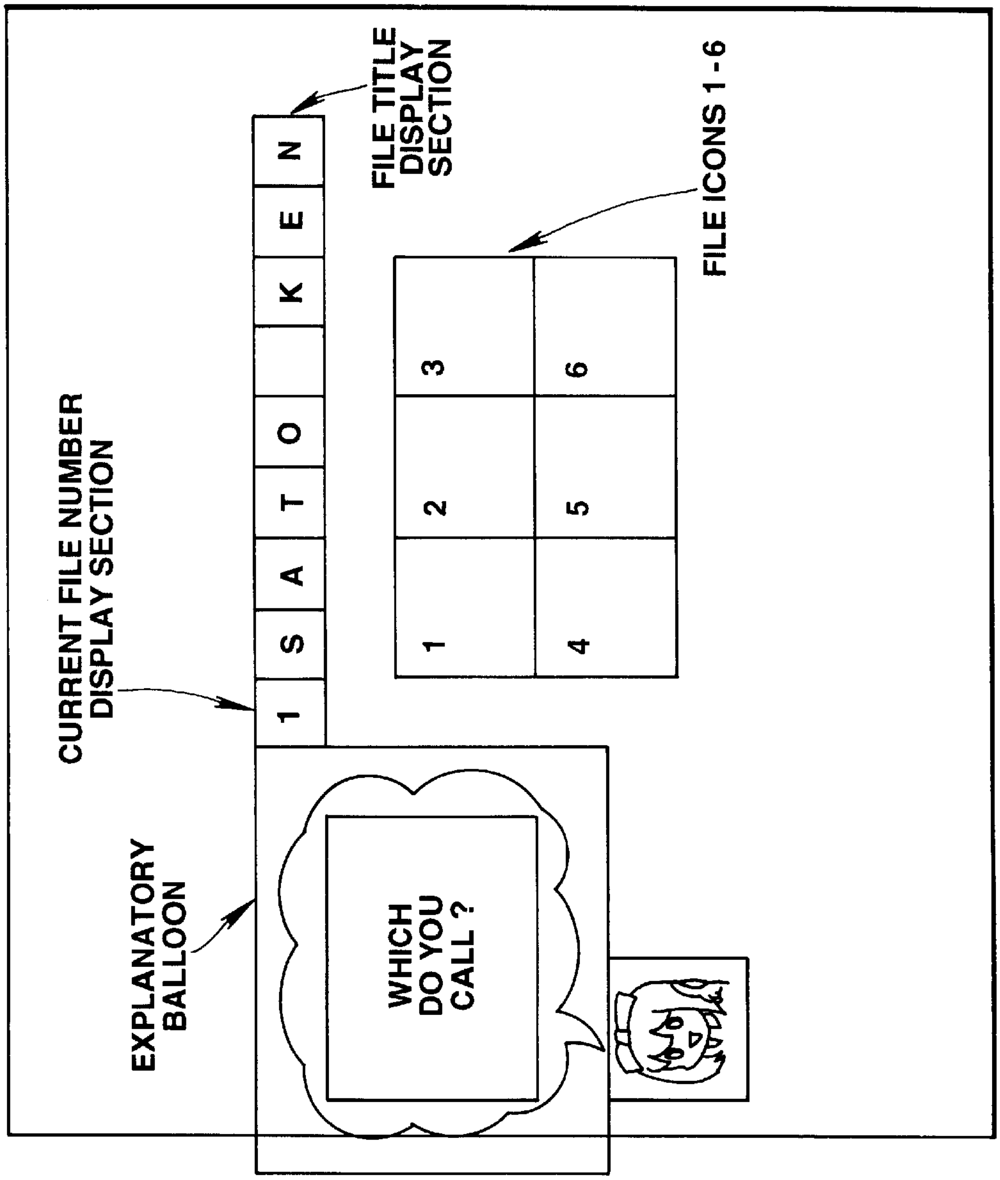
FIG. 49 shows the layout of a file operation screen.

As shown in FIG. 49, a current file number display section and a file title display section which display the currently selected file number and title, respectively, file icons 1–6 which display the kinds of files as pictures, and a helper comprising an explanatory balloon and a doll picture are displayed on television receiver 111 as the file operation screen.

In the file operation screen, the user can select the group of file icons 1–3 or the group of file icons 4–6 as the group of files to be loaded by turning on U (UP) switch 203 or D (DOWN) switch 204 on control pad 112. Further, the user can select one of the file icons in the currently selected group as a file to be loaded by turning on L (LEFT) switch 205 or R (RIGHT) switch 206 on control pad 112. Thus, the selected file icon is displayed emphatically, and the display contents of the current file number display section and the file title display section are changed to contents corresponding to the relevant file icons. Then, when the user turns on ENTER switch 202 on control pad 112 in this state, the data of the file corresponding to the file icon is loaded on SRAM 103 or DP-RAM 104. The user can edit a portrait by the face creating process at step 1306 in FIG. 13 to be described later.

The flow chart of FIG. 16 to FIG. 19 are explained in detail.

Figure 16:
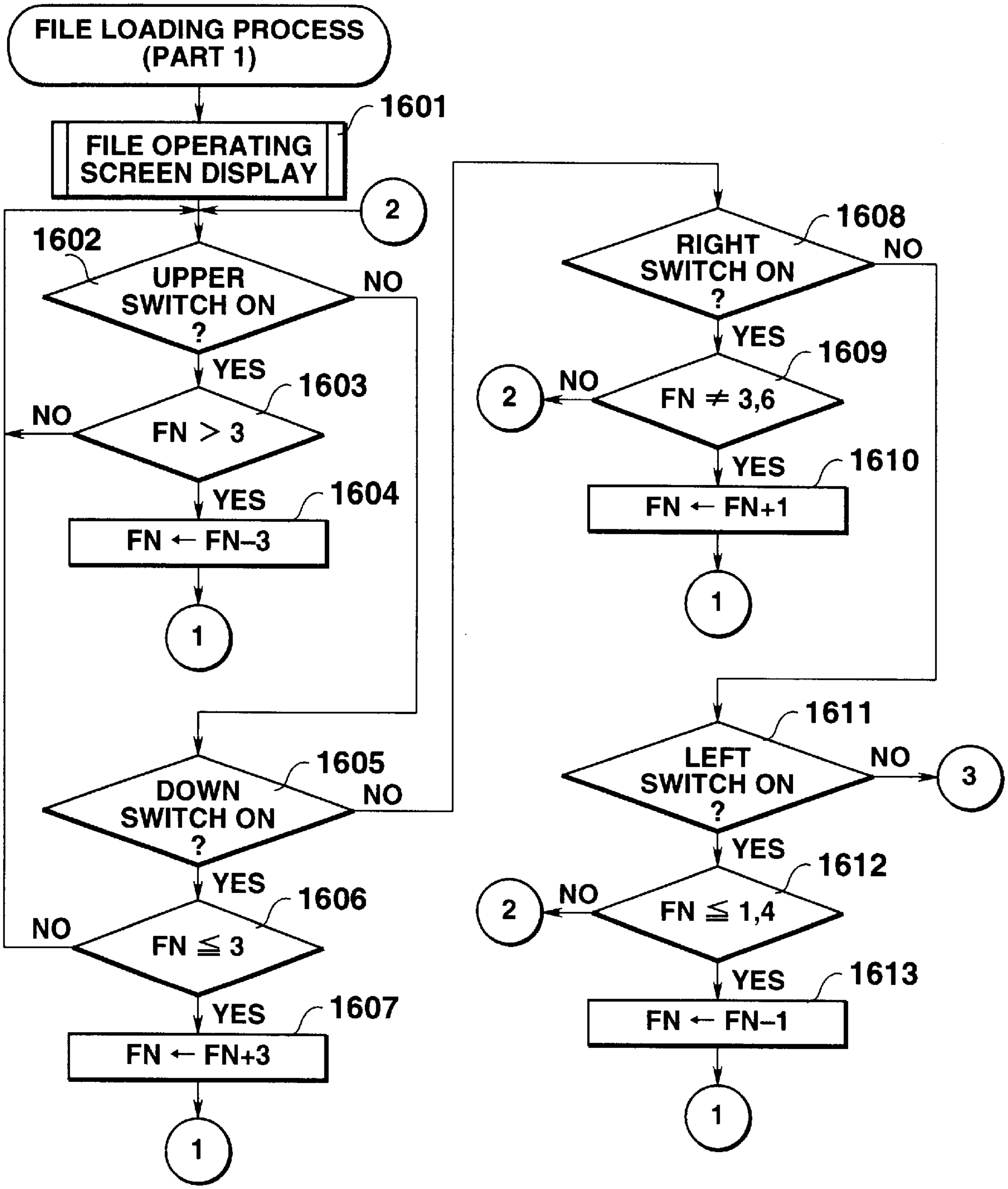
FIG. 16 is a flow chart for a file loading process (part 1)

At first, at step 1601 in FIG. 16, a file operation screen display process is performed. The details of this process are shown as a flow chart in FIG. 19.

Figure 19:
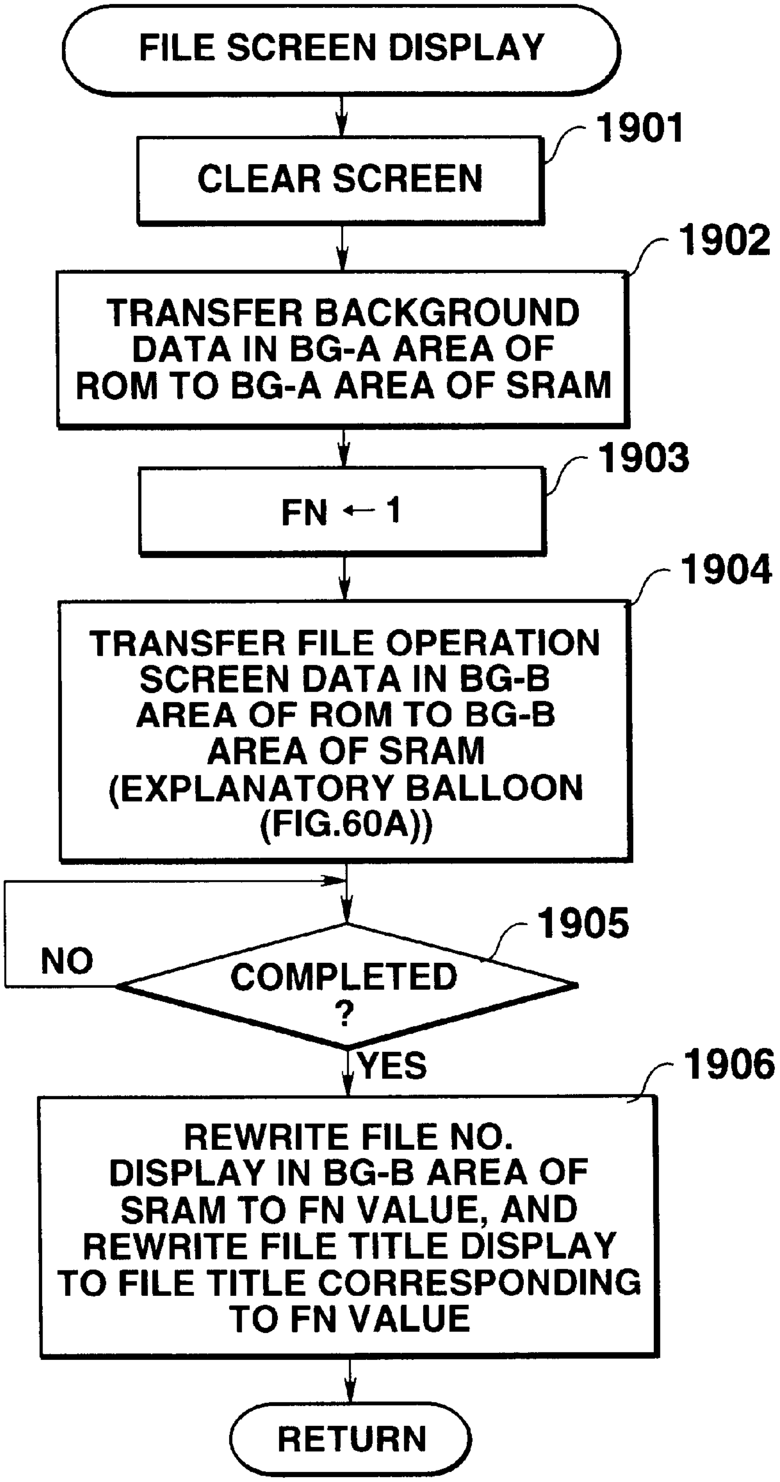
FIG. 19 is a flow chart for a file display screen displaying process.

In FIG. 19, CPU 101 instructs VDP 102 to clear the output screen at step 1901. As a result, the screen display of television receiver 111 is cleared.

At step 1902, CPU 101 transfers the background image data for the BG-A plane shown in FIG. 6 of program/data ROM 107 (refer to the file operation screen in FIG. 5) through CPU interface 301, address bus 315, data bus 116 and SRAM interface 302 to the BG-A plane memory area of SRAM 103.

At step 1903, value "1" is preset in register FN indicative of the file number.

Figure 60A:
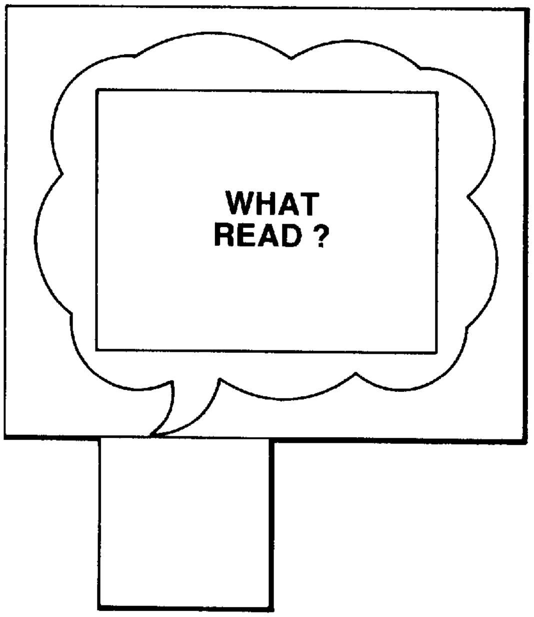
FIGS. 60A–60B illustrate the contents of an explanatory balloon in a file loading process.

At step 1904, like at step 1902, CPU 101 transfers the file operation screen data (system screen data) which is the background image data for the BG-B plane shown in FIG. 6 of program/data ROM 107 through CPU interface 301, address bus 315, data bus 316 and SRAM interface 302 to the BG-B plane memory area of SRAM 103 (refer to the file operation screen in FIG. 5). Thus, the file operation screen shown in FIG. 49 is displayed on television receiver 111. As the initial display of the explanatory balloon, the contents of FIG. 60A are displayed.

At step 1905, it is determined whether the series of the transfer processes described above have been completed. If so, only data on cells corresponding to the current file number display section and the file title display section (refer to FIG. 49) among the cells constituting the background image of the file operation screen, data on the background image being stored in the BG-B plane memory area of SRAM 103 (at step 1906), is replaced with data corresponding to value "1" of register FN. Specifically, CPU 101 transfers image data indicative of numeral "1" corresponding to the value "1" of register FN as data on the cells of the current file number display section to the corresponding area on SRAM 103 and also transfers, as data on the cells of the file title display section, the file title image data stored in address areas (AD7)–(AD7+7) corresponding to value "1" of register FN, among six address areas (AD7)–(AD7+7), (AD7+8)–(AD7+15), (AD7+16)–(AD7+23), (AD7+24)–(AD7+31), (AD7+32)–(AD7+39), and (AD7+40)–(AD7+47) of FIG. 9 of work RAM 108 to the corresponding areas of SRAM 103.

Subsequently, the file operation screen display process at step 1601 in FIG. 16 is terminated. As a result, the current file number display section and file name display section displaying file number "1" and the file title thereof, file icons 1–6 with file icon 1 being displayed emphatically and a helper comprising an explanatory balloon indicative of a speech and a doll picture in FIG. 60A are displayed as the initial file operation screen on television receiver 111.

Figure 17:
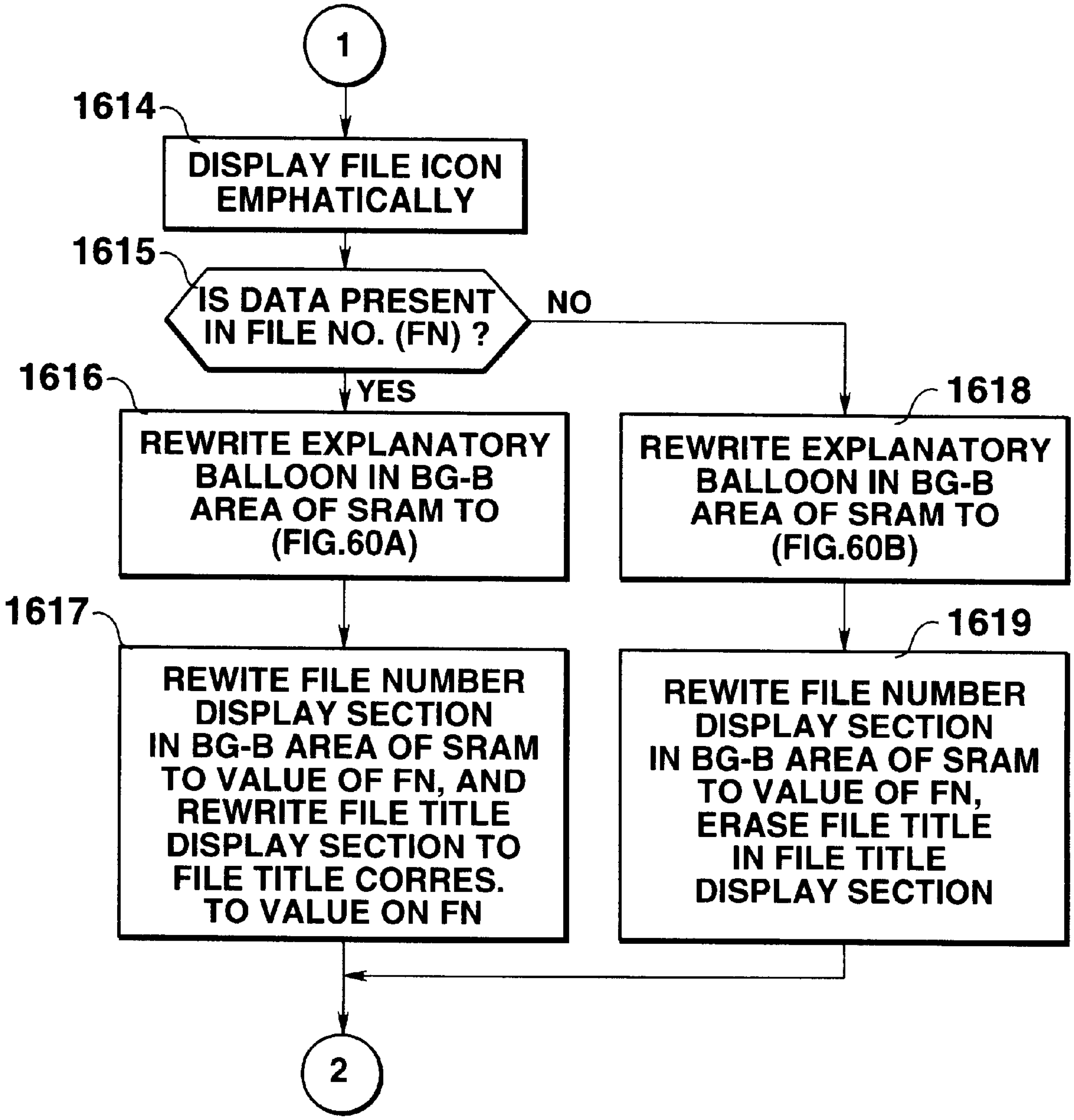
FIG. 17 is a flow chart for the file loading process (part 2)
Figure 18:
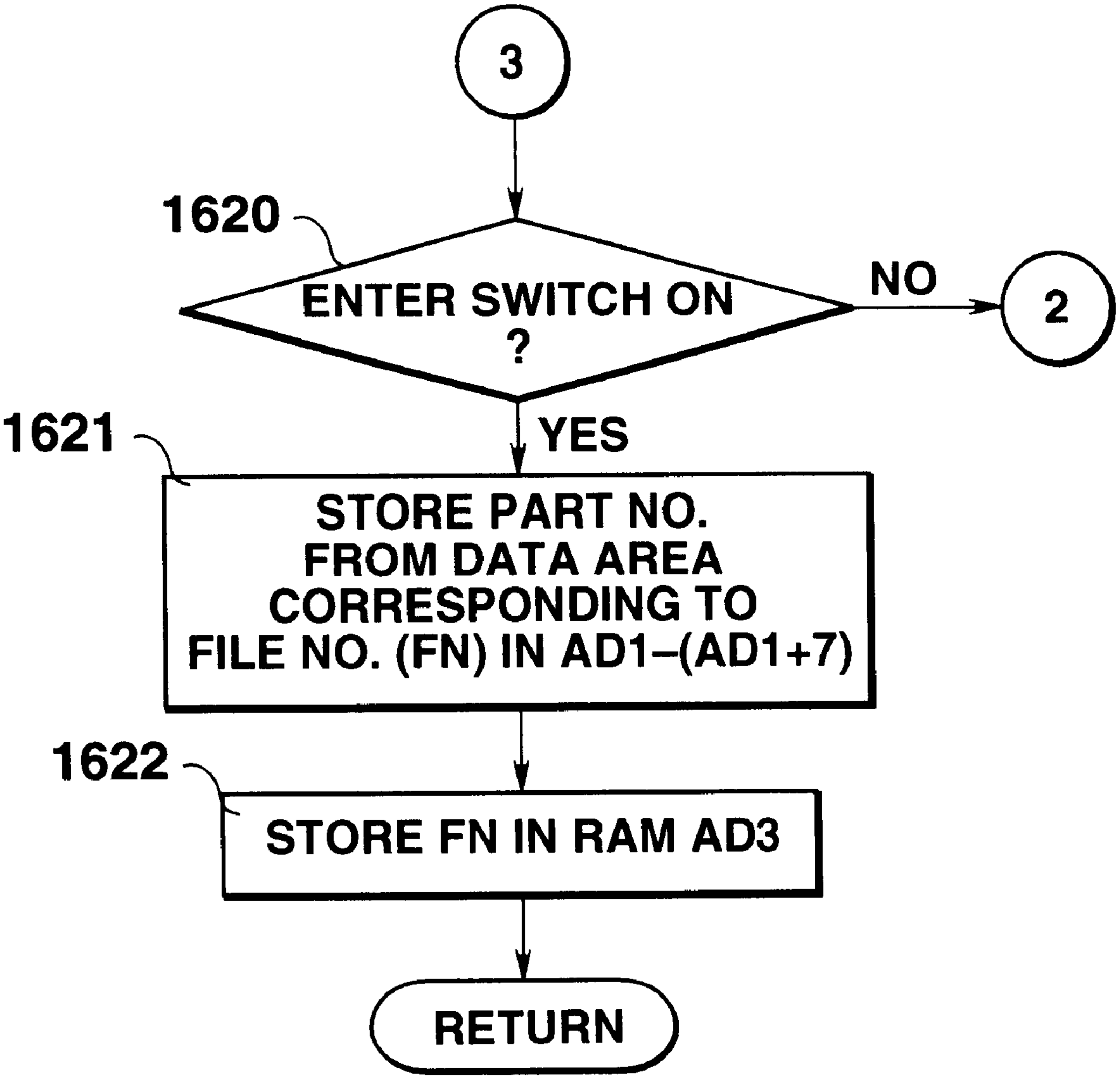
FIG. 18 is a flow chart for the file loading process (part 3)

When the user turns on D (DOWN) switch 204 on control pad 112 in this state, determination at step 1605 in FIG. 16 is YES. At this time, if a file icon in the group of file icons 1 to 3 (refer to FIG. 49) is selected and if the value of register FN indicative of the file number is 3 or less, determination at step 1606 is YES, and the value of register FN is incremented by 3 at step 1607. As a result, the group of the file icons moves from group 1 to 3 to group 4 to 6. Subsequently, processes at steps 1614–1619 in FIG. 17 are executed for changing the display. If a file icon in the group of file icons 4 to 6 (refer to FIG. 49) has already been selected, and the value of register FN indicative of the file number is not less than 3 when D (DOWN) switch 204 is turned on, determination at step 1606 is NO, and the display contents are not changed and the control returns to the process at step 1602.

If the user turns on UP switch 203 on control pad 112, determination at step 1602 in FIG. 16 is YES, and when a file icon in the group of file icons 4 to 6 (refer to FIG. 49) has been selected and the value of register FN indicative of the file number is greater than 3, determination at step 1603 is YES, and the value of register FN is decremented by 3 at step 1604. As a result, the group of the file icons moves from the group of 4 to 6 to the group of 1 to 3. Subsequently, processes at steps 1614–1619 in FIG. 17 are executed to change the display. If a file icon in the group of file icons 1–3 (refer to FIG. 49) has been selected and the value of register FN indicative of the file number is not more than 3 when UP switch 203 was turned on, determination at steps 1603 is NO, the display contents are not changed and the control returns to the process at step 1602.

If the user turns on L (LEFT) switch 205 on control pad 112, determination at step 1611 in FIG. 16 is YES. If none of the file icons 1 and 4 which are the leftmost file icons (refer to FIG. 49) is selected and the value of register FN is neither 1 nor 4, determination at step 1612 is YES and the value of register FN is decremented by one at step 1613. As a result, the file icon to be selected is moved by one to the left. Subsequently, processes at steps 1614–1619 in FIG. 17 are executed for changing the display. If file icon 1 or 4 as the leftmost file icon has been selected and the value of register FN is 1 or 4 when LEFT switch 205 is turned on, determination at step 1612 is NO, the display contents are not changed and the control returns to step 1602.

If the user turns on RIGHT switch 206 on control pad 112, determination at step 1608 in FIG. 16 is YES. If none of the file icons 3 and 6 which are the rightmost file icon (refer to FIG. 49) has been selected and the value of register FN is neither 3 nor 6, determination at step 1609 is YES and the value of register FN is incremented by one at step 1610. As a result, the file icon to be selected is moved by one to the right. Subsequently, processes at steps 1614–1619 in FIG. 17 are executed for changing the display. If file icon 3 or 6 as the rightmost file icon has been selected and the value of register FN is either 3 or 6 when R switch 206 is turned on, determination at step 1609 is NO, the display contents are not changed and the control returns to step 1602.

After the processes at any of groups of steps 1605–1607, steps 1602–1604, steps 1611–1613 or steps 1608–1610 in FIG. 16, only the file icon corresponding to the value of register FN is newly displayed emphatically at step 1614 in FIG. 17. Specifically, CPU 101 replaces cells corresponding to the file icon that, in turn, corresponds to the value of register FN, among the cells constituting the background image of the file operation screen, data on the background image being stored in the BG-B plane memory area of SRAM 103, with cells for emphatic display. For example, CPU 101 replaces the cells corresponding to the file icon displayed emphatically so far and corresponding to the original value of register FN with cells for regular display.

Then, at step 1615, CPU 101 determines whether any file is stored or not at the address of work RAM 108 corresponding to the file number of the value of register FN. Specifically, CPU 101 determines whether an effective file title is stored in areas {AD7+{(FN)−1}×8} to {AD7+{(FN)−1}×8+7} corresponding to the value of register FN, among the address areas starting from AD7 shown in FIG. 9 of work RAM 108. In this case, (FN) shows the value of register FN.

If a file has a file number which is equal to the value of register FN is present and determination at step 1615 is YES, CPU 101 replaces, at step 1616, cells corresponding to the explanatory balloon, among the cells constituting the background image of the file operation screen, data on the background image being stored in the BG-B plane memory area of SRAM 103, with cells corresponding to the balloon contents shown in FIG. 60A. The data for the cells is contained in the image data for the file operation screen among the BG-B plane image data shown in FIG. 6 of program/data ROM 107.

Subsequently, among the cells constituting the back ground image of the file operation screen stored in the BG-B plane memory area of SRAM 103, only data on the cells corresponding to the current file number display section and the file title display section (refer to FIG. 49) is replaced with data indicative of the contents corresponding to the value of register FN. More specifically, CPU 101 transfers image data indicative of a numeral corresponding to the value of register FN as the cells of the current file number display section to the corresponding area of SRAM 103 and transfers the file title image data stored in address areas {AD7+{(FN)−1}×8} to {AD7+{(FN)−1}×8+7} corresponding to the value of register FN, among six address areas starting from AD7 shown in FIG. 9 of work RAM 16 as the cells of the file title display section to the corresponding areas of SRAM 103.

Subsequently, the control returns to the processing at step 1602 in FIG. 16.

Figure 60B:
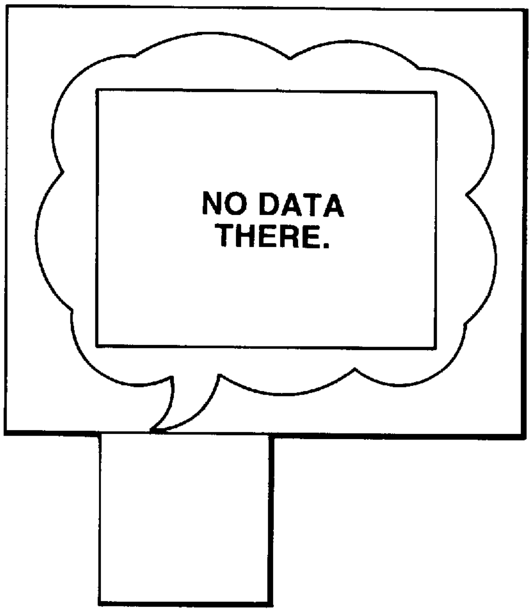

On the other hand, if the file having a file number which is equal to the value of register FN is not present, and determination at step 1615 in FIG. 17 is NO, CPU 101 replaces data on the cells corresponding to the explanatory balloon, among the cells constituting the background image of the file operation screen, data on the bacground image being stored in the BG-B memory area of SRAM 103, with data on cells corresponding to the balloon contents shown in FIG. 60B. The data on the cells is contained in the image data for the file operation screen among the BG-B plane image data shown in FIG. 6 in program/data ROM.

Subsequently, at step 1619, among the cells constituting the background image of the file operation screen, data on which is stored in the BG-B plane memory area of SRAM 103, only data on the cells corresponding to the current file number display section and the file number title display section (refer to FIG. 49) is changed. Specifically, CPU 101 transfers image data indicative of a numeral corresponding to the value of register FN as data on the cells of the present file number display section to the corresponding area of SRAM 103, and transfers image data indicative of a blank as the contents of the cells of the file title display section to the corresponding area of SRAM 103.

Subsequently, the control returns to the process at step 1602 in FIG. 16.

Figure 20:
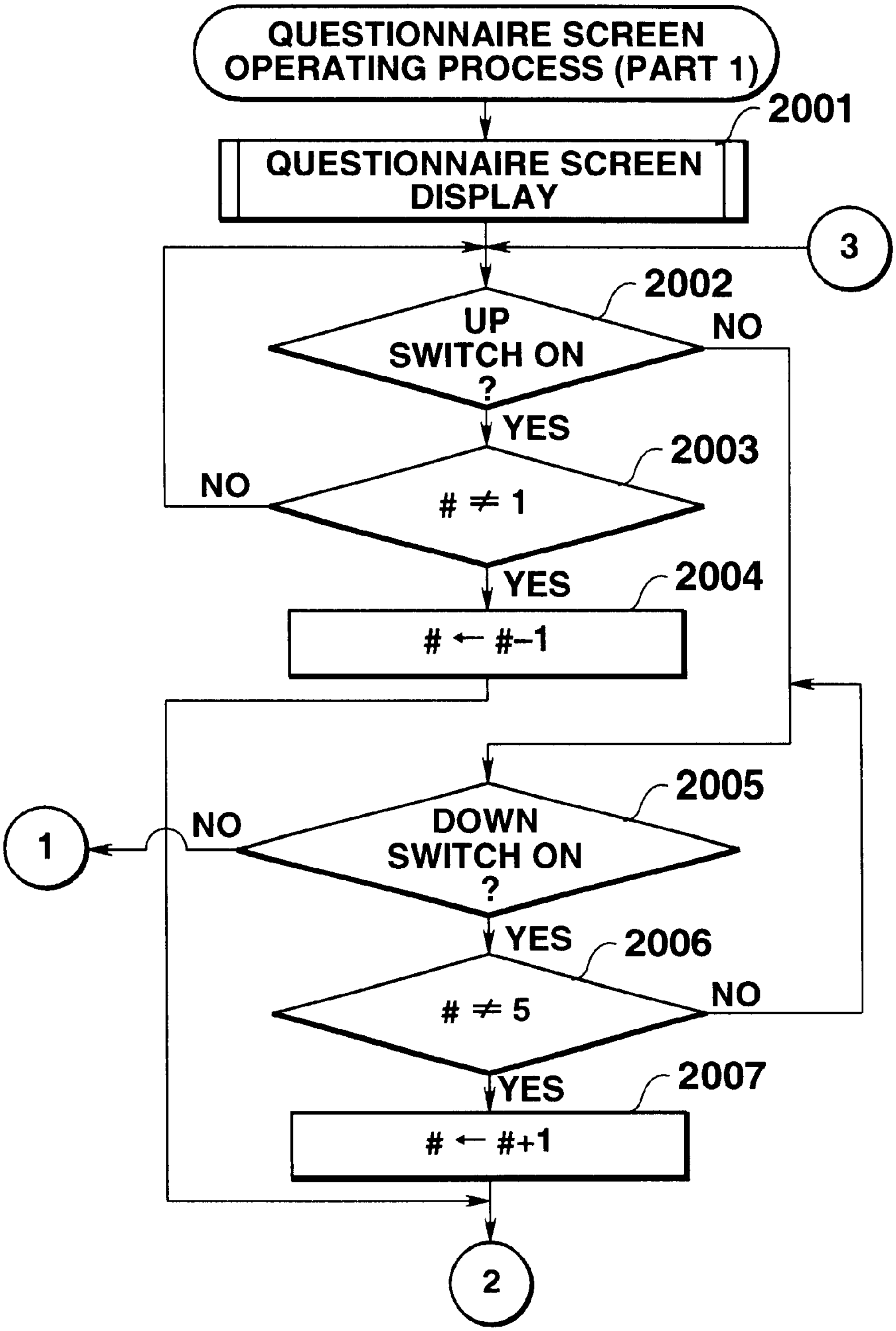
FIG. 20 is a flow chart for a questionnaire screen display process (part 1)
Figure 21:
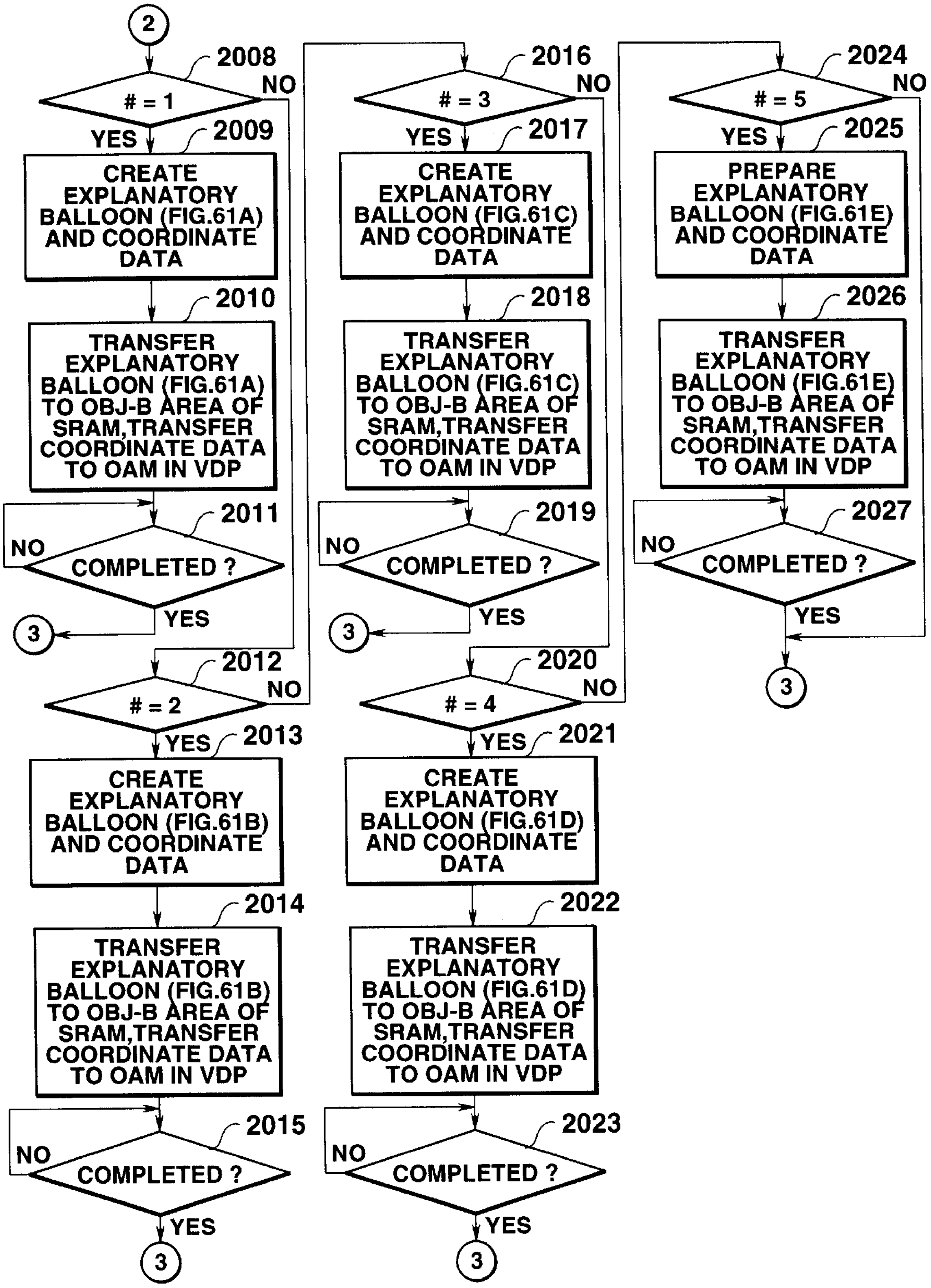
FIG. 21 is a flow chart for the questionnaire screen display process (part 2)

Finally, one of the file icons is displayed emphatically. If the user turns on ENTER switching 202 on control pad 112 when the display contents of the current file number display section and the file title display section correspond to that file icon, determination at steps 1602, 1605, 1608 and 1611 in FIG. 16 is NO and determination at 1620 in FIG. 20 is YES.

As a result, at step 1621, CPU 101 stores data on part numbers which are indicative of 8 kinds of parts, stored in address areas {AD8+8{(FN)−1)} to {AD8+8×((FN)−1)+7} shown in FIG. 9 of work RAM 108 corresponding to the value of register FN to address areas {AD1}−{AD1+7} shown in FIG. 9 of work RAM 108, respectively.

In this case, as will be described later in the face creation at step 1306 in FIG. 13, the part, number, data on which is stored in address area {AD8+8×((FN)−1)} to address area {AD1} of work RAM 108, designates from one of BG-A plane background data "00"–"06" shown in FIG. 6 of program/data ROM 107.

The part number, data on which stored in address area {AD8+8×((FN−1)+1} to address area {AD1+1} of work RAM designates one of BM-B place back hair image data "10"–"16" and one of BM-A plane front hair image data "10"–"16" shown in FIG. 6 of program/data ROM 107.

A part number, data on which is stored in address area {AD8+8×((FN)−1)+2} to address area {AD1+2} of work RAM 108, designates one of BM-B plane outline data "10"–"26" shown in FIG. 6 of program/data ROM 107.

A part number data on which is stored in address area {AD8+8×((FN−1)+3} to address area {AD1+3} of work RAM 108, designates one of OBJ-A plane eye image data "30"–"36" shown in FIGS. 6 and 7 and one of OBJ-B eyebrow image data "30 "–"36" shown in FIGS. 6 and 7 of program/data ROM 107.

A part number, data on which is stored in address area {AD8+8×((FN)−1)+4} to address area {AD1+4} of work RAM 108 designates one of OBJ-A plane nose image data "40"–"46" shown in FIGS. 6 and 7 of program/data ROM 107.

A part number data on which is stored in address area {AD8+8×((FN)−1)+5} to address area {AD1+5} of work RAM 108, designates one of OBJ-A plane mouth image data "50"–"56" shown in FIGS. 6 and 7 of program/data ROM 107.

A part number, data on which is stored in address area {AD8+8×((FN)−1)+6} to address area {AD1+6} of work RAM 108, designates one of OBJ-B plane speech text image data "80"–"86" shown in FIGS. 6 and 7 of program/data ROM 107.

Finally, a part number, data on which is stored in address area {AD8+8×((FN)−1)+7} to address area {AD1+7} of work RAM 108 designates one of OBJ-B plane speech frame image data "90"–"96" shown in FIGS. 6 and 7 in program/data ROM 107.

After the process at step 1621, the value of register FN is stored in address area {AD3} shown in FIG. 9 of work RAM 108 (step 1622).

After the process at 1622, the file loading process at step 1304 in FIG. 13 is terminated.

Thus, data on parts corresponding to the part numbers of the portrait contained in the file selected by the user and stored in address area {AD1}−{AD1+9} shown in FIG. 9 of work RAM 108 is transferred, in the face creation at step 1306 in FIG. 13 to be described later, from program/data ROM 107 to SRAM 103 or DP-RAM 104 and displayed by way of VDP 102 on television receiver 111, and the user can edit a portrait based on the data and, if necessary, save the data as a file.

Questionnaire Screen Processing Flow

FIGS. 20 to 25 are an operational flow chart showing the questionnaire screen processing operation executed at step 1305 in FIG. 13. The user can determine the outline of a portrait intended to be created newly on the questionnaire screen. Actually, data on the contents of a file having features nearest the result of the questionnaire is loaded from among the preset files described above.

At first, a questionnaire screen display process is performed at step 2001. The details of this process are shown as an operational flow chart in FIG. 25.

Figure 25:
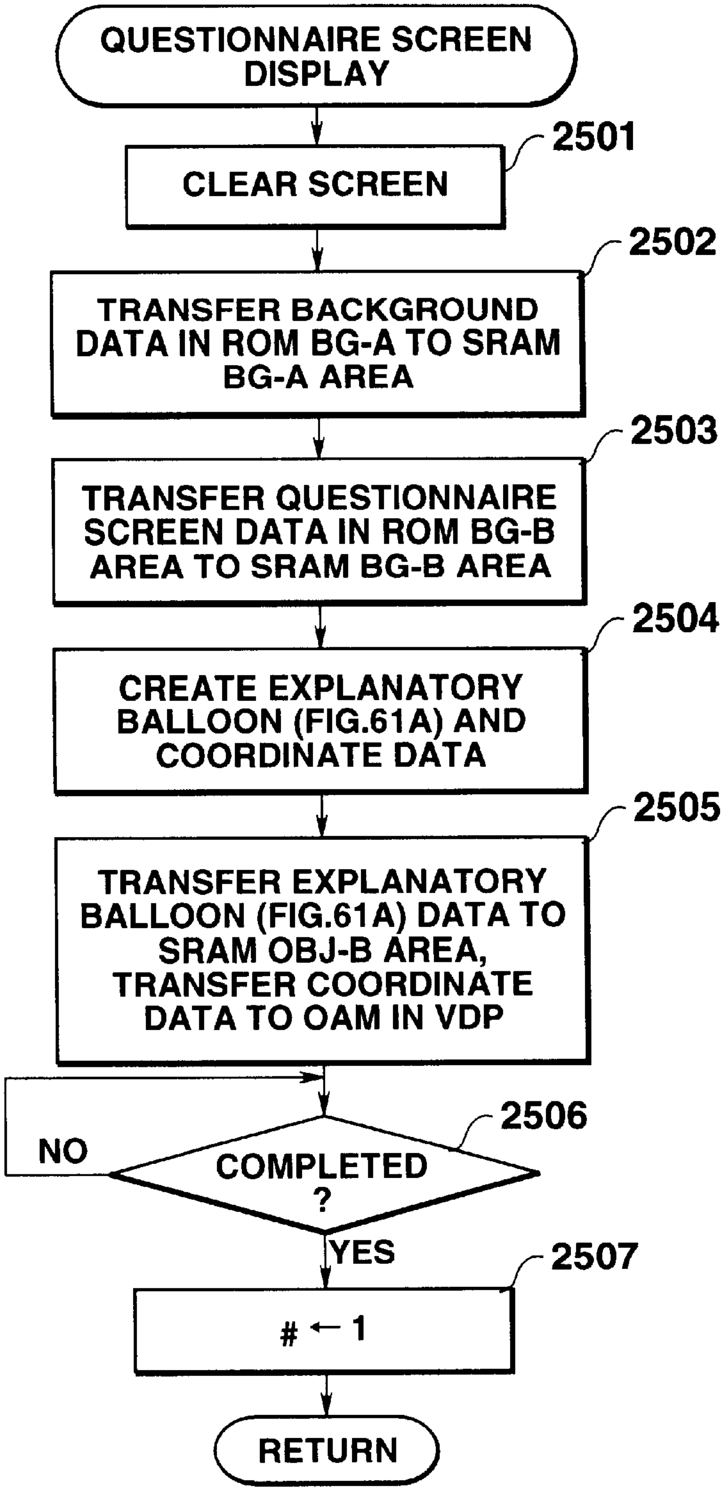
FIG. 25 is a flow chart for a questionnaire screen display process.

In FIG. 25, CPU 101 delivers a clear instruction for the output screen at step 2501 to VDP 102. As a result, the screen display of television receiver 111 is cleared.

At step 2502, CPU 101 transfers the background data which are the BG-A plane background image data (refer to the questionnaire screen in FIG. 5) shown in FIG. 6 of program/data ROM 107 through of CPU interface 301, address bus 315, data bus 316 and SRAM interface 302 to the BG-A plane memory area of SRAM 103.

At step 2503, like step 2502, CPU 101 transfers the questionnaire screen data which are the BG-B plane background image data (system screen) shown in FIG. 6 of program/data ROM 107 (refer to the questionnaire screen in FIG. 5) through CPU interface 301, address bus 315, data bus 316 and SRAM interface 302 to the GB-B plane memory area of SRAM 103.

Further, at step 2504, data on an explanatory balloon and its coordinates on the questionnaire screen is prepared. Specifically, CPU 101 determines as data on the explanatory balloon the data corresponding to the image shown in FIG. 61A and comprising data on the speech text and the speech frame shown in FIG. 7 3 which is the OBJ-B plane object image data shown in FIG. 6 of program/data ROM 107 (refer to the questionnaire screen in FIG. 5). Further, CPU 101 prepares the coordinate data indicating the display positions of those object images in the internal register thereof.

Figure 61A:
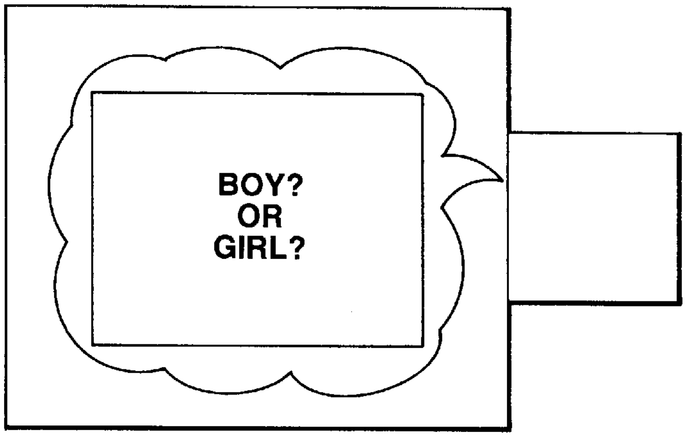
FIGS. 61A–61C illustrate the contents of an explanatory balloon in a questionnaire screen display process (part 1)
Figure 61B:
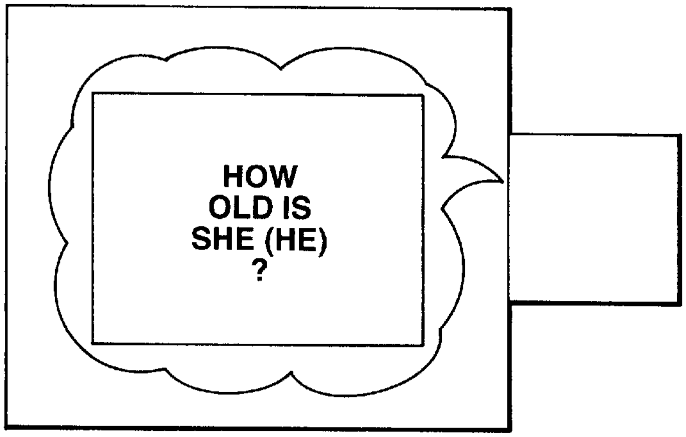
Figure 61C:
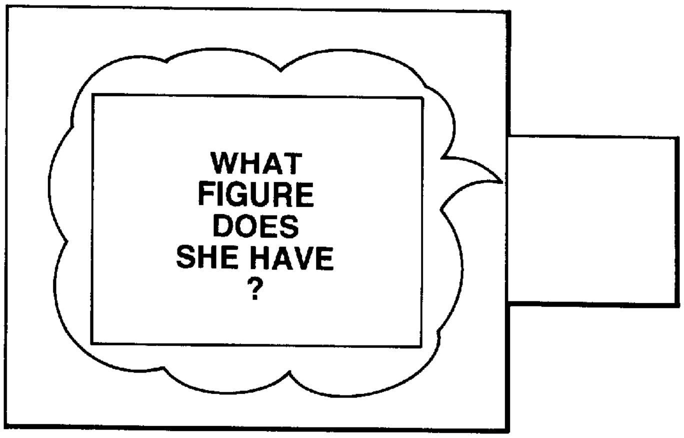
Figure 62A:
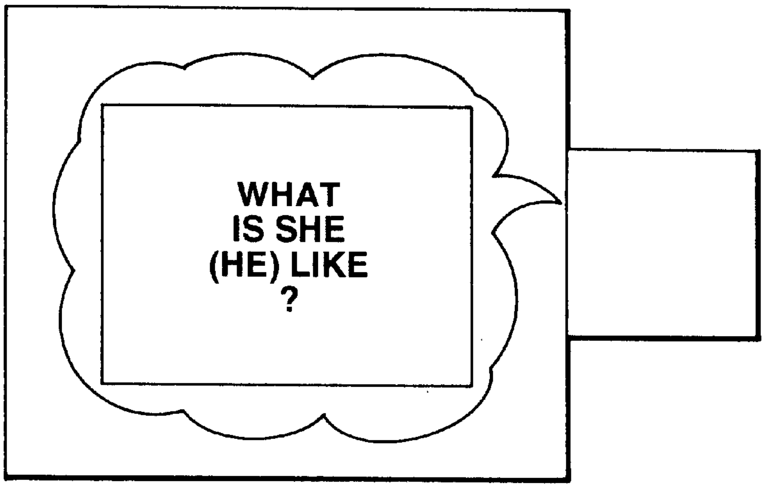
FIGS. 62A and 62B illustrate the contents of the explanatory balloon in the questionnaire screen display process (part 2)
Figure 62B:
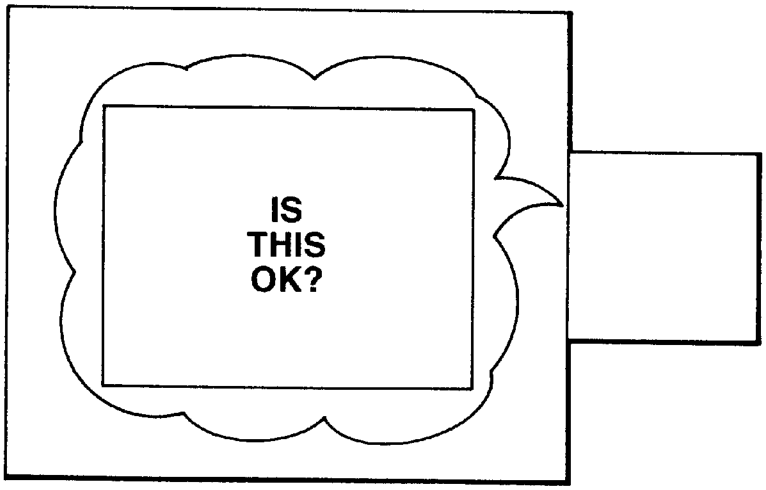

At step 2505, CPU 101 transfers the determined object image data for the explanatory balloon shown in FIG. 61A from program/data ROM 107 by way of CPU interface 301, address bus 315, data bus 316, and SRAM interface 302 to an empty object OBJ-B plane memory area of SRAM 103. Further, CPU 101 transfers data on the coordinates indicating the display position of the object image, data on which is created in the internal register thereof by way of CPU interface 301, address bus 315 and data bus 316 to object attribute memory (OAM) 307.

At step 2506, it is determined whether the series of the transfer processes have been completed, at which time the questionnaire screen display process at step 201 in FIG. 20 is terminated. As a result, VDP 102 having the constitution shown in FIG. 3 displays, as described previously, on television set 111 the video data for the questionnaire screen transferred to the respective BG-A, BG-B and OBJ-B plane memory areas of SRAM 103.

Figure 50:
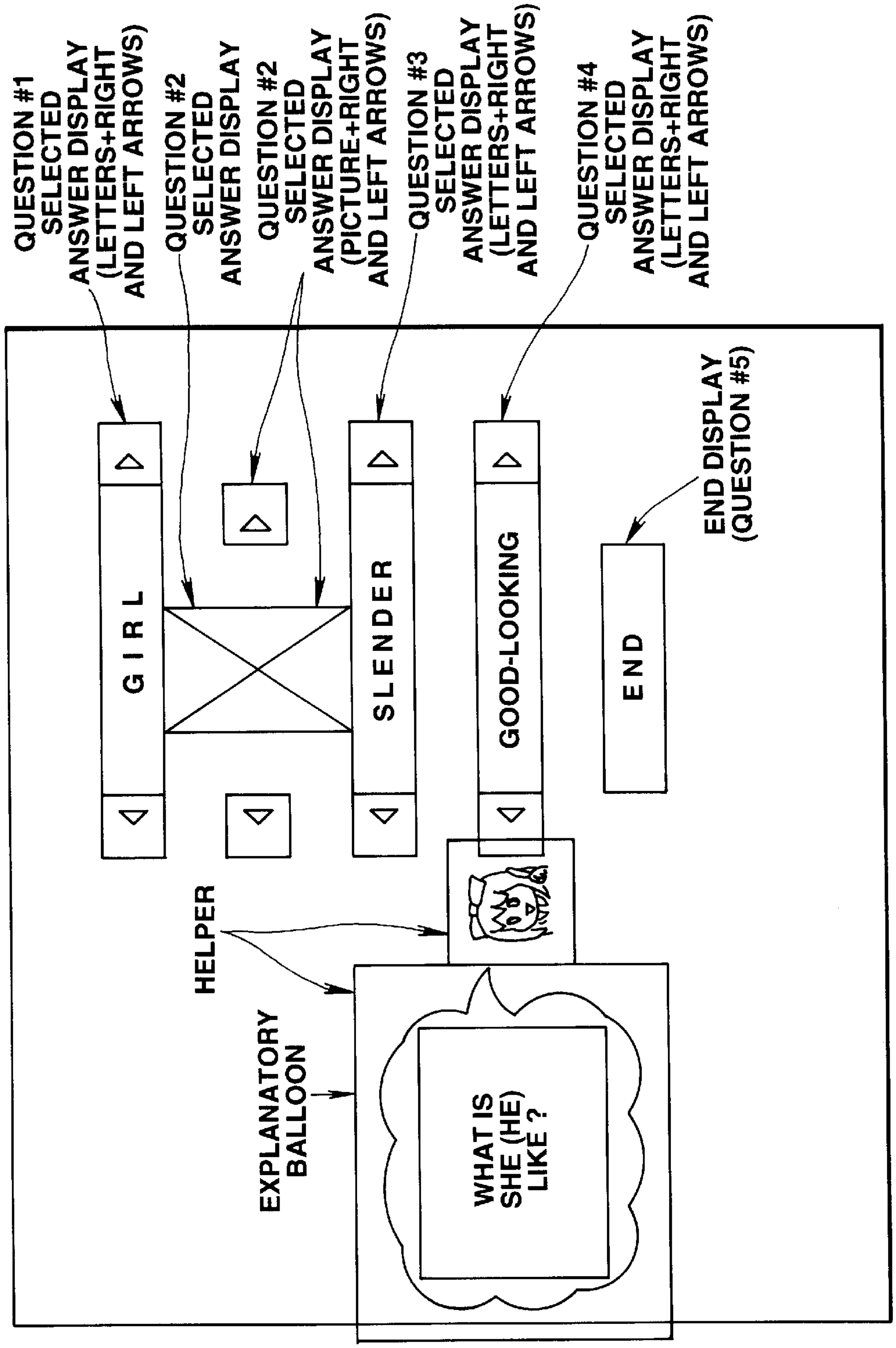
FIG. 50 shows for the layout of a questionnaire screen.

As the questionnaire screen, as shown in FIG. 50, the selected answers for the respective question numbers #1–#4 (also including a picture for selecting an answer in the case of question number 1), "END" (question number #5) and a helper comprising an explanatory balloon indicating the currently selected display and a doll picture are displayed. In the initial state, the helper indicates display of a selected answer for question number 0.

When the user turns on DOWN switch 204 on control pad 112, determination at step 2005 is YES, determination at step 2006 is YES, if the value of question number (#) set in a register (not particularly illustrated) is not 5, and the value of the question number (#) of the register is incremented by one at step 2007. If the value of question number (#) is 5, determination at step 2006 is NO, and the value of question number (#) is not incremented.

On the other hand, when the user turns on UP switch 203 on control pad 112, determination at step 2003 is YES, determination at step 2003 is YES, if the value of the question number (#) set in a register (not particularly illustrated) is not 1, and the value of the question number (#) of the register is decremented by one at step 2004. If the value of the question number (#) is 1, determination at step 2003 is NO, and the value of question number (#) is not decremented.

In the above manner, the user can change the question number (#) by UP switch 203 or DOWN switch 204 on control pad 112. If the question number (#) is changed as described above, processes corresponding to the changed question number (#) are executed at steps 2008–2027 in FIG. 21.

At first, if the question number (#) is changed to 1, determination at step 2008 is YES, whereby steps 2009–2011 are executed.

That is, at step 2009, data on an explanatory balloon for explaining the questionnaire screen corresponding to question number 1 and data on the coordinates of the balloon are prepared. Specifically, CPU 101 determines, as the explanatory balloon data, the data corresponding to the image shown in FIG. 61A and being the OBJ-B plane object image data shown in FIG. 6 of program/data ROM 107 comprising the speech text data and the speech frame data shown in FIG. 7((3)). Further, CPU 101 prepares data on the coordinates the display position of the object image corresponding to question number 1 in the internal register thereof.

At step 2010, CPU 101 transfers the determined object image data for the explanatory balloon shown in FIG. 61A from program/data ROM 107 by way of CPU interface 301, address bus 315, data bus 316 and SRAM interface 302 to an empty OBJ-B plane object memory area of SRAM 103. Further, CPU 101 transfers data on the coordinate of the display position of the object image prepared in the internal register thereof by way of CPU interface 301, address bus 315 and data bus 316 to object attribute memory (OAM) 307.

At step 2011, it is determined whether the series of the transfer processes have been completed, the explanatory balloon shown in FIG. 61A is displayed at the position of question number 1. Subsequently, control flow returns to the process at step 2002.

Then, also where question number (#) is changed to any one of 2–5, determination at steps 2012, 2016, 2020 or 2024 is YES, whereby the process at a group of steps 2013–2015, 2017–2019, 2021–2023 or 2025–2027 is executed in the same manner as at steps 2009–2011 described previously. As a result, data on the explanatory balloon for explaining the questionnaire screen and data on the coordinates of the balloon shown in each of FIG. 61B, 61C, 62A, and 62E corresponding to question numbers 2–5 respectively are transferred to an empty OBJ-B plane object memory area of SRAM 103 and to object attribute memory (OAM) 307, whereby each of the explanatory balloons is displayed at a respective one of the positions of question number 2–5. After the respective processes, control returns to the process at step 2002 in FIG. 20.

Figure 22:
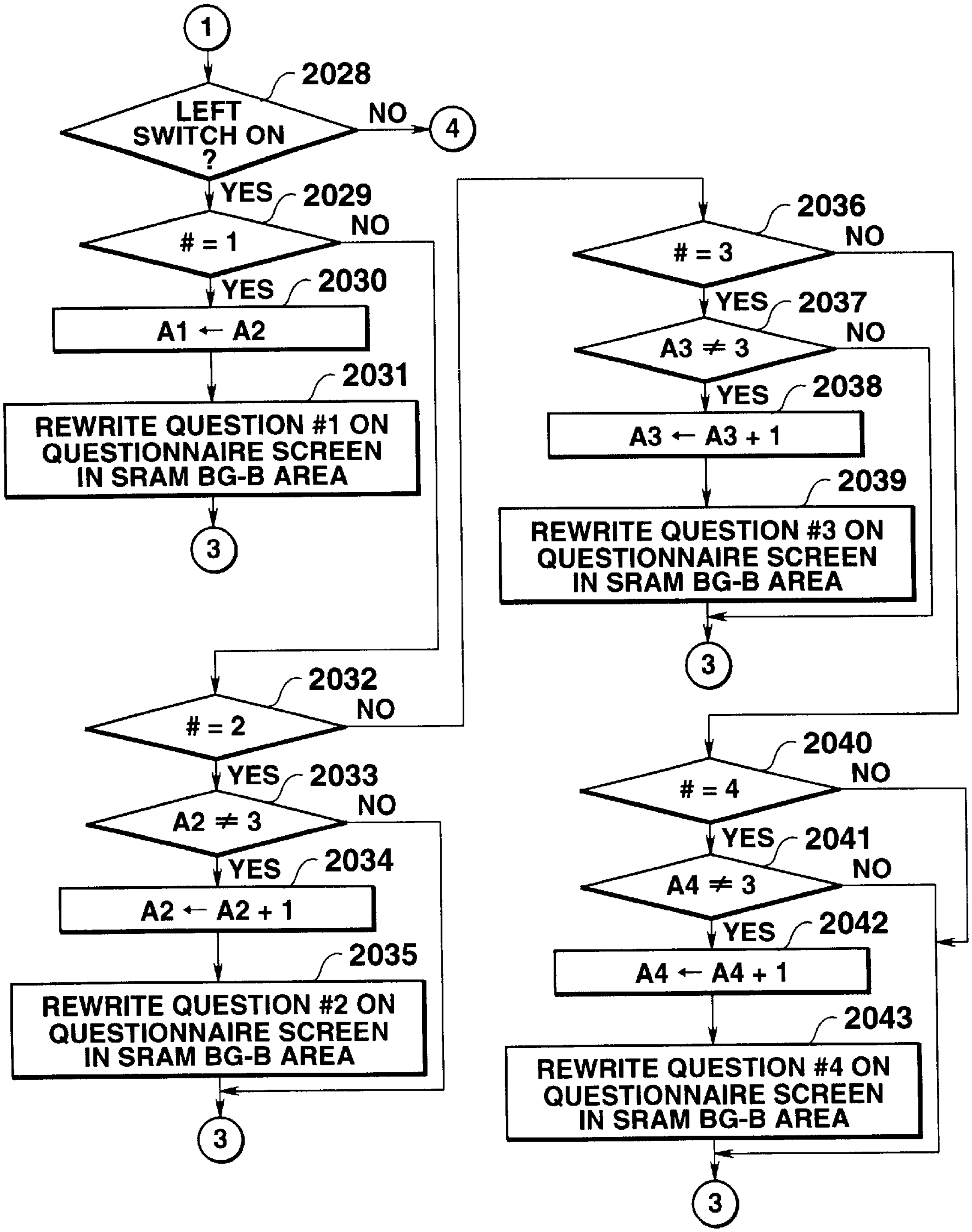
FIG. 22 is a flow chart for a questionnaire screen display process (part 3)
Figure 23:
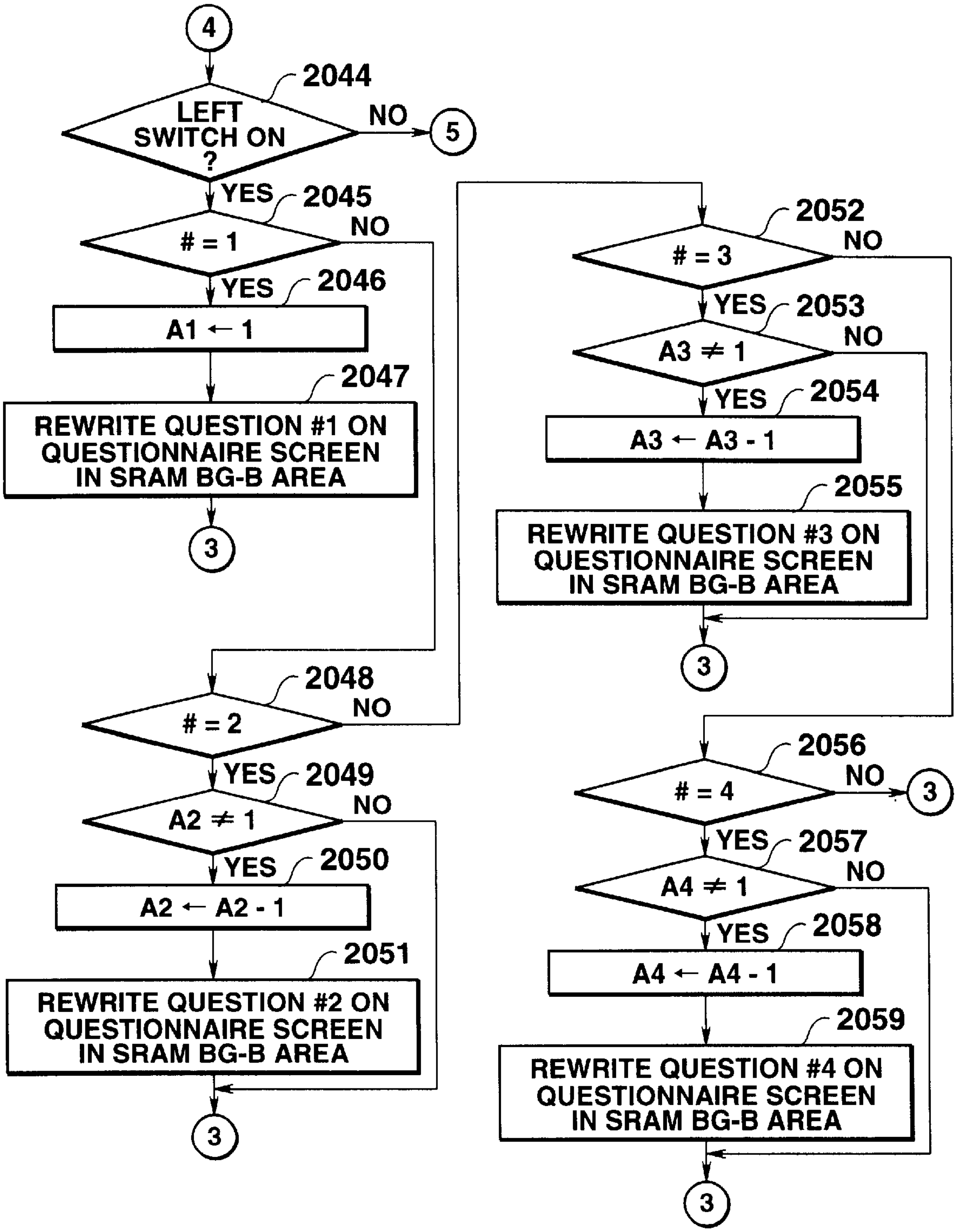
FIG. 23 is a flow chart for a questionnaire screen display process (part 4)

Then, if the user turns on RIGHT switch 206 or LEFT switch 205 on control pad 112 when the value of question number (#) is 1, determination at steps 2028 and 2029 in FIG. 22 or at steps 2024 and 2045 in FIG. 23 is YES, and steps 2030 and 2031 in FIG. 22 or steps 2046 and 2047 in FIG. 23 are executed.

If RIGHT switch 206 is turned on, the value of register A1 (not particularly illustrated) is set at 2 at step 2030 of FIG. 22, whereas if LEFT switch 205 is turned on, the value for register A1 is set at 1 at step 2046 in FIG. 23. The initial values of register A1 and registers A2–A4 to be described later are respectively preset at 1.

At step 2031 in FIG. 22 or at step 2047 in FIG. 23, CPU 101 replaces only data on the cells corresponding to the display of the selected answer (refer to FIG. 50) of question number 1 among the cells constituting the background image for the questionnaire screen, data on the background image being stored in the BG-B plane memory area of SRAM 103, with data on new cells corresponding to a new value 2 or 1 of register A1 read out of the BM-B plane background image data area shown in FIG. 6 of program/data ROM 107. As a result, the display of the selected answer for question number 1 changes between the displays "GIRL" (FIG. 50) and "BOY".

Then, if the user turns on RIGHT switch 206 or LEFT switch 205 on control pad 112 when the value of a question number (#) is 2, determination at steps 2028 and 2034 in FIG. 22 or at steps 2024 and 2048 in FIG. 23 is YES and steps 2033 and 2035 in FIG. 22 or steps 2049 and 2051 in FIG. 23 are executed.

If RIGHT switch 206 is turned on and, further,the value of register A2 is not 3, determination at step 2033 in FIG. 22 is YES, and the value of register A2 is incremented by one at step 2034. If the value of register A2 is 3, determination at 2033 is NO, and the value of register A2 is not changed. On the other hand, if LEFT switch 205 is turned on and, further, the value of register A2 is not 1, determination at step 2049 in FIG. 23 is YES and the value of register A2 is decremented by one at step 2050. If the value of register A2 is 1, determination at step 2049 is NO and the value of register A2 is not changed.

At step 2035 in FIG. 22 or at step 2051 in FIG. 23, CPU 101 replaces only data on the cells corresponding to the display of a selected answer for a question number 2 and an answer select picture (refer to FIG. 50), among the cells constituting the background image for questionnaire screen, data on the background image being stored in the BG-B plane memory area of SRAM 103, with data on new cells corresponding to a new value of register A2 read from the BM-B plane background image data area shown in FIG. 6 of program/data ROM 107. As a result, the selected answer display and the answer select picture for question number 2 are changed sequentially in three kinds of displays. Subsequently, control returns to the process at step 2002 in FIG. 20.

If the user turns on RIGHT switch 206 or LEFT switch 205 on control pad 112 when the value of the question number (#) is 3 or 4, determination at steps 2028 and 2036 in FIG. 22 or steps 2044 and 2052 in FIG. 23 is YES, or determination at steps 2028 and 2040 in FIG. 22 or determination at steps 2044 and 2056 in FIG. 23 is YES, and steps 2037–2039 in FIG. 22, steps 2053–2055 in FIG. 23, steps 2041–2043 in FIG. 22 or steps 2057–2059 in FIG. 23 are executed. The processes in those cases are the same as those where the value of the question number (#) is 3.

That is, after the value of register A3 or A4 is incremented or decremented between 1 and 3, CPU 101 replaces only data on cells corresponding to the display of the selected answer for question number 3 or 4 (refer to FIG. 50) among the cells constituting the background image for the questionnaire screen, data on the background image being is stored in the BG-B plane memory area of SRAM 103, with data on new cells corresponding to a new value of register A3 or A4 read out from the BM-B plane background image data area shown in FIG. 6 of program/data ROM 107. As a result, the selected answer for question number 3 or 4 is sequentially changed in three kinds of displays.

Figure 24:
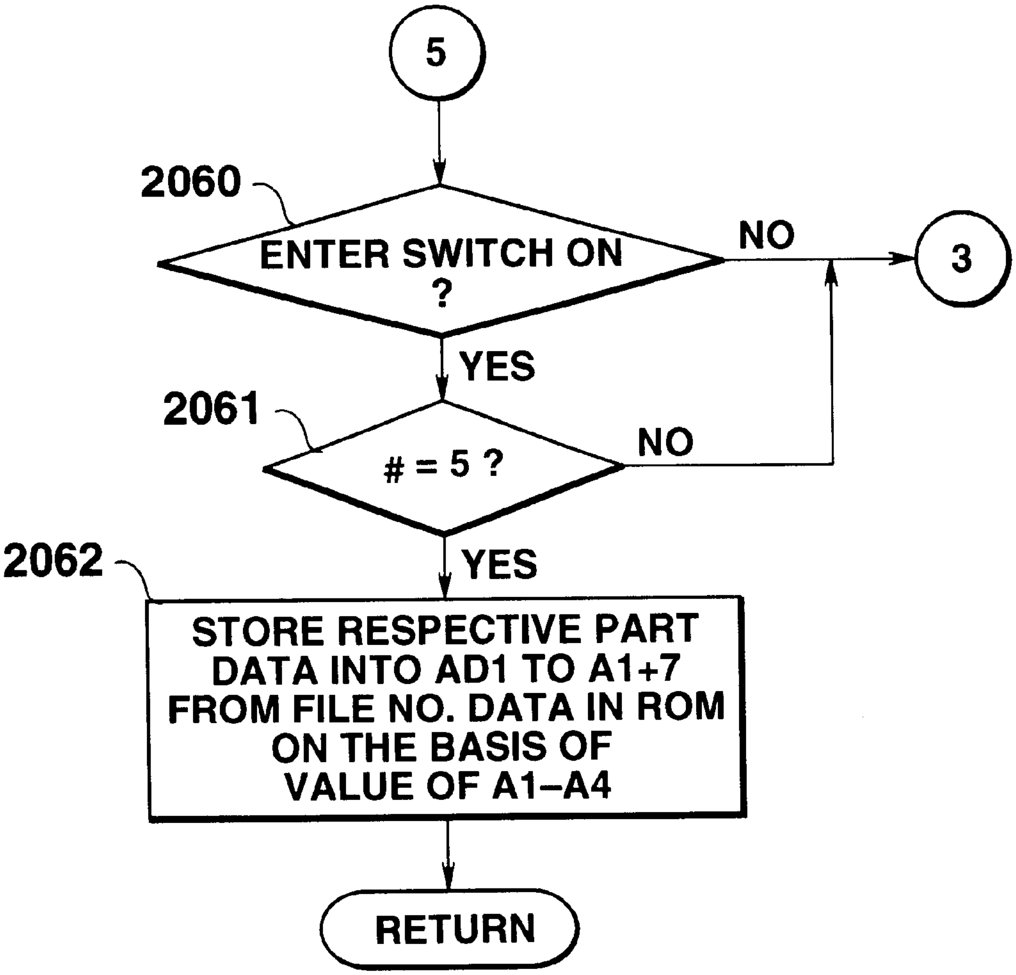
FIG. 24 is a flow chart for the questionnaire screen display process (part 5)

If the user turns on ENTER switch 202 on control pad 112 when the value of the question number (#) is any one of 1–4, determination at step 2060 in FIG. 24 is YES and determination at step 2061 is NO, and control returns to the process at step 2002 in FIG. 20.

Further, if the user turns on ENTER switch 202 on control pad 112 when the value of the question number (#) is 5, that is, when the explanatory balloon has shown END display, both the determinations at steps 2060 and 2061 in FIG. 24 are YES. As a result, CPU 101 determines a file number to be loaded on the basis of the values of registers A1–A4 showing the result of the questionnaire by referring to a table (not particularly illustrated) of program/data ROM 107. Then, similarly to the file loading process at step 1304 in FIG. 13 described previously (refer to step 1621 in FIG. 18), CPU 101 stores data on part numbers of 10 kinds of parts, data on which is stored in address areas {AD8+8×((FN)−1)}−{AD8+8×((FN)−1)+7} shown in FIG. 9 of work RAM 108 corresponding to the file number described above, in address areas {AD1}−{AD1+7} shown in FIG. 9 of work RAM 108 respectively.

As described above, data on the respective images of the parts corresponding to the part numbers for a portrait contained in the file selected by the user stored in address areas {AD1}−{AD+7} shown in FIG. 9 of work RAM 108 is transferred from program/data ROM 107 to SRAM 103 or DP-RAM 104 and displayed by way of VDP 102 on television receiver 111 in the face creation process at step 1306 in FIG. 13 to be described later, and the user can edit a portrait based on the data. Further, the data can be saved as a file if necessary.

Face Creating Process

As described previously, the user can load the data of the file corresponding to the file icon selected on the file operation screen or the data of the file having a feature nearest the result of the questionnaire set on the questionnaire screen onto SRAM 103 or DP-RAM 104, and can edit a portrait based on the load data in the face creation process at step 1306 in FIG. 13. In this process, processes for the following 24 cases are executed.

(Case 1)

Figure 51:
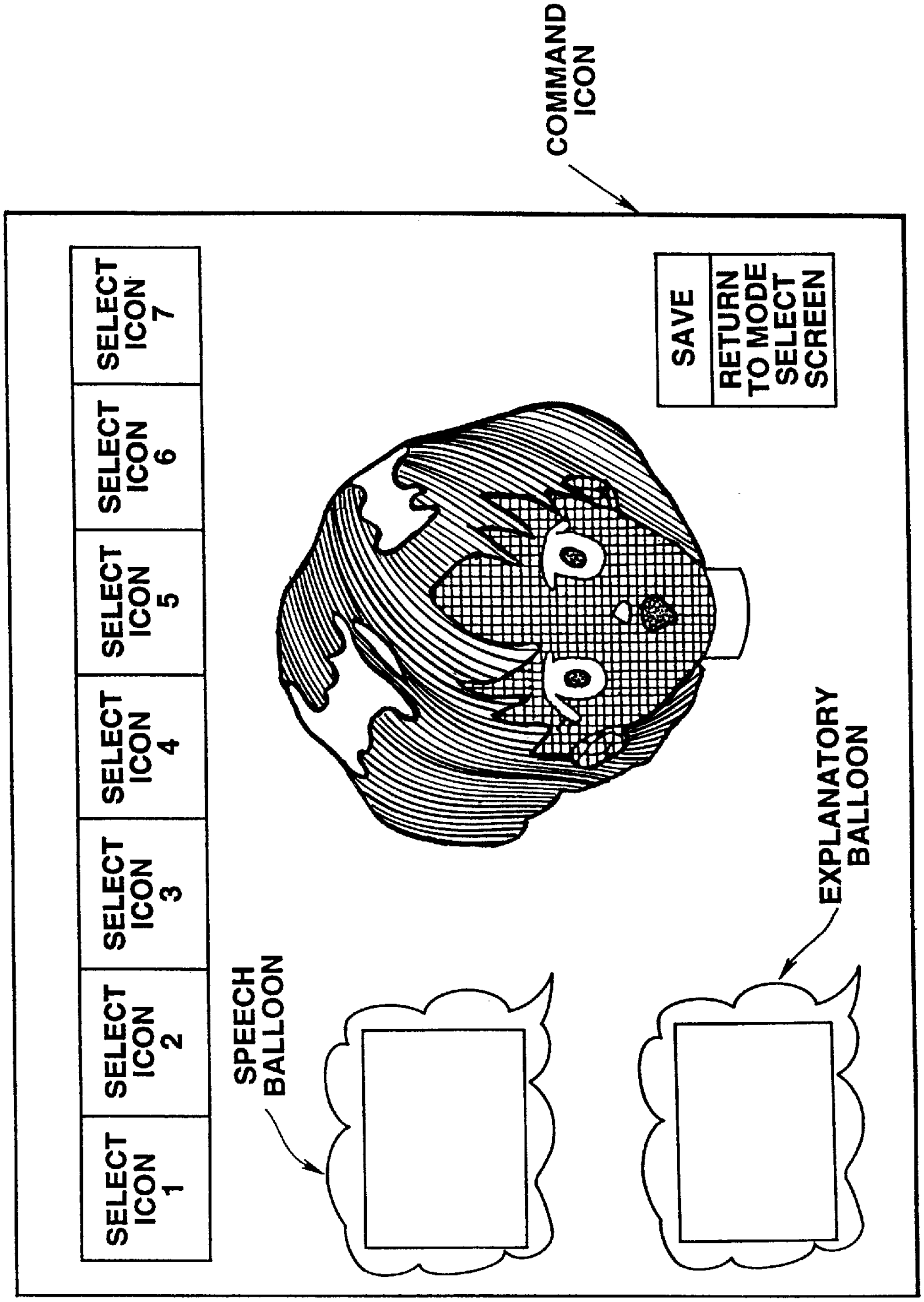
FIG. 51 shows the layout of a basic system screen.

The user can select between a select icon and a command icon by SEL switch 201 while observing a basic system screen displayed on television receiver 111 in the face image creation shown in FIG. 51.

(Case 2)

The user can select between a "save" icon and a "return to mode selection" icon as the command icon by turning on either UP switch 203 or DOWN switch 204 when one of the command icons has displayed emphatically.

(Case 3)

By turning on ENTER switch 202 when any one of the command icons has been displayed emphatically, the user can return to the mode select screen if the "return to mode select" icon has been displayed emphatically, or can save the currently created portrait data into the file if the "save" icon has been displayed emphatically.

(Case 4)

Figure 69A:
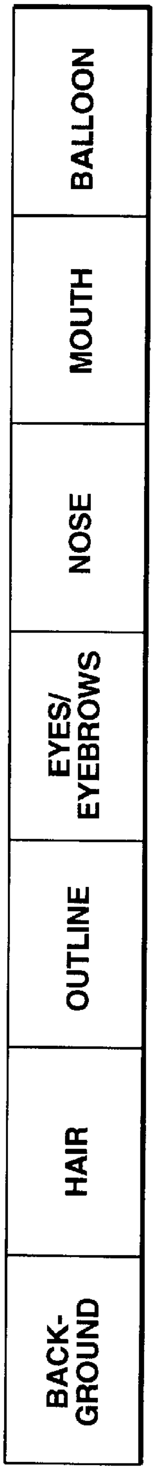
FIGS. 69A–69D illustrate selection icons.

By turning on LEFT switch 205 or RIGHT switch 206 when any one of 7 kinds of select icons in the first stage shown in FIG. 69A for selecting parts of a portrait has been displayed emphatically, the user can move the select icon to be selected, and change the contents of the explanatory balloon shown in FIG. 51 simultaneously as shown in FIG. 63A–FIG. 64D. The operation of UP switch 203 and DOWN switch 204 is invalid.

(Case 5)

By turning on ENTER switch 202 when any one of other select icons than the balloon in the first stage shown in FIG. 69A has been displayed emphatically, the user can display select icon other than the balloon in the second stage (not illustrated particularly) corresponding to the select icon in the first stage.

(Case 6)

By turning on ENTER switch 202 when any one of other select icons than the balloon in the second state has been displayed emphatically, the user can return to the display of the select icon in the first stage shown in FIG. 69A.

(Case 7)

By turning on LEFT switch 205 or RIGHT switch 206 when any one of other select icons than the balloon in the second stage has been displayed emphatically, the user can move the select icon to be selected and, at the same time, display the selected part.

(Case 8)

Figure 69B:
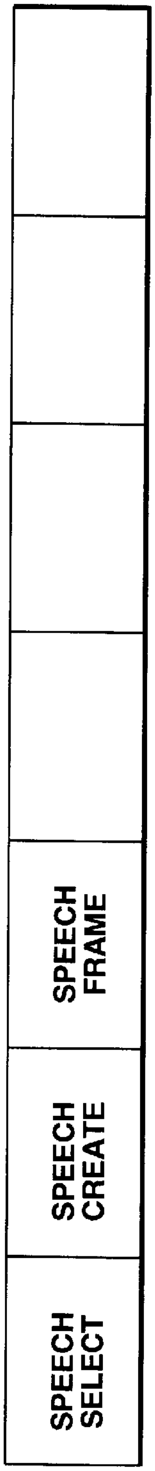

By turning on ENTER switch 202 when the balloon select icon in the first stage shown in FIG. 69A has been displayed emphatically, the user can display the select icon for the balloon in the second stage displayed in FIG. 69B.

(Case 9)

Figure 65A:
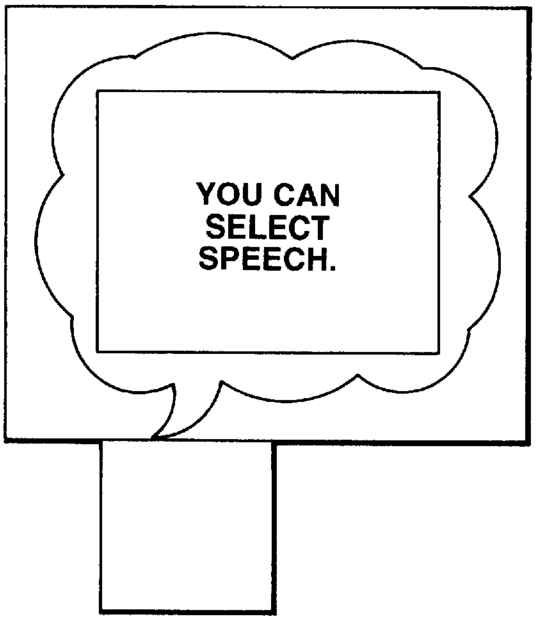
FIGS. 65A–65C illustrate the contents of an explanatory balloon in the basic system screen (part 3)
Figure 65B:
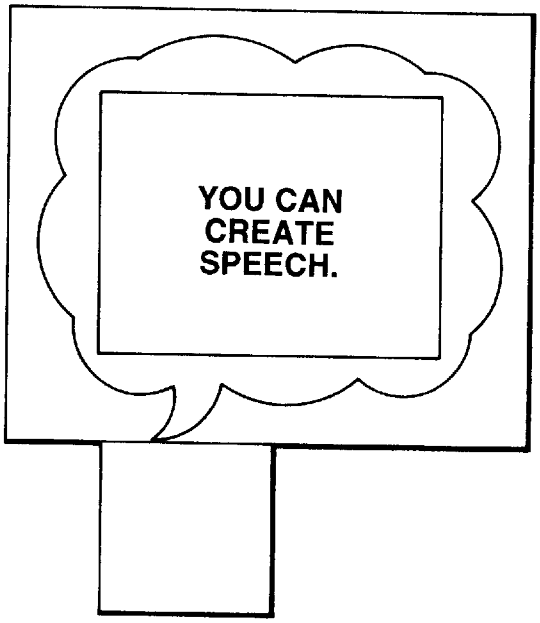
Figure 65C:
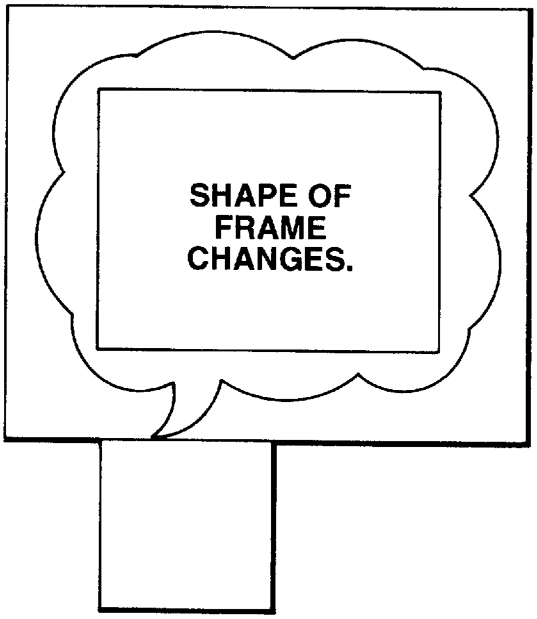

By turning on LEFT switch 205 or RIGHT switch 206 when any one of balloon icon in the second stage shown in FIG. 69B has been displayed emphatically, the use can move the select icon to be selected and, at the same time, change the contents of the explanatory balloon shown in FIG. 51, as shown in FIGS. 65(A)–(C).

(Case 10)

By turning on UP switch 203 when any one of the balloon icons in the second stage shown in FIG. 69B has been displayed emphatically, the user can return to the display of the select icons in the first state shown in FIG. 69A.

(Case 11)

Figure 69C:

By turning on ENTER switch 202 when the speech select icon in the balloon select icons in the second stage shown in FIG. 69B has been displayed emphatically, the user can display the select icon in the third stage shown in FIG. 69C corresponding to the speech select icon.

As shown in FIG. 69C, the user can select a speech displayed as the balloon from the current file title or a previously preset speech and can modify the reacted speech.

(Case 12)

By turning on LEFT switch 205 or RIGHT switch 206 when any one of the speech select icons in the third stage shown in FIG. 69C has been displayed emphatically, the user can move the select icon to be selected and, at the same time, change the contents of the explanatory balloon shown in FIG. 51, for example, as shown in FIGS. 66A–D (corresponding to four select icons from the left end).

(Case 13)

The user can return to the display of the balloon select icon in the second stage shown in FIG. 69B by turning on UP switch 203 when any one of the speech select icons in the third stage shown in FIG. 69C has been displayed emphatically.

(Case 14)

The user can display the selected speech on the inputted letter display section of the letter input screen shown in FIG.

58 by turning on ENTER switch 202 when any one of the speech select icons in the third stage shown in FIG. 69C has been displayed emphatically.

(Case 15)

The user can switch between the cursor movement in the letter display section and the cursor movement in the inputted letter display section by turning on SEL switch 201 when the letter input screen has been displayed in case 14.

(Case 16)

The user can move the cursor in the letter display section upwardly or downwardly by turning on UP switch 203 or DOWN switch 204 when the letter input screen has been displayed in case 14.

(Case 17)

The user can move the cursor in the letter display section rightwardly and leftwardly by turning on LEFT switch 205 or RIGHT switch 206 when the letter input screen has been displayed and the cursor is in the letter display section in case 14.

(Case 18)

The user can move the cursor leftwardly or rightwardly in the inputted letter display section or the inputted letter display section by turning on LEFT switch 205 or RIGHT switch 206 when the letter input screen has been displayed and the cursor is in the inputted letter display section in case 14.

(Case 19)

The user can display the currently selected letter in the letter display section into the inputted letter display section by selecting a letter other than the end letter (refer to FIG. 58) in the letter display section and turning on ENTER switch 202 when the letter input screen has been displayed in case 14.

(Case 20)

Figure 69D:
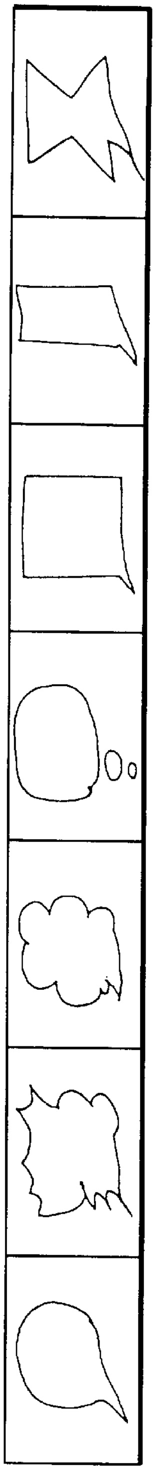
Figure 70A:
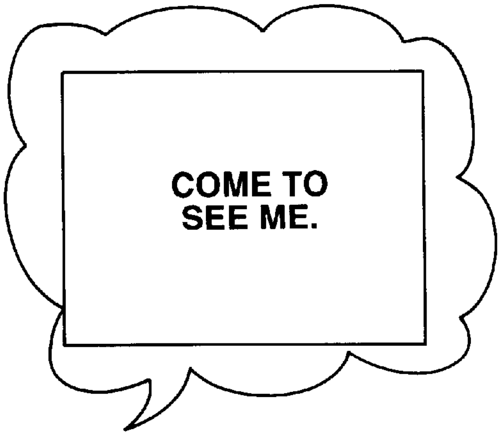
FIGS. 70A–70D illustrate changes in the balloon shape and the speech.
Figure 70B:
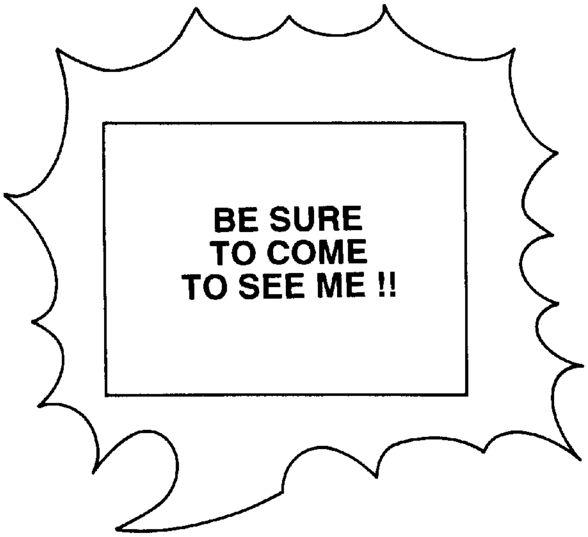
Figure 70C:
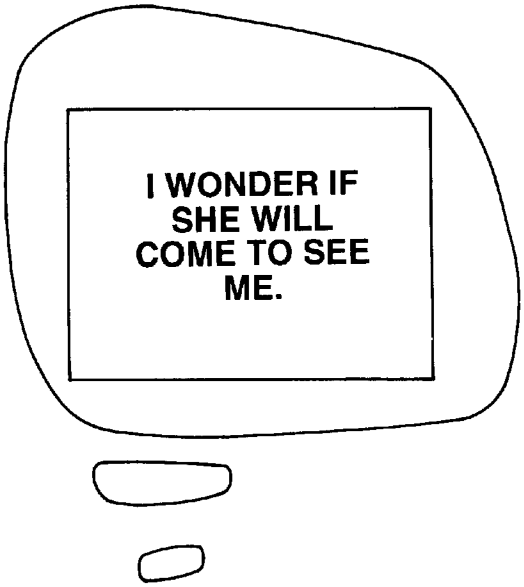
Figure 70D:
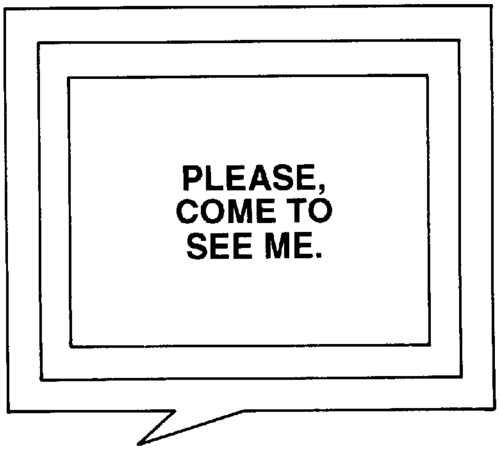

By selecting the end letter (refer to FIG. 58) in the letter display section and turning on ENTER switch 202 when the letter input screen has been displayed in case 14, and when letters are present in the inputted letter display section and constitute a non-fixed text, the user can display those letters as they are, as balloon letters on the basic system screen. Further, if the letters in the inputted letter display section constitute a fixed text, the user can change the text in accordance with the shape of the currently selected speech frame and then can display them as the letters in the balloon on the basic system screen. Subsequently, the speech frame select icons in the third stage shown in FIG. 69D are displayed and the user can select a shape of the speech frame.

(Case 21)

Figure 58:
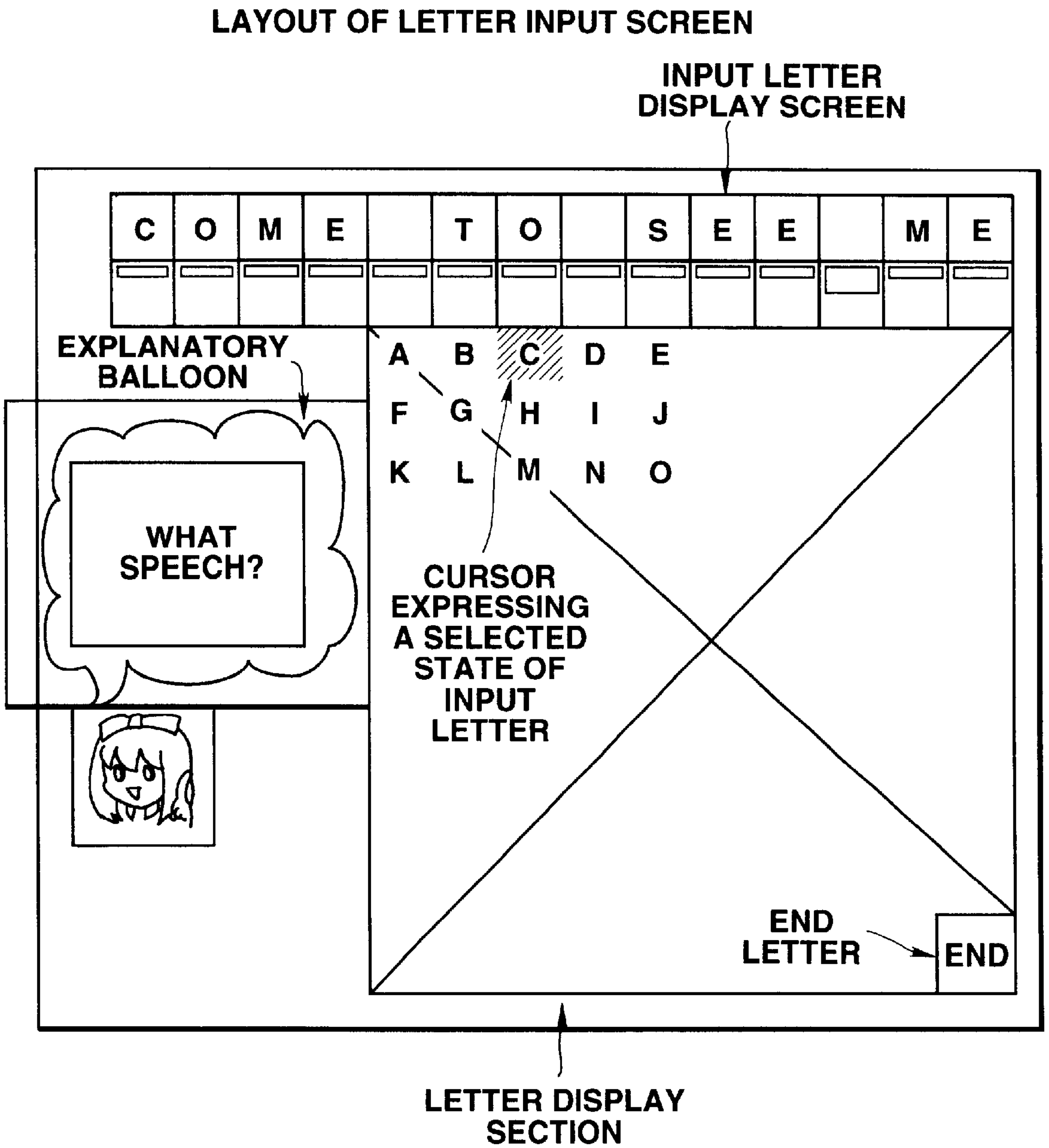
FIG. 58 shows the layout of a letter inputting screen.

By turning on ENTER switch 202 when the speech creation select icon of the balloon select icons in the second stage shown in FIG. 69B has been displayed emphatically, the user can display the letter input screen shown in FIG. 58 and create a speech by selecting letters from the letter display section.

(Case 22)

By turning on ENTER switch 202 when the speech frame select icon of the balloon select icons in the second stage shown in FIG. 69B has been displayed emphatically, the user can display a select icon in the third stage shown in FIG. 69D corresponding to the select icon for the shape of the speech frame.

(Case 23)

By turning on LEFT switch 205 or RIGHT switch 206 when any one of the select icons for the shape of the speech in the third stage shown in FIG. 69D has been displayed emphatically, the user can move the select icon to be selected and, at the same time, convert a speech text created in the same manner as in case 20 in accordance with the shape of the balloon corresponding to the selected select icon if the speech text is a fixed sentence, to thereby change the displayed speech text and the shape of the speech frame.

As described above, when the fixed sentence has been selected as the speech text of the balloon, the speech text can be converted automatically in accordance with the shape of the balloon.

(Case 24)

The user can return to the display of the balloon select icons in the second stage shown in FIG. 69B by turning on UP switch 203 when any one of the select icons for the shapes of the speech frame in the third stage shown in FIG. 69D has been displayed emphatically.

The operation for each of the cases described above can be realized by the operational flow charts in FIGS. 26 to 40 corresponding to the face creating process at step 1306 in FIG. 13. The operations for the respective cases described above will be described in detail in accordance with the corresponding operation flow charts.

(Details of the Operation in Case 1)

In case 1, the user can select between the select icon and the command icon by SEL switch 201 while viewing the basis system screen displayed on television receiver 111 in the face creation process shown in FIG. 51.

Figure 26:
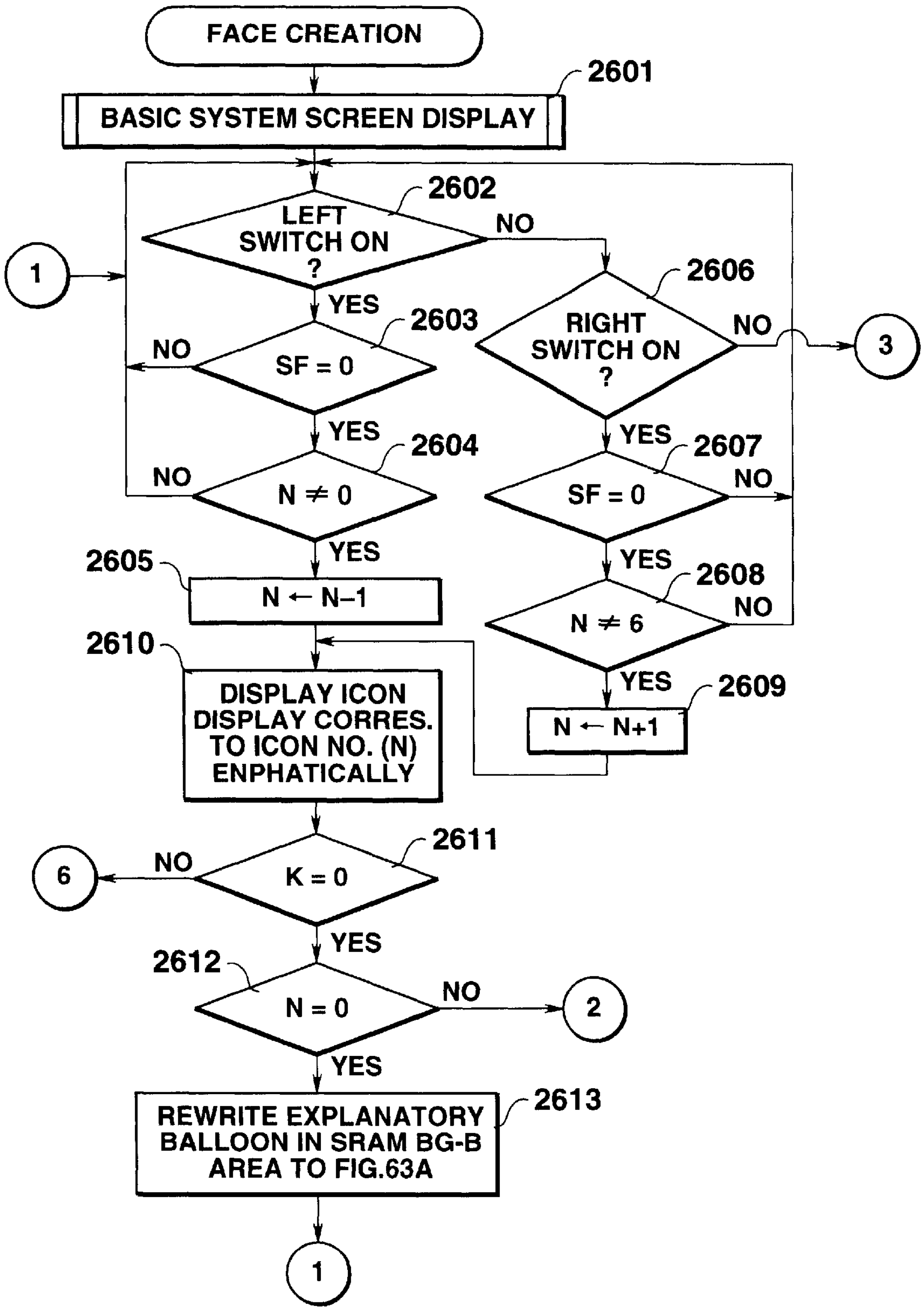
FIG. 26 is a flow chart for a face creation process (part 1)

At first, at step 2601 in FIG. 26, the basic system screen display process is executed. The details of this process are shown as an operational flow chart in FIG. 38.

Figure 38:
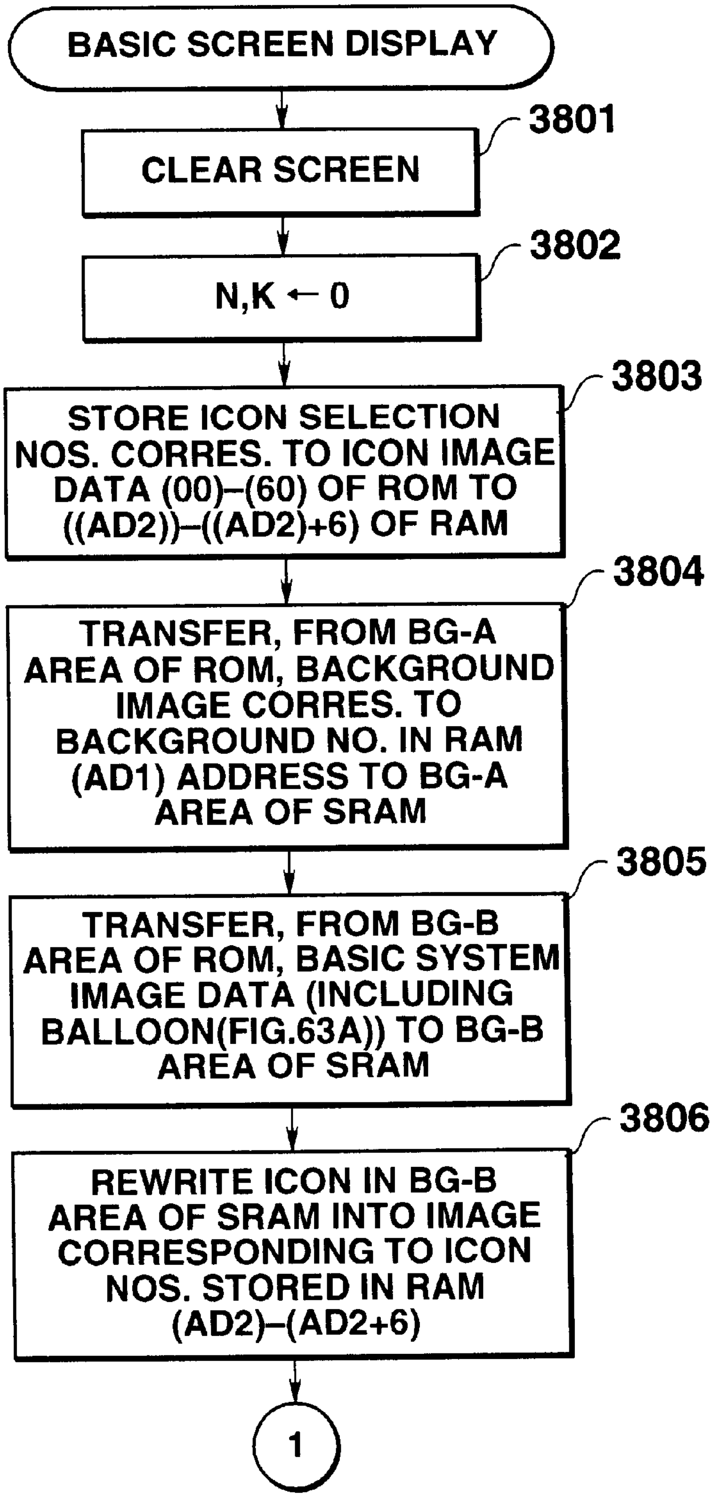
FIG. 38 is a flow chart for a basic system screen display process (part 1)

In FIG. 38, CPU 101 delivers a clear instruction for the output screen to VDP 102 at step 3801. As a result, the screen display of television receiver 111 is cleared.

At step 3802, both of the value of register N indicating the select position of the select icon and the value of register K indicating the display stage of the select icon are reset at zero.

At step 3803, CPU 101 stores data on respective icon select numbers 00–60 corresponding to 7 kinds of icons of Nos. 00 to 60 shown in FIG. 8 among the icon image data in program/data ROM 107 shown in FIG. 6, into address areas {AD2}–{AD2+6} of work RAM 108 shown in FIG. 9.

At step 3804, CPU 101 reads background data corresponding to the background number stored in address area {AD1} of work RAM 108 (refer to FIG. 52) from the BG-A plane background data A-1 to A-7 in program/data ROM 107 shown in FIG. 6 and transfers the read data by way of CPU interface 301, address bus 315, data bus 316 and SRAM interface 302 to the BG-A plane memory area of SRAM 103 (refer to the basic system screen in FIG. 5).

Figure 57:
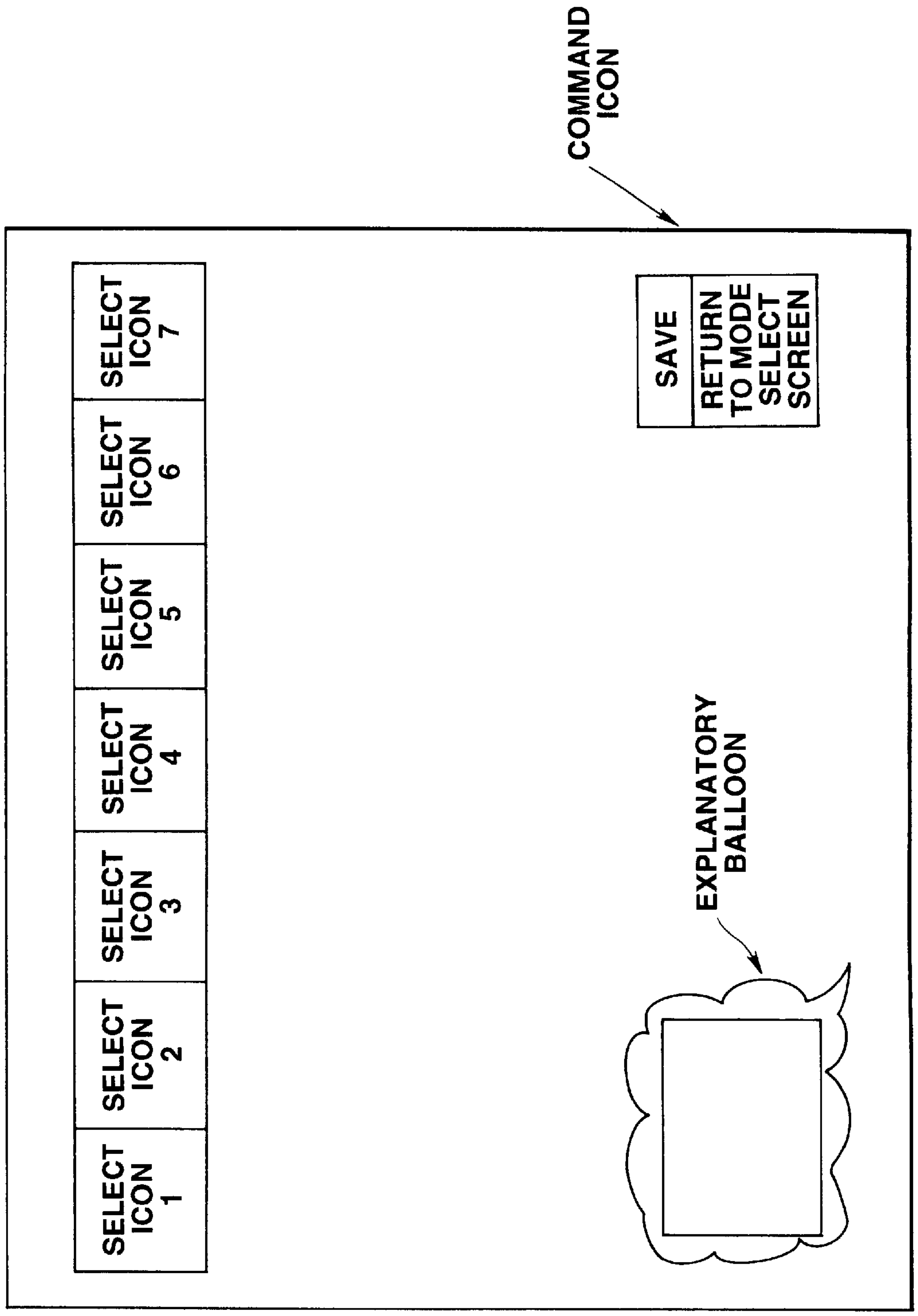
FIG. 57 is a view for the layout of a BG-B plane in the basic system screen.

At step 3805, CPU 101 transfers the basic system screen data (system screen data) as the BG-B plane background image data shown in FIG. 6 in program/data ROM 107 by way of CPU interface 301, address bus 315, data bus 316 and SRAM interface 302 to the BG-B plane memory area of SRAM 103 (corresponding to the system of the basic system screen in FIG. 5). The images in this case correspond to the explanatory balloon shown in FIG. 63(A) and the command icon selected from among the BG-B images shown in FIG. 57.

At step 3806, CPU 101 replaces, only data on cells corresponding to the select icon selected from among the cells constituting the background image of the basic system screen, data on the background image being stored in the BG-B plane memory area of SRAM 103, with image data for 7 kinds of part kind select icons shown in FIG. 8 of program/data ROM 107 corresponding to the icon numbers stored in address areas {AD2} to {AD2+6} shown in FIG.

9 of work RAM 108 at step 3803 (corresponding to the system on the basic system screen in FIG. 5). The images in this case correspond to the images of seven kinds of select icons among the BG-B images shown in FIG. 57. The select icons display the images of seven kinds of parts, namely, back ground, hair, outline, eyes, eyebrows, nose, mouth and balloon from the left to the right in this order as shown in FIG. 69A.

Figure 39:
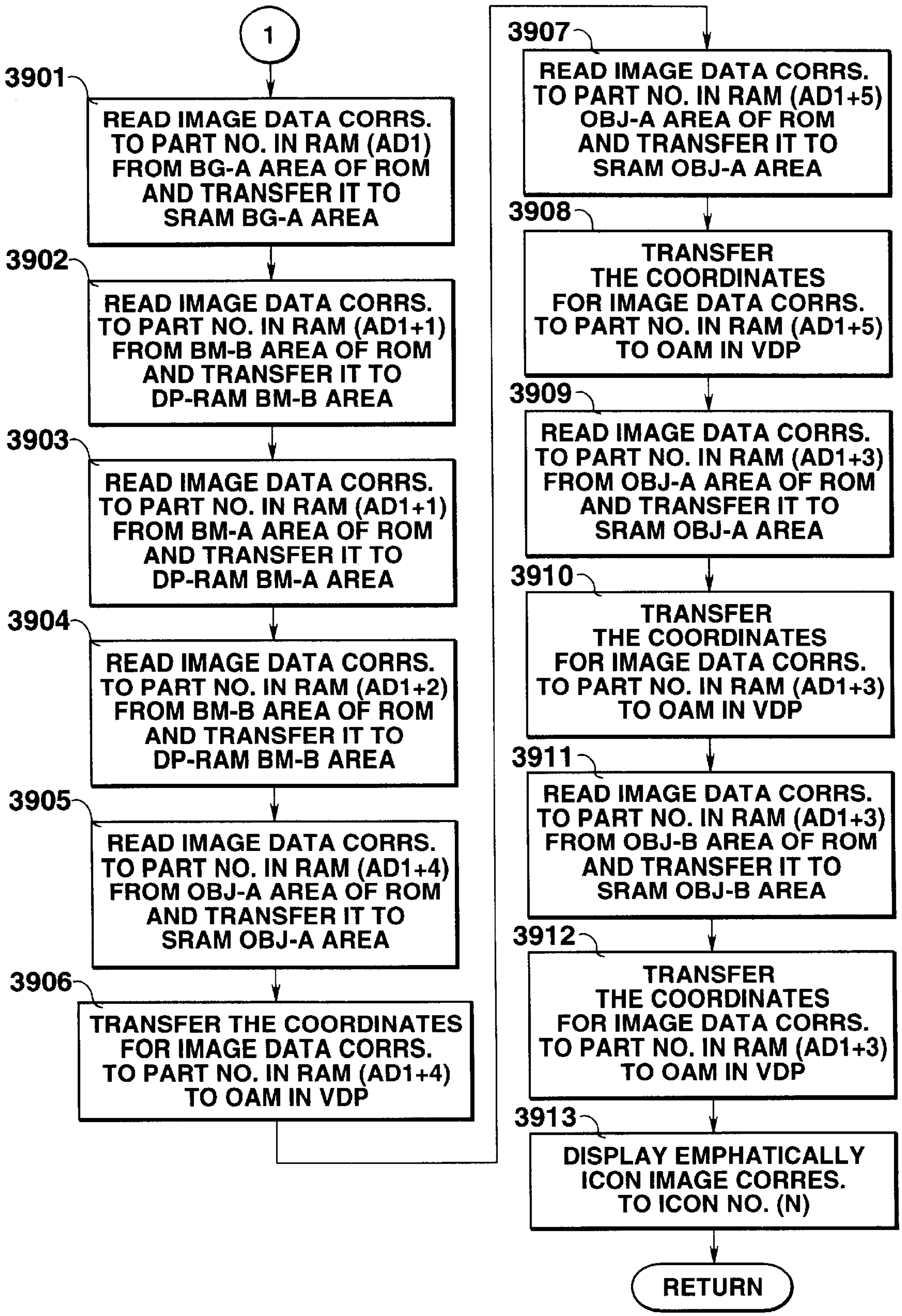
FIG. 39 is a flow chart for the basic system screen display process (part 2)
Figure 52:
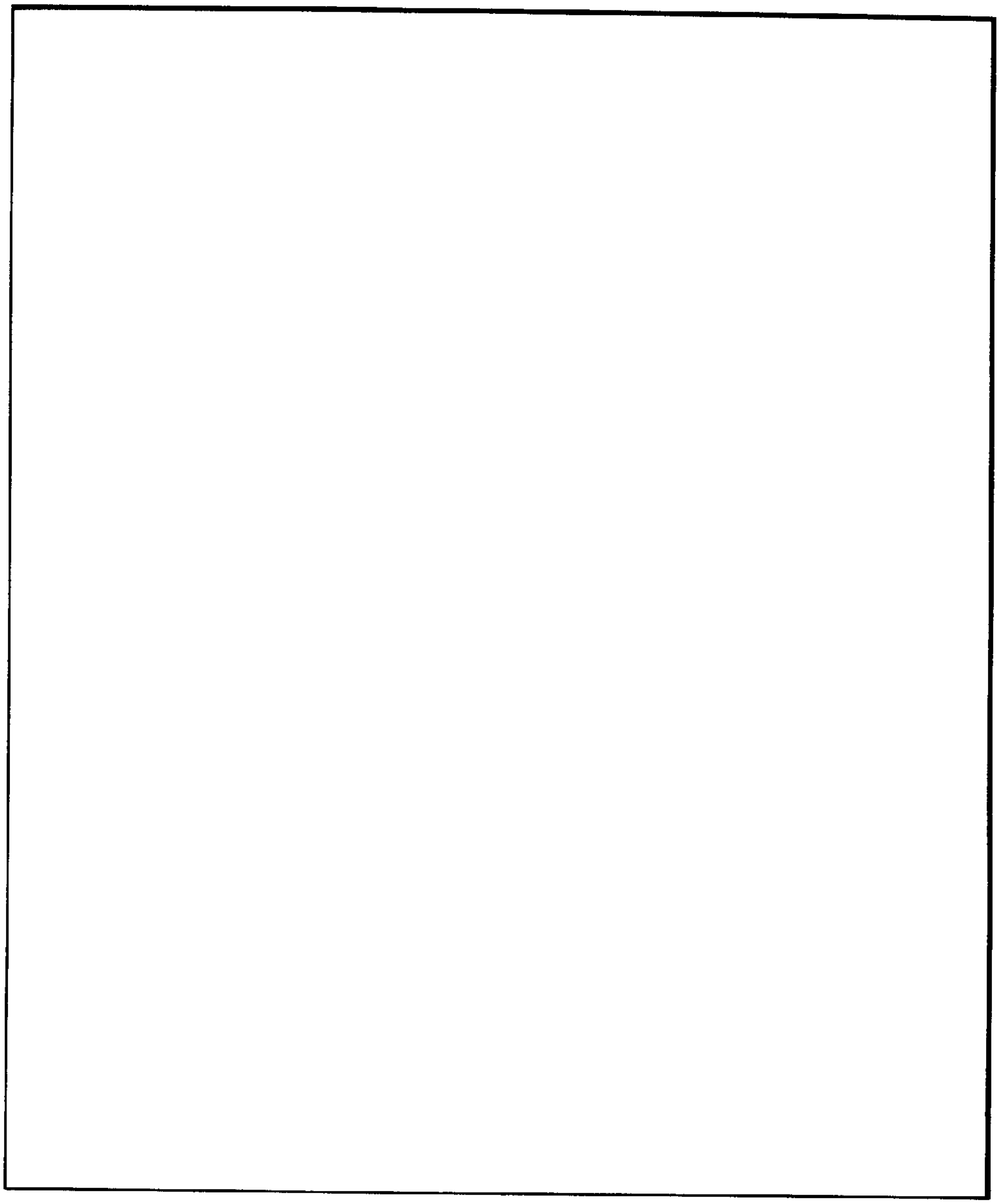
FIG. 52 shows the layout of a BG-A plane in the basic system screen.

Then, at step 3901 in FIG. 39, CPU 101 reads out the data corresponding to part numbers stored in address area {AD1} shown in FIG. 9 of work RAM 108 in the file loading process at step 1304 or the questionnaire screen display process at step 1305 in FIG. 13 described previously from among the seven kinds of BG-A plane background images shown in FIG. 6 of program/data ROM 107, and transfers the read data by way of CPU interface 301, address bus,315, data bus 316 and SRAM interface 302 to the BG-A plane memory area of SRAM 103 (refer to FIGS. 5, 52). VDP 102 having the constitution shown in FIG. 3 displays on television receiver 111 the background image data transferred to the BG-A plane memory area of SRAM 103, as described previously.

Figure 53:
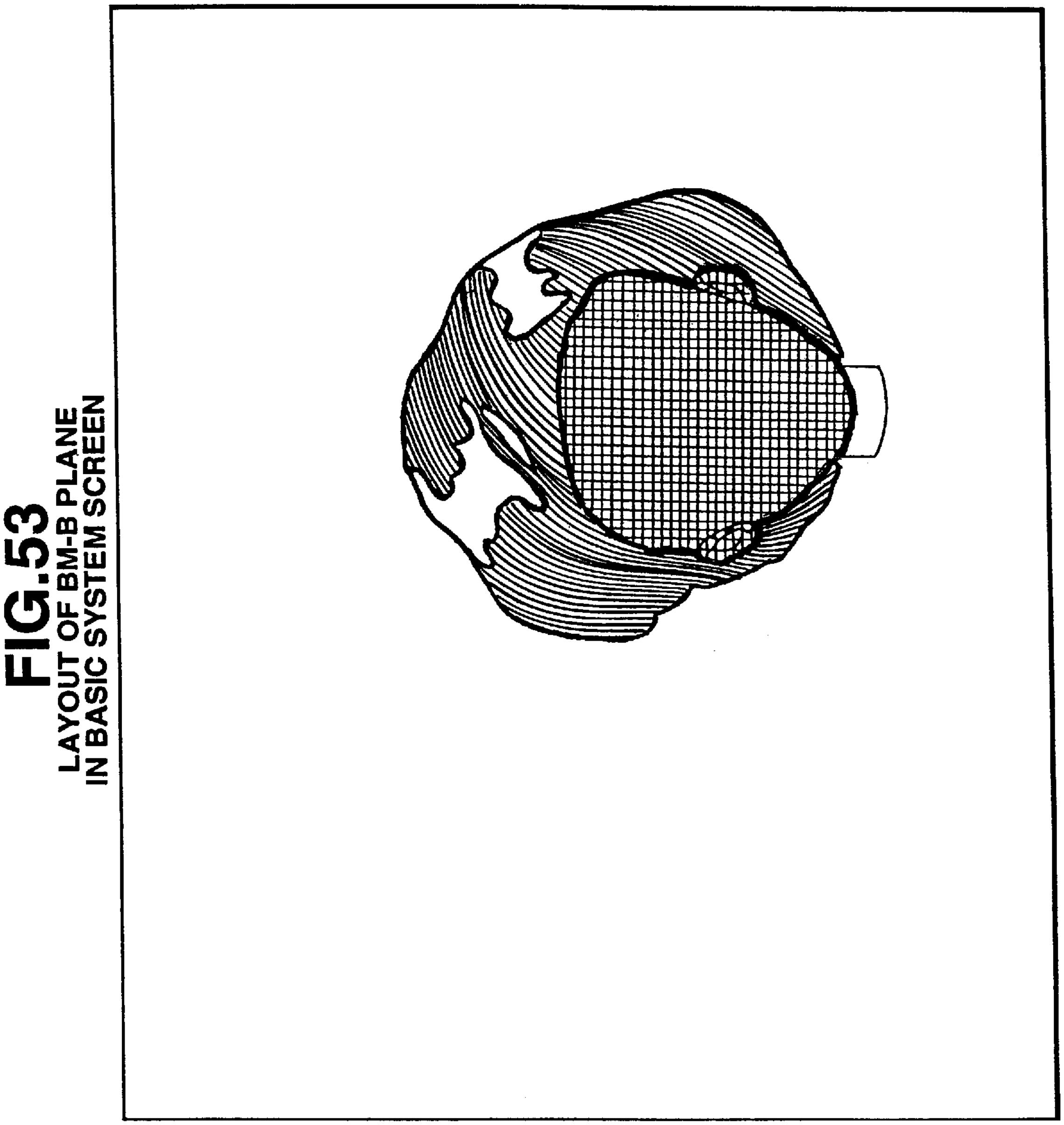
FIG. 53 shows the layout of a BM-B plane in the basic system screen.

At step 3902, CPU 101 reads out data corresponding to part number stored in address area (AD1+1) shown in FIG. 9 of work RAM 108 in the file loading process at step 1304 or in the questionnaire screen operating process at step 1305 in FIG. 13 described previously, from among seven kinds of BG-B plane back hair images for BG-B area shown in FIG. 6 of program/data ROM 107 and transfers the read data by way of CPU interface 301, address bus 315, data bus 316 and DP-RAM interface 303 to the back hair cells of the BM-B plane memory area of DP-RAM 104 (refer to the back hair in FIGS. 5, 53). VDP 102 having the constitution shown in FIG. 3 display on television receiver 111 the back hair image data transferred to the BM-B plane memory area of DP-RAM 104.

At step 3903, CPU 101 reads out front hair data corresponding to the part number stored in address area (AD1+1) shown in FIG. 9 of work RAM 108, in the file loading process at step 1304 or in the questionnaire screen operating process at step 1305 in FIG. 13 described previously, from among seven kinds of BM-A plane front hair images shown in FIG. 6 of program/data ROM 107 and transfers the read data by way of CPU interface 301, address bus 315, data bus 316 and DP-RAM interface 303 in the BM-A plane memory area of DP-RAM 104 (refer to FIGS. 5, 53). VDP 102 having the constitution shown in FIG. 3 displays on television receiver 111 the front hair image data transferred to the BM-A plane memory area of DP-RAM 104.

Figure 63A:
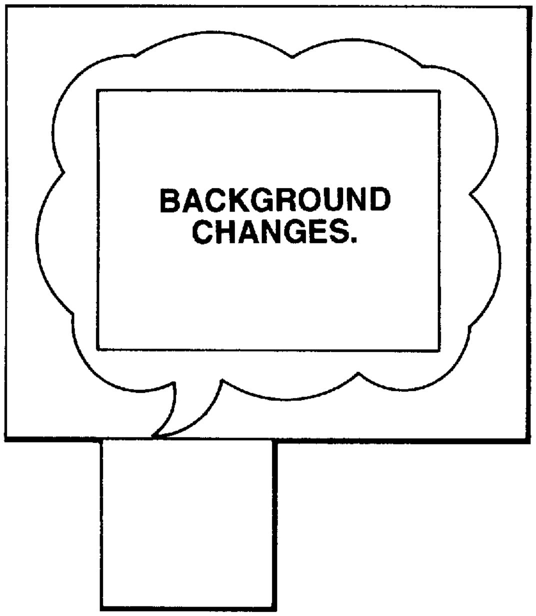
FIGS. 63A–63C illustrate the contents of an explanatory balloon in the basic system screen (part 1)
Figure 63B:
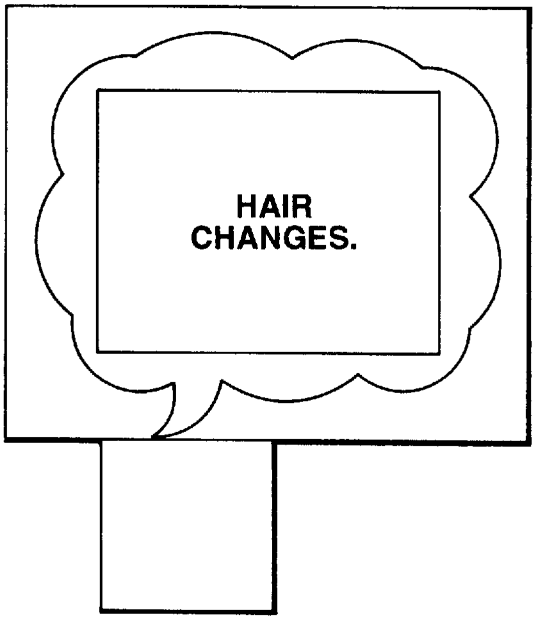
Figure 63C:
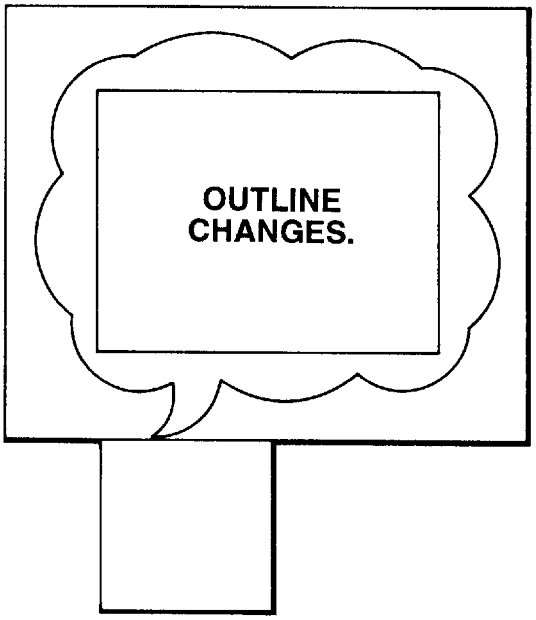

At step 3904, CPU 101 reads outline data corresponding to the part number stored in address area (AD1+2) shown own in FIG. 9 of work RAM 108 in the file loading process at step 1304 or in the questionnaire screen operating process at step 1305 in FIG. 13 described previously from among 7 kinds of BM-B outline images shown in FIG. 6 of program/data ROM 107 and transfers the read data by way of CPU interface 301, address bus 315, data bus 316 and DP-RAM interface 303 to the outline cells of the BM-B plane memory area of DP-RAM 104 (refer to the outline in FIGS. 5, 63). The VDP 102 having the constitution shown in FIG. 3 displays on television receiver 111 the outline image data transferred to the BM-B plane memory area of DP-RAM 104.

Figure 54:
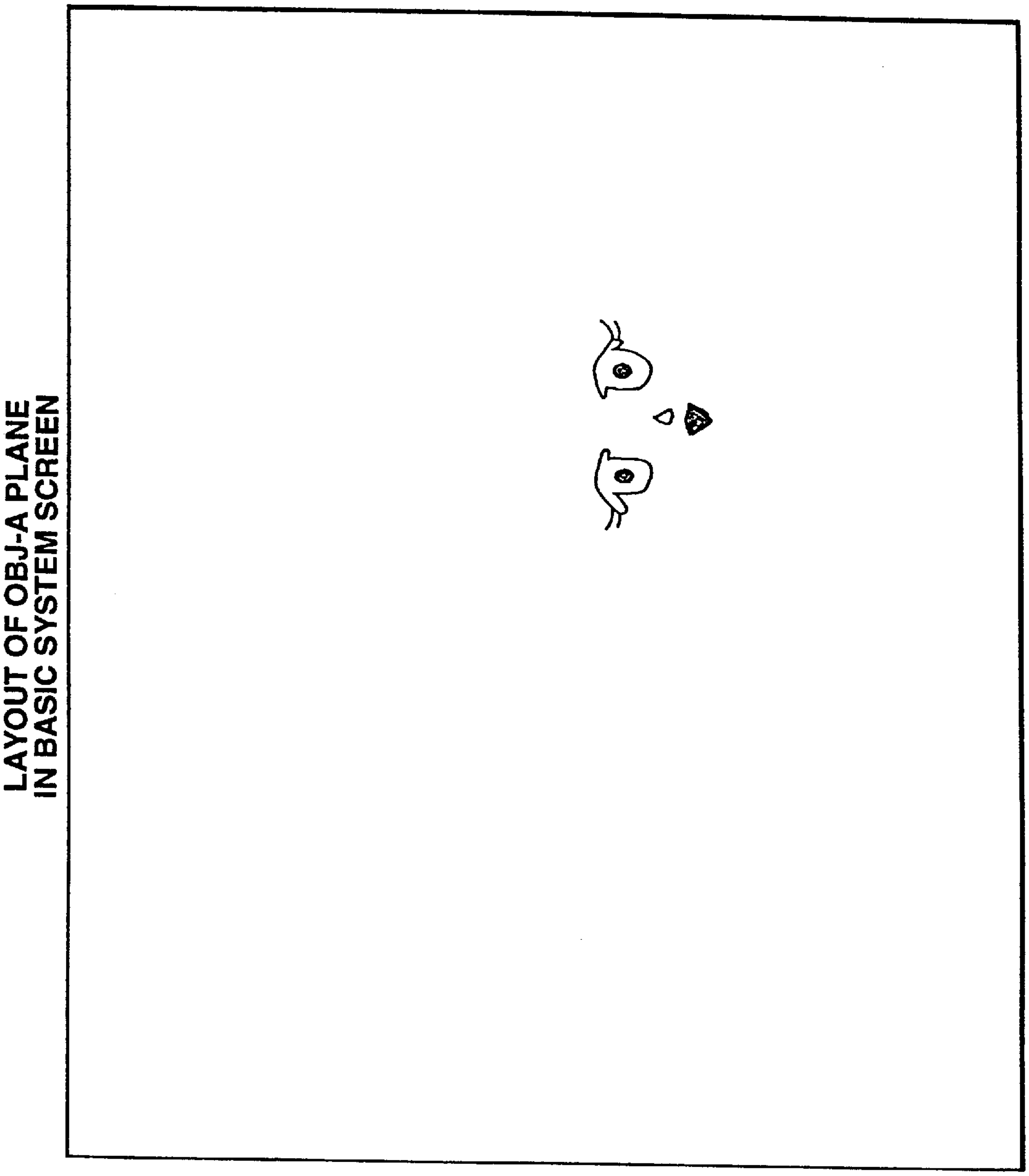
FIG. 54 shows the layout of an OBJ-A plane in the basic system screen.

At step 3905, CPU 101 reads the nose image data corresponding to the part number stored in address area {AD1+4} shown in FIG. 9 of work RAM 108 in the file loading process at step 1304 or in the questionnaire screen operating process at step 1305 in FIG. 13 described previously, from among 7 kinds of OBJ-A plane nose images shown in FIGS. 6 and 7 of program/data ROM 107 and transfers the read data by way of CPU interface 301, address bus 315, data bus 316 and SRAM interface 302 to an empty OBJ-A plane object memory area of SRAM 103 (refer to the nose in FIGS. 5, 54).

At subsequent step 3906, CPU 101 transfers coordinate data corresponding to the part number of the nose referred to at step 3905 by way of CPU interface 301, address bus 315 and data bus 316 to the object number area of object attribute memory 307 corresponding to the object memory area to which the read nose image data was transferred at step 3905 (refer to FIG. 10).

At step 3907, CPU 101 reads mouth image data corresponding to the part number stored in address area {AD1+5} shown in FIG. 9 of work RAM 108, in the file loading process at step 1304 or in the questionnaire screen operating process at step 1305 in FIG. 13 described previously from among 7 kinds of OBJ-A mouth image data shown in FIGS. 6 and 7 of program/data ROM 107 and transfers the read data by way of CPU interface 301, address bus 315, data bus 316 and SRAM interface 302 to an empty OBJ-A plane object memory area of SRAM 103 (refer to the mouth in FIGS. 5, 54).

At succeeding step 3908, CPU 101 transfers coordinate data corresponding to the part number of the mouth referred to at step 3905 by way of CPU interface 301, address bus 315 and data bus 316 to the object number area of object attribute memory 307 corresponding to the object memory area to which the read mouth image data was transferred at step 3907.

VDP 102 having the constitution shown in FIG. 3 displays the image data for the nose and mouth transferred to the OBJ-A plane the memory area of SRAM 103, as mentioned above, at the display positions corresponding to the coordinate data transferred to object attribute memory 307.

At step 3909, CPU 101 reads eye image data corresponding to the part number stored in address area (AD1+3) shown in FIG. 9 of work RAM 108 in the file loading process at step 1304 or in the questionnaire screen operating process at step 1305 in FIG. 13 described previously from among 7 kinds of OBJ-A plane eye image data shown in FIGS. 6 and 7 of program/data ROM 107 and transfers the read data by way of CPU interface 301, address bus 315, data bus 316 and SRAM interface 302 to an empty OBJ-A plane object memory area of SRAM 103 (refer to the eyes in FIGS. 5, 54).

At subsequent step 3910, CPU 101 transfers coordinate data corresponding to the part number of eyes referred to at step 3909 by way of CPU interface 301, address bus 315 and data bus 316 to an object number area of object attribute memory 307 corresponding to the object memory area to which the eye image data was transferred at step 3909.

VDP 102 having the constitution shown in FIG. 3 displays the eye image data transferred to the OBJ-A plane memory area of SRAM 103 at the display position corresponding to the coordinate data transferred to object attribute memory 307.

At step 3911, CPU 101 reads, eyebrows image data corresponding to part number 3 stored in address area {AD1+3} shown in FIG. 9 of work RAM 108 from among 7 kinds of eyebrow image data shown in FIGS. 6, 7 of program/data ROM 107, in the file loading process at step 1304 or in the questionnaire screen operating process at step 1305 in FIG. 13 described previously and transfers the read data by way of CPU interface 301, address bus 315, data bus 316 and SRAM interface 302 to an empty OBJ-B plane object memory area of SRAM 103 (refer to the eyebrows in FIGS. 5, 54).

At succeeding step 3912, CPU 101 transfers the coordinate data corresponding to the part number for eyebrows referred to at step 3911 by way of CPU interface 301, address bus 315 and data bus 316 to the object number area of object attribute memory 307 corresponding to the object memory area to which the eyebrows image data was transferred at step 3911. VDP 102 having the constitution shown in FIG. 3 displays the eyebrows image data transferred to the OBJ-B plane memory area of SRAM 103 at a display position corresponding to the coordinate data transferred to object attribute memory 307.

Finally, at step 3913, the first (left end) back ground select icon corresponding to the value 0 of register N (refer to step 3802 in FIG. 38) is displayed emphatically. Specifically, CPU 101 replaces data on cells corresponding to the first selection icon among the cells constituting the background image of the basic system screen, data on the background image being stored in the BG-B plane memory area of SRAM 103, with data on cells for emphatic display.

After this process, the basic system screen display process at step 2601 in FIG. 26 is ended. As a result, the basic system screen (except for the speech balloon), for example, shown in FIG. 51 is displayed.

Figure 28:
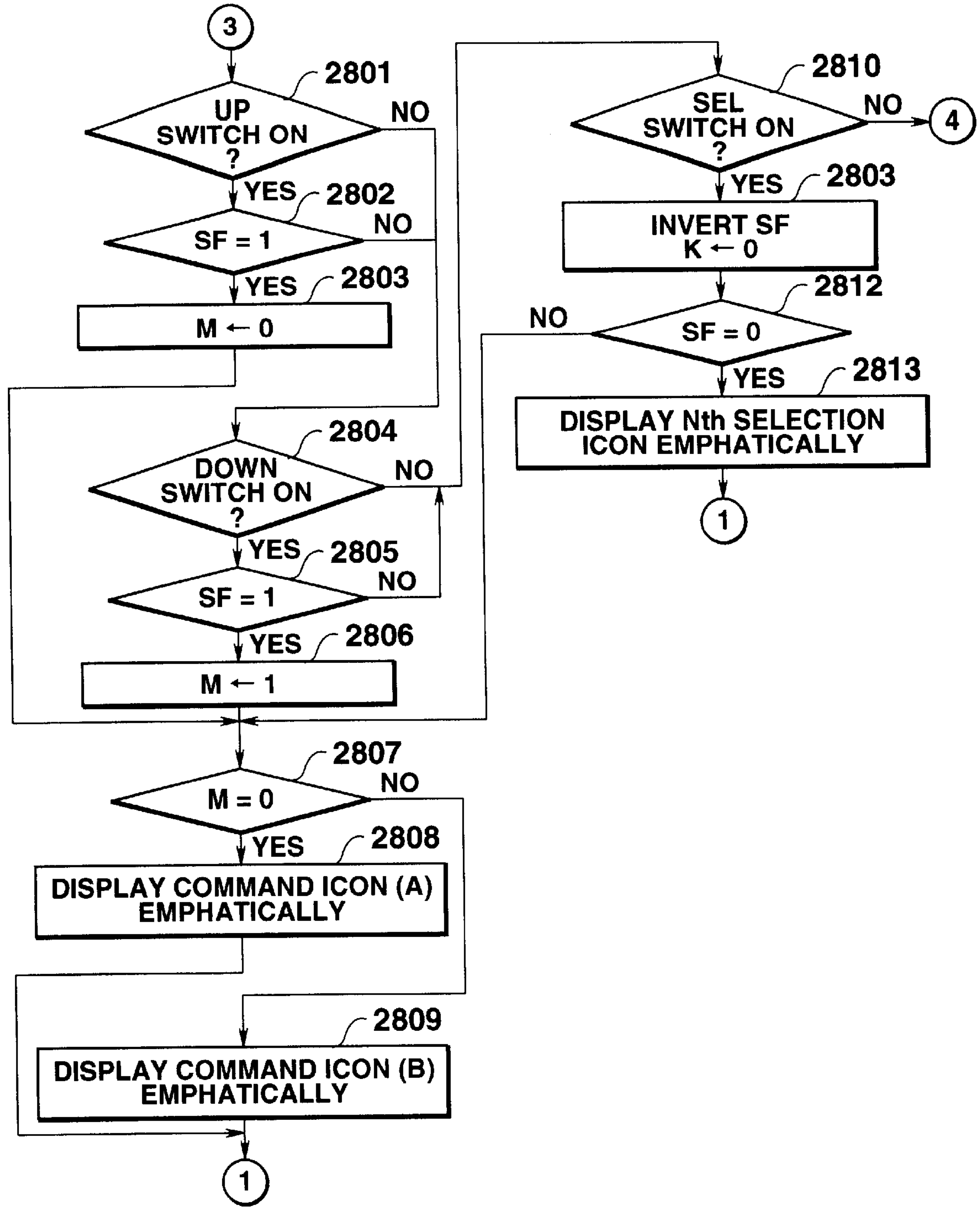
FIG. 28 is a flow chart for the face creation process (part 3)

Subsequently, when the user turns on SEL switch 201 on control pad 112 while viewing the displayed basic system screen, determination at steps 2602, 2606 in FIG. 26 and at steps 2801 and 2804 in FIG. 28 are NO and then determination at step 2810 in FIG. 28 is YES.

As a result, at step 2811, after the value of register SF for selecting one of the select icon and the command icon is inverted between 0 and 1, the value of register K indicating the display stage of the select icon is reset at 0.

Then, if the value of register SF is zero, determination at step 2812 is YES, and the select icon of the number shown by the value of register N is displayed emphatically at step 2813. Specifically, CPU 101 replaces data on cells corresponding to a select icon of a number corresponding to the value of register N, among the cells constituting the background image of the basic system screen, data on the background image being stored in the BG-B plane memory area of SRAM 103, with data on cells for emphatic display. Then, the control returns to the process at step 2606.

On the other hand, if the value of register SF is 1, determination at step 1812 is NO and, further, the value of register M indicating one of the two command icons is determined further at step 2807.

Then, if the value of register M is 0 and determination at step 2807 is YES, the “save” icon (refer to FIG. 51) is displayed emphatically. Specifically, CPU 101 replaces data on cells corresponding to the “save” icon, among the cells constituting the background image of the basic system screen, data on the background image being stored in the BG-B plane memory area of SRAM 103, with data on cells for emphatic display. Subsequently, control returns to the process at step 2602 in FIG. 26.

Then, if the value of register M is 1, and determination at step 2809 is NO, the “return to mode selection screen” icon (refer to FIG. 51) is displayed emphatically. Specifically, CPU 101 replaces data on cells corresponding to the “return to mode selection screen” icon, among the cells constituting the background image of the basic system screen, data on the background image being stored in the BG-B plane memory area of SRAM 103, with data on cells for emphatic display. Subsequently, control returns to the process at step 2602 in FIG. 26.

(Details of the Operation in Case 2)

In case 2, the user can switch from any particular one of the “save” icon and the “return to mode selection” icon to the other, both of which are the command icons, by turning on UP switch 203 or DOWN switch 204 when the particular one of the command icons is displayed emphatically.

If the user turns on UP switch 203 when any one of the command icons has been displayed emphatically, determination at steps 2602 and 2606 in FIG. 26 is NO and then determination at steps 2801 and 2802 in FIG. 28 is YES.

As a result, value “0” is set in register M at step 2803, determination at step 2807 is YES and the “save” icon (refer to FIG. 51) is displayed emphatically at step 2808. Specifically, CPU 101 replaces data on cells corresponding to the “save” icon, among the cells constituting the background image of the basic system screen, data on the background image being stored in the BG-B memory area of SRAM 103, with data on cells for emphatic display. Then, control returns to the process at step 2602.

On the other hand, if the user turns on DOWN switch 204 when any one of the command icons has been displayed emphatically, determination at steps 2602 and 2606 in FIG. 26 and at step 2801 in FIG. 28 is NO and then determination at steps 2804 and 2805 in FIG. 28 is YES.

As a result, value “1” is set in register M at step 2806, determination at step 2807 is NO and the “return to mode selection screen” icon (refer to FIG. 51) is displayed emphatically at step 2809. Specifically, CPU 101 replaces data on cells corresponding to the “return to mode selection screen” icon, among the cells constituting the background image of basic system screen, data on the background image being stored in the BG-B plane memory area of SRAM 103, with data on cells for emphatic display. Then, control returns to the process at step 2602.

If the user turns on LEFT switch 205 or RIGHT switch 206 when any one of the command icons has been displayed emphatically, determination at steps 2602 or 2606 in FIG. 26 is YES, then determination at steps 2603 or 2607 is NO and control returns to the process at step 2602, in which the operation of LEFT switch 205 or RIGHT switch 206 is invalidated.

(Details of the Operation in Case 3)

In case 3, by turning on ENTER switch 20, the user can return to the mode selection screen when the “return to mode selection” icon has been displayed emphatically and can save the currently prepared portrait data into the file when the “save” icon has been displayed emphatically.

Figure 29:
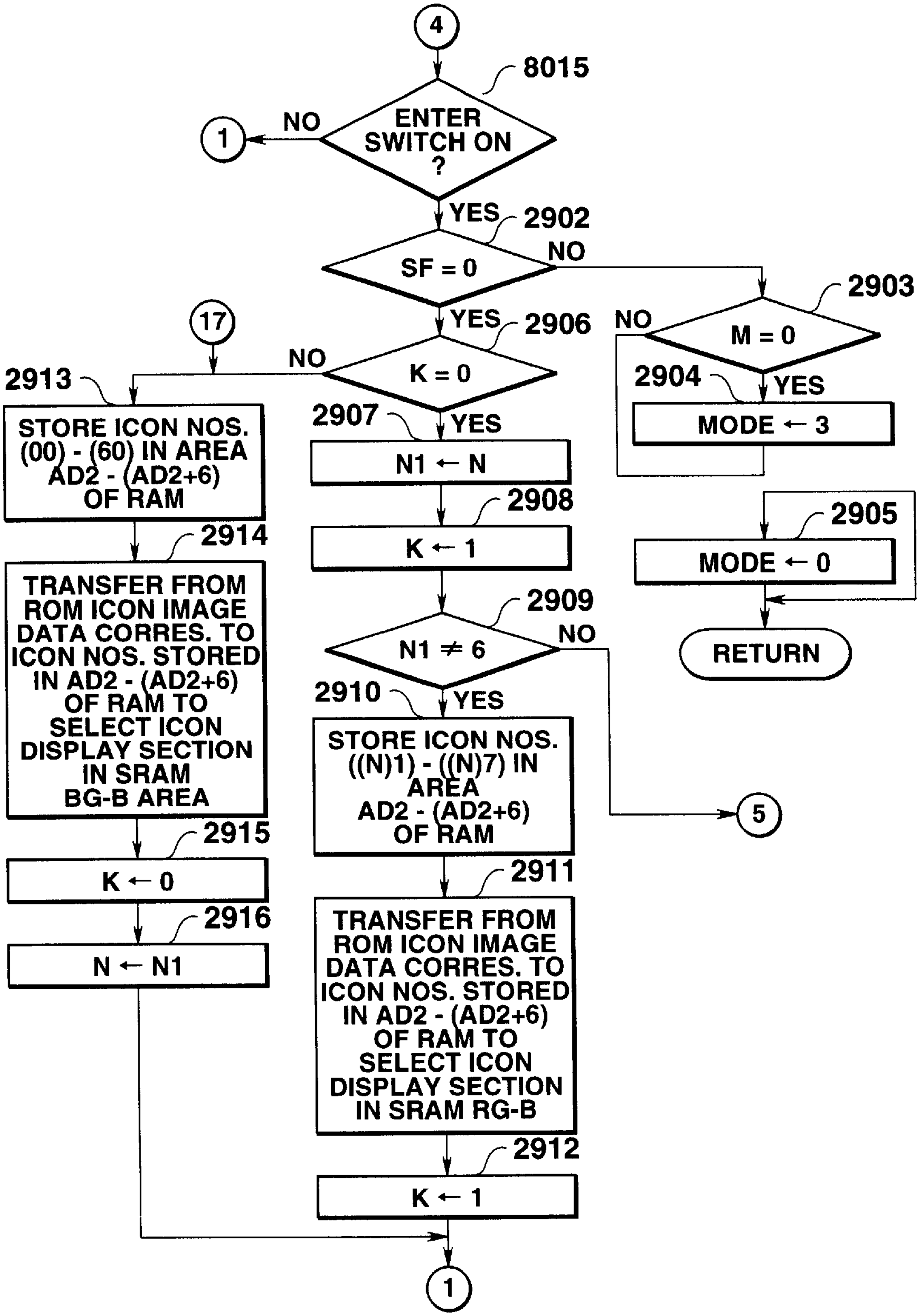
FIG. 29 is a flow chart for the face creation process (part 4)

If the user turns on ENTER switch 202 when the “return to mode selection” icon has been displayed emphatically, determination at steps 2602 and 2606 in FIG. 26 and at steps 2801, 2804 and 2810 in FIG. 28 is NO and then determination at step 2901 in FIG. 29 is YES and determination at steps 2902 and 2903 in FIG. 29 is NO.

Then, at step 2905, value “0” is set as the mode number in register MODE to complete the face creating process at step 1306 in FIG. 13.

As a result, after the determination at step 1307, control returns to the mode selection at step 1302 described previously.

If the user turns on ENTER switch 202 when the “save” icon has been displayed emphatically, determination at steps 2602 and 2606 in FIG. 26 and determination at steps 2801, 2804 and 2810 in FIG. 28 are NO and then determination step 2901 is YES, determination at step 2902 is NO, and determination at steps 2903 is YES in FIG. 29.

Then, at step 2904, value “3” is set as the mode number in register MODE to complete the face creating process at step 1306 in FIG. 13.

As a result, after the determination at step 1307, the file saving process is executed at steps 1308 and 1309 to be described later.

(Details of the Operation in Case 4)

Figure 64A:
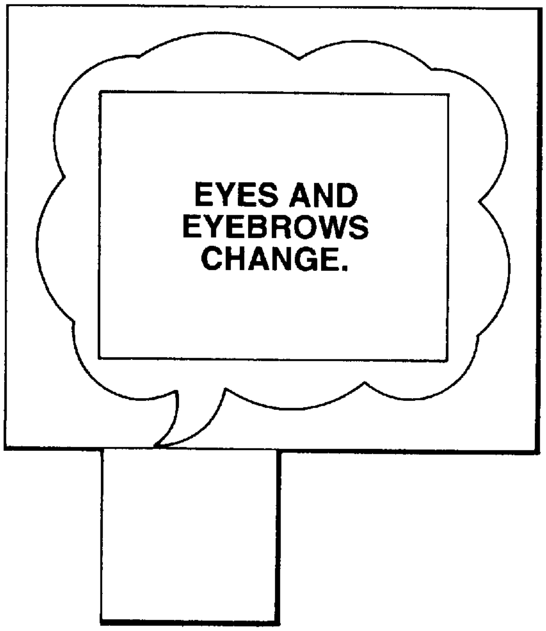
FIGS. 64A–64D illustrate the contents of an explanatory balloon in the basic system screen (part 2)
Figure 64B:
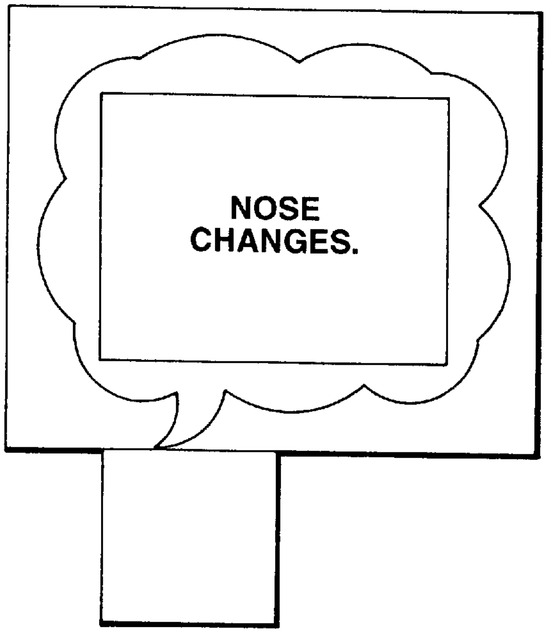
Figure 64C:
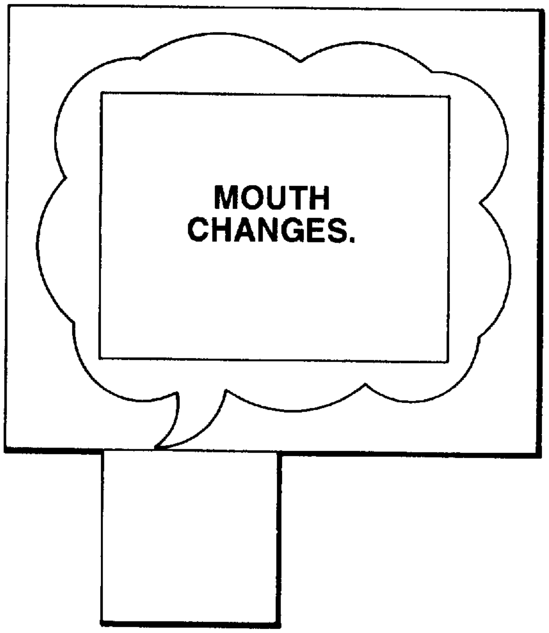
Figure 64D:
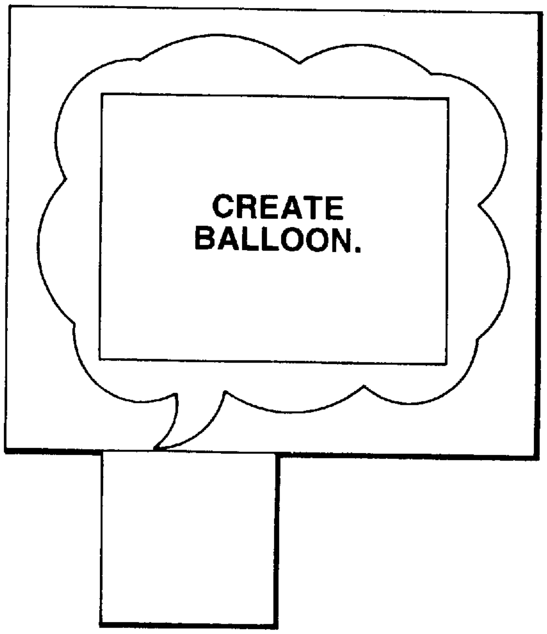

In case 4, the user can move a select icon to be selected by turning on LEFT switch 205 or RIGHT switch 206 when any one of seven kinds of select icons in the first the stage shown in FIG. 69A for selecting the parts of a portrait has been displayed emphatically, and at the same time, change the contents of the explanatory balloon shown in FIG. 51, as shown in FIGS. 63A and 64D. The operation of UP switch 203 and DOWN switch 204 is invalidated.

When the user turns on LEFT switch 205 when any one of the select icons has been displayed emphatically, determination at steps 2602 and 2603 is YES and, further, if the value of register N is not 0 and the first (left end) selection icon is not displayed emphatically either, determination at step 2604 is YES, and the value of register N is decremented by one at step 2605. As a result, the select icon to be selected moves by one to the left. If the value of register N is 0 and the first (left end) select icon has been displayed by emphasis, determination at step 2604 is NO, the control returns to the process at step 2602 and the operation of LEFT switch 205 is invalidated.

On the other hand, if the user turns on RIGHT switch 206 when any one of the select icons has been displayed emphatically, determination at steps 2602 is NO and then determination at step 2606 and 2607 is YES and, further, if the value of register N is not 6 and the seventh (right end) select icon has not been displayed emphatically either, determination at step 2608 is YES, and the value of register N is incremented by one at step 2609. As a result, the select icon to be selected moves by one to the right. If the value of register N is 6 and the seventh (right end) select icon has been displayed emphatically, determination at step 2608 is NO and control returns to the process at step 2602 and the operation to RIGHT switch 206 is invalidated.

After the process at step 2605 or 2609, a select icon having a number corresponding to the value of register N is displayed emphatically at step 2610. Specifically, CPU 101 replaces data on cells corresponding to a select icon having a number corresponding to the value of register N, among the cells constituting the background image of the basic screen, data on the background image being stored in the BG-B plane memory area of SRAM 103, with data on cells for emphatic display and, at the same time, replaces data on cells corresponding to the select icon displayed emphatically so far corresponding, for example, to the value of register N+1 (in the case of step 2605 to 2610) or the value of register N−1 (in the case of step 2609 to 2610), with data on cells for regular display.

After the process at step 2610, and since the select icons in the first stage have been displayed and the value of register K showing the display stage for the select icons is 0 at present, the determination at step 2611 is YES.

Figure 27:
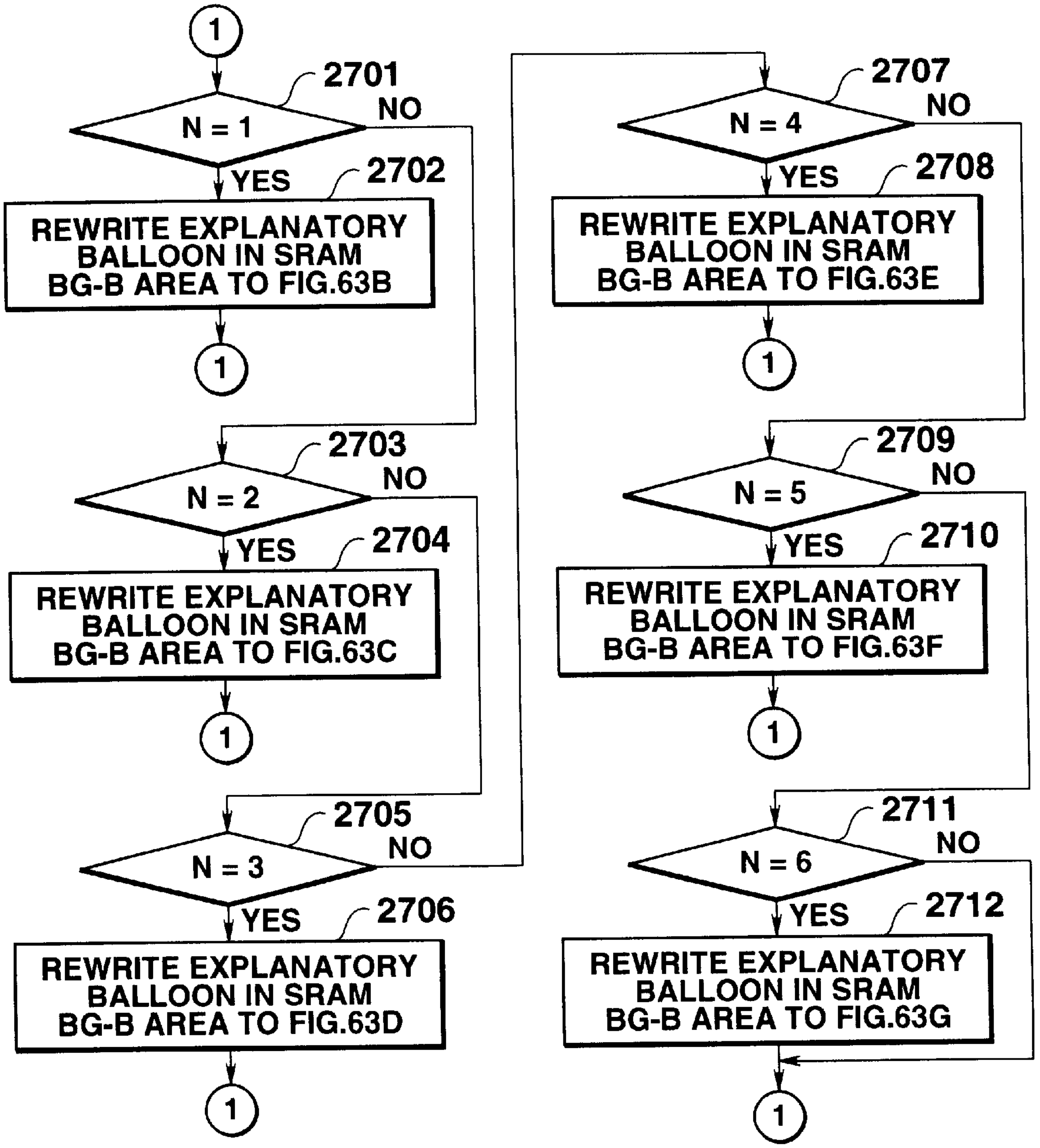
FIG. 27 is a flow chart for the face creation process (part 2)

Subsequently, determination at step 2612 in FIG. 26, and step 2701, 2703, 2705, 2707, 2709 or 2711 in FIG. 27 is YES, and CPU 101 replaces data on cells corresponding to the explanatory balloon, among the cells constituting the background image of the basic system screen, data on the background image being stored in the BG-B plane memory area of SRAM 103 (refer to FIG. 57), with data on cells corresponding to the balloon contents in any one of FIG. 63A–FIG. 64D. The cell data is contained in the image data for the basic system screen among the BG-B plane image data shown in FIG. 6 of program/data ROM 107.

Subsequently, control returns to the process at step 2602 in FIG. 26.

If the user turns on UP switch 203 or DOWN switch 204 when any one of the select icons has been displayed emphatically, determination at steps 2801 or 2804 in FIG. 28 is YES, then determination at steps 2802 or 2805, and then determination at step 2810 and at step 2901 in FIG. 29 are NO. Then, control returns to the process at step 2602, in which the operation of UP switch 203 or DOWN switch 204 is invalidated.

(Details of the Operation in Case 5)

In case 5, the user can display the select icons except for the balloon (not particularly shown) in the second stage corresponding to the select icons in the first stage by turning on ENTER switch 202 when any one of the select icons other than the balloon in the first stage shown in FIG. 69A has been displayed emphatically.

If the user turns on ENTER switch 202 when any one of the select icons other than the balloon in the first stage has been displayed emphatically, determination at steps 2602 and 2606 in FIG. 26 is NO, determination at steps 2801, 2804 and 2810 in FIG. 28 is NO and determination at steps 2901, 2902 and 2906 in FIG. 29 is YES.

As a result, the value of register N is at first saved in register N1 at step 2907 and then value "1" indicating the second stage is set in register K at step 2908.

Then, since the number of the select icons other than the balloon is not 6, determination at step 2909 is YES.

As a result, at step 2910, CPU 101 stores data on respective icon selection numbers Nos. (N1) 0 to (N1) 6 corresponding to seven kinds of icons having Nos. (N1) 0–(N1) 6 shown in FIG. 8, among the icon image data shown in FIG. 6 of program/data ROM 107, in address areas {AD2}–{AD2+6} shown in FIG. 9 of work RAM 108. (N1) represents a value shown by register N1. Assuming, for example, that ENTER switch 202 is turned on when the background select icon in the first stage has been displayed emphatically and the value of register N is 0, data on the respective icon selection numbers corresponding to seven kinds of background icons having Nos. 00–06 shown in FIG. 8 are stored in address areas {AD2}–{AD2+6}.

Then, at step 2911, CPU 101 replaces only data on cells corresponding to the select icon, among the cells constituting the background image of the basic system screen, data on the background image being stored in the BG-B plane memory area of SRAM 103, with data on image cells (not particularly illustrated) of seven kinds of select icons, that is, background icon, hair icon, outline icon, eye/eyebrow icon, nose icon and mouth icon, respectively, shown in FIG. 8, of program/data ROM 107 corresponding to the icon numbers stored in address areas {AD2}–{AD2+6} shown in FIG. 9 of work RAM 108 at step 2910.

Then, at step 2912, value "0" is set in register N indicating the selection position of the select icon in the second stage and control then returns to the process at step 2602 in FIG. 26.

(Details of the Operation in Case 6)

In case 6, the user can return to the display of the select icons in the first stage shown in FIG. 69A by turning on ENTER switch 202 when any one of the select icons other than the balloon in the second stage has been displayed emphatically.

If the user turns on ENTER switch 202 when any one of the select icons other than the balloon in the second stage has been displayed emphatically, determination at steps 2602 and 2606 in FIG. 26 is NO, and determination at steps 2801, 2804 and 2810 in FIG. 28 is NO, determination at steps 2901 and 2902 in FIG. 29 is YES and determination at step 2906 in FIG. 29 is NO.

As a result, at step 2913, CPU 101 stores the respective icon selection numbers 00–60 corresponding to seven kinds of icons having Nos. 00–60 shown in FIG. 8, among the icon image data shown in FIG. 6 of program/data ROM 107, in address areas {AD2}–{AD2+6} shown in FIG. 9 of work RAM 108.

Then, at step 2914, CPU 101 replaces only data on cells corresponding the select icons, among the cells constituting the background image of the basic system screen, data on the background image being stored in the BG-B plane memory area of SRAM 103, with image data on 7 kinds of part select icons shown in FIGS. 8 and 69A of program/data ROM 107 corresponding to the icon numbers stored in address areas {AD2}–{AD2+6} shown in FIG. 9 of work RAM 108 at step 2913.

Subsequently, at step 2915, a value "0" indicating the first stage is set in register K.

Further, at step 2916, the value saved in register N1 is returned to register N.

Subsequently, the control returns to the process at step 2602 in FIG. 26.

(Details of the Operation in Case 7)

In case 7, the user can move the select icon to be selected and, simultaneously, display the selected part by turning on LEFT switch 205 or RIGHT switch 206 when any one of the select icons other than the balloon in the second stage has been displayed emphatically.

If the user turns on LEFT switch 205 when any one of the select icons other than the balloon in the second stage has been displayed emphatically, determination at steps 2602 and 2603 is YES and, further, if the value of register N is not 0 and the first (left end) select icon has not been displayed emphatically either, determination at step 2604 is YES, and the value of register N is decremented by one at step 2605. As a result, the select icon selected in the second stage moves by one to the left. If the value of register N is 0 and the first (left end) select icon has been displayed emphatically, determination at step 2604 is NO and control returns to the process at step 2602 and the operation of LEFT switch 205 is invalidated.

On the other hand, when the user turns on RIGHT switch 206 when any one of the select icons other than the balloon in the second stage has been displayed emphatically, determination at step 2602 is NO and then determination at steps 2606 and 2607 is YES and, further, if the value of register N is not 6 and the seventh (right end) select icon has not been displayed emphatically either, determination at step 2608 is YES, and the value of register N is incremented by one at step 2609. As a result, the select icon to be selected in the second stage moves by one to the right. If the value of register N is 6 and the seventh (right end) select icon has been displayed emphatically, determination at step 2608 is NO and control returns to the process at step 2602 and the operation of RIGHT switch 206 is invalidated.

After the process at step 2605 or 2609, a select icon having a number corresponding to the value of register N is displayed emphatically at step 2610. Specifically, CPU 101 replaces data on cells corresponding to the select icon corresponding to the value of register N, among the cells constituting the background image of the basic system screen, data on the background image being stored in the BG-B plane memory area of SRAM 103, with data on cells for emphatic display and, at the same time, replaces data on the cells corresponding to the select icon displayed emphatically so far corresponding, for example, to the value of register N+1 (from step 2605 to 2610) or the value of register N−1 (from step 2609 to 2610) with data on cells for regular display.

After the process at step 2610, since the select icons other than the balloon in the second stage are display and the value of register K indicating the display stage of the select icons is 1 at present, determination at step 2611 is NO.

Figure 30:
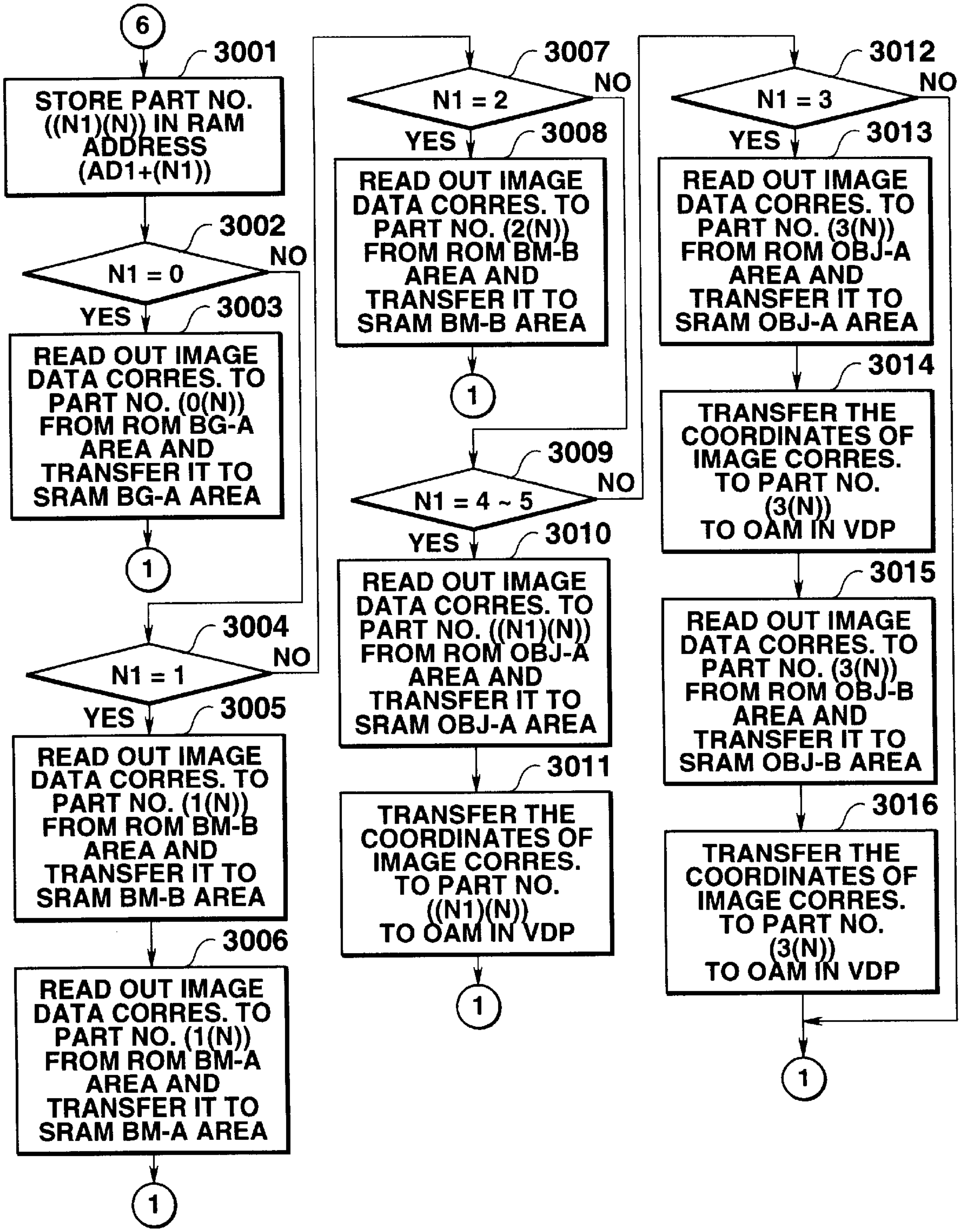
FIG. 30 is a flow chart for the face creation process (part 5)

As a result, at step 3001 in FIG. 30, CPU 101 stores the icon selection number ((N1)(N)) corresponding to the icon having part number ((N1)(N)) shown in FIG. 8, among the icon image data shown in FIG. 6 of program/data ROM 107, in address areas (AD1+(N1)) which means any one of address areas (AD1) to (AD1+5) shown in FIG. 9 of work RAM 108 corresponding to the select icons selected in the first stage (any one of left-side 6 kinds of select icons in FIG. 69A). In this case, (N1) is the number of register N1 and (N) is the number for register N. For example, if ENTER switch 202 is turned on when the first (left end) background select icon shown in FIG. 69A in the first stage is displayed emphatically, the value of register N1 is 0. On the other hand, when the first (left end) select icon is displayed emphatically after LEFT switch 205 or RIGHT switch 206 is turned on in the second stage, the value of register N is 0. As a result, the icon selection number 00 corresponding to the No. 00 background icon shown in FIG. 8 is stored in address area (AD1) shown in FIG. 9 of work RAM 108.

Subsequently, the determination at step 3003, 3004, 3007, 3009 or 3012 is YES depending on the number N1 (the value of register N1) of the select icon selected in the first stage.

When the user turns on LEFT switch 205 or RIGHT switch 206 in the second stage after selecting the first (left end) background select icon in the first stage (refer to FIG. 69A), determination at step 3002 is YES.

As a result, at step 3003, CPU 101 reads out data corresponding to the background icon of part number 0 (N) (refer to FIG. 8) stored in address area (AD1) of work RAM 108 at step 3001 among seven kinds of the BG-A plane background image data shown in FIG. 6 of program/data ROM 107 and transfers the read data by way of CPU interface 301, address bus 315, data bus 316 and RAM interface 302 to the BG-A plane memory area of SRAM 103 (refer to FIG. 52). VDP 102 having the constitution shown in FIG. 3 displays, as described previously, on television receiver 111 the background image data transferred to the BG-A plane image area of SRAM 103.

Subsequently, the control returns to the process at step 2602 in FIG. 26.

If the user turns on LEFT switch 205 or RIGHT switch 206 in the second stage after selecting the second hair select icon in the first stage (refer to FIG. 69A), determination at step 3004 is YES.

As a result, at step 3005, CPU 101 at first reads out data corresponding to the hair icon having part number 1 stored in address area (AD1+1) of work RAM 108 at step 3001 among seven kinds of BM-B plane back hair image data shown in FIG. 6 of program/data ROM 107 and transfers the data by way of CPU interface 301, address bus 315, data bus 316 and DP-RAM interface 303 to the back hair cells of the BM-B plane memory area of DP-RAM 104 (refer to the back hair in FIG. 53). VDP 102 having the constitution shown in FIG. 3 displays, as described previously on television receiver 111, the back hair image data transferred to the BM-B plane image area of DP-RAM 104.

Figure 55:
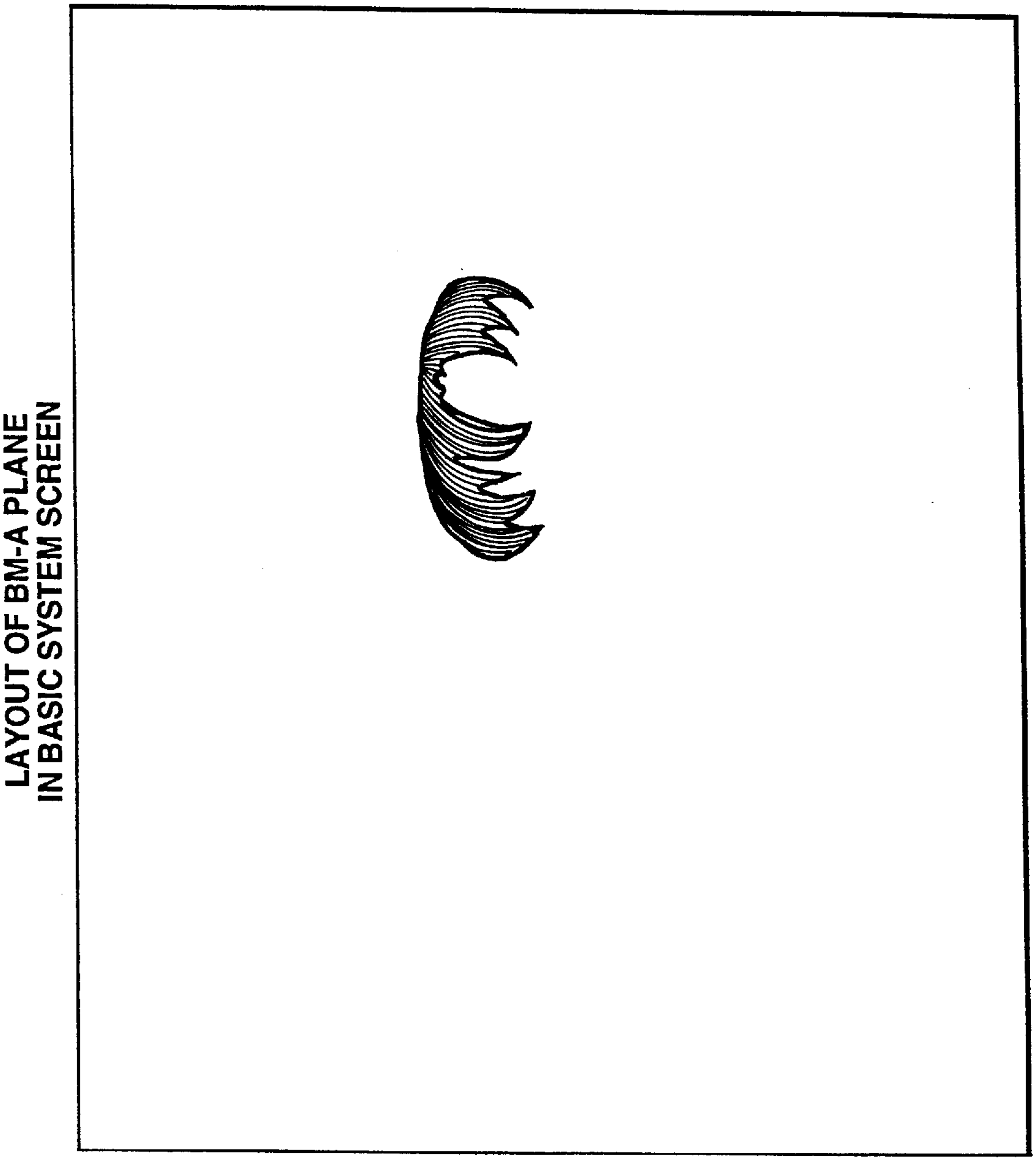
FIG. 55 shows the layout of a BM-A plane in the basic system screen.

Next, at step 3006, CPU 101 reads out data corresponding to the hair icon of part number 1 (N) stored in address area (AD1+1) of work RAM 108 at step 3001, among seven kinds of BM-A plane front hair image data shown in FIG. 6 of program/data ROM 107 and transfers the read data by way of CPU interface 301, address bus 315, data bus 316 and RAM interface 303 to the BM-A memory area of DP-RAM 104 (refer to FIG. 55). VDP 102 having the constitution shown in FIG. 3 displays, as described previously on television receiver 111, the front hair image data transferred to the BM-B plane image area of DP-RAM 104.

Subsequently, the control returns to the process at step 2602 in FIG. 26.

When the user turns on LEFT switch 205 or RIGHT switch 206 in the second stage after selecting the third outline select icon in the first stage (refer to FIG. 69A), determination at step 3007 is YES.

As a result, at step 3008, CPU 101 reads out data corresponding to the outline icon having part number 2(N) stored in address area (AD1+2) of BM-B plane work RAM 108 at step 3001 among seven kinds of BM-B plane outline image data shown in FIG. 6 of program/data ROM 107 and transfers the read data by way of CPU interface 301, address bus 315, data bus 316 and DP-RAM interface 303 to the outline corresponding cells of the BM-B plane memory area of DP-RAM 104 (refer to the outline in FIG. 53). VDP 102 having the constitution shown in FIG. 3 displays, as described previously, on television receiver 111 the outline image data transferred to the BM-B plane image area of DP-RAM 104.

Subsequently, the control returns to the process at step 2602 in FIG. 26.

When the user turns on LEFT switch 205 or RIGHT switch 206 in the second stage after selecting one of the fifth nose select icon or the sixth mouth select icon in the first stage (refer to FIG. 69A), determination at step 3009 is YES.

As a result, at step 3010, CPU 101 reads out the data corresponding to the nose icon or the mouth icon having part number (N1) (N) stored in address area (AD1+1N) (AD1+4) or (AD1+5) of work RAM 108 at step 3001 among seven kinds of OBJ-A plane nose or mouth image data shown in FIGS. 6 and 7.of program/data ROM 107 and transfers the read data by way of CPU interface 301, address bus 315, data bus 316 and SRAM interface 302 to an empty OBJ-B object memory area of SRAM 103 (refer to the nose and mouth in FIG. 54).

Then, at step 3011, CPU 101 transfers coordinate data corresponding to the nose icon or mouth icon having part number ((N1) (N)) stored in address area (AD1+N1) (AD1+4) or (AD1+5) of work RAM 108 by way of CPU interface 301, address bus 315 and data bus 316 to an object number area of object attribute memory 307 corresponding to the object memory area to which the read data was transferred at step 3010 (refer to FIG. 10).

VDP 102 having the constitution shown in FIG. 3 displays, as described previously, the nose or mouth image data transferred to the OBJ-A plane memory area for OBJ-A area of SRAM 103 at a display position corresponding to the coordinate data transferred to object attribute memory 307.

Subsequently, control returns to the processing at step 2602 in FIG. 26.

If the user turns on LEFT switch 205 or RIGHT switch 206 in the second stage after selecting the third eye/eyebrow select icon (refer to FIG. 69A) in the first stage, determination at step 3012 is YES.

As a result, at step 3013, CPU 101 at first reads out image data corresponding to the eye/eyebrow icon of part number 3(N) stored in address area (AD1+3) of work RAM 108 at step 3001, among seven kinds of OBJ-A plane eye image data shown in FIGS. 6 and 7 of program/data ROM 107 and transfers the read data by way of CPU interface 301, address bus 315, data bus 316 and RAM interface 302 to an empty OBJ-A plane object memory area of SRAM 103 (refer to the eyes in FIG. 54).

Then, at step 3014, CPU 101 transfers coordinate data corresponding to the eye/eyebrow icon having part number 3(N) stored in address area (AD1+3) of work RAM 108 at step 3001 by way of CPU interface 301, address bus 315 and data bus 316 to the object number area of object attribute memory 307 corresponding to the object memory area to which read data was transferred at step 3013.

VDP 102 having the constitution shown in FIG. 3 displays, as described previously, the eye image data transferred to the OBJ-A plane memory area of SRAM 103 at a display position corresponding to the coordinate data transferred to object attribute memory 307.

Subsequently, at step 3015, CPU 101 reads out data corresponding to the eye/eyebrow icon having part number 3(N) stored in address area (AD1+3) of work RAM 108 at step 3001, among seven kinds of OBJ-B plane eyebrow image data shown in FIGS. 6 and 7 of program/data ROM 107 and transfers the read data to by way of CPU interface 301, address bus 315, data bus 316 and SRAM interface 302 to an empty OBJ-B plane object memory area of SRAM 103 (refer to the eyebrows in FIG. 54).

Then, at step 3016, CPU 101 transfers the coordinate data corresponding to the eye/eyebrow icon having part number 3(N) stored in address area (AD1+3) of work RAM 108 at step 3001 by way of CPU interface 301, address bus 315 and data bus 316 to the object number area of object attribute memory 307 corresponding to the object memory area to which the read data was transferred at step 3010.

VDP 102 having the constitution shown in FIG. 3 displays, as described previously, the eyebrow image data transferred to the OBJ-B plane memory area for OBJ-B area of SRAM 103 at a display position corresponding to the coordinate data transferred to object attribute memory 307.

Subsequently, control returns to the process at step 2602 in FIG. 26.

(Details of the Operation in Case 8)

In case 8, the user can display the balloon select icon in the second stage shown in FIG. 69B by turning on ENTER switch 202 when the balloon select icon in the first stage shown in FIG. 69A has been displayed emphatically.

If the user turns on ENTER switch 202 when the balloon select icon in the first stage has been displayed emphatically, determination at steps 2602 and 2606 in FIG. 26 is NO, determination at steps 2801, 2804 and 2810 in FIG. 28 is NO and determination at steps 2901, 2902 and 2906 in FIG. 29 is YES.

As a result, at step 2907, the value of register N is at first saved into register N1 and then value “1” indicating the second stage is set in register K at step 2908.

Then, since the number of the balloon select icon is 6, determination at step 2909 is NO.

Figure 31:
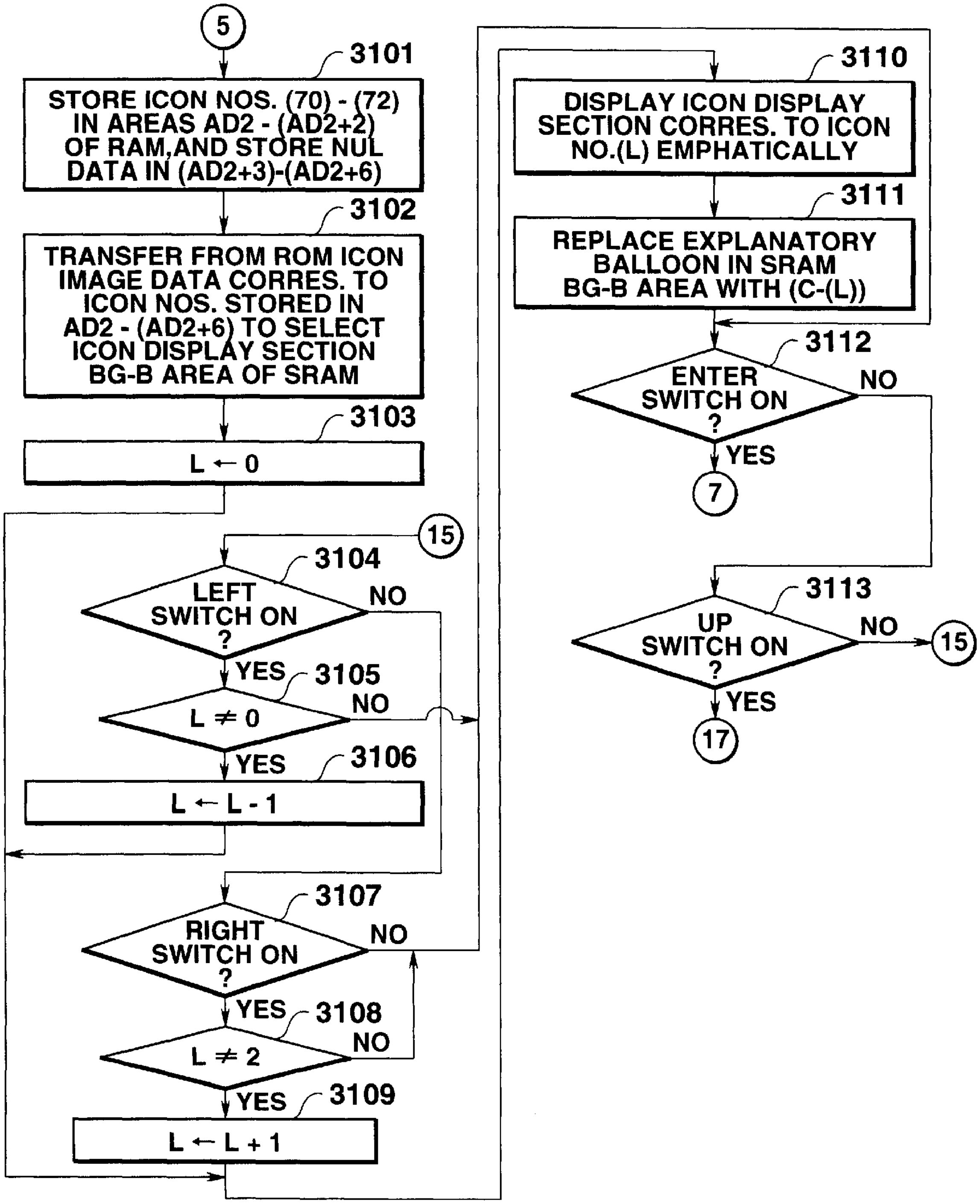
FIG. 31 is a flow chart for the face creation process (part 6);.

As a result, at step 3101 in FIG. 31, CPU 101 stores data on the respective icon selection numbers 70, 71 and 72 corresponding to three kinds of icons having Nos. of 70, 71 and 72 shown in FIG. 8, among the icon image data shown in FIG. 6 of program/data ROM 107, in address areas {AD2}–{AD2+2} shown in FIG. 9 of work RAM 108. Further, CPU 101 stores null (NUL) data in address areas {AD2+3}–{AD2+6} shown in FIG. 9 of work RAM 108.

Then, at step 3102, CPU 101 replaces only data on cells corresponding to the select icons, among the cells constituting the background image of the basic system screen, data on the background image being stored in the BG-B plane memory area of SRAM 103, with image data on the speech select icon, speech creation icon and balloon icon shown in FIG. 8 of program/data ROM 107 corresponding to the icon numbers stored in address areas (AD2)–(AD2+6), actually, address areas (AD2)–(AD2+2) shown in FIG. 9 of work RAM 108 at step 3101.

As a result, VDP 102 having the constitution shown in FIG. 3, displays, as described previously, on television 111 the balloon select icon in the second stage shown in FIG. 69B transferred to the BG-B plane memory area of SRAM 103.

Then, at step 3103, value “0” is set in register L indicating the selection position of the balloon select icon in the second stage.

Then, at step 3110, the first (left end) speech select icon corresponding to the value “0” of register L is displayed emphatically. Specifically, CPU 101 replaces data on cells corresponding to the first (left end) speech select icon which, in turn, corresponds to the value “0” of register L among the cells constituting the background image of the basic system screen, data on the background image being stored in the BG-B plane memory area of SRAM 103, with data on cells for emphatic display.

Subsequently, at step 3111, CPU 101 replaces data on cells corresponding to the explanatory balloon among the cells constituting the background image of the basic system screen (refer to FIG. 57), data on the background image being stored in the BG-B plane memory area of SRAM 103, with data on cells corresponding to the balloon contents in FIG. 65A. The cell data is contained in the image data of the basic system screen among the BG-B image data shown in FIG. 6 of program/data ROM 107.

Then, determination at steps 3112 and 3113 is NO and controls passes to process at step 3104.

(Details of the Operation in Case 9)

In case 9, the user can move the select icon to be selected by turning on LEFT switch 205 or RIGHT switch 206 when any one of the balloon select icons at the second stage shown in FIG. 69B has been displayed emphatically and, at the same time, change the contents of the explanatory balloon shown in FIG. 51, as shown in FIGS. 65A–65C.

If the user turns on LEFT switch 205 when any one of the balloon select icons in the second stage has been displayed emphatically, determination at step 3104 in FIG. 31 is YES and, further, if the value of register L is not 0 and the first (left end) speech select icon in the second stage (refer to FIG. 69B) has not been displayed emphatically either, determination at step 3105 is YES, and value of register L is decremented by one at step 3106. As a result, the select icon to be selected in the second stage moves by one to the left. If the value of register L is 0 and the first (left end) speech select icon has been displayed emphatically, determination at step 3105 is NO, determination at steps 3112 and 3113 is NO, and control then returns to the process at step 3104, and the operation of LEFT switch 205 is invalidated.

If the user turns on RIGHT switch 206 when any one of the balloon select icons in the second stage has been displayed emphatically, determination at step 3107 in FIG. 31 is YES and, further, if the value of register L is not 2 and the third speech frame select icon in the second stage (refer to FIG. 69B) has not been displayed emphatically, determination at step 3108 is YES, and the value of register L is incremented by one at step 3109. As a result, the select icon selected in the second stage moves by one to the left. If the value of register L is 2 and the third speech frame select icon has been displayed emphatically, determination at step 3108 is NO, determination at steps 3112 and 3113 is NO, and then control returns to the processing at step 3104 and the operation of RIGHT switch 206 is invalidated.

After the process at step 3106 or 3109, a select icon having a number corresponding to the value of register L is displayed emphatically at step 3110. Specifically, CPU 101 replaces data on cells corresponding to the select icon having a number corresponding to the value of register L, among the cells constituting the background image of the basic system screen, data on the background image being stored in the BG-B plane memory area of SRAM 103, with data on cells for emphatic display and replaces data on the cells corresponding to the select icon displayed emphatically so far corresponding, for example, to the value of register N+1 (from step 3105 to 3110) or the value of register N−1 (from step 3109 to 3110) with data on cells for regular display.

Subsequently, at step 3111, CPU 101 replaces data on cells corresponding to the explanatory balloon among the cells constituting the background image of the basic system screen (refer to FIG. 57), data on the background image being stored in the BG-B plane memory area of SRAM 103 with data on cells corresponding to the balloon contents of the FIG. 65 (L) where (L) is the value of register L and, accordingly, is any one of FIGS. 65A, 65B and 65C. The cell data is contained in the image data of the basic system screen among the BG-B plane image data shown in FIG. 6 of program/data ROM 107.

Then, determination at steps 3112 and 3113 is NO and control returns to the process at step 3104.

(Details of the Operation in Case 10)

In case 10, the user can return to the display of the selects icon in the first stage shown in FIG. 69A by turning on UP switch 203 when any one of the balloon select icons at the second stages shown in FIG. 69B has been displayed emphatically.

If the user turns on UP switch 203 when any one of the balloon select icons in the second stage has been displayed emphatically, determination at steps 3104, 3107 and 3112 in FIG. 31 is NO and determination at step 3113 in FIG. 31 is YES.

As a result, at step 2913 in FIG. 29, CPU 101 stores icon selection numbers 00–60 corresponding to seven kinds of icons of Nos. 00 to 60 shown in FIG. 8, among the icon image data shown in FIG. 6 of program/data ROM 107 in address areas (AD2)–(AD2+6) shown in FIG. 9 of work RAM 108.

Then, at step 2914, CPU 101 replaces only data on cells corresponding to the select icons, among the cells constituting the background image of the basic system screen, data on the background image being stored in the BG-B plane memory area of SRAM 103, with image data on 7 kinds of part select icon shown in FIGS. 8 and 69A of program/data ROM 107 corresponding to the icon numbers stored in address areas (AD2)–(Ad2+6) shown in FIG. 9 of work RAM 108 at step 2913.

Then, at step 2915, value “0” showing the first stage is set in register K.

Further, at step 2916, the value saved in register N1 is returned to register N.

Then the control returns to the processing at step 2602 in FIG. 26.

(Details of the Operation in Case 11)

In case 11, the user can display the select icons in the third stage shown in FIG. 69C corresponding to the speech select icon by turning on ENTER switch 202 when the select speech icon among the balloon select icons in the second stage shown in FIG. 69B has been displayed emphatically.

Figure 32:
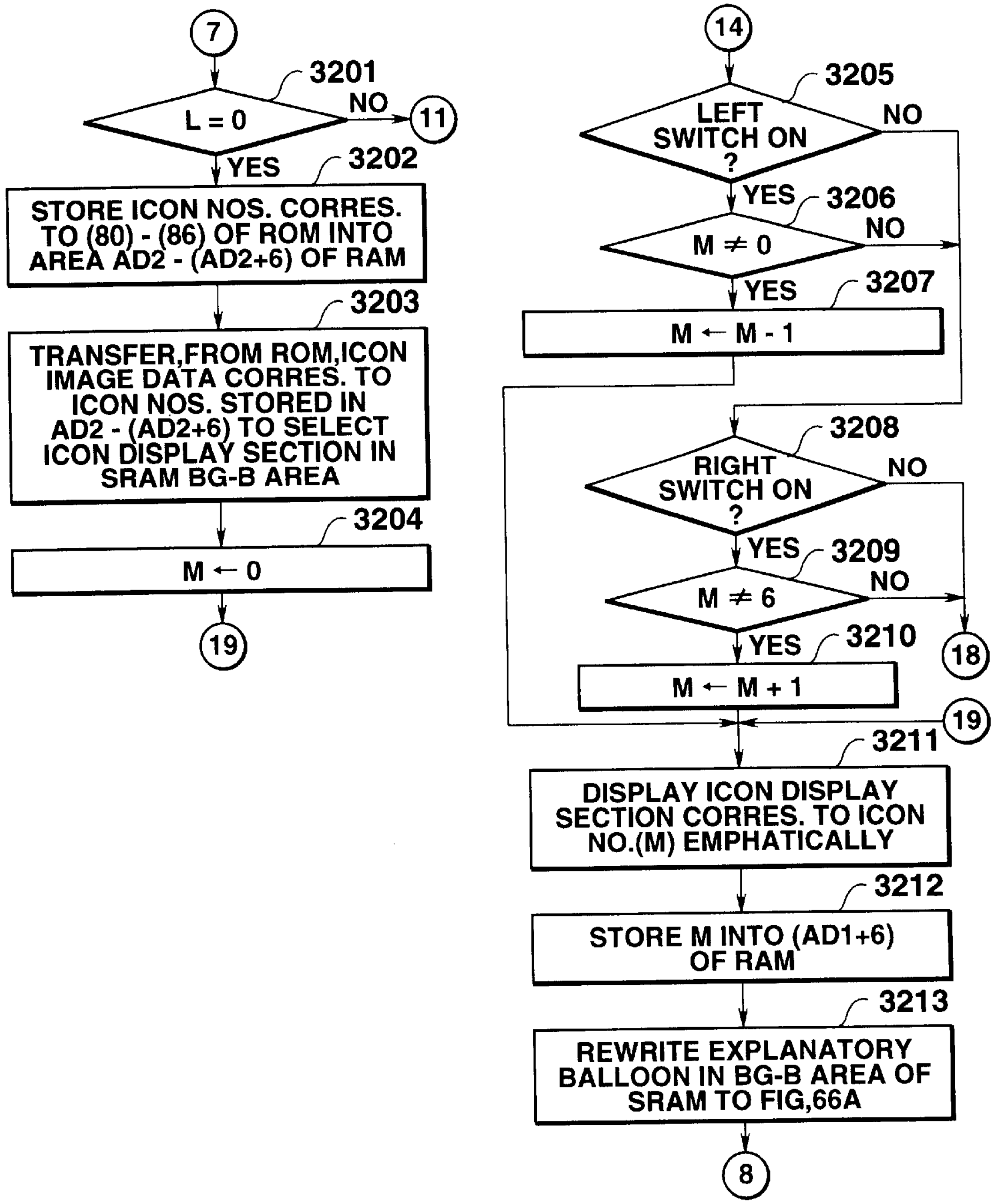
FIG. 32 is a flow chart for the face creation process (part 7)

When the use turns on ENTER switch 202 when the speech select icon has been displayed emphatically, determination at steps 3104 and 3107 in FIG. 31 is NO, determination at step 3112 is YES in FIG. 31 and determination at step 3201 in FIG. 32 is YES.

As a result, at step 3202 in FIG. 32, CPU 101 stores data on respective icon selection numbers Nos. 80–86 of the seven kinds of icons shown in FIG. 8, among the icon image data shown in FIG. 6 of program/data ROM 107 in address areas (AD2)–(AD2+6) shown in FIG. 9 of work RAM 108.

Then, at step 3203, CPU 101 replaces only data on cells corresponding to the select icon, among the cells constituting the background image of the basic system screen, data on the background image being stored in the BG-B plane memory area of SRAM 103, with image data on the seven kinds of speech select icons shown in FIG. 8 of program/data ROM 107 corresponding to the icon numbers stored in address area (AD2)–(AD2+6) shown in FIG. 9 of work RAM 108 at step 3202.

As a result, VDP 102 having the constitution shown in FIG. 3, as described previously, displays on television receiver 111 the speech select icon in the third stage shown in FIG. 69C transferred to BG-B plane the memory area of SRAM 103.

Then, at step 3204, value "0" is set in register M indicating the selection position of the speech select icon for selecting speech in the third stage.

Then, at step 3211, the first (left end) file title select icon corresponding to the value "0" of register M is displayed emphatically. Specifically, CPU 101 replaces data on cells corresponding to the select icon of the first (left end) file title which, in turns, corresponds to value "0" of register M, among the cells which constitute the background image of the basic system screen, data on the background image being stored in the BG-B memory area of SRAM 103, with data on cells for the emphatic display.

Subsequently, at step 3112, the value of register M corresponding to the number of the selected speech text is stored in address area (AD1+6) shown in FIG. 9 of work RAM 108.

Figure 66A:
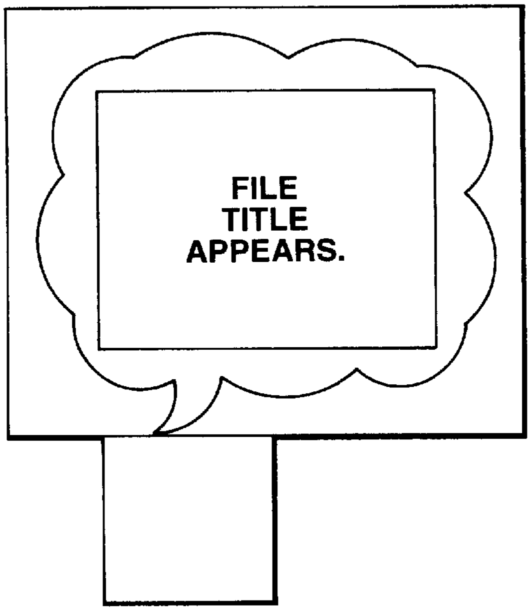
FIGS. 66A–66D illustrate the contents of an explanatory balloon in the basic system screen (part 4)
Figure 66B:
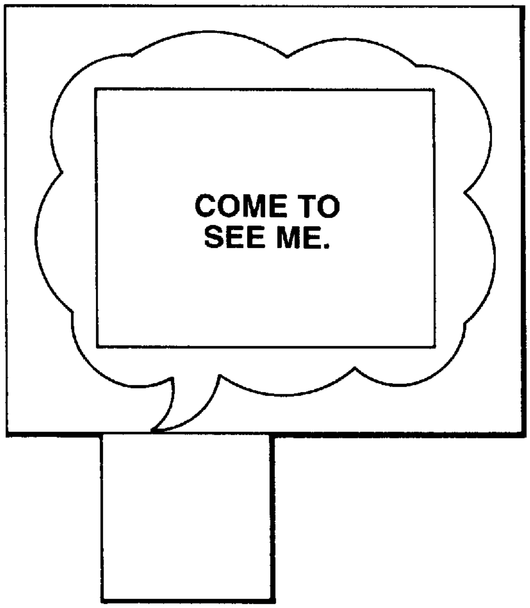
Figure 66C:
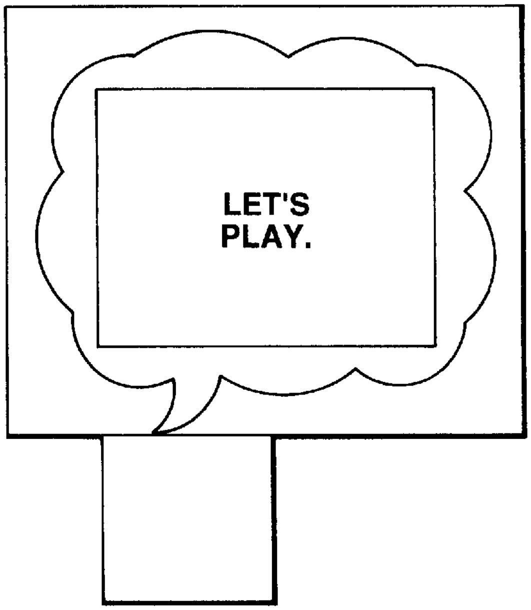
Figure 66D:
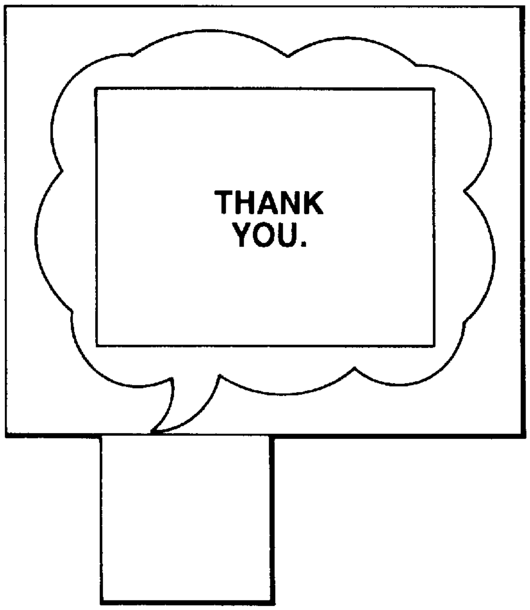

Further, at step 3213, CPU 101 replaces data on cells corresponding to the explanatory balloon among the cells constituting background image data of the basic system screen, data on the background image being stored in the BG-B plane memory area of SRAM 103 (refer to FIG. 57) with data on cells having balloon contents of FIG. 66A. The cell data is contained in the image data on the basic system screen among the BG-B plane image data shown in FIG. 6 of program/data ROM 107.

Then, after the processes at steps 3301–3303 in FIG. 33 to be described later, determination at steps 3305 and 3306 is in FIG. 33 NO and control passes to the process at step 3205 in FIG. 32.

(Details of the Operation in Case 12)

In case 12, the user can move the select icon to be selected by turning on LEFT switch 205 or RIGHT switch 206 when any one of the speech select icons in the third stage shown in FIG. 69C has been displayed emphatically and, at the same time, change the contents of the explanatory balloon shown in FIG. 51, for example, as shown in FIGS. 66A–66D.

If the user turns on LEFT switch 205 when any one of the speech select icons in the second stage has been displayed emphatically, determination at step 3205 is YES and, further, if the value of register M is not 0 and the first (left end) file title select icon in the second stage is not displayed emphatically either, determination at step 3206 is YES, and the value of register M is decremented by one at step 3207. As a result, the speech select icon to be selected moves by one to the left. If the value of register M is 0 and the first (left end) file title select icon has been displayed emphatically, determination at 3206 is NO and determination at steps 3208, and 3305 and 3306 in FIG. 33 is NO either and control returns to the process at step 3205 in FIG. 32 and the operation of LEFT switch 205 is invalidated.

On the other hand, if the user turns on RIGHT switch 206 when any one of the select icons has been displayed emphatically, determination at step 3205 is NO. and determination at step 3208 is YES and, further, if the value of register M is not 6 and the seventh (right end) "GOOD NIGHT" select icon has not been displayed emphatically either, determination at step 3209 is YES, and the value of register M is incremented by one at step 3210. As a result, the speech select icon to be selected moves by one to the left. If the value of register M is 6 and the seventh (right end) "GOOD NIGHT" select icon has been displayed emphatically, determination at step 3209 is NO, determination at steps 3305 and 3306 in FIG. 33 is NO either, and control returns to the process at step 3205 in FIG. 32 and the operation of RIGHT switch 206 is invalidated.

After the process at step 3207 or 33210, a select icon of a number corresponding to the value of register M is displayed emphatically at step 3211. Specifically, CPU 101 replaces data on cells corresponding to a select icon having a number corresponding to the value of register M among the cells constituting the background image of the basic system screen, data on the background image being stored in the BG-B plane memory area of SRAM 103, with data on cells for emphatic display and, at the same time, replace data on cells corresponding to the select icon displayed emphatically so far and corresponding, for example, to the value of register M+1 (from step 3210 to 3211) or the value of register M−1 (from step 3210 to 3211) with data on cells for regular display.

Successively, at step 3212, the value of register M corresponding to the number of the selected speech text is stored in address area (AD1+6) shown in FIG. 9 of work RAM 108.

Further, at step 3213 in FIG. 32, CPU 101 replaces data on cells corresponding to the explanatory balloon among the cells constituting the background image of the basic system screen, data on the background image being stored in the BG-B plane memory area of SRAM 103 (refer to FIG. 57) with data on cells partially corresponding to the balloon contents (S-(M)) shown in FIG. 66 where (M) is the value of register M and, accordingly, (S-(M)) is any one of A–F (A–D are shown in FIG. 66). The cell data is contained in the image data of the basic system screen among the BG-B plane image data shown in FIG. 6 of program/data ROM 107.

Figure 33:
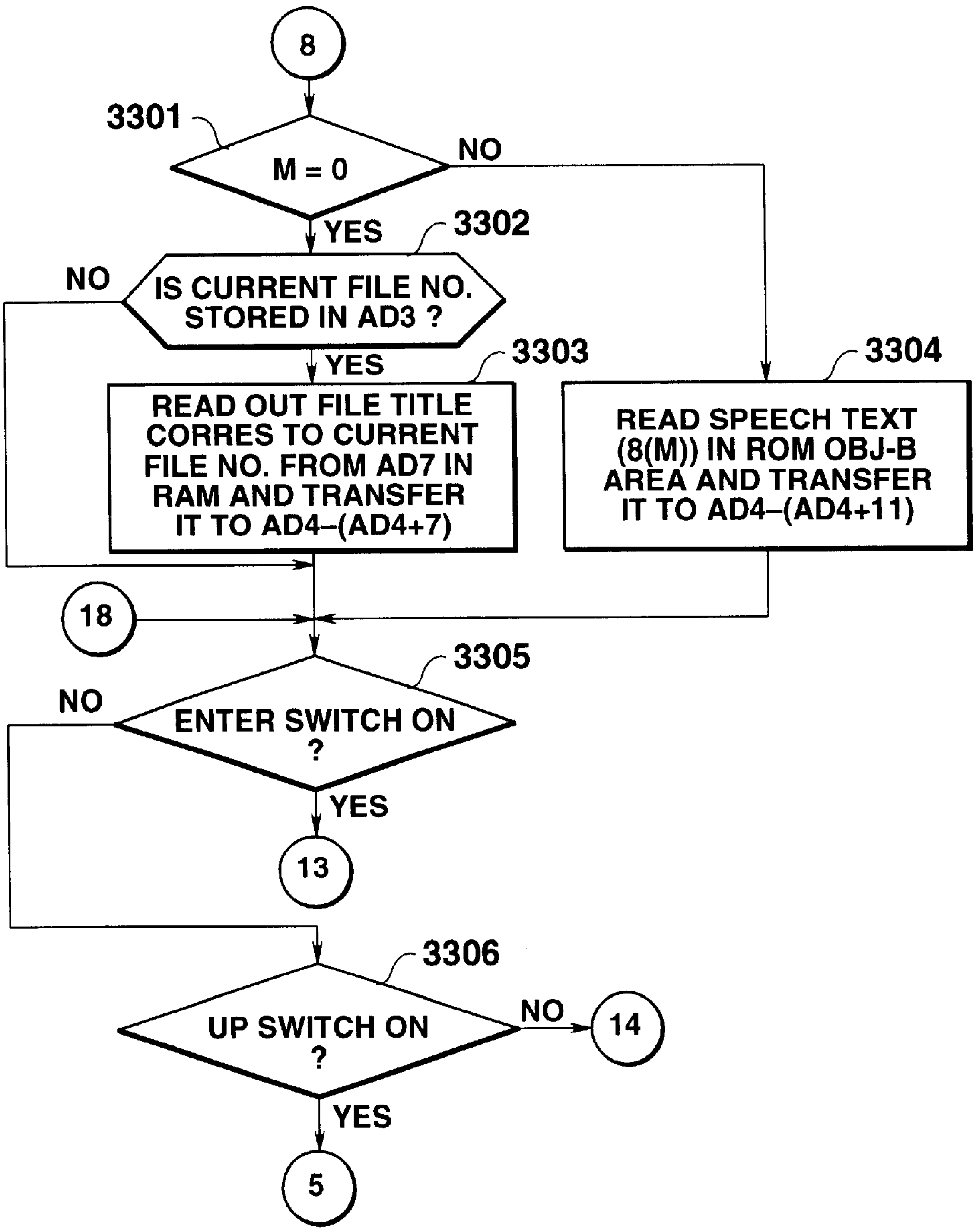
FIG. 33 is a flow chart for the face creation process (part 8)

Then, when the select icon for the first file title in the third stage is displayed emphatically and the value of register M becomes 0, determination at step 3301 in FIG. 33 is YES.

As a result, at step 3302, it is at first determined in the file loading process at step 304 shown in FIG. 13 described previously (step 1622 in FIG. 18) or in the file saving process at step 1309 in FIG. 13 to be described later (step 4622 in FIG. 47) whether the current file number is stored or not in address area (AD3) of work RAM 108.

If determination at step 3302 is YES, CPU 101 reads out data on the file title corresponding to the current file number stored in address areas (AD3) of work RAM 108 from the address area starting from AD7 shown in FIG. 9 of work RAM 108 and transfers the read data to the address areas starting from AD4 (step 3303). Specifically, CPU 101 transfers data on the file title stored in address areas (AD7+(current file number−1)×8) to (AD7+(current file number−1)×8+7) to address areas (AD4) to (AD4+7).

Since file name can not be obtained if determination at step 3302 is NO, step 3303 is not executed.

On the other hand, if the speech select icon other than the first icon in the third stage is displayed emphatically and the value of register M is other than 0, determination at step 3301 in FIG. 33 is NO.

As a result, at step 3304, CPU 101 reads out image data corresponding to number (8(M)) (comprising 12 letters), among the 7 kinds of OBJ-B plane speech that image data shown in FIGS. 6 and 7 of program/data ROM 107 and transfers the read data to address areas (AD4)–(AD4+11) of work RAM 108 where (M) is the value of register M (M>0) and if (M)=1 for instance, the 81th speech text is to be transferred.

After the determination at step 3304 is NO or after the process at steps 3303 or 3304, determination at steps 3305 and 3306 is NO and control returns to the process at step 3205 in FIG. 32.

(Details of the Operation in Case 13)

In case 13, the user can return to the display of the balloon select icon in the second stage shown in FIG. 69B by turning on UP switch 203 when any one of the speech select icons in third stages shown in FIG. 69C has been displayed emphatically.

If the user turns on UP switch 203 when any one of the speech select icons in the third stage has been displayed emphatically, determination at steps 3205 and 3208 in FIG. 32 and at step 3305 in FIG. 33 is NO, determination at step 3306 in FIG. 33 is YES, control returns to the process at step 31101 in FIG. 31 and the balloon select icon in the second stage shown in FIG. 69B is displayed.

(Details of the Operation in Case 14)

In case 14, the user can display the selected speech to the input letter display section on the letter input screen shown in FIG. 58 by turning on ENTER switch 202 when any one of the speech select icons in the third stage shown in FIG. 69C has been displayed emphatically and further can edit a speech by selecting letters from the letter display section.

If the use turns on ENTER switch 202 when any one of the speech select icons in the third stage has been displayed emphatically, determination at steps 3205 and 3208 in FIG. 32 is NO and determination at step 3305 in FIG. 33 is YES.

Figure 34:
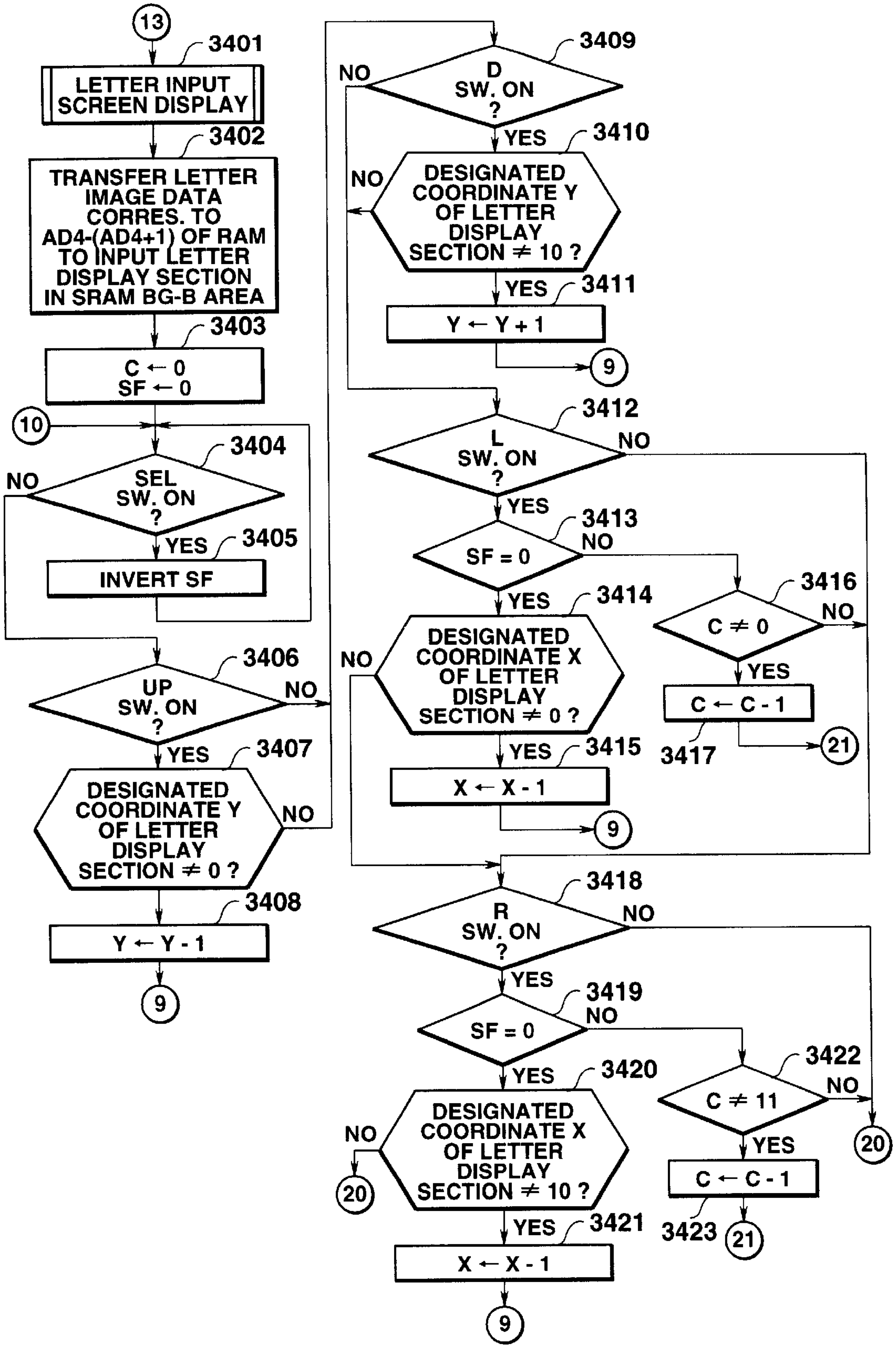
FIG. 34 is a flow chart for the face creation process (part 9)

As a result, first, at step 3401 in FIG. 34, the letter input screen display process is executed. The details of this process are shown as an operation flow chart in FIG. 40.

Figure 40:
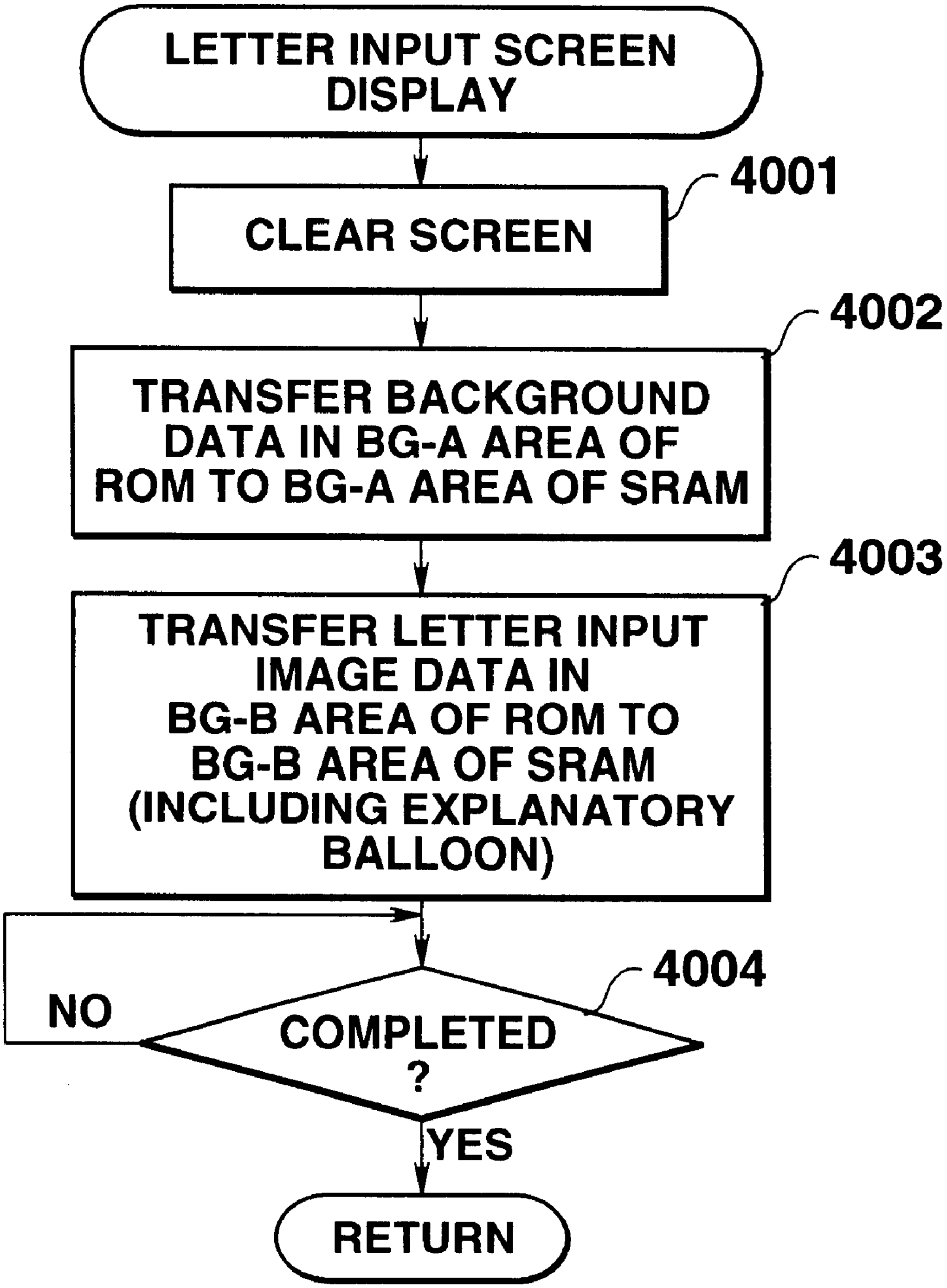
FIG. 40 is a flow chart for a letter input screen display process.

In FIG. 40, CPU 1 delivers a clear instruction for the output screen to VDP 102 at step 4001. As a result, the screen display of television receiver 111 is cleared.

At step 4002, CPU 101 transfers the BG-A plane background image data shown in FIG. 6 of program/data ROM 107 (Refer t the letter input screen of FIG. 5) by way of CPU interface 301, address bus 315, data bus 316 and SRAM interface 302 to the BG-A plane memory area of SRAM 103.

At step 4003, CPU 101 transfers the letter input screen data as the BG-B plane background image data (system screen data) shown in FIG. 6 of program/data ROM 107 by way of CPU interface 301, address bus 315, data bus 316 and SRAM interface 302 to the BG-B plane memory area of SRAM 103 (refer to the letter input screen in FIG. 5). As the explanatory balloon in this case, the balloon contents shown in FIG. 58 are displayed.

At step 4004, it is determined whether the series of transfer processes has been completed, at which time the letter input screen display process at step 3401 in FIG. 34 is ended. As a result, VDP 102 having the constitution shown in FIG. 3 displays, as described previously, on television receiver 111 the image data of the letter input screen transferred to the BG-A and -B plane memory areas of SRAM 103 in the format shown in FIG. 58.

It is the feature of the present invention that the format of the letter input screen is identical with the format of the letter input screen of the file title displayed at step 1308 in FIG. 13 to be described later.

Then, at step 3402 in FIG. 34, CPU 101 replaces data on cells of the inputted letter display section shown in FIG. 58 among the cells constituting the background image of the letter input screen, data on the background image being stored in the BG-B plane memory area of SRAM 103, with data on the letter image data of the speech text transferred to address areas (AD4)–(AD4+11) of work RAM 108 in the process at step 3303 or 3304 in FIG. 33. As a result, a speech corresponding to the speech select icon displayed emphatically in the third stage is displayed in the inputted letter display section when ENTER switch 200 is turned on.

Then, at step 3403, both the value of register C indicating a letter position in the input letter display section and the value of register SF indicating whether the cursor is in the letter display section or in the input letter display section are reset to 0.

Then, the control passes to step 3404.

(Details of the Operation in Case 15)

In case 15, the user can select between the movement of the cursor in the letter display section and that in the input letter display section by turning on SEL switch 201 when the letter input screen has been displayed in case 14.

If the user turns on SEL switch 201 when the letter input screen has been displayed in case 14, determination at step 3404 in FIG. 34 is YES, and the value of register SF is inverted between 0 and 1 at step 3405. As a result, the cursor can be moved in the letter display section if the value of register SF is 0 and in the input letter display section if the value of register SF is 1.

Then, control returns to the process at step 3404.

(Details of the Operation in Case 16)

In case 16, the user can move the cursor in the letter display section upwardly or downwardly by turning on UP switch 203 or DOWN switch 204 when the letter input screen has been displayed in case 14 and can freely select letters for the speech text.

If the user turns on UP switch 203 when the letter input screen has been displayed in case 14, determination at step 3404 in FIG. 34 is NO and determination at step 3406 is YES.

Then, of the value of register X indicating the letter position in the horizontal direction and the value of register Y indicating the letter position in the vertical direction in the letter display section, if the value of register Y indicating the vertical direction is not "0" indicating the uppermost row, determination at step 3407 is YES and the value of register Y is decremented by one at step 3408.

Subsequently, at step 3501 in FIG. 35 the letter in the letter display section shown by the values of registers X and Y is displayed emphatically. Specifically, CPU 101 replaces data on cells corresponding to the letter, among the cells constituting the background image of the letter input screen, data on the background image being stored in the BG-B plane memory area of SRAM 103, with data on cells for emphatic display and replaces, for example, data on cells corresponding to the letter in the letter display section indicated by the value of register X and the value of register Y+1, with cells for regular display. As a result, the letter position in the letter display section is moved upwardly by one row.

Figure 35:
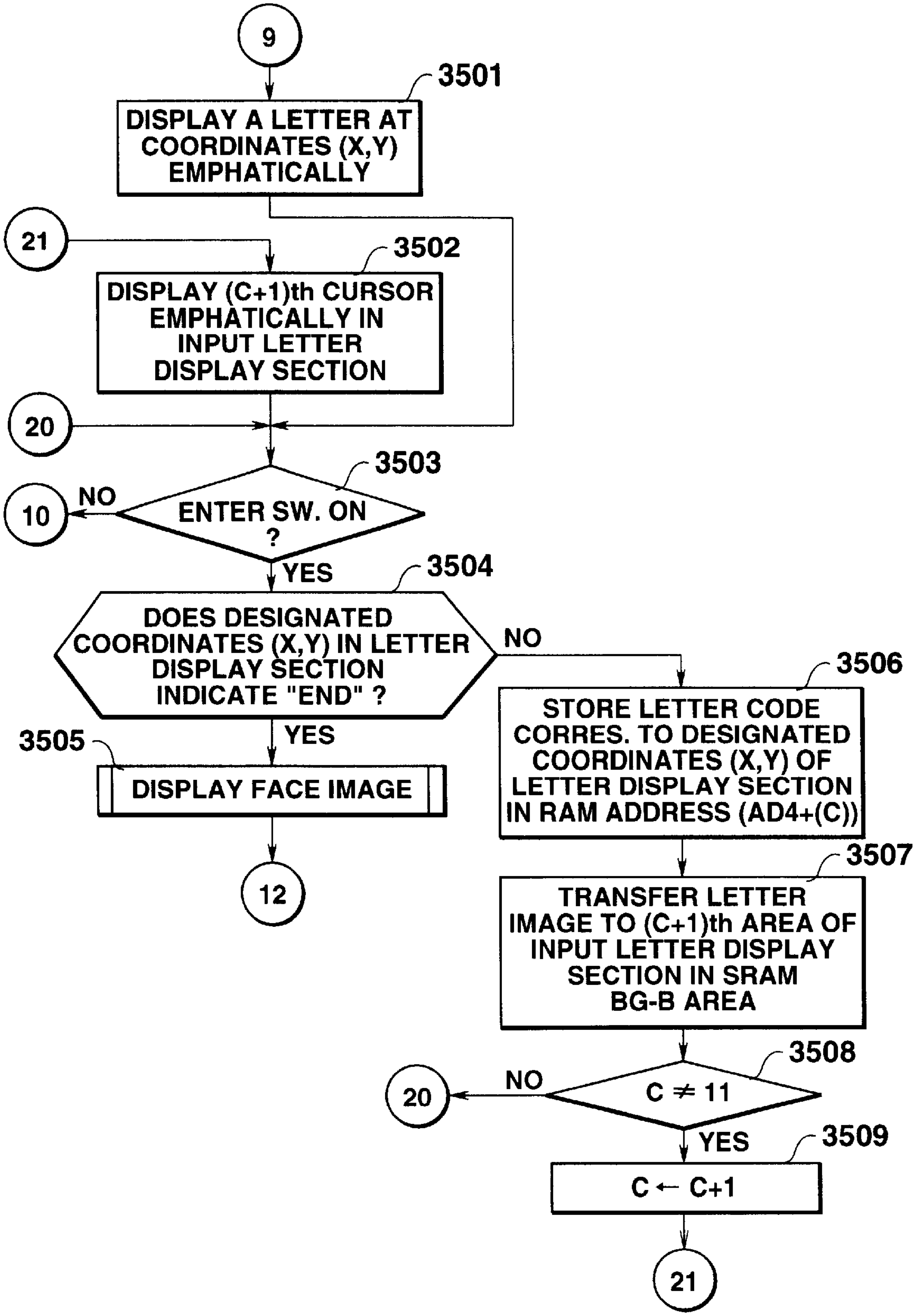
FIG. 35 is a flow chart for the face creation process (part 10)

Then, determination at steps 3503 in FIG. 35 is NO and control returns to the process at step 3404 in FIG. 34.

If the value of register Y is "0" indicating the uppermost row, determination at step 3407 is NO and step 3408 is not executed, and determination at steps 3409, 34012 and 3418 is NO and determination at step 3503 in FIG. 35 is NO, and the control returns to the process at step 3404 in FIG. 34, and the operation of UP switch 203 is invalidated.

On the other hand, if the user turns on DOWN switch 204 when the letter input screen has been displayed in case 14, determination at steps 3404 and 3406 is NO and determination at step 3409 is YES in FIG. 34.

Then, of the value of register X indicating the letter position in the horizontal direction and the value of register Y indicating the letter position in the vertical direction in the letter display section, if the value of register Y indicating the vertical direction is not "10" indicating the lowermost row, determination at step 3410 is YES, and the value of register Y is incremented by one at step 3411.

Subsequently, at step 3501 in FIG. 35 described previously, the letter in the letter display section indicated by the values of register X and Y is displayed emphatically and the emphatic display of the letter in the letter display section indicated by the value of register X and the value of register Y−1 is released. As a result, the letter position in the letter display section is moved downwardly by one row.

Then, determination at step 3503 in FIG. 35 is NO and control returns to the process at step 3404 in FIG. 34.

If the value of register Y is "10" indicating the lowermost row, determination at step 3410 is NO and step 3411 is not executed, and determination at steps 3412, 3418 is NO and determination at step 3503 in FIG. 35 is NO either, and the control returns to step 3404 in FIG. 34, and the operation of DOWN switch 204 is invalidated.

(Details of the Operation in Case 17)

In case 17, the user can move the cursor in the letter display section rightwardly and leftwardly by turning on LEFT switch 205 or RIGHT switch 206 when the letter input screen has been displayed and the cursor is in the letter display section in case 14 and can freely select letters for the speech text.

If the user turns on LEFT switch 205 when the letter input screen has been displayed and the cursor is in the letter display section in case 14, determination at steps 3404, 3406 and 3409 in FIG. 34 is NO and then determination at steps 3412 and 3413 is YES.

Then, of the value of register X indicating the letter position in the horizontal direction in the letter display section and the value of register Y indicating the letter position in the vertical direction, the value of register X is not "0" indicating the leftmost end, determination at step 3414 is YES and the value of register X is decremented by one at step 3415.

Subsequently, at step 3501 in FIG. 35 described previously, the letter in the letter display section indicated by the values of register X and Y is displayed emphatically, and the emphatic display of the letter in the letter display section indicated by the value of register X+1 and the value of register Y are released. As a result, the position of the letter in the letter display section is moved by one row to the left.

Then, determination at step 3503 in FIG. 35 is NO and control returns to the process at step 3404 in FIG. 34.

If the value of register X is "0" indicating the leftmost end, since determination at step 3414 is NO, step 3415 is not executed, while determination at step 3418 is NO and determination at step 3503 in FIG. 35 is NO, and the control returns to the process at step 3404 in FIG. 34 and the operation of LEFT switching 205 is invalidated.

On the other hand, if the user turns on RIGHT switch 206 when the letter input screen has been displayed and the cursor is in the letter display section in case 14, determination at steps 3404, 3406, 3409 and 3412 in FIG. 34 is NO and then determination at steps 3418 and 3419 is YES.

Then, of the value of register X indicating the letter position in the right to horizontal direction and the value of register Y indicating the letter position in the vertical direction, in the letter display section, if the value of register X is not value "10" indicating the rightmost end row, determination at step 3420 is YES and the value of register X is incremented by one at step 3421.

Subsequently, at step 3501 in FIG. 35 described previously, the letter in the letter display section indicated by the value of register X and Y are displayed emphatically, and the emphatic display of the letter in the letter display section indicated by the value of register X−1 and the value of register Y is released. As a result, the position of the letters in the letter display section is moved by one row to the right.

Then, determination at step 3503 in FIG. 35 is NO and control returns to the process at step 3404 in FIG. 34.

If the value of register X is "10" indicating the rightmost (end), determination at step 3420 is NO, step 3421 is not executed, determination at step 3503 in FIG. 35 is NO, and the control returns to the process at step 3404 in FIG. 34 and the operation of RIGHT switch 206 is invalidated.

(Details of the Operation in Case 18)

In case 18, the user can move the cursor in the inputt letter display section rightwardly and leftwardly by turning on LEFT switch 205 or RIGHT switch 206 when the input letter input screen has been displayed in case 14 and the cursor in the input letter display section, so that the input position of the new letter in the speech text can be freely changed.

If the user turns on LEFT switch 205 when the letter input screen has been displayed and the cursor is in the inputted letter display section in case 14, determination at steps 3404, 3406 and 3409 in FIG. 34 is NO, determination at step 3412 is YES and determination at step 3413 is NO.

Then, if the value of register C indicating the letter position in the input letter display section is not "0" indicating the leftmost end, determination at step 3416 is YES and the value of register C is decremented by one at step 3417.

Subsequently, at step 3502 in FIG. 35, the letter in the input letter display section indicated by the value of register C+1 (+1 is performed because the value of register C indicates "0" (origin).) is displayed emphatically. Specifically, CPU 101 replaces data on cells corresponding to the above letter among the cells constituting the background image of the letter input screen, data on the background image being stored in the BG-B plane memory area of SRAM 103, with data on cells for emphatic display and, at the same time, replaces data on the cells corresponding to the letter in the input letter display section indicated, for example, by (value of register C+1)+1, with data on cells for regular display. As a result, the letter position in the inputted letter display section is moved by one letter to the left.

Thereafter, the determination at step 3503 of FIG. 35 becomes NO and the control returns to step the process at 3404 of FIG. 34.

If the value of register C is "0" which indicates the left end, the determination at step 3416 becomes NO and step 3417 is not executed. Thus, the determination at step 3418 becomes NO and the determination at step 3503 of FIG. 3503 becomes NO. Thus, the control returns to the processing at step 3404 of FIG. 34 and the operation of left switch 205 becomes invalidated.

When the user turns on RIGHT switch 206 when the letter input screen has been displayed and the cursor is in the input letter display in the case 14, the determination at steps 3404, 3406, 3409 and 3412 of FIG. 34 becomes NO, the determination at step 3418 becomes YES and the determination at step 3419 becomes NO.

Unless the value of register C indicative of the letter position in the input letter display is "11", which indicates the right end, the determination at step 3422 becomes YES, and the value of register C is incremented by one at step 3423.

Subsequently, at step 3502 of FIG. 35 the letter in the input letter display indicated by the register C value +1 is displayed emphatically, and the emphatic display of the letter in the input letter display indicated by (register C value +1)−1 is released. As a result, the position of the letter in the input letter display moves by one letter to the right.

Thereafter, the determination at step 3503 of FIG. 3 becomes NO and the control returns to the process at step 3404 of FIG. 34.

If the value of register C is "11" which indicates the right end, the determination at step 3422 becomes NO and step 3423 is not performed, and the determination at step 3503 of FIG. 35 becomes NO. Thus, the control returns to the processing at step 3404 of FIG. 34 and the operation of the right switch 206 is invalidated.

(Details of the Operation in Case 19)

In case 19, the user can display the current selected letter in the letter display into the input letter display by selecting a letter (FIG. 58) other than the end letter in the letter display and turning on ENTER switch 202 in a state where the letter input screen is displayed in case 14.

If the user turns on ENTER switch 202 when the letter input screen has been displayed and a letter other than the end letter has been displayed emphatically in the letter display, the determinations at steps 3404, 3406, 3409, 3412 and 3418 of FIG. 34 becomes NO and the determination at steps 3503 and 3504 of FIG. 35 becomes YES.

As a result, at step 3506 CPU 101 stores the code of a letter allocated to the position in the letter display indicated by the values of registers X and Y in address area {AD4+(C))} of FIG. 9 in work RAM 108 where (C) denotes the value of register C. For example, if the value of register C is "2", the letter code is stored in address area {AD4+2}. Since the value of register C can change from 0 to 11, the range of address area where letter codes are stored is {AD4}–{AD4+11}.

Subsequently, at step 3507 CPU 101 transfers data on the image of the letter allocated to the letter position in the letter display section indicated by the values of registers X and Y to a letter position in the input letter display indicated by the register C value +1. More specifically, CPU 101 transfers the letter image data through CPU interface 301, address bus 315, data bus 316 and SRAM interface 302 to cells corresponding to the above letter among the cells which constitute the background image of the letter input display screen stored in the BG-B plane memory area of SRAM 103. The letter image data is contained in the BGB plane image data in program/data ROM 107 shown in FIG. 6. As a result, the letter displayed emphatically in the letter display when ENTER switch 202 is turned on is displayed at a position which is displayed emphatically in the input letter display.

Thereafter, unless the value of register C indicating the letter position in the input letter display is "11" which indicates the right end, the determination at step 3508 becomes YES and the value of register C is incremented at step 3509.

At step 3502 the letter position in the input letter display indicated by the register C value +1 is displayed emphatically and the emphatic display of the letter position in the input letter display indicated by (register C value+1)−1 is released. As a result, the letter position in the input letter display moves by one letter to the right.

Thereafter, the determination at step 3503 of FIG. 35 becomes NO and the control returns to the process at step 3404 of FIG. 34.

If the value of register C is "11" which indicated the right end, the determination at step 3508 becomes NO and the process at step 3509 is not performed, and the determination at step 3503 of FIG. 35 becomes NO and the control returns to the process at step 3403 of FIG. 34.

(Details of the operation in case 20)

In case 20, by selecting the end letter (FIG. 58) in the letter display and turning on ENTER switch 202 when the letter input screen has been displayed in case 14, the user can display, if any, letters which are present in the input letter display and constitute a non-fixed type sentence, as balloon letters on the basic system display screen. If the letters in the input display screen constitute a fixed type sentence, the user can convert that sentence in accordance with the shape of the current selected speech frame and then display the converted sentence in the form of balloon letters on the basic system display screen.

When the user turns, on ENTER switch 202 in a state where the letter input screen is displayed and the end letter is emphatically displayed in the letter display, the determination at steps 3404, 3406, 3409, 3412 and 3418 of FIG. 34 becomes NO, determination at step 3503 of FIG. 35 becomes YES and determination at step 3504 becomes NO.

Figure 41:
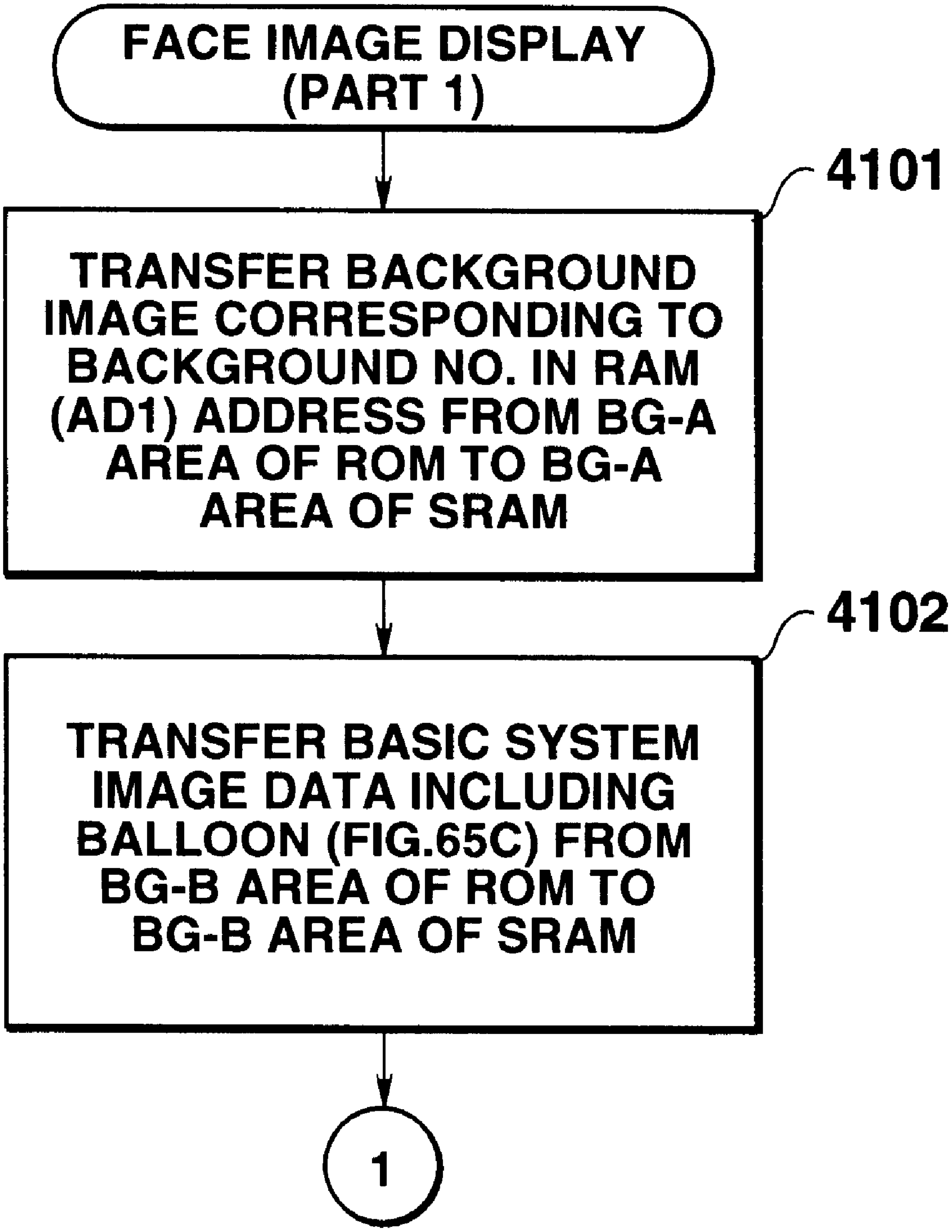
FIG. 41 is a flow chart for a face image display process (part 1)

As a result, at step 3050 the face image display process is performed, the details of which are shown as an operational flow chart of FIG. 41.

In FIG. 41, at step 4101, CPU 101 reads background data (FIG. 52) corresponding to the background number data stored in address area {AD1} of work RAM 108 from among BG-A plane background data A-1 to A-7 in program/data ROM 107 of FIG. 6, and transfers it through CPU interface 301, address bus 315, data bus 316, and SRAM interface 302 to the BG-A plane memory area in SRAM 103 (see the basic system display screen of FIG. 5).

At step 4105, CPU 101 transfers the basic system display screen data (system display screen data) which is the BG-B plane background image data in program/data ROM 107 of FIG. 6 through CPU interface 301, address bus 315, data bus 316 and SRAM interface 302 to the BG-B plane memory area of SRAM 103 (corresponding to the system of the basic system display screen of FIG. 5). The image in this case corresponds to the explanatory balloon and command icon displaying the contents of the BG-B plane image of FIG. 57 of FIG. 65C. As will be described later, after ENTER switch 202 is turned on, an explanatory balloon having the contents of FIG. 65C is displayed so that a speech frame may be selected.

Figure 42:
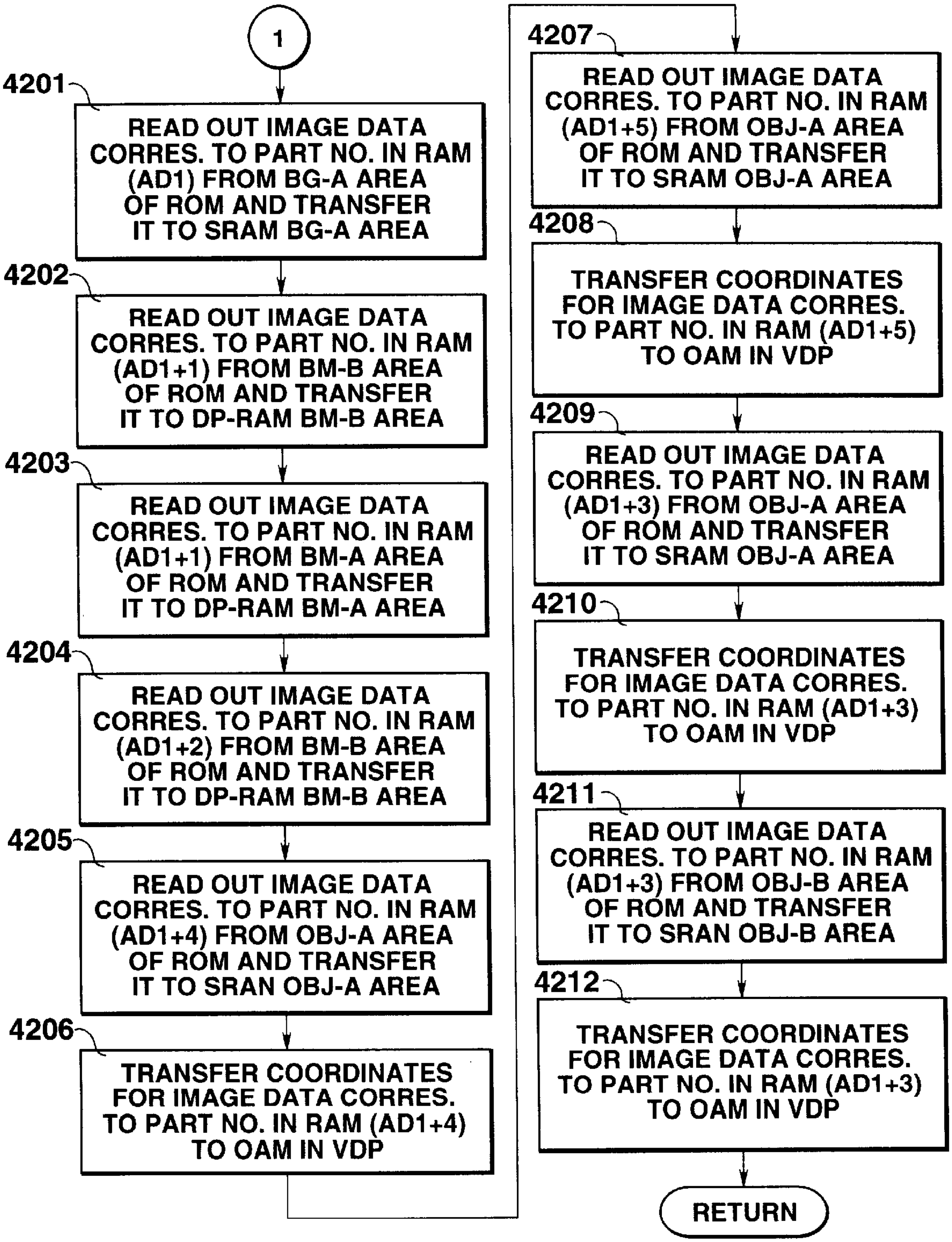
FIG. 42 is a flow chart for the face image display process (part 2)

Next, at steps 4201–4212 of FIG. 42, the CPU reads image data corresponding to the respective part numbers, data on which is stored in address areas {AD1}–{AD1+6} of work RAM 108 of FIG. 9 due to the creation of the portrait and transfers the data through CPU interface 301, address bus 305, data bus 316 and SRAM interface 302 or DP-RAM interface 303 to the respective storage areas of SRAM 103 or DP-RAM 104 and also transfers coordinate data on the OBJ-A and -B planes through CPU interface 301, address bus 315 and data bus 316 to object attribute memory 307.

As a result, the image of the portrait created by VDP 102 having the structure of FIG. 3 is displayed on television set 111.

Thereafter, the face image displaying process at step 3505 of FIG. 35 is terminated.

Subsequently, at step 3601 of FIG. 36 if there are codes of input letters which make up a speed sentence in address area {AD4}–{AD4+11} of work RAM 108 of FIG. 9, the determination at step 3602 becomes YES and the CPU performs the processes at steps 3603–3606 where the speech sentence in the speech frame is displayed. If not, the determination at step 3602 becomes NO and these processing operations 20 are not performed.

At step 3603, the CPU determines whether the input sentence composed of the letter codes in the address area is a fixed type sentence or not. This determining process is realized by comparing the respective codes of the letters which make up 7 kinds of speech sentences which are the image data on the OBJ-B plane of program/data ROM 107 of FIGS. 6 and 7 with the codes of the respective input letters in the address area beforehand.

If the input sentence is of a fixed type and the determination at step 3602 is YES, the respective letter codes in address areas {AD4}–{AD4+11} in work RAM 108 of FIG. 9 which make up the input sentence are converted in accordance with the value of register W and stored in address areas {AD5}–{AD5+11} in work RAM 108 of FIG. 9. As will be described later, a value depending on the shape of a balloon frame which the user can select is set in register W. The input sentence is automatically changed in accordance with the shape of the balloon frame, for example, as shown in FIGS. 70A–70D. Thus, the user can enjoy various speeches only by selecting the respective speech frames. The conversion of a speech sentence is realized as selection of the letter code string of a speech sentence, for example, depending on the value of register W from a conversion table (not shown) stored in program/data ROM 107.

If the input sentence is a non-fixed sentence and the determination at step 3602 is NO, the CPU stores the respective letter codes in address areas {AD4}–{AD4+11} of work RAM 108 of FIG. 9 which make up the input sentence as they are in address areas {AD5}–{AD5+11} of work RAM 108 of FIG. 9.

After the processes at step 3603 or 3604, CPU 101 reads data on the images of the speech letters corresponding to the respective letter codes stored in address areas {AD5}–{AD5+11} in work RAM 108 from the OBJ-B plane memory area of program/data ROM 107 of FIGS. 6 and 7 and transfers it through CPU interface 301, address bus 315, data bus 316 and SRAM interface 302 to an empty OBJ-B plane object memory area of SRAM 103 (step 3605).

At step 3606, CPU 101 transfers coordinate data corresponding to address areas {AD5}–{AD5+11} in work RAM 108 through CPU interface 301, address bus 315 and data bus 316 to the corresponding object number areas of object attribute memory 307 corresponding to the object storage area to which the speech letter image data was transferred at step 3605 (FIG. 10).

Subsequently, at step 3607, CPU 101 reads data on the image of a balloon frame corresponding to the balloon frame number data stored in address area {AD1+7} in work RAM 108 by selection of the speech frame to be described later, from the OBJ-B plane memory area of program/data ROM 107 of FIGS. 6 and 7 and transfers it through CPU interface 301, address bus 315, data bus 316 and SRAM interface 302 to an empty OBJ-B plane memory area of SRAM 103.

At step 3606, CPU 101 transfers coordinate data corresponding to the speech frame number data processed at step 3607 through CPU interface 301, address bus 315 and data bus 316 to the object number area in object attribute memory 307 corresponding to the object storage area transferred at step 3605.

Figure 56:
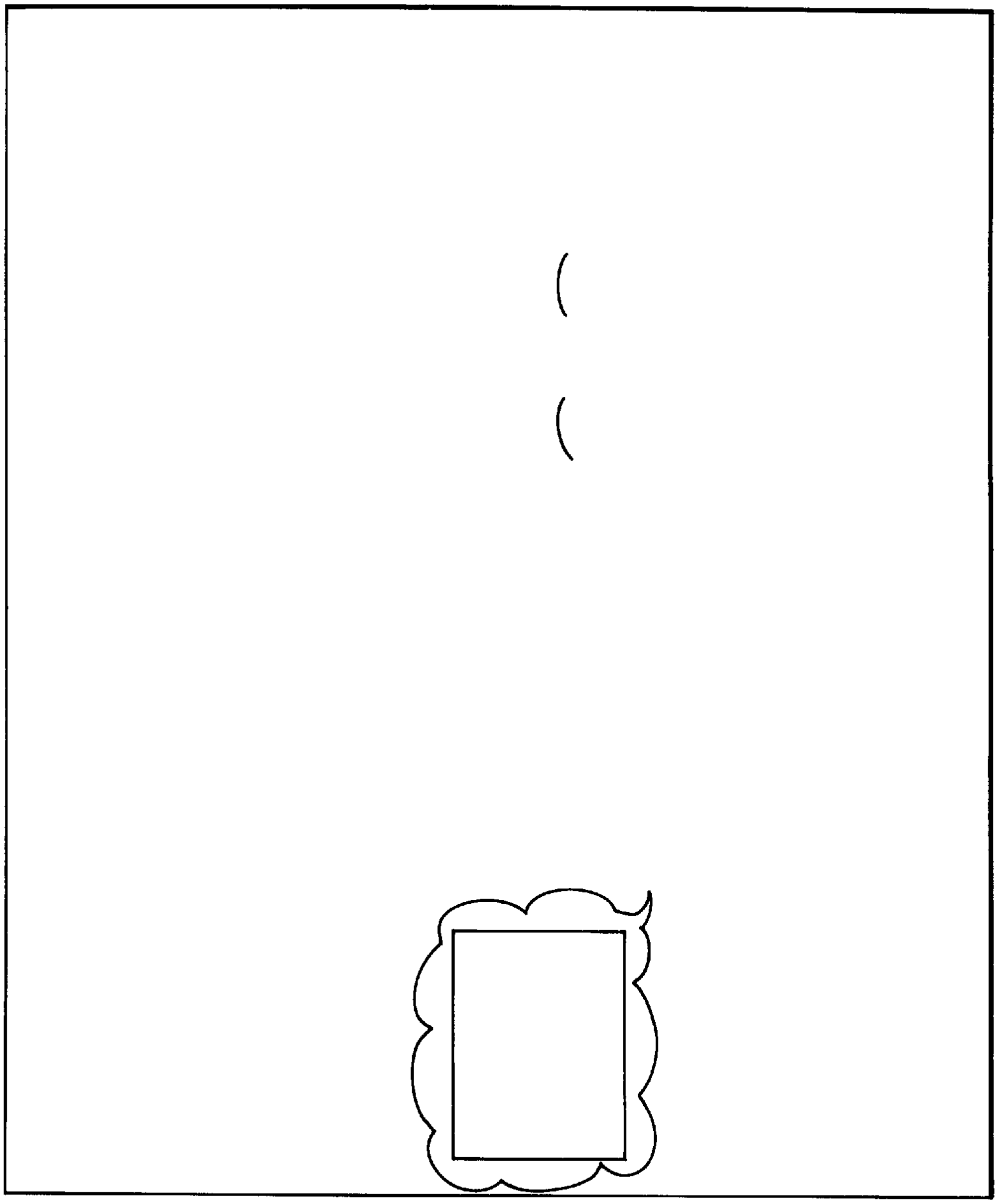
FIG. 56 shows the layout of an OBJ-B plane in the basic system screen.

As the result of the above processing, VDP 102 having the structure of FIG. 3 displays data on the respective images of the speech sentence and frame transferred to the OBJ-B plane memory area in SRAM 103 at display positions corresponding to the respective coordinate data transferred to the object attribute memory 307 (FIG. 56).

Figure 37:
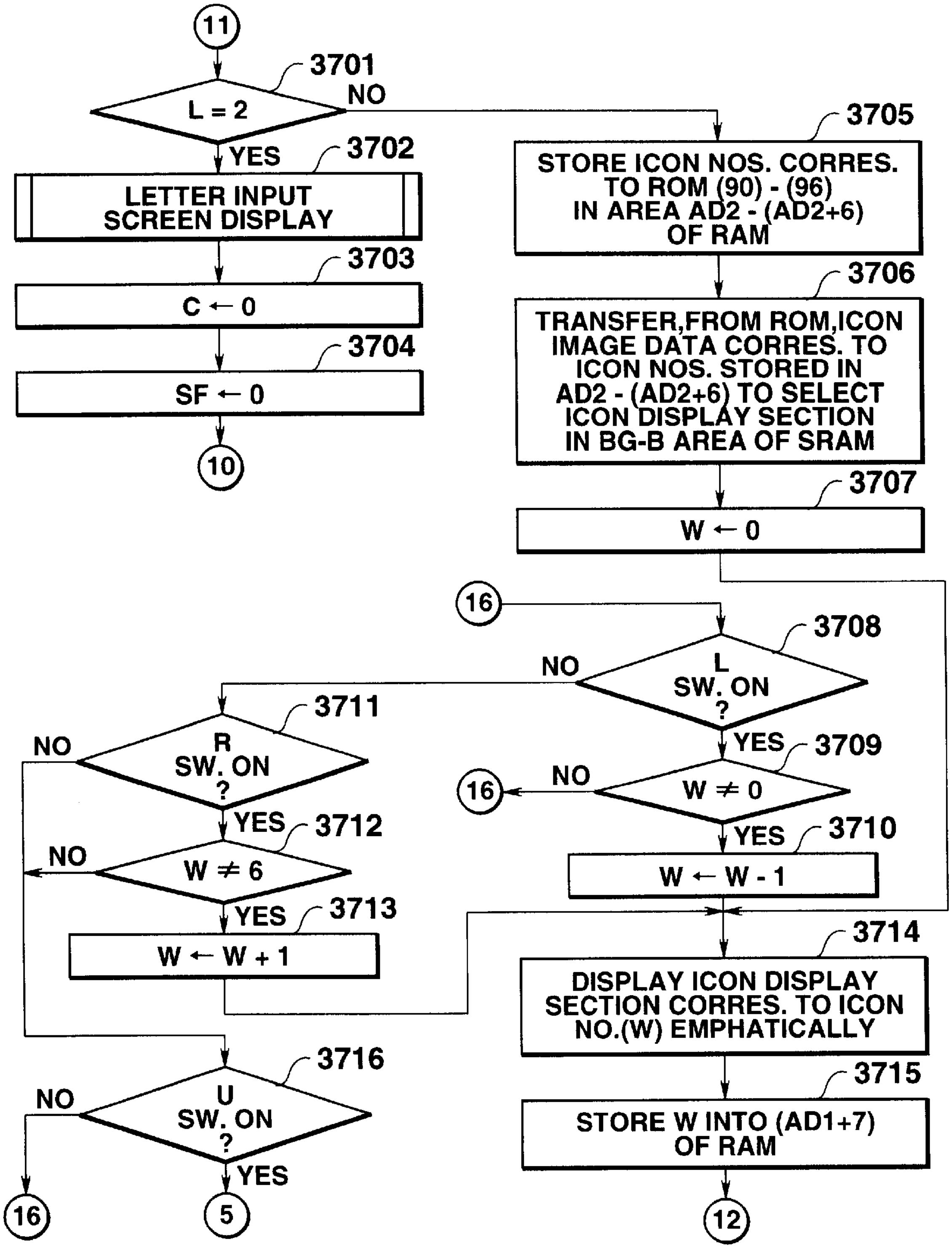
FIG. 37 is a flow chart for the face creation process (part 12)

Thereafter, the determination at step 3609 becomes NO (see step 3103 of FIG. 31), a value "2" which indicates that a select icon for a speech frame has been selected from select icons for the balloons in the second stage is set at step 3610 and the determination at step 3701 of FIG. 37 becomes NO and a process for selection of a balloon frame at steps 3705 and subsequent steps is performed. The processing for selection of the balloon frame will be described later in the description of the details of the operation in case 22.

(Details of the Operation in case 21)

In case 21, by turning on ENTER switch 202 when the select icon for creation of a speech has been displayed emphatically among the balloon select icons in the second stage of FIG. 69B, the user can display the letter input display screen of FIG. 58, and by selecting a letter from the letter display, the user can create a balloon.

When the user turns on ENTER switch 202 in a state where the select icon for the speech creation is displayed emphatically, the determination at steps 3104 and 3107 of FIG. 31 becomes NO, the determination at step 3112 becomes YES, the determination at step 3202 of FIG. 32 becomes NO, and the determination at step 3701 of FIG. 37 becomes YES.

First, at step 3702 of FIG. 37, a letter input display screen displays process is performed, which is similar to the process at step 3401 of FIG. 34 and is shown as the operational flow chart of FIG. 40. As a result, VDP 102 which has the structure of FIG. 3 displays image data for the letter input display screen transferred to the respective BG-A and -B plane memory areas of SRAM 103 in the format of FIG. 58 on television screen 111, as described above.

Thereafter, at step 3703, the value of register C indicative of the letter position of the input letter display is reset at 0. At step 3704, the value of register SF which indicates whether the cursor is placed in the letter display or in the input letter display is also reset at 0.

Thereafter, the CPU performs processing is at step 3404 and subsequent steps of FIG. 34, and hence the above-mentioned process for inputting a speech sentence. Thus, the user can input the speech sentence.

When the user completes the inputting operation of the speech sentence and turns on ENTER switch 202, VDP 102 which has the structure of FIG. 3 displays data on the respective images of the speech sentence and frame transferred to the OBJ-B plane memory area of SRAM 103, as mentioned above at corresponding display positions corresponding to the respective coordinates, data on which was transferred to object attribute memory 307.

Figure 36:
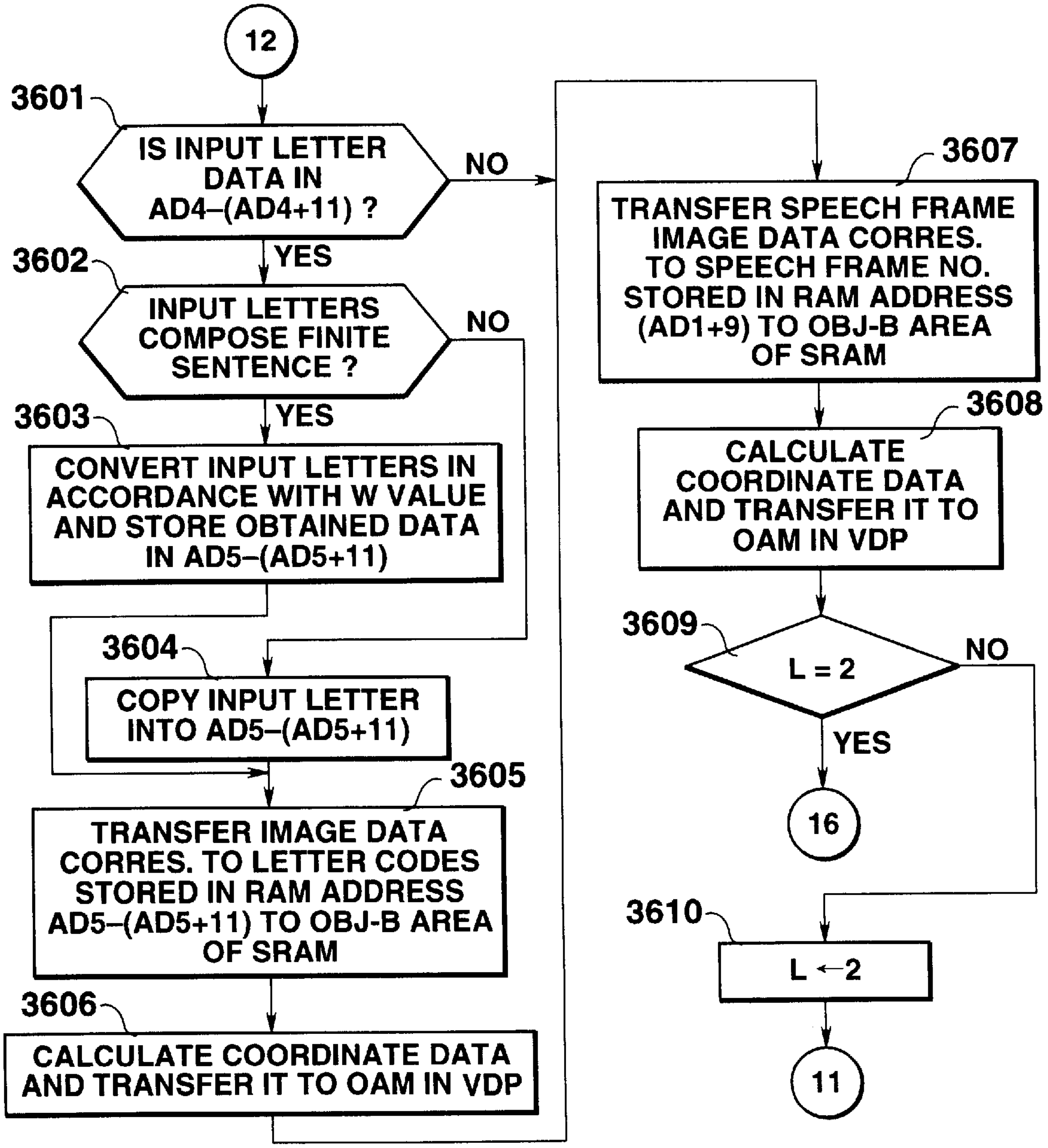
FIG. 36 is a flow chart for the face creation process (part 11)

Thereafter, the determination at step 3609 of FIG. 36 becomes NO. At step 3610, a value "2" indicating that the select icon for the speech frame was selected in the select icons in the second stage balloon is set in register L, and the determination at step 3701 of FIG. 37 becomes NO and a process for selection of a speech frame at step 3705 and subsequent steps is performed.

(Details of the Operation in Case 22)

In case 22, by turning on ENTER switch 202 the speech frame select icon in the balloon select icons in the second stage of FIG. 69B has been displayed emphatically, the user can display select icons in the third stage of FIG. 69D corresponding to the select icon for the speech frame shape.

When the user turns on ENTER switch 202 in a state where the speech frame select icon is displayed emphatically, the determination at steps 3104 and 3107 of FIG. 31 becomes NO, the determination at step 3112 becomes YES, the determination at step 3201 of FIG. 32 becomes NO, and the determination at step 3701 of FIG. 37 becomes NO.

As a result, at step 3705 of FIG. 37, CPU 101 stores data on the respective icon select numbers 90–96 corresponding to seven kinds of icons "90"–"96" of FIG. 8 among the icon image data of program/data ROM 107 of FIG. 6 in address areas {AD2}–{AD2+6} of FIG. 9 in work RAM 108.

At step 3706, CPU 101 replaces only data on cells corresponding to the select icons among the cells which constitute the background image of the basic system display screen, data on the background image being stored in the BG-B plane memory area of SRAM 103, with data on the images of the select icons for the seven kinds of speech frames on program/data ROM of FIG. 8 corresponding to the icon numbers, data on which is stored in address areas {AD2}–{AD2+6} of work RAM 108 of FIG. 9 at step 3705.

As a result, as described above, VDP 102 having the structure of FIG. 3 displays on the television screen 111 the speech frame select icons in the third stage of FIG. 69D, data on which was transferred to the BG-B memory area of SRAM 103.

Thereafter, at step 3707, a value "0" is set in register W which indicates the select position of the speech frame select icon in the third stage.

At step 3714, the first (left end) select icon corresponding to the value "0" of register W is displayed emphatically. More specifically, CPU 101 replaces data on cells corresponding to the first (left end) select icon for the value "0" of register W among the cells which constitute the background image of the basic system display screen, data on the background image being stored in the BG-B plane memory area of SRAM 103, with data on cells for emphatic display.

Subsequently, at step 3715, the value "0" of register W corresponding to the selected speech frame number is stored in address area {AD1}–{AD1+7} of work RAM 108 of FIG. 9.

After the processing at steps 3601–3608 of FIG. 36, the determination at step 3609 becomes YES and the control passes to the process at step 3708 of FIG. 37.

(Details of the Operation in Case 23)

In case 23, by turning on the LEFT switch 205 or RIGHT switch 206 when any one of the speech frame shape select icons in the third stage of FIG. 69D has been displayed emphatically, the user can move a select icon to be selected.

When the user turns on LEFT switch 205 in a state where any one of the speech frame select icons has been displayed emphatically, the determination at step 3708 becomes YES. In addition, unless the value of register W is "0" and unless the first (left end) select icon has been displayed emphatically, the determination at step 3709 becomes YES and at step 3710 the value of register W is decremented by one. As a result, a speech frame select icon to be selected is moved by one to the left. If the value of the register W is 0 and the first (left end) select icon has been displayed emphatically, the determination at step 3709 becomes NO, and the control returns to the process at step 3708, where the operation of left switch 205 is invalidated. When the user turns on right switch 206 in a state where any one of the select icons has been displayed emphatically, the determination at steps 3708 becomes NO, and the determination at step 3711 then becomes YES. In addition, unless the value of the register W is "6" and unless the seventh (right end) select icon has been displayed emphatically, the determination at step 3712 becomes YES, and at step 3713 the value of register w is incremented by one. As a result, the speech frame select icon to be selected moves by one to the right. If the value of register W is "6" and the seventh (right end) select icon has been displayed emphatically, the determination at step 3712 becomes NO. In addition, after the determination at step 3716 becomes NO, the control returns to the process at step 3708, where the operation of the right switch 206 is invalidated.

After the process at step 3710 or 3713, a select icon having a number corresponding to the value of register W is displayed emphatically at step 3714. More specifically, CPU 101 replaces data on cells corresponding to a select icon having a number which, in turn, corresponds to the value of register W among the cells which constitute the background image of the basic system display screen, data on the background image being stored in the BG-B plane memory area of SRAM 103, with data on cells for emphatic display.

Subsequently, at step 3715, CPU 101 stores the value of register W corresponding to the number of the selected speech frame in address area {AD1+7} of work RAM 108 of FIG. 9.

By performing the processing at steps 3601–3608 of FIG. 36, the already created or selected speech sentence as it is displayed within the new speech frame if the speech sentence is of a non-fixed type, or the input sentence is converted in accordance with information on the new selected speech frame shape set in register W if it is of a fixed type and the resulting sentence is displayed within new the speech frame.

Thereafter, the determination at step 3609 becomes YES and the control returns to the process at step 3708 of FIG. 37.

(Details of the Operation in Case 24)

In case 24, by turning on upper switch 203 in a state where any one of the speech frame select icons in the third stage of FIG. 69C has been displayed emphatically, the user can return the display screen to the display of the balloon select icons in the second stage of FIG. 69B.

When the user turns on upper switch 203 in a state where any one of the speech frame select icons in the third stage has been displayed emphatically, the determination at steps 3708 and 3711 of FIG. 37 becomes NO and the determination at step 3716 becomes YES. The control then returns to the process at step 3101 of FIG. 31, where the balloon select icons in the second stage of FIG. 69B are displayed.

Flow of a Letter Inputting Operation

Figure 43:
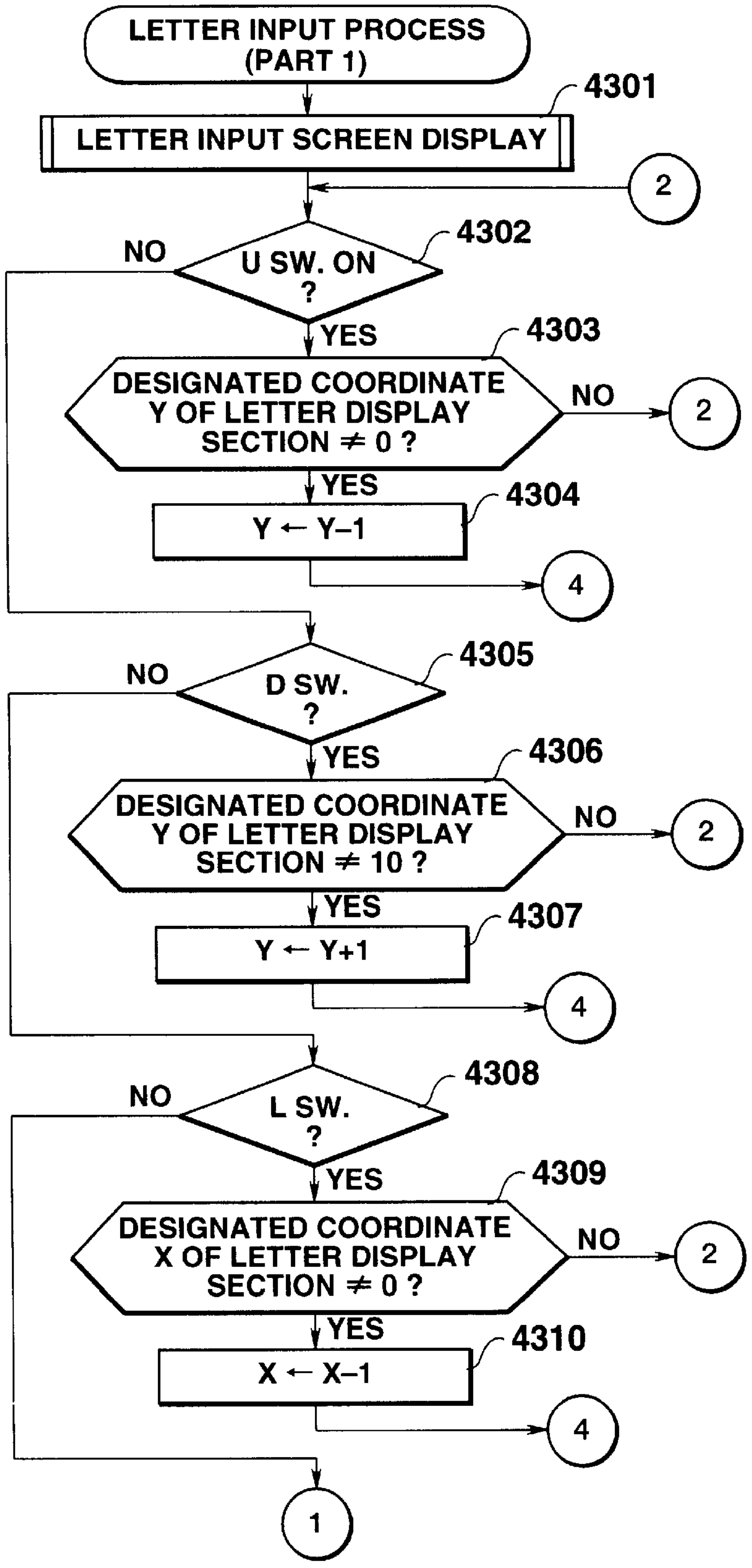
FIG. 43 is a flow chart for a letter input process (part 1)
Figure 44:
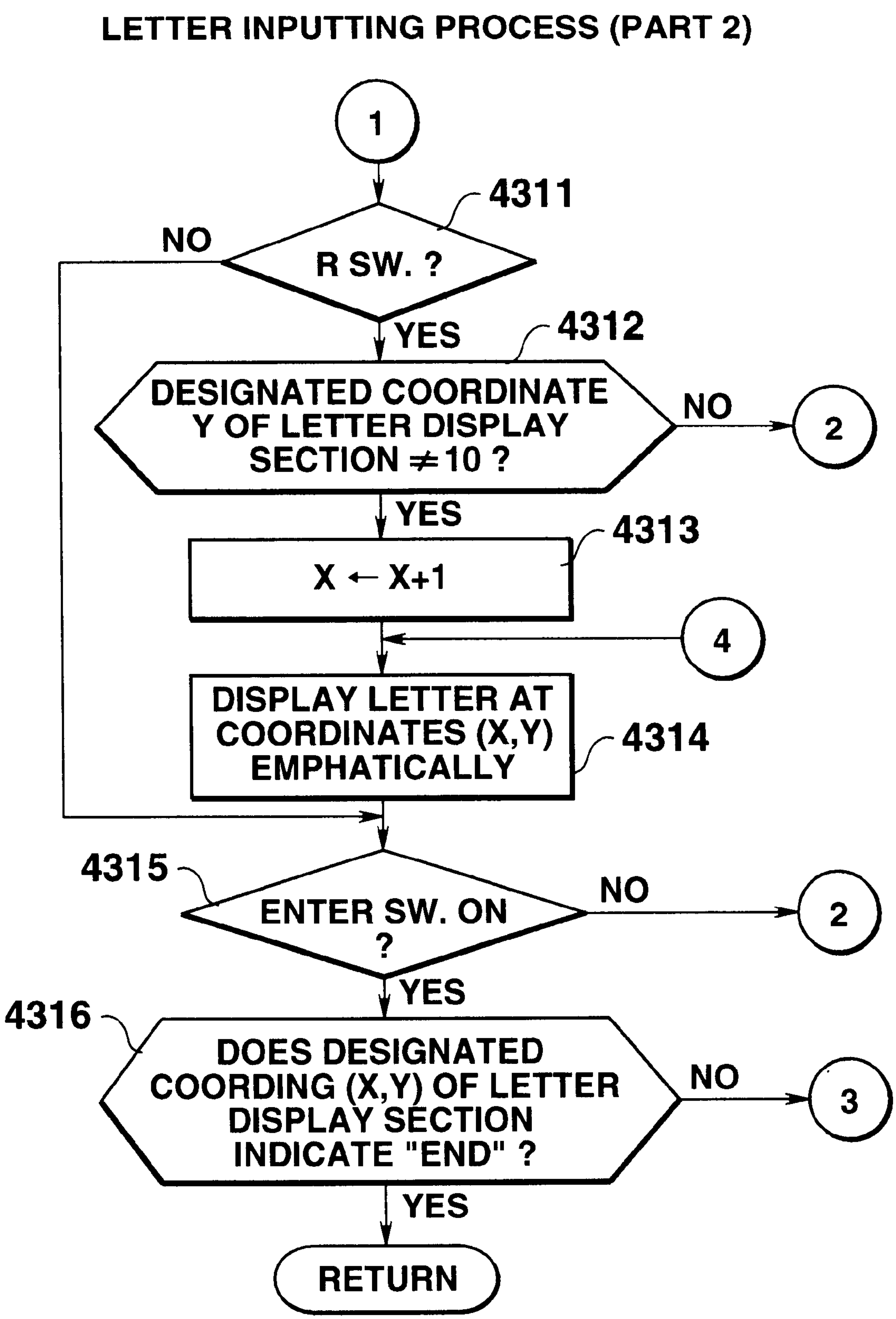
FIG. 44 is a flow chart for the letter input process (part 2)
Figure 45:
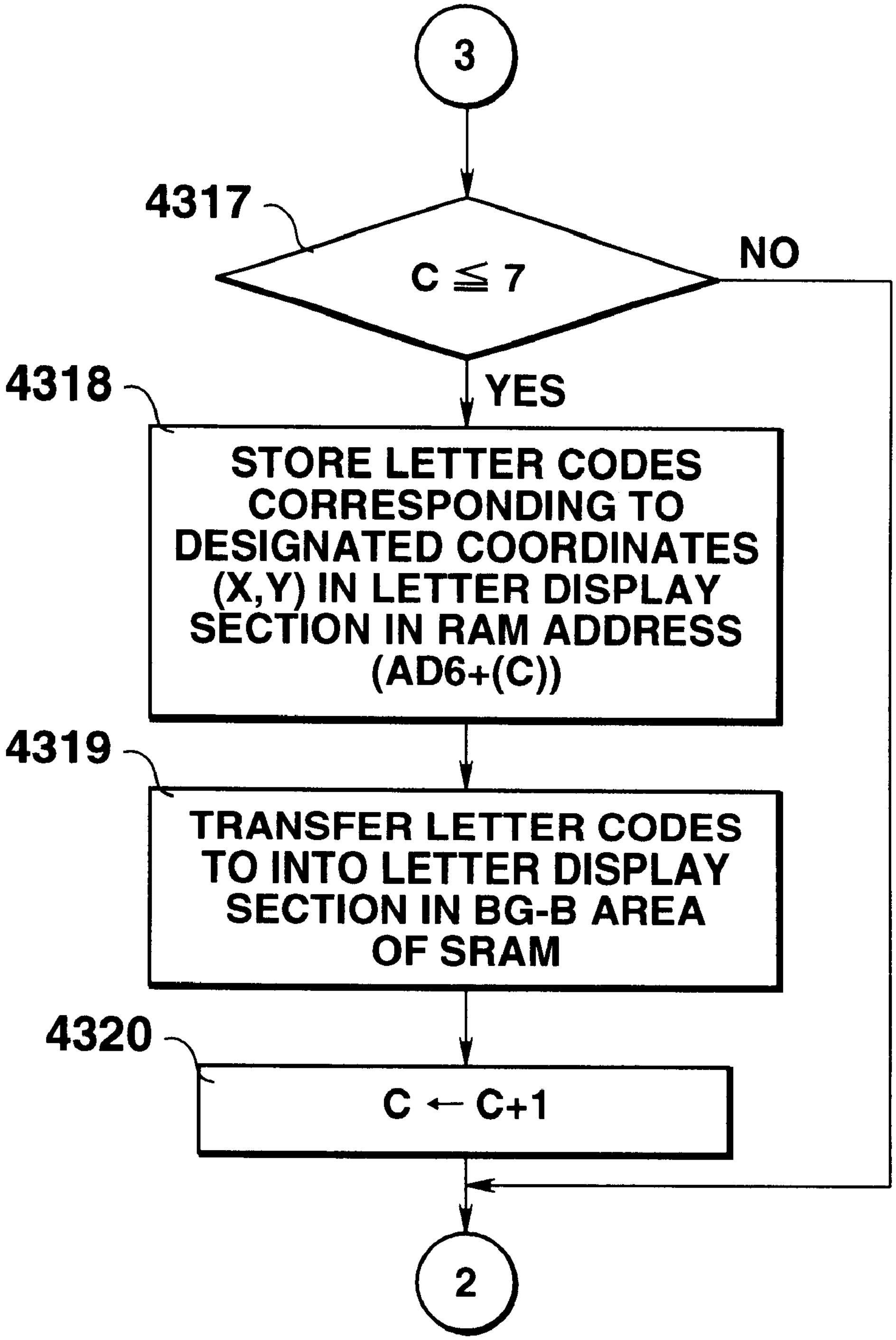
FIG. 45 is a flow chart for the letter input process (part 3)

FIGS. 43–45 are operational flow charts indicative of the processing on a letter input display screen performed at step 1308 of FIG. 13. The user can input a file title to be saved on this letter input display screen.

As described above, when the user turns on ENTER switch 202 in a state where the "SAVE" icon (FIG. 51) has been displayed emphatically in the face image creation process at step 1306 of FIG. 13, a value "3" is set as a mode number in register MODE at step 2904 of FIG. 29 to thereby terminate the face image creation process at step 1306 of FIG. 13. As a result, after the determination at step 1307 of FIG. 13, a letter inputting process at step 1308 is performed. (0313)

First, at step 4301 of FIG. 43, the letter input display screen displaying process is performed, which is similar to the process at step 3401 of FIG. 34 in the face image creation process at step 1306 of FIG. 13, and is indicated as an operational flow chart of FIG. 40. As a result, VDP 102 having the structure of FIG. 3 displays image data for the letter input display screen transferred to the respective BG-A and -B plane memory areas of SRAM 103 in a format of FIG. 58 on the television set 111, as described above.

One of the features of the present invention is that the letter input display screen is the same in format as that displayed in the letter input display screen displaying process at step 3401 of FIG. 34 in the face image creation process at step 1306 of FIG. 13 for inputting the speech sentence into the speech frame. Thus, the letter input display screen for inputting a letter string of a speech sentence and the letter input display screen for inputting a file title to be saved are not required to be made up in separate data formats, and the memory capacity is reduced and the cost is reduced compared to the prior art.

Figure 67:
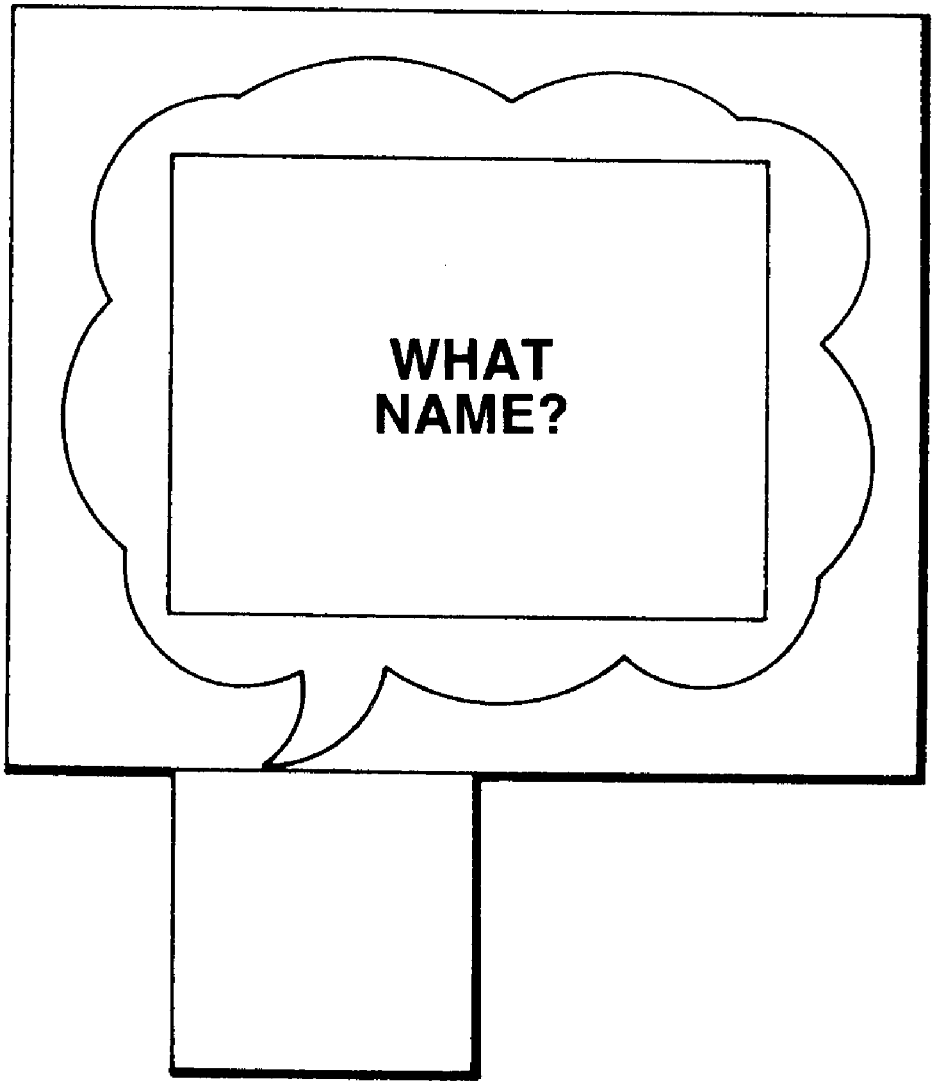
FIG. 67 illustrates the contents of an explanatory balloon in a letter inputting screen.

In this case, the contents of the explanatory balloon which are displayed are not those of FIG. 58, but those of FIG. 67. Thus, it is easily discerned whether a letter string of a speech sentence is being input at present or a letter string of the file title to be saved is being input, so that operability for a low-aged user is greatly improved, which is another feature of the present invention.

Thereafter, when the user turns on up switch 203, down switch 204, left switch 205 or right switch 206 on the letter input display screen, the cursor moves up, down, right or left on the letter display screen of FIG. 58 to thereby select letters for the tile of the file freely.

When the user turns on up switch 203 in a state where the letter input display screen has been displayed, the determination at step 4302 of FIG. 43 becomes NO.

Unless the value of register Y indicative of a vertical letter position in the letter display is "0" indicative of the uppermost line, the determination at step 4303 becomes YES and the value of register Y is decremented by one at step 4304.

Subsequently, at step 4314 of FIG. 44, the letter in the letter display indicated by the values of registers X and Y is displayed emphatically. More specifically, CPU 101 replaces data on cells corresponding to the above letter among the cells which constitute the background image of the letter input display screen, data on the background image being stored in the BG-B plane memory area of SRAM 103, with data on cells for emphatic display. For example, CPU 101 replaces data on cells corresponding to a letter in the letter display indicated by the value of register X and the value of register Y+1 with data on cells for regular display. As a result, the letter position in the letter display is moved up by one line.

Thereafter, the determination at step 4315 of FIG. 44 becomes NO and the control returns to step 4302 of FIG. 43. If the value of register Y is "0" indicative of the uppermost line, the determination at step 4303 becomes NO and the process at step 4304 is not performed. Thus, the control returns to step 4302 and the operation of the up switch 203 is invalidated.

When the user turns on DOWN switch 204 in a state where the letter input display screen has been displayed, the determination at step 4302 of FIG. 43 becomes NO and the determination at step 4305 becomes YES.

Unless the value of register Y indicative of a vertical direction letter position is "10" indicative of the lowermost line, the determination at step 4306 becomes YES and the value of register Y is incremented by one at step 4307.

Subsequently, at step 4314 of FIG. 44, the letter in the letter display indicated by the values of registers X and Y is displayed emphatically, and the emphatic display of the letter in the letter display indicated by the value of register X and the value of register Y−1 is released. As a result, the letter position in the letter display is moved down by one line in the letter display.

Thereafter, the determination at step 4315 of FIG. 44 becomes NO and the control returns to step 4302 of FIG. 43.

If the value of register Y indicates "10" which indicative of the lowermost line, the determination at step 4306 becomes NO and the process at step 4307 is not performed, the control returns to the process at step 4302, where the operation of down switch 204 is invalidated.

When the user turns on left switch 205 in a state where the letter input display screen has been displayed and the cursor is in the letter display, the determination at steps 4302 and 4305 of FIG. 43 become NO and the determination at step 4308 then becomes YES.

Unless the value of register X which indicates a horizontal direction letter position in the letter display is "0" which indicates the leftmost line, the determination at step 4309 becomes YES and at step 4310 the value of register X is decremented by one.

Subsequently, at step 4314 of FIG. 44 the letter in the letter display indicated by the values of registers X and Y is displayed emphatically, and the emphatic display of the letter in the letter display indicated by the value of register X+1 and the value of register Y is released. As a result, the letter position in the letter display is moved by one line to the left.

Thereafter, the determination at step 4315 of FIG. 44 becomes NO and the control returns to the process at step 4302 of FIG. 43.

If the value of register X is "0" indicative of the leftmost line, the determination at step 4309 becomes NO and the process at step 4310 is not performed. Thus, the control returns to the process at step 4302, where the operation of the left switch 205 is invalidated.

When the user turns on right switch 206 in a state where the letter input display screen has been displayed and the cursor is in the letter display, the determination at steps 4302, 4305, 4308 of FIG. 43 become NO and the determination at step 4311 of FIG. 44 becomes YES.

Unless the value of register X which indicates a horizontal-direction letter position in the letter display is "10" which indicates the rightmost line, the determination at step 4312 becomes YES and at step 4313 the value of register X is incremented by one.

Subsequently, at step 4314 the letter in the letter display indicated by the values of registers X and Y is displayed emphatically, and the emphatic display of the letter in the letter display indicated by the value of register X−1 and the value of register Y is released. As a result, the letter position in the letter display is moved by one line to the right.

Thereafter, the determination at step 4315 of FIG. 44 becomes NO and the control returns to the process at step 4302 of FIG. 43.

If the value of register X is "10" indicative of the rightmost line, the determination at step 4312 becomes NO and the process at step 4313 is not performed. Thus, the control returns to the process at step 4302, where the operation of the right switch 205 is invalidated.

When the user turns on ENTER switch 202 in a state where the letter input screen has been displayed and a letter other than the end letter (FIG. 58) has been displayed emphatically, the determination at steps 4302, 4305 and 4308 of FIG. 43, and the determination at step 4311 of FIG. 44 become NO, the determination at step 4315 becomes YES, and the determination at step 4316 becomes NO.

As a result, the determination at step 4317 of FIG. 45 is performed, in which it is determined whether the value of register C indicative of the letter position in the input letter display of the letter input display screen of FIG. 58 indicates a value not larger than "7" corresponding to 8 letters which is the maximum letter length of the title of the file. The value of register C (not shown) is reset at 0 when the letter inputting process at step 1308 of FIG. 13 starts to be performed.

If the value of register C is not larger than "7" and the determination at step 4317 is YES, the process at step 4318 and subsequent ones are performed. When the value of register C is larger than "8" and the determination at step 4317 becomes NO, no more letters of the title of the file are input.

At step 4318, CPU 101 stores a letter code corresponding to a letter allocated to a position in the letter display indicated by the values of registers X and Y in address area {AD6+(C)} of work RAM 108 of FIG. 9 where (C) denotes the value of register C, which changes from 0 to 7, so that the range of the address area in which the letter code is stored is {AD6}–{AD6+7}.

Subsequently, at step 4319, letter image data corresponding to a letter allocated to the position in the letter display indicated by the values of registers X and Y is transferred to a letter position in the input letter display indicated by the value of register C+1. More specifically, CPU 101 transfers the letter image data through CPU interface 301, address bus 315, data bus 316 and SRAM interface 302 to cells corresponding to the above letter among the cells which constitute the background image of the letter input display screen, data on the background image being stored in the BG-B plane memory area of SRAM 103. The letter image data is contained in the BG-B plane image data in program/data ROM 107 of FIG. 6. As a result, the letter displayed emphatically in the letter display when ENTER switch 202 was turned on is displayed additionally in the input letter display.

Thereafter, at step 4320, the value of register C is incremented by one and the control returns to step 4302 of FIG. 43.

Last, when the user turns on ENTER switch 202 in a state where the letter input screen has been displayed and the end letter (FIG. 58) has been displayed emphatically in the letter display, the determination at steps 4302, 4305 and 4308 of FIG. 43 becomes NO, the determination at step 4311 of FIG. 44 becomes NO and the determination at steps 4315 and 4316 become YES to terminate the letter input process at step 1308 of FIG. 13.

As a result, a letter code string having a file title of a maximum eight-letter sentence which the user input is obtained in address areas {AD6}–{AD6+7} in work RAM 108.

Flow of a File Save Process

Figure 46:
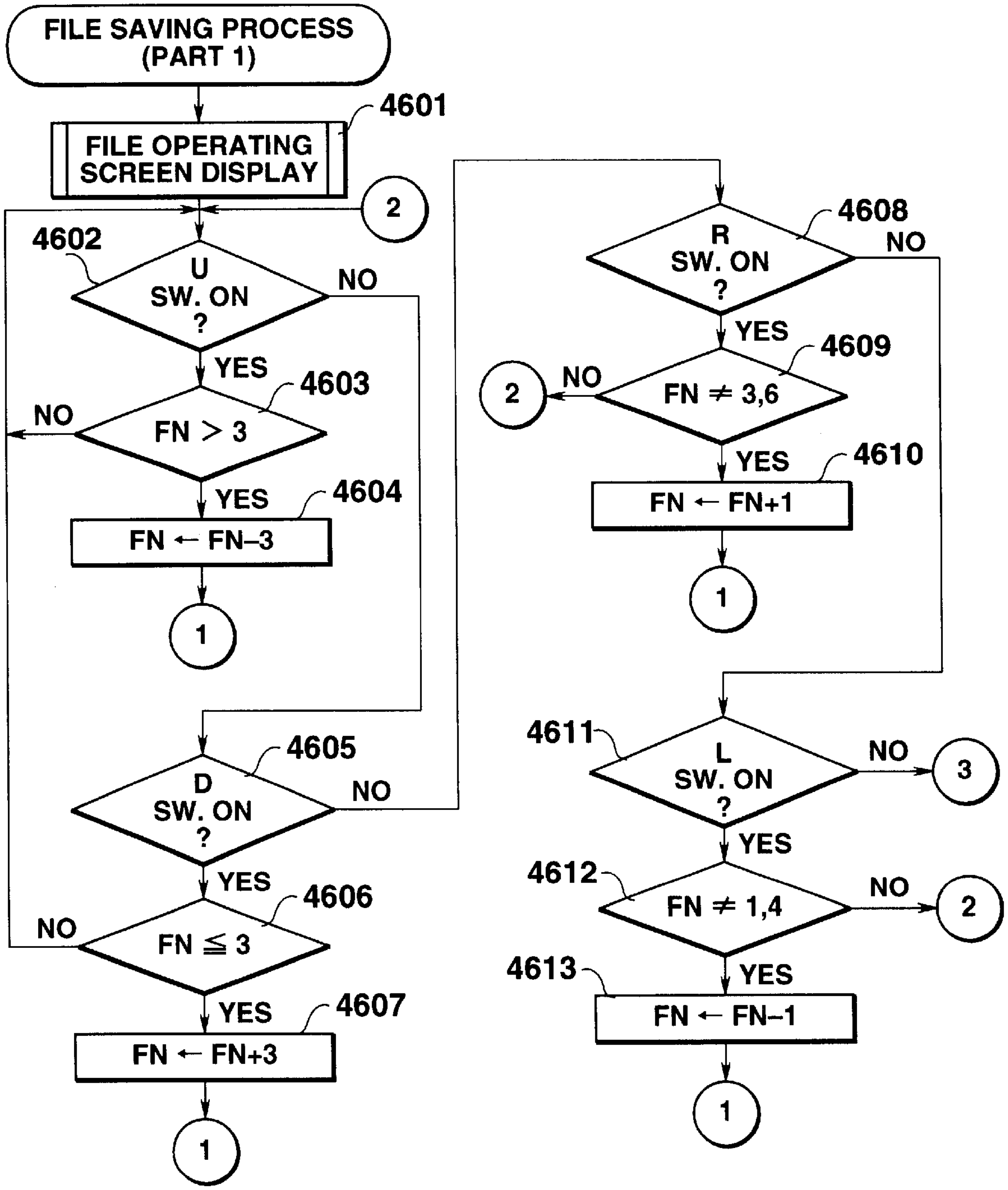
FIG. 46 is a flow chart for a file saving process (part 1)
Figure 47:
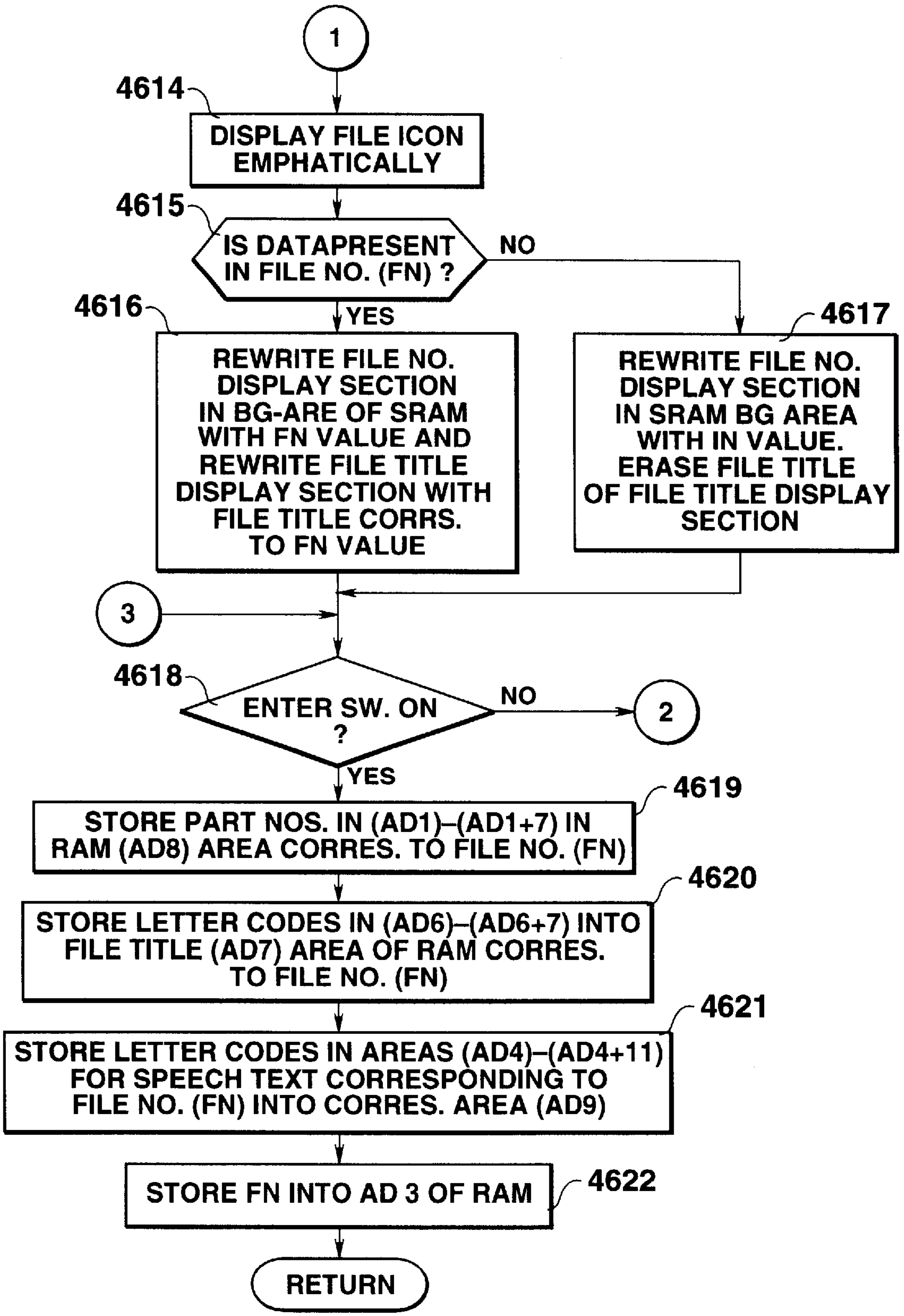
FIG. 47 is a flow chart for the file saving process (part 2)
Figure 48:
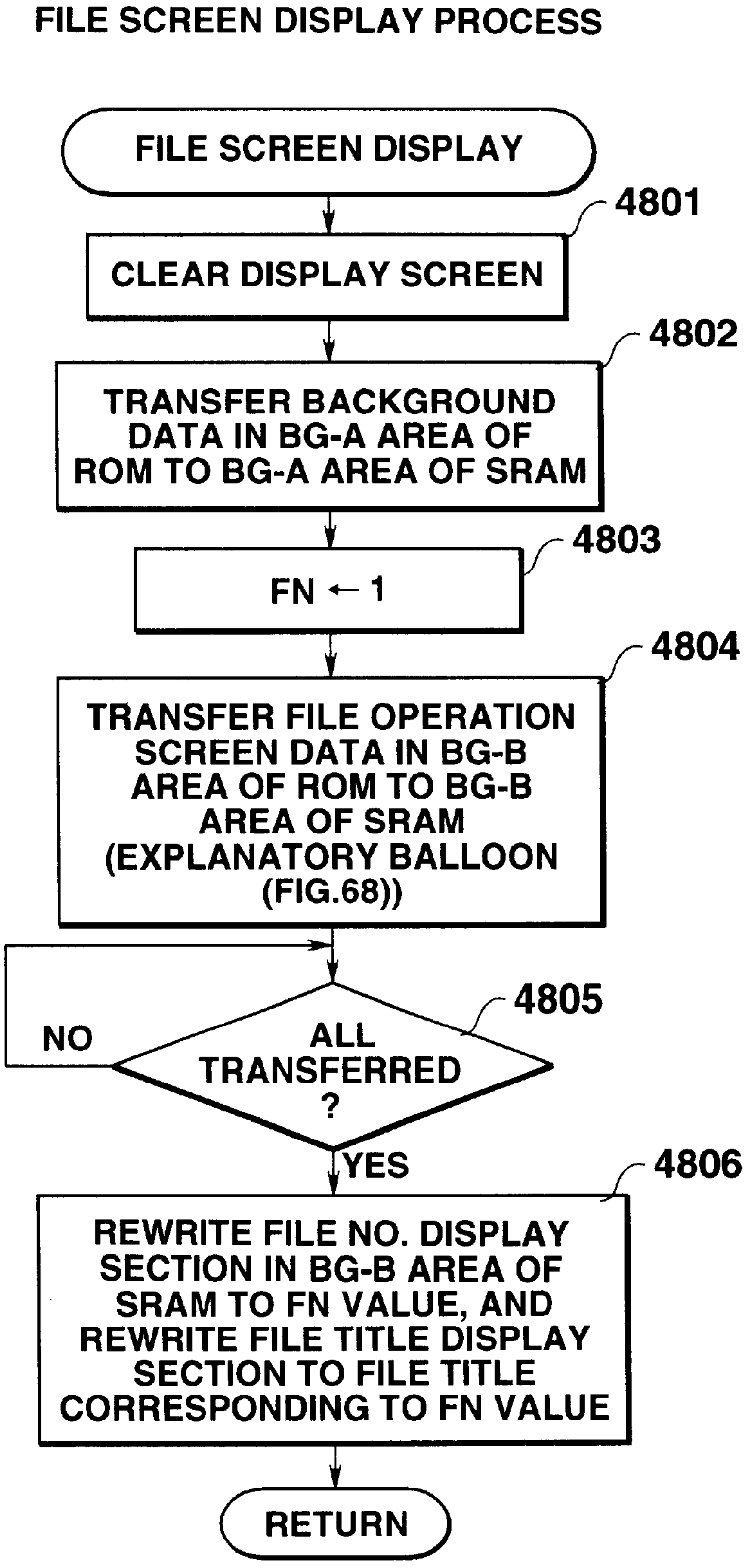
FIG. 48 is a flow chart for a file screen display process.

FIGS. 46–48 are an operational flow chart indicative of a file save process performed at step 1309 of FIG. 13. The user can save the image data file of a portrait, which the user created, in work RAM 108 which is backed up by buttery, on the file operation display screen displayed in the process of the flow chart.

The file operation display screen is similar to that of FIG. 49 displayed in the file loading process at step 1304 of FIG. 13. In this case, the current file number display and file title display which display the current selected file number and title, respectively, file icons 1–6 which display the kind of file as pictures, and a helper which includes a picture of an explanatory balloon and a doll are displayed on the television screen 111.

On the file operation display screen, the user can turn on up switch 203 or down switch 204 on the control pad 112 to select a file group to be saved between a group of file icons 1–3 and a group of file icons 4–6. By turning on left switch 205 or right switch 206 on control pad 112, the user can select any one of the file icons of the current selected group as a file to be saved. Thus, the selected file icon is displayed emphatically, the current file number display changes to a number corresponding to that file icon and the title displayed in the file title display changes to the file title which the user input at step 1308 of FIG. 13. When the user turns on ENTER switch 202 on control pad 112 in this state, data on the portrait is saved at a storage area in a file corresponding to the file icon.

The details of operational flow charts of FIGS. 46–48 will be described next. First, at step 4601 of FIG. 46, a file operation display screen display process is performed, the details of which are shown as an operational flow chart of FIG. 48.

In FIG. 48, at step 4801, CPU 101 instructs VDP 102 to clear the output display screen. As a result, the display screen of television set 111 is cleared.

At step 4802, CPU 101 transfers background data (see the file operation display screen of FIG. 5) which is the BG-A plane background image data in program/data ROM 107 of FIG. 6 to the BG-A plane memory area of SRAM 103 through CPU interface 301, address bus 315, data bus 316 and SRAM interface 302.

At step 4803 a value "1" is preset in register FN indicative of the file number.

Figure 68:
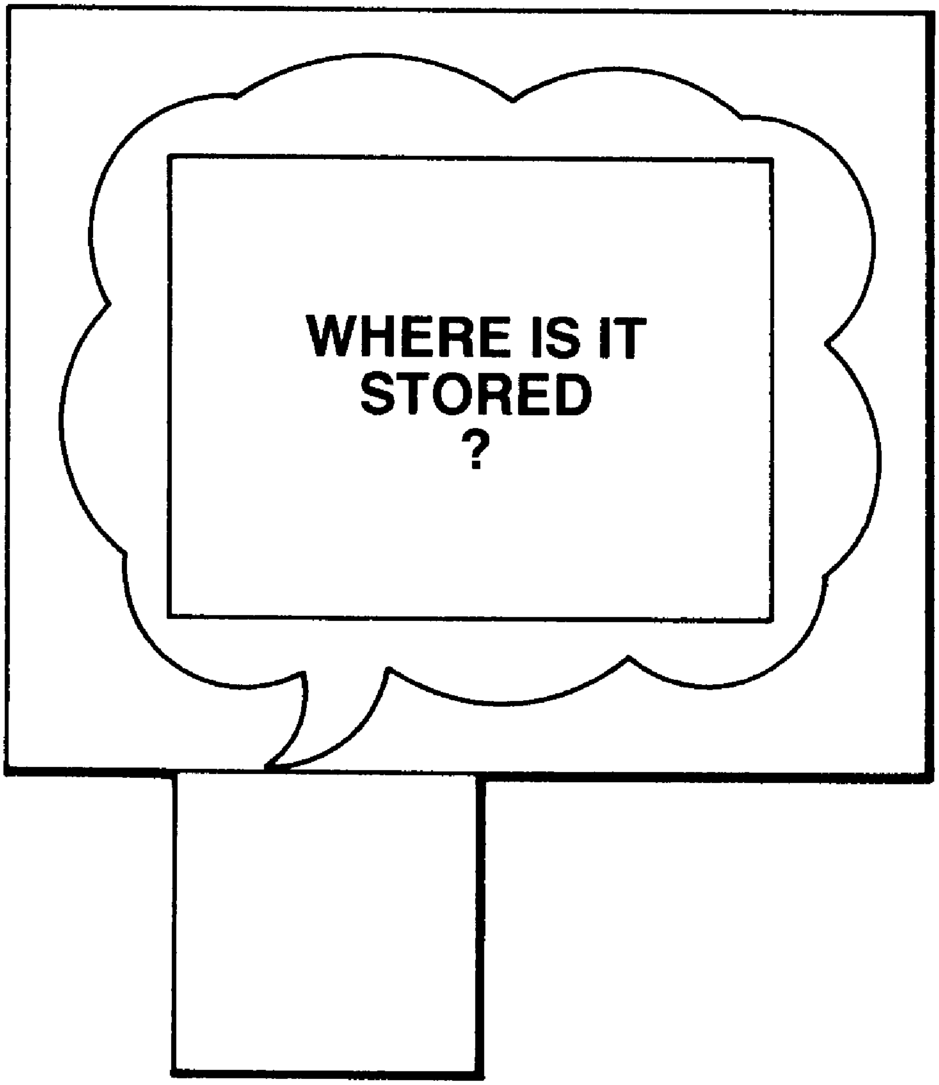
FIG. 68 illustrates the contents of an explanatory balloon in a file saving process.

At step 4804 as at step 4802, CPU 101 transfers file operation display screen data (system display screen data) which is the BG-B plane background image data in program/data ROM 107 of FIG. 6 through CPU interface 301, address bus 315, data bus 316 and-SRAM interface 302 to the BG-B plane memory area of SRAM 103 (see file operation display screen of FIG. 5). Thus, the file operation display screen of FIG. 49 is displayed on the television set 111. The contents of FIG. 68 are displayed as the initial display of the explanatory balloon.

At step 4805, it is determined whether the above series of transfer processes has ended. If so, only data on cells corresponding to the current file number display and file title display sections (FIG. 49) among the cells which constitute the background image of the file operation display screen, data on the background image being stored in the BG-B plane memory area of SRAM 103, is replaced with data indicative of the contents of those corresponding to a value "1" of register FN. More specifically, CPU 101 transfers image data indicative of a numeral "1" corresponding to the value "1" of register FN as the cells of the current file number display section to a corresponding area of SRAM 103 and transfers file title image data stored in address areas {AD7}–{AD7+7} of six address areas stating at AD7 of FIG. 9 in work RAM 108 and corresponding to the value "1" of register FN to corresponding areas of SRAM 103.

Thereafter, CPU 101 terminates the file operation display screen display process at step 4601 of FIG. 46. As a result, the initial file operation display screen which indicates the current file number display and file title display which display the file number "1" and its file title, respectively, file icons 1–6 which display file icon 1 emphatically, and a helper which includes a picture of an explanatory balloon and a doll indicating a contents of FIG. 68 is displayed on television set 111.

When the user turns on down switch 204 on control pad 112 in such state, the determination at step 4606 of FIG. 46 becomes YES. If one of file icons 1–3 (FIG. 49) as the group has been selected at this time, and the value of register FN indicative of the file number is not more than 3, the determination at step 4606 becomes YES and the value of register FN is incremented by three at step 4607. As a result, the group of file icons has moved from the group of file icons 1–3 to the group of file icons 4–6. Thereafter, in order to change the display, the processes at steps 4614–4617 of FIG. 47 are performed. If a file icon (FIG. 49) of the group of file icons 4–6 has been selected when down switch 204 is turned on and the value of register FN indicative of the file number is not less than "3", the determination at step 4606 becomes NO and the contents of the display are not changed and the control returns to the process at step 4602.

When the user turns on upper switch 203 on control pad 112, the determination step 4602 of FIG. 46 becomes YES. If at this time, one of file icons 4–6 (FIG. 49) has been selected and the value of register FN indicative of the file number is more than 3, the determination at step 4603 becomes YES and at step 4604 the value of register FN is decremented by three. As a result, the group of file icons moves from the group of file icons 4–6 to the group of file icons 1–3. Thereafter, in order to change the display, the processes at steps 4614–4617 of FIG. 47 are performed. If a file icon of the group of file icons 1–3 (FIG. 49) has been selected when upper switch 203 is turned on and the value of register FN indicative of the file number is not more than "3", the determination at step 4603 becomes NO and the contents of the display are not changed and the control returns to the process at step 4602.

When the user turns on left switch 205 on control pad 112, the determination step 4611 of FIG. 46 becomes YES. If at this time, left-end file icons 1 and 4 (FIG. 49) have not been selected and the value of register FN is neither 1 nor 4, the determination at step 4612 becomes YES and at step 4613 the value of register FN is decremented by one. As a result, a file icon to be selected moves by one to the left. Thereafter, in order to change the display, the processing at steps 4614–4617 of FIG. 47 is performed. If left-end file icon 1 or 4 has been selected when left switch 205 is turned on and the value of register FN is either 1 or 4, the determination at step 4612 becomes NO and the contents of the display are not changed and the control returns to the process at step 4602.

When the user turns on right switch 206 on control pad 112, the determination step 4608 of FIG. 46 becomes YES. If at this time, right-end file icons 3 and 6 (FIG. 49) have not been selected and the value of register FN is neither 3 nor 6, the determination at step 4609 becomes YES and at step 4610 the value of register FN is incremented by one. As a result, a file icon to be selected moves by one to the right. Thereafter, in order to change the display, the processes at steps 4614–4617 of FIG. 47 are performed. If right-end file icon 3 or 6 has been selected when right switch 206 is turned on and the value of register FN is either 3 or 6, the determination at step 4609 becomes NO and the contents of the display are not changed and the control returns to the process at step 4602.

After processes at any one of step groups 4605–4607, 4602–4604, 4611–4613 or 4608–4610 of FIG. 46, only the file icon corresponding to the value of register FN is newly displayed emphatically at step 4614 of FIG. 47. More specifically, CPU 101 replaces data on cells corresponding to the file icon which, in turn, corresponds to the value of register FN among the cells which constitute the background image of the file operation display screen, data on the background image being stored in the BG-B plane memory area of SRAM 103, with data on cells for emphatic display. For example, CPU 101 replaces data on cells for the file icon displayed emphatically so far which corresponds to the original value of register FN with data on the cells for regular display.

Next, at step 4615, it is determined whether a file has been stored at an address in work RAM 108 corresponding to the file number of the register FN value. More specifically, CPU 101 determines whether an effective file title has been stored in $\{AD7+\{(FN)-1\}\times 8\}$ to $\{AD7+\{(FN)-1\}\times 8+7\}$ of address areas starting AD7 of work RAM 108 of FIG. 9 and corresponding to the value of register FN, where (FN) denotes the value of register FN.

If there is a file corresponding to a file number of the register FN value and the determination at step 4615 is YES, CPU 101 replaces only cells corresponding to the current file number display section and file title display section (FIG. 49) among the cells which constitute the background image of the file operation display screen, data on the background image being stored in the BG-B plane memory area of SRAM 103, with image data corresponding to the value of register FN (step 4616). More specifically, CPU 101 transfers data on the image of a numeral corresponding to the register FN value to a corresponding area of SRAM 103 as data on the cells of the current file number display section, and also transfers, as data on the cells of the file title display section, data on the file title image stored in address areas $\{AD7+\{(FN)-1\}\times 8\}$ to $\{AD7+(FN)-1\}\times 8+7\}$ corresponding to the register FN value among the six address areas starting at AD7 of FIG. 9 in work RAM 108 to corresponding areas of SRAM 103.

Thereafter, the determination at step 4618 becomes NO and the control returns to the process at step 4602 of FIG. 46.

If there is no file having a file number corresponding to the register FN value and the determination at step 4615 of FIG. 47 is NO, CPU 101 changes only data on cells corresponding to the current file number display section and file title display section (FIG. 49) among the cells which constitute the background image of the file operation display screen, data on the background image being stored in the BG-B plane memory area of SRAM 103 (step 4617). More specifically, CPU 101 transfers data on the image of a numeral corresponding to the register FN value as data on the cells of the current file number display section to a corresponding area of SRAM 103, and also transfers data on the image of a blank as data on the contents of the cells of the file title display section to a corresponding area of SRAM 103.

Thereafter, the determination at step 4618 becomes NO and the control returns to step 4602 of FIG. 46.

Last, when the user turns on ENTER switch 202 on control pad 112 in a state where any one of the file icons has been displayed emphatically and the current file number display and file title display area correspond in display content to that icon, the determination at steps 4602, 4605, 4608 and 4611 of FIG. 46 become NO and the determination at step 4618 of FIG. 47 becomes YES.

As a result, at step 4619, CPU 101 stores data on numbers of 8 kinds of parts stored in address areas $\{AD1\}-\{AD1+7\}$ of FIG. 9 in work RAM 108 into address areas $\{AD8+8\times((FN)-1)\}$ to $\{AD8+8\times((FN)-1)+7\}$ of FIG. 9 in work RAM 108 corresponding to the value of register FN.

At step 4620, CPU 101 stores data on letter codes which make up the file title stored in address area $\{AD6\}$ to $\{AD6+7\}$ of FIG. 9 in work RAM 108 at step 1308 of FIG. 45 in the letter input process at step 1308 of FIG. 13 on the basis of the user's letter inputting operation into address areas $\{AD7+8\times((FN)-1)\}$ to $\{AD8+8\times((FN)-1)+7\}$ of FIG. 9 in work RAM 108 corresponding to the value of register FN.

Subsequently, at step 4621, CPU 101 stores data on codes of input letters which make up a speech sentence stored in address areas {AD4}–{AD4+11} of FIG. 9 in work RAM 108 into address areas {AD9+12×((FN)−1)} to {AD9+12×((FN)−1)+11} of FIG. 9 in work RAM 108 corresponding to the value of register FN.

Last, at step 4622, the value of register FN is stored in address area {AD3} of FIG. 9 in work RAM 108.

After the process at step 4622, the file save process at step 1308 of FIG. 13 is terminated and the control returns to the process at step 1306 of FIG. 13.

<Modification>

While in the first embodiment the arrangement is such that it is discerned by replacing the contents of the explanatory balloon whether a letter string of a speech sentence is being input or a letter string of the tile of a file to be saved is being input at present, the present invention is not limited to that arrangement. For example, data on the image of the background (FIG. 5) displayed by the BG-A plane may be replaced with another or a different character may be displayed, using the OBJ-A or -B plane.

Second Embodiment

A second embodiment of the present invention is the same in whole circuit structure, control pad appearance, VDP structure and display screen hierarchy structure as the first embodiment of FIGS. 1–4, and further description thereof will be omitted.

FIG. 71 shows the relationship between kind of image data (part) assigned to each display screen and screen mode. Various image data displayed on BG-A, -B; BM-A, -B; and OBJ-A, -B planes are stored in the data formats of FIGS. 72–74 in program/data ROM 107 of FIG. 1. CPU 101 (FIG. 1) transfers the image data on the BG-A, -B planes; OBJ-A and -B planes from program/data ROM 107 through CPU interface 301, address bus 315, data bus 316 and SRAM interface 302 of FIG. 3 to SRAM 103. Similarly, CPU 101 (FIG. 1) transfers image data on the BM-A and -B from program/data ROM 107 through work RAM 108, CPU interface 301, address bus 315, data bus 316 and DP-RAM interface 303 to SRAM 103. As shown in FIG. 77, CPU 101 writes into work RAM 108 data indicative of image data read from program/data ROM 107 in accordance with the user's operation of control pad 112.

<Outline of the Operation of VDP 102 and CPU 101>

Object generator 304 and background generator 305 of FIG. 3 access SRAM interface 302 at the respective time-divisional timings in each horizontal interval. In this access, object generator 304 reads, from SRAM 103 of FIG. 1, data on color codes of sprites (objects) to be disposed at the respective display coordinates on the OBJ-A and -B planes corresponding to the timings of displaying the respective dots in the next horizontal display interval and stores them in line buffers corresponding to the respective display screens of object generator 304. Similarly, background generator 305 reads, from SRAM 103 of FIG. 1, data on the codes of the color of the background disposed at the respective displayed coordinates on the BG-A and -B planes corresponding to the timings of displaying the respective dots in the next horizontal display interval and stores them in line buffers of background generator 305 corresponding to the respective display screens.

Figure 75:
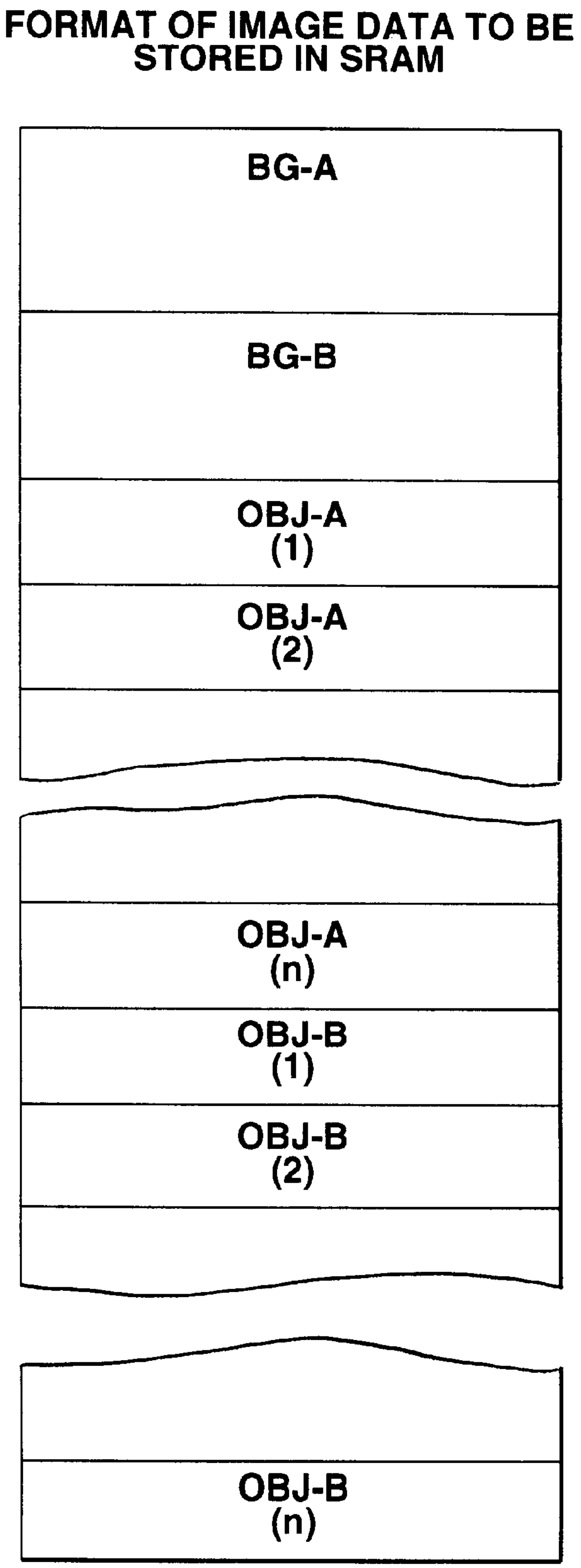
FIG. 75 illustrates a format of image data stored in SRAM.

In the above operation, CPU 101 of FIG. 1 stores in the data format of FIG. 10 data on the coordinates on the OBJ-A or -B plane where the respective sprites (objects), whose maximum number is 128, stored in the data format of FIG. 75 in SRAM 103 of FIG. 1, are disposed through CPU interface 301, address bus 315 and data bus 316 of FIG. 3 into object attribute memory 307 as in the first embodiment. Object generator 304 calculates the respective read timings corresponding to the coordinates of disposition of the respective sprites (objects), data on which is stored in object attribute memory 307 and reads data on the respective sprites (object) from SRAM 103 and stores them in the line buffer at the respective calculated timings.

Bit map generator 306 accesses DP-RAM interface 303 at the respective time-divisional timings in each horizontal interval independent of the accessing operation of object generator 304 and background generator 305. In this access, background generator 305 reads data on color codes of a bit map disposed at the respective display coordinates on the BM-A and -B planes corresponding to the display timings of the respective dots in the next horizontal interval from DP-RAM 104 of FIG. 1 where the data is stored in the format of FIG. 76 and stores the data in the line buffers of bit map generator 306 corresponding to the respective display screens.

In the above manner, data on the color codes of sprites (objects) for the next one line to be disposed in the OBJ-A and -B planes is obtained in two line buffers of object generator 304 in each horizontal interval; data on a color code of the background for the next one line to be disposed in the BG-A and -B planes is obtained in two line buffers of background generator 305; and data on a color code of a bit map for the next one line to be disposed in the BM-A and -B planes is obtained in four line buffers of bit map generator 306.

Also, in the second embodiment, VDP 102 includes a display control register having a data format of FIG. 13.

<Details of the Operation of CPU 101>

The operation of CPU 101 of FIG. 3 will be described in detail with reference to the operational flow charts of FIGS. 78–96, which indicates the operation of CPU 101 in accordance with control programs contained in program/data ROM 107.

Whole Operation Flow

Figure 78:
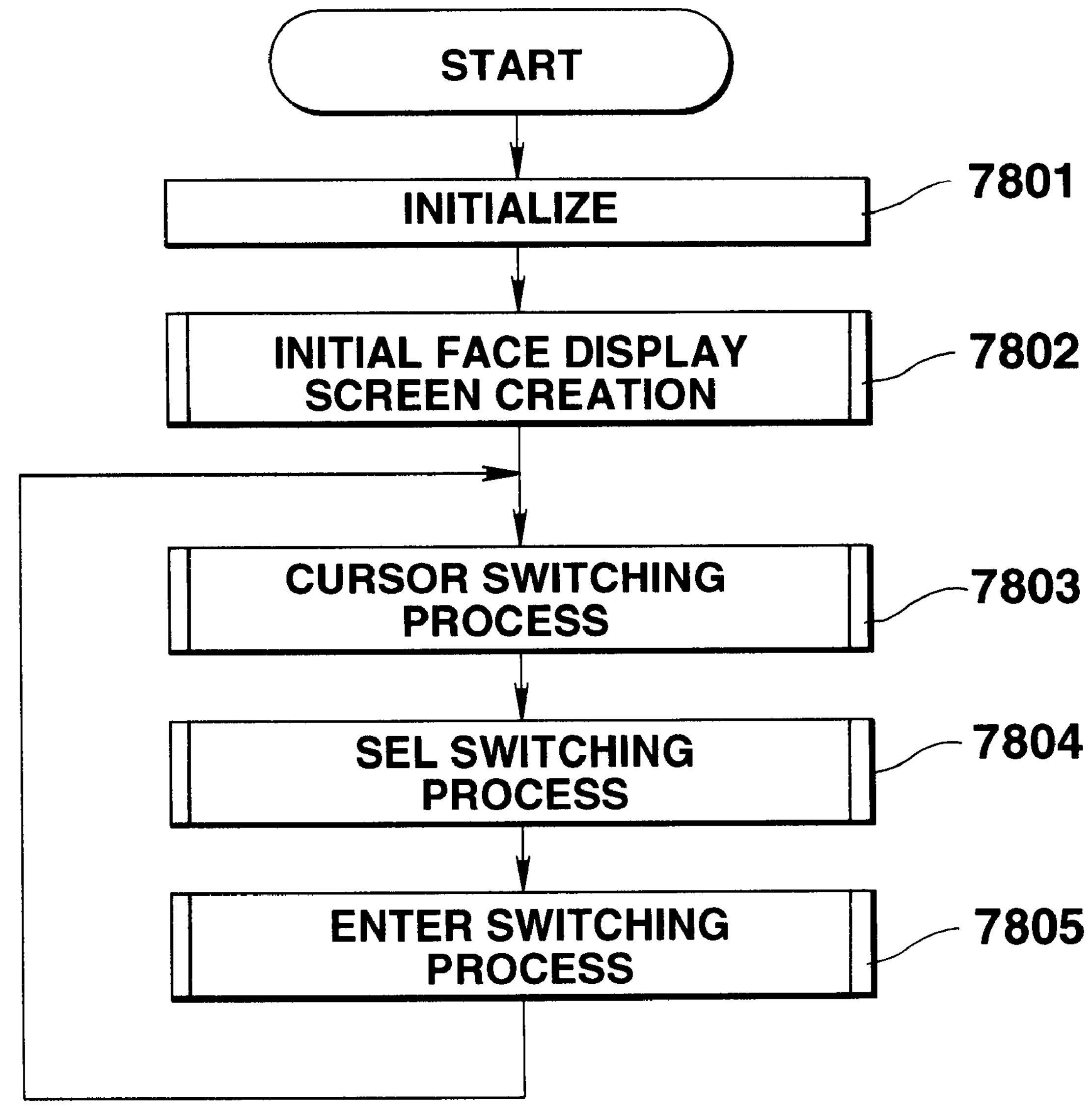
FIG. 78 is a flow chart for the entire operation of the second embodiment of the present invention.

FIG. 78 is a flow chart indicative of the control program which CPU 101 executes.

Figure 97:
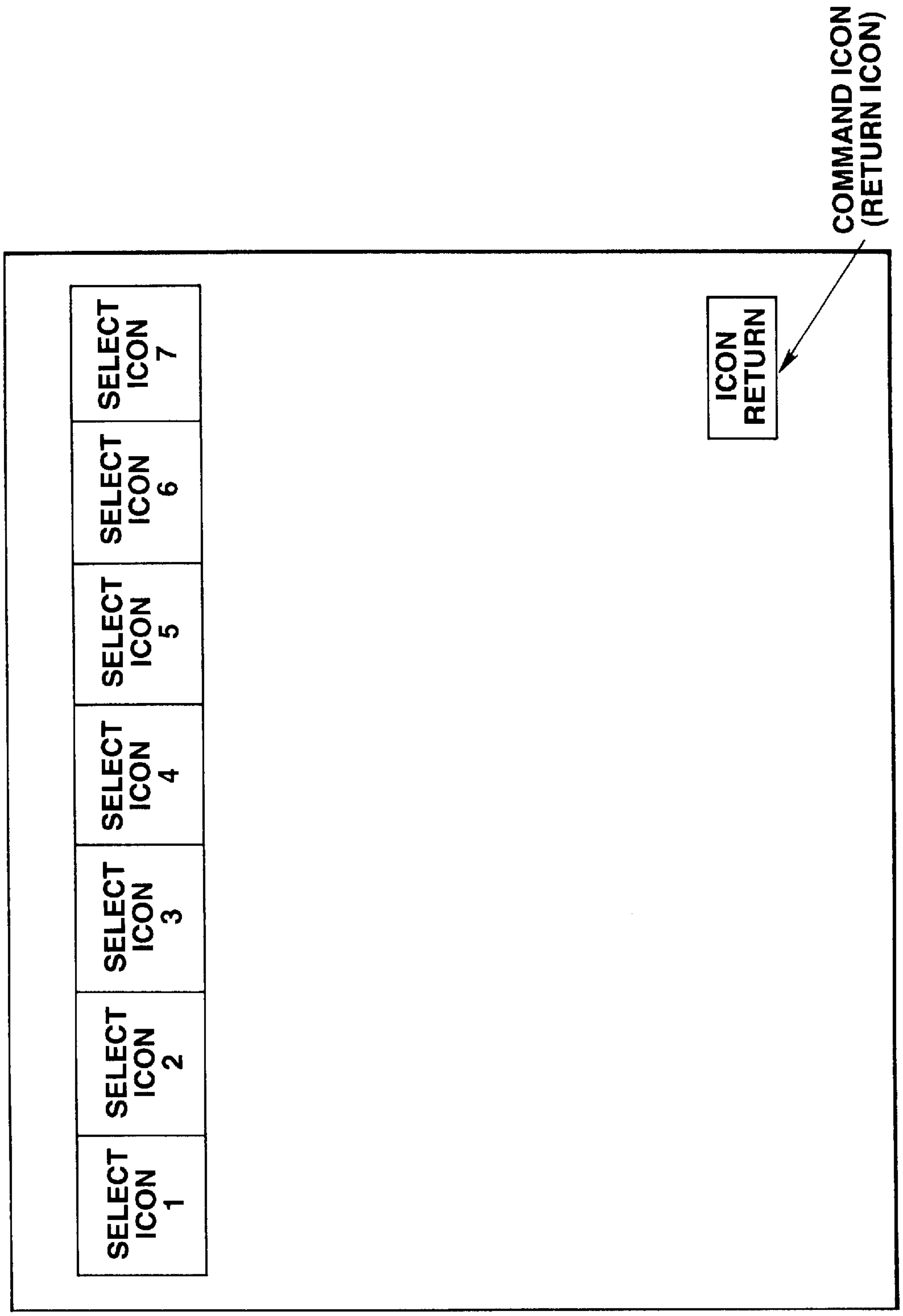
FIG. 97 shows the layout of the BG-B plane in the basic system screen.

When a system power supply (not shown) is turned on, CPU 101 initializes work RAM 108, performs initial setting operations on the respective elements of a sound source processor 105, etc., as required (step 7801), and then performs an initial face image display creation process (step 7802) to thereby display a predetermined portrait on the basic system display screen (FIG. 97). Thereafter, the basic system display screen on which the portrait is displayed is hereinafter referred to as an initial display screen.

After the initial face image creation process has ended, the user turns on some of up, down, right and left switches 203–206 on control pad 112 of FIG. 2 to perform corresponding cursor switch operations (step 7803) and then performs a SEL switch process corresponding to the operation of SEL switch 201 (step 7804).

At step 7805 subsequent to step 7804, an ENTER switching process corresponding to the operations of ENTER switch 202 is performed. Thereafter, the control returns to the process at step 7803.

By repeating the processing at steps 7803–7805, the contents of display on television set 111 are changed in accordance with the respective user's operations on various switches on control pad 112 of FIG. 2. The respective processes at steps 7802–7805 will be described in detail next.

Operational Flow of Initial Face Image Creation Process

Figure 79:
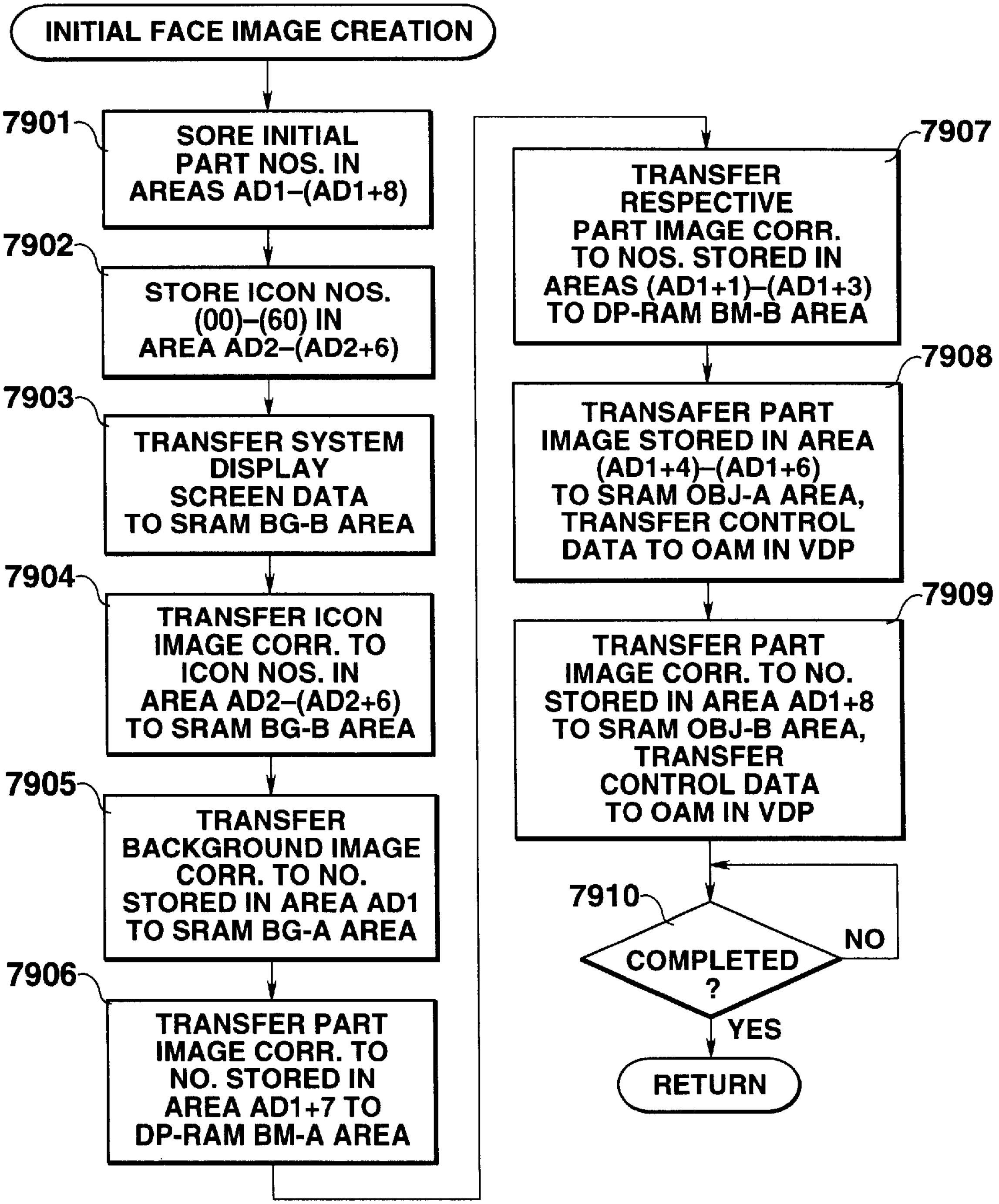
FIG. 79 is a flow chart for an initial face image creation process.

FIG. 79 is an operational flow chart indicative of the initial face image creation process at step 7802.

Figure 72:
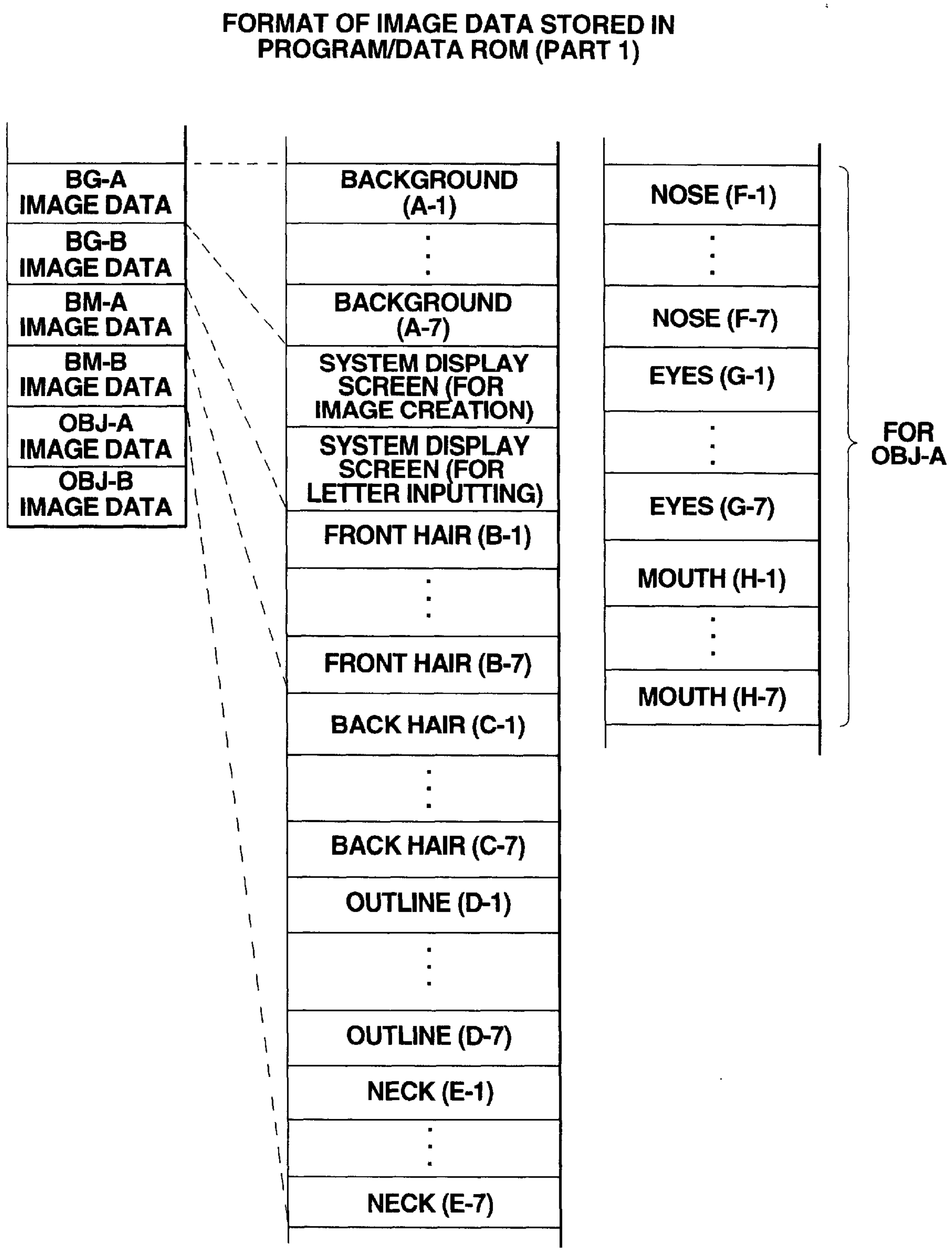
FIG. 72 illustrates a format of image data stored in program/data ROM (part 1)
Figure 73:
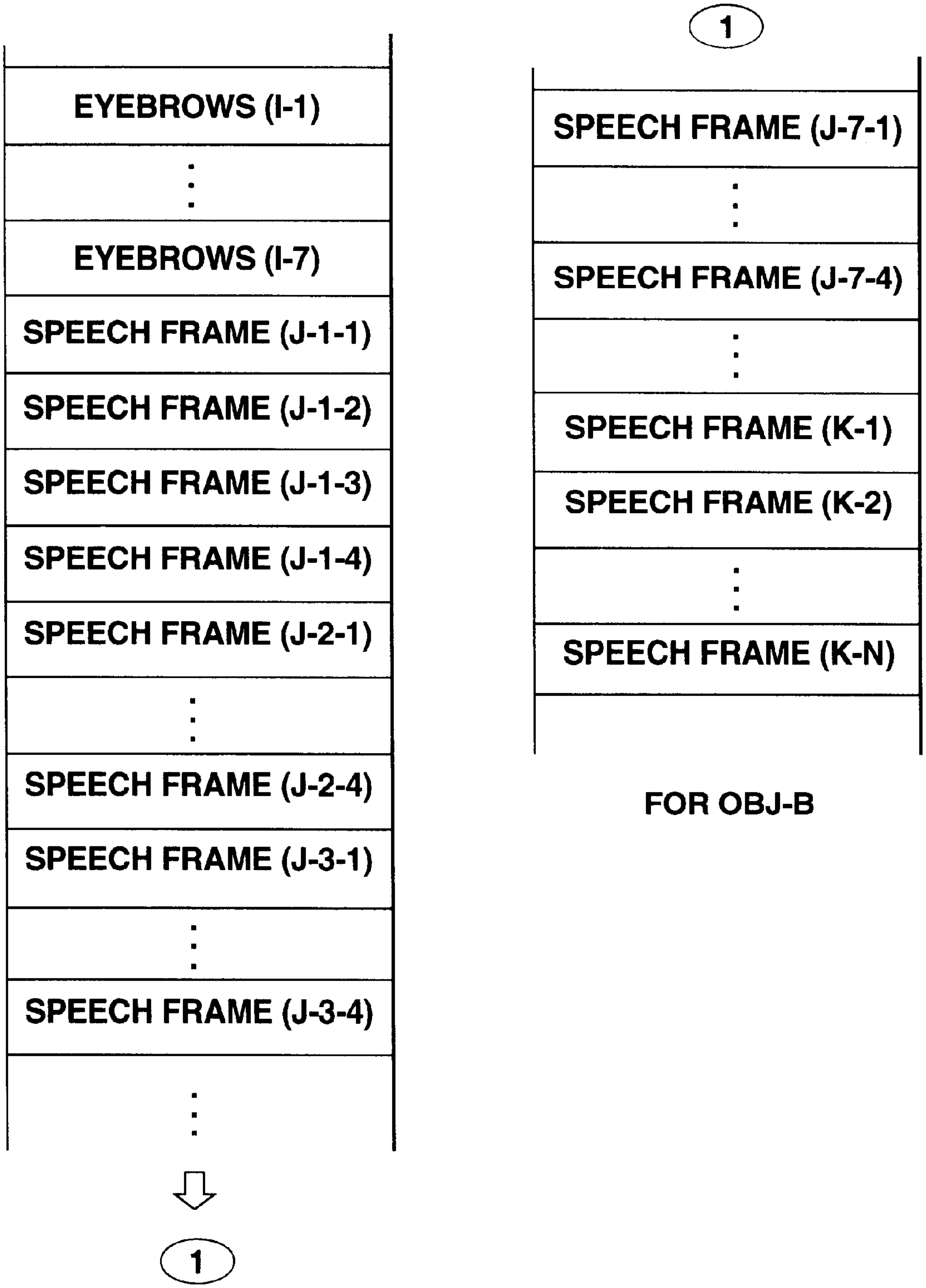
FIG. 73 illustrates the format of image data stored in program/data ROM (part 2)

First, in FIG. 77, in the initial face image creation process, data on initial part numbers is stored in the respective areas of work-RAM 108 indicated by AD1– AD1+8 in FIG. 77 (step 7901). The part numbers designate the respective parts which make up a portrait such as eyes, nose, and front hair. As shown in FIGS. 72–74, image data corresponding to those numbers is read out from program/data ROM 107 where data on the respective part images is contained, as shown in FIGS. 72–74.

In the process at step 7902 subsequent to the process at step 7901, data on icon numbers indicative of select icons for respective parts to be displayed on the initial display screen are stored in the respective areas AD2–AD2+6 in FIG. 77.

The select icons are used to select the respective kinds of parts such as background, back hair, outline, neck, nose, eyes and mouth. When the select icons select the respective kinds of parts, parts which are used for creation a portrait will each be selected from among a corresponding kind of different parts, as will be described later. As shown in FIG. 74, image data for those select icons is stored in program/ data ROM 107. A number to be stored at step 7902 is bracketed as shown by "(00)" in FIG. 74.

At step 7903 subsequent to step 7902, the CPU reads from program/data ROM 107 data on an image to be displayed always such as command icons (returning icons) which make up the BG-M plane (system display screen) as the initial display screen and transfers the image data to BG-B plane memory area of SRAM 103 of FIG. 9. At this time, CPU 101 can also transfer simultaneously image data which displays an explanatory balloon which informs the user of the contents of the operation to be performed.

At step 7904 subsequent to step 7903, the CPU transfers data on the icon image corresponding to the icon numbers stored in areas AD-2 to AD-2+6 in work RAM 108 of FIG. 77 at step 77 of FIG. 79 to the BG-B plane memory area (FIG. 75) of SRAM 103. Then at subsequent step 7905, the CPU transfers data on the background image corresponding to the number stored in address area AD1 of FIG. 77 to an area of the BG-A plane memory area of SRAM 103.

Figure 98:
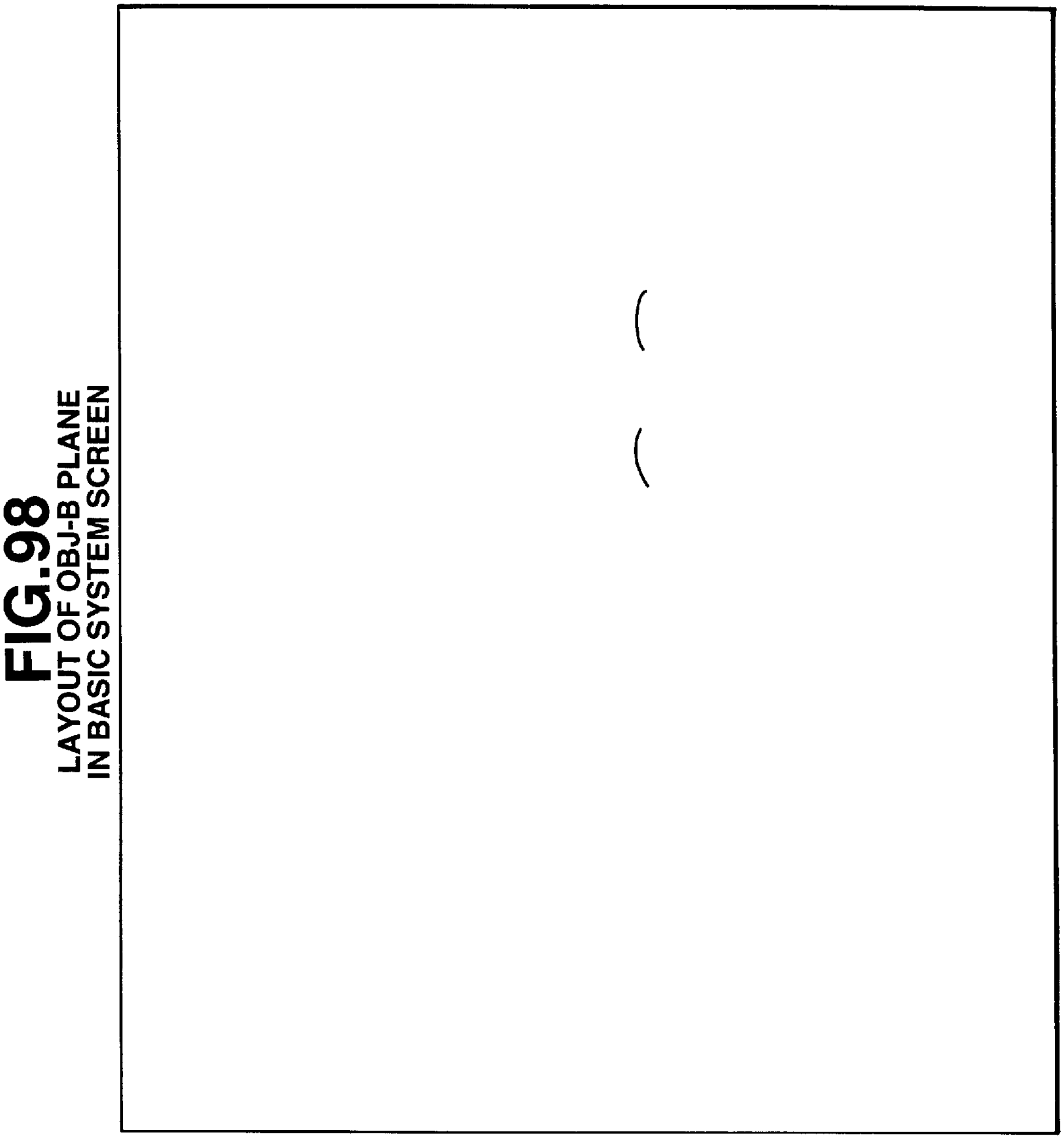
FIG. 98 shows the layout of the OBJ-B plane in the basic system screen.

FIG. 98 shows one example of the layout of the BG-B plane displayed by the image data transferred to SRAM 103 in the processes at steps 7903, 7904. The layout of the GB-A face displayed by the image data transferred to SRAM 103 in the process at step 7905 is similar to that in the first embodiment (FIG. 52). The processes at steps 7903–7905 are realized by the transfer of image data read from program/ data ROM 107 by CPU 101 through CPU interface 301 of VDP 102, address bus 315, data bus 316 and SRAM interface 302 to SRAM 103.

At step 7906 subsequent to step 7905, CPU 101 transfers data on a part (front hair) image corresponding to the number, data on which is stored in area AD1+7 in FIG. 77 to the BM-A plane memory area of DP-RAM 104. At step 7907 subsequent to this step, CPU 101 transfers data on part images (back hair, outline, neck) corresponding to the numbers, data on which is stored in areas AD1+1 to AD1+3 in FIG. 77, to the BM-B plane memory area (FIG. 76) of DP-RAM 104.

The layout of the BM-A plane displayed by the image data transferred to DP-RAM 104 in the process at step 7906 is similar to that in the first embodiment (FIG. 55). The layout of the BM-B plane displayed by the image data transferred to DP-RAM 104 in the process at step 7907 is similar to that in the first embodiment (FIG. 53). The processes at steps 7906, 7907 are realized by the transfer of image data read from program/data ROM 107 by CPU 101 through CPU interface 301 of VDP 102, address bus 315, data bus 316 and DP-RAM interface 303 to DP-RAM 104.

At step 7908 subsequent to step 7907, CPU 101 transfers data on part (nose, eyes, mouth) images corresponding to the numbers, data on which is stored in the respective areas AD1+4 to AD1+6 in FIG. 77, to the OBJ-A plane memory area of SRAM 103 (FIG. 72) and also transfers control data (coordinate data) which indicates the display positions of the transferred respective part images to object attribute memory 307 (FIG. 11) of VDP 102. At subsequent step 7909, CPU 101 transfers data on a part (eyebrows) image corresponding to the number, data on which is stored in area AD1+8 in FIG. 77, to the OBJ-B plane memory area of SRAM 103 (FIG. 72) and also transfers control data (coordinate data) which designates the display positions of the respective part images, data on which was transferred, to object attribute memory 307 (FIG. 11) of VDP 102.

Figure 99:
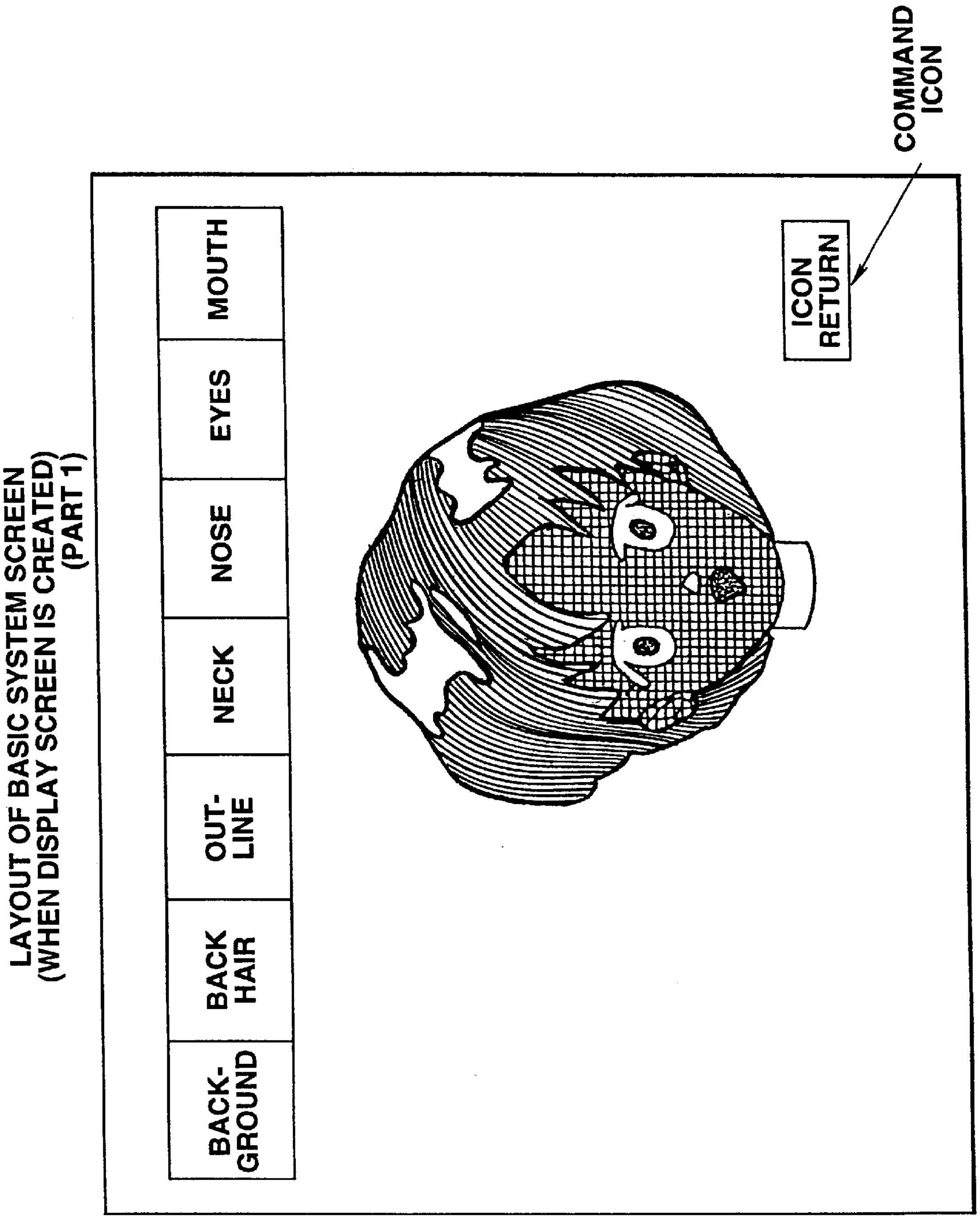
FIG. 99 shows the layout of the basic system screen (when created) (part 1)

The layout of the OBJ-A plane displayed by the image data transferred to SRAM 103 and the control data transferred to VDP 102 in the process at step 7908 is similar to that in the first embodiment (FIG. 54). FIG. 99 shows the layout of the OBJ-B plane displayed by the image data transferred to SRAM 103 in the processing at step 7909 and the control data transferred to VDP 102. The transfer operation of the control data to object attribute memory 307 at steps 7908, 7909 is realized by the transfer of the control data read from program/data ROM 107 by CPU 101 through CPU interface 301 of VDP 102, address bus 315 and data bus 316 to object attribute memory 307.

When the process at step 79 ends, CPU 101 determines whether the transfer of the image data, etc., at step 7910 has ended. If so, CPU 101 terminates the series of processing operations directly.

By transferring image data to SRAM 103 and DP-RAM 104 and also transferring control data to object attribute memory 307 of VDP 102 in this way and further setting the respective display face bits of the display control register of FIG. 13 at "1", the basic system display screen (initial display screen) of FIG. 33 is displayed.

Flow of Cursor SW Operation

Figure 80:
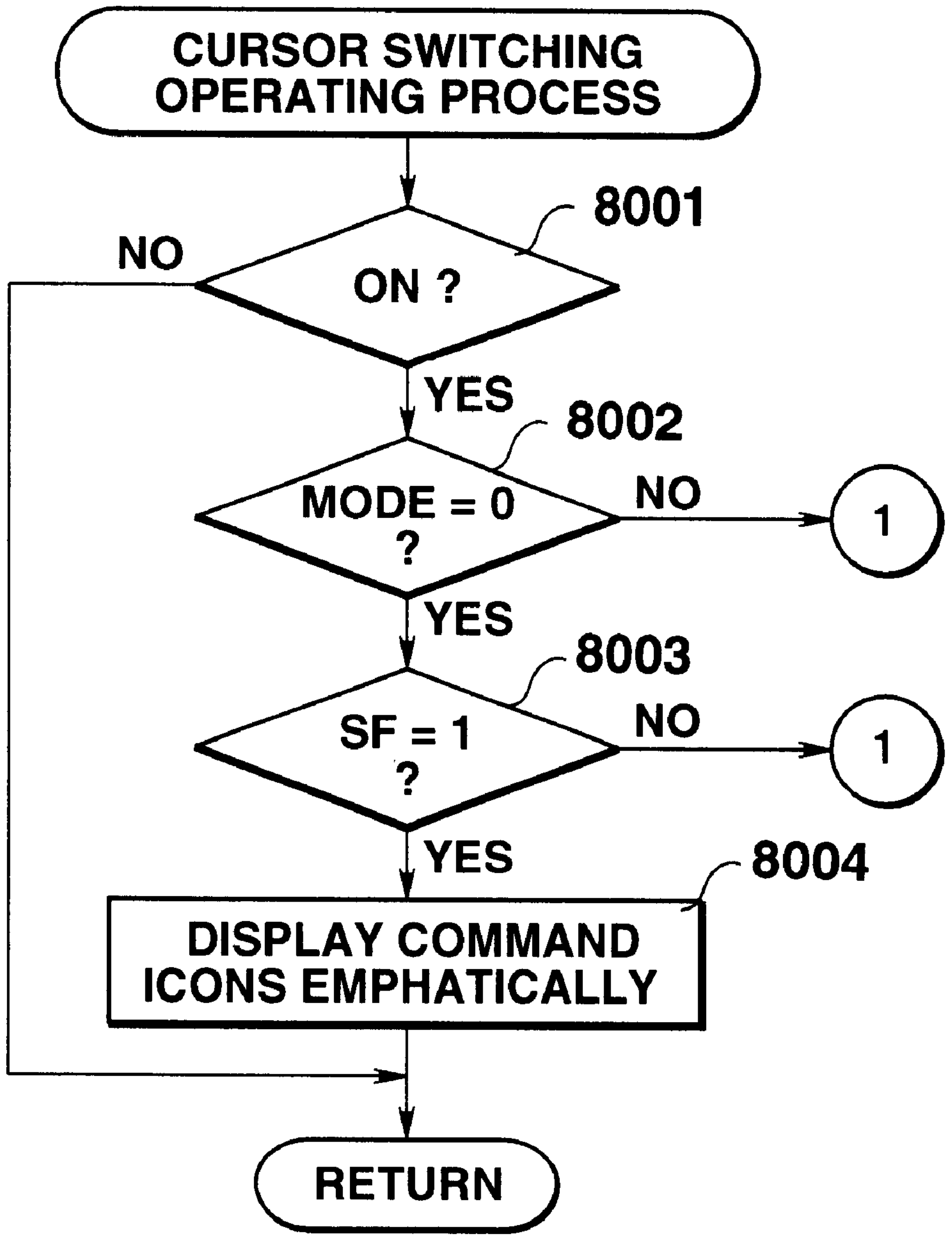
FIG. 80 is a flow chart for a cursor switching process (part 1)
Figure 81:
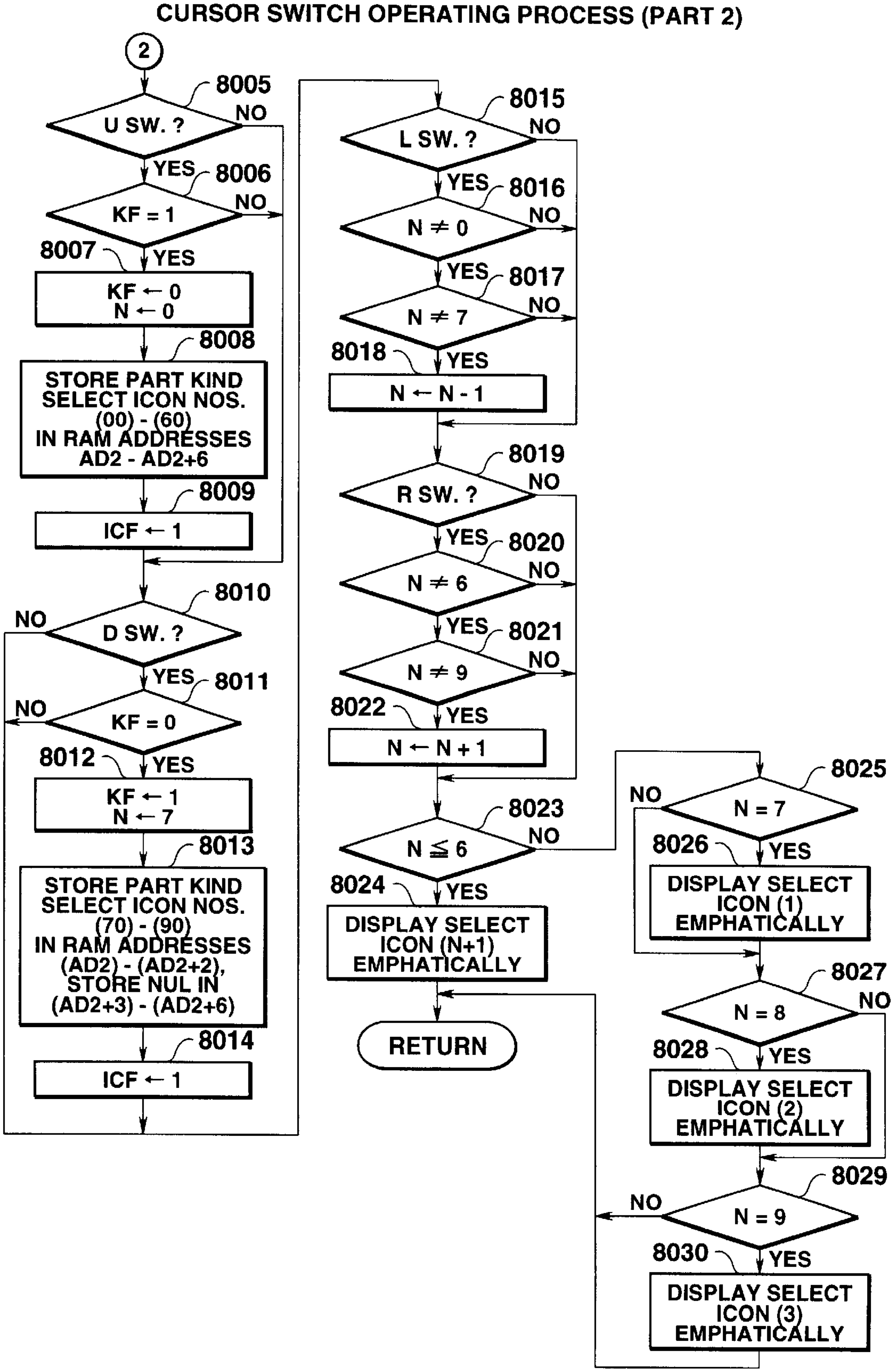
FIG. 81 is a flow chart for the cursor switching process (part 2)
Figure 82:
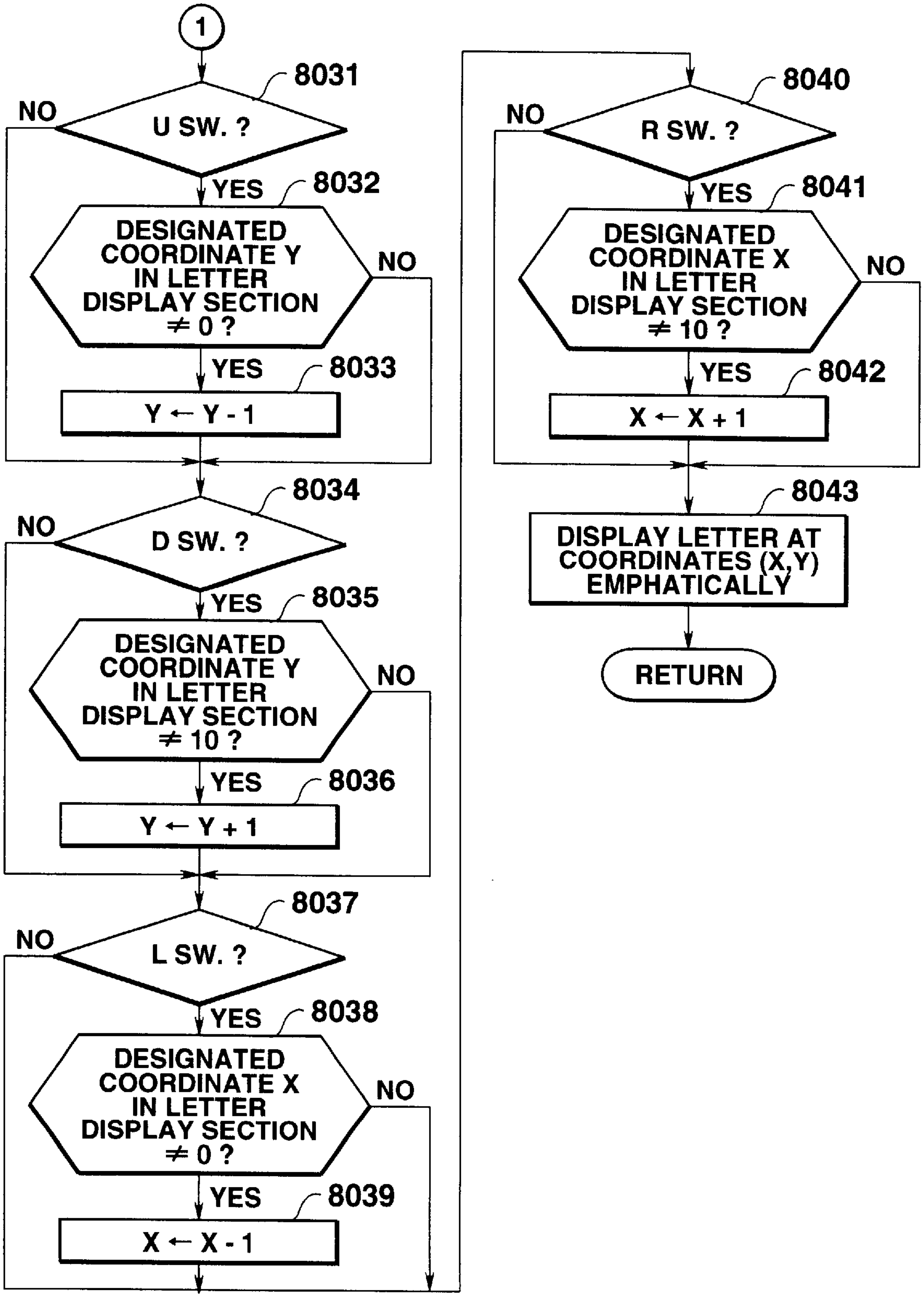
FIG. 82 is a flow chart for the cursor switching process (part 3)

FIGS. 80–82 are a flow chart of the cursor switching operation at step 7803 of FIG. 78.

In the cursor SW operation, first, CPU 101 determines whether any one of up, down, right and left cursor switches 203–206 on control pad 112 of FIG. 2 has been newly operated (step 8001). If not, the determination becomes NO, and the series of processes ends here. If so, the determination becomes YES and the control passes to step 8202.

At step 8002, CPU 101 determines whether the value of a mode number (a variable MODE) indicative of whether the current mode is a letter input mode in which a speech is input into a balloon or a basic input mode in which a portrait can be created is "0", that is, whether the basic input mode has been set at present. If not, the determination becomes NO and the control passes to step 8031 of FIG. 82. Conversely, if the value of the mode number is "0", the determination becomes YES and the control passes to step 8003.

At step 8003, CPU 101 determines whether the value of variable SF is "1". Variable SF assumes values "1" and "0" alternately when SEL switch 201 of FIG. 2 is sequentially operated. When the value is "1", the function of a command icon becomes effective while when the value is "0", the function of a select icon becomes effective (FIG. 98). When CPU 101 determines at step 8003 that the value of variable SF is not "1", the control passes to 8005 of FIG. 81. Conversely, when CPU 101 determines that the value is "1", CPU 101 displays the command icon emphatically at step 8004 and terminates the series of processes.

At step 8005 of FIG. 81, CPU 101 determines whether up switch 203 has been turned on. If not, the control passes to step 8010. Conversely, if so, the control passes to step 8006.

At step 8006, CPU 101 determines whether the value of variable KF is "1". As described above, the number of portrait part kinds is "10" in all and a maximum number of select icons for display in one display screen is "7". Thus, in the present embodiment, the select icons for the part kinds are displayed in two display screens. A variable KF indicates which of the two display screens is selected at present while variable N denotes which of the select icons has been selected at present.

When CPU 101 determines at step 8006 that the value of the variable KF is not "1", the control passes to step 8010. Conversely, when CPU 101 determines that the value is "1", the control passes to step 8007, where "0" is substituted into both of variables KF and N.

At step 8008 subsequent to step 8007, CPU 101 stores data on icon numbers which designate select icons for part kinds (background, back hair, outline, neck, nose, eyes, mouth) indicated by (00)–(60) in program/data ROM 107 of FIG. 74 in areas AD2 to AD2+6 of work RAM 108 of FIG. 77. Then, at step 8009, CPU 101 substitutes "1" indicative of transfer into a variable of ICF indicative of whether data on the image of a system image screen such as an icon should be transferred and then the control passes to step 8010.

At step 8010, CPU 101 determines whether down switch 204 has been turned on. If not, the control passes to step 8015. Conversely, the control passes to step 8011.

At step 8011, CPU 101 determines whether the value of variable KF is "0". If not, the control passes to step 8015. Conversely, if so, the control passes to step 8012, where CPU 101 substitutes "1" and "7" into variables KF and N, respectively.

At step 8013 subsequent to step 8012, CPU 101 stores data on numbers which designate select icons for part kinds (front hair, eyebrows, speech frame) indicated by (70)–(90) in program/data ROM 107 of FIG. 74 in areas AD2 to AD2+2 of work RAM 108 of FIG. 77 and also stores "0" in areas AD2+3 to AD2+6. At subsequent step 8014, CPU 101 substitutes "1" indicative of icon display into variable ICF. Then, the control returns to step 8015.

Figure 100:
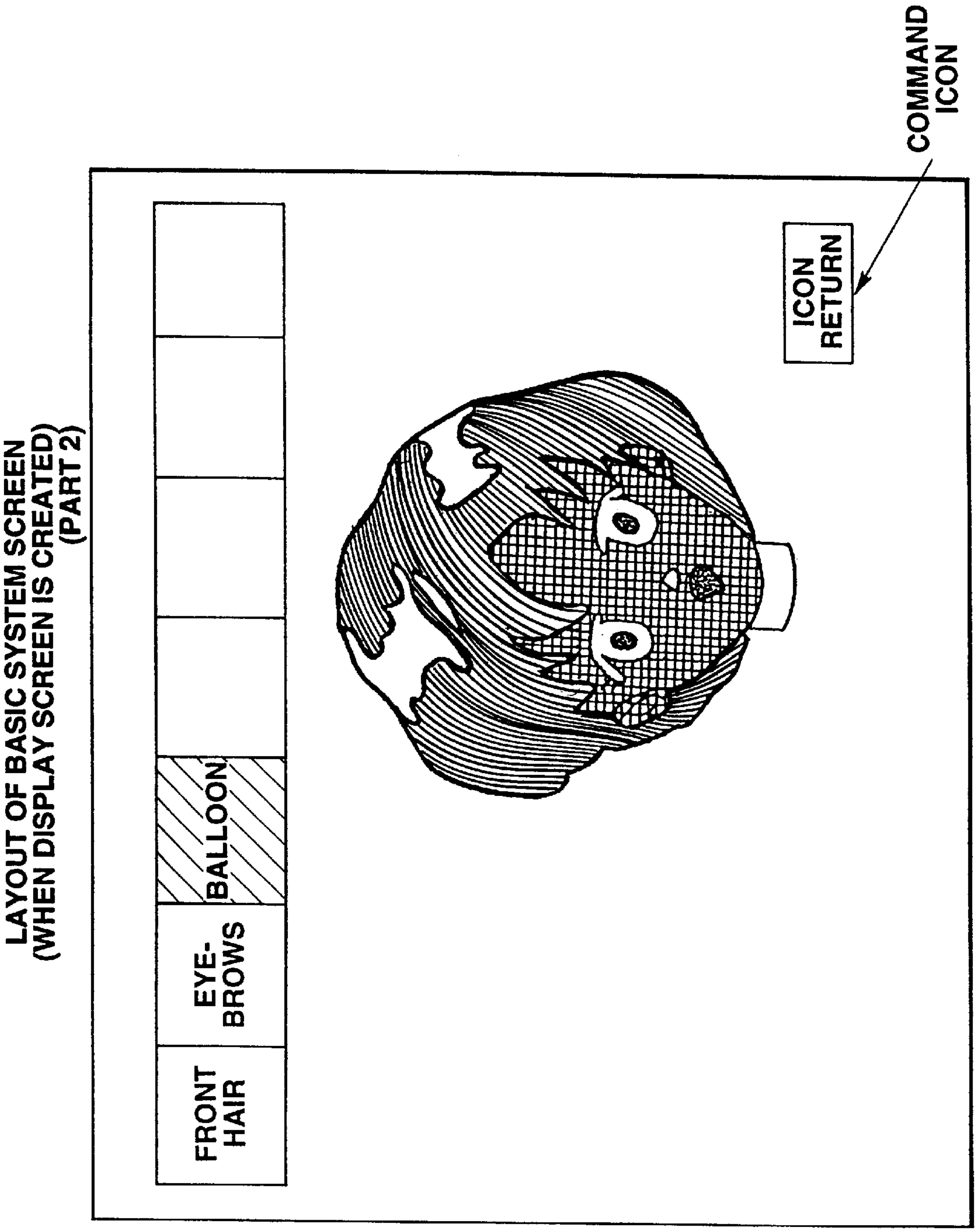
FIG. 100 shows the layout of the basic system screen (when created) (part 2)
Figure 101:
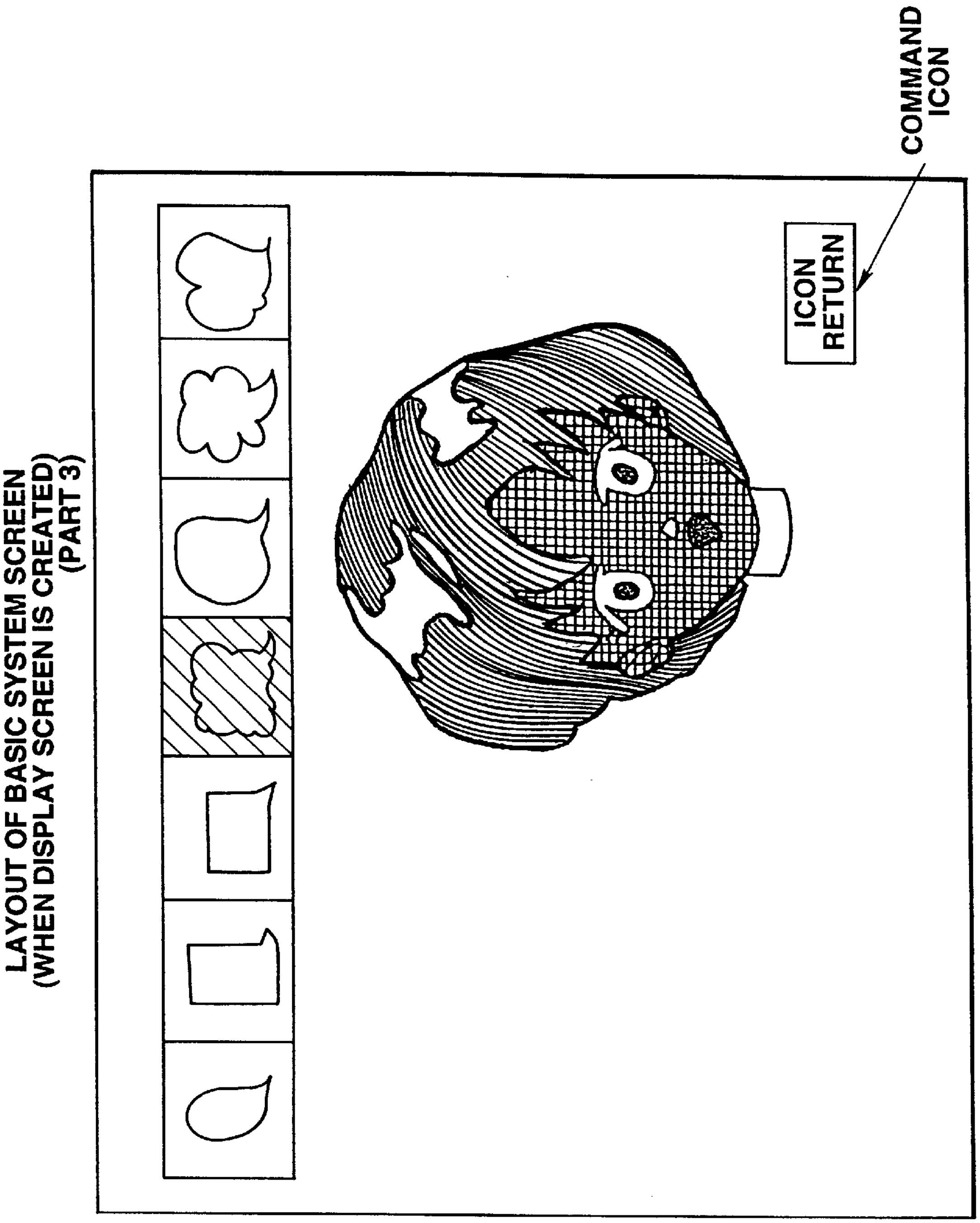
FIG. 101 shows the layout of the basic system screen (when created) (part 3)

As described above, one of the two display screens where the selected icons are displayed is selected depending on the operation of up switch 203 or down switch 204. FIGS. 100 and 101 denote the corresponding layouts of those display screens. When the user turns on SEL switch 201 of FIG. 2 in a state where any one of those display screens has been displayed, "1" is substituted into variable SF and the command icon is displayed emphatically.

At step 8015, CPU 101 determines whether left switch 205 has been turned on. At step 8016, CPU 101 determines whether the value of variable N is not "0". The CPU determines at step 8017 whether the value of variable N is not "7". When the CPU determines that left switch 205 has been turned on and that the value of variable N is neither "0" nor "7", CPU 101 decrements the value of variable N at step 8018. The control then passes to step 8019. In a case other than that mentioned above, that is, when the value of variable N is either "0" or "7", the control executes no process at step 8018, but passes to step 8019.

At step 8019, CPU 101 determines whether right switch 206 has been turned on. At step 8020 CPU determines whether the value of variable N is not "6". At step 8021, CPU 101 determines whether the value of variable N is not "9". When CPU 101 determines that the right switch 206 has been turned on, and further that the value of variable N is neither "6" nor "9", CPU 101 increments the value of variable N at step 8022. The control then passes to step 8023. In other cases, that is, when the value of variable N is either "6" or "9", the control executes no process at step 8022, but moves to step 8023.

At step 8023, the CPU determines whether the value of variable N is not more than "6". If so, CPU 101 emphatically displays a select icon having a value which includes a variable N+1 at step 8024 and then terminates the series of processes. When the CPU determines at step 8023, that the value of variable N is larger than "6", the control passes to the process at step 8025.

At step 8025, CPU 101 determines whether the value of variable N is "7". If so, the CPU displays emphatically the select icon displayed at the left end of the display screen at step 8026. Then, the control passes to a process at step 8027. When CPU 101 determines that the value of variable N is not "7", CPU 101 executes the process at step 8027.

At step 8027, CPU 101 determines whether the value of variable N is "8". If so, the CPU emphatically displays the select icon displayed at the second position from left of the display screen at step 8028. Then, the control passes to a process at step 8029. When CPU 101 determines that the value of variable N is not "8", CPU 101 executes the process at step 8029.

At step 8029, CPU 101 determines whether the value of variable N is "9". If so, the CPU emphatically displays the select icon displayed at the third position from the left of the display screen at step 8030. Then, CPU 101 terminates the series of processes. If not at step 8029, the CPU performs the series of processes at that time.

The processes at steps 8031–8043 of FIG. 82 are performed when CPU 101 determines at step 8002 of FIG. 80 that the mode number (the value of variable MODE) is not "0", that is, that the letter input mode has been set. By the series of these processes, the cursor is moved in the letter display of the letter input display screen (FIG. 43) in accordance with the respective operations of up, down, right and left cursor switches 203–206. The display position of a letter in the letter display is controlled by its X and Y coordinates and the letter display includes an area where the values of the X and Y coordinates are both "0"–"10". The letter input mode and the basic input mode are set in accordance with advancement of the creation of a portrait, as will be described later.

At step 8031, CPU 101 determines whether up switch 203 has been turned on. If so, at step 8032 CPU 101 determines whether the value of the Y coordinate of the cursor display position (the letter which the user designated) in the letter display is not "0". If so, CPU 101 decrements the Y value at step 8033 and passes to a process at step 8034. When CPU 101 determines at step 8031 that up switch 203 has not been turned on, or determines at step 8032 that the value of the Y coordinate is "0", the control passes to the process at step 8034.

At step 8034, CPU 101 determines whether down switch 204 has been turned on. If so, CPU 101 determines at step 8035 whether the value of the Y coordinate of the coordinates (X, Y) indicative of the display position of the designated letter in the letter display is not "10". If so, CPU 101 decrements the Y value at step 8036 and passes to a process at step 8037. When CPU 101 determines at step 8034 that down switch 204 has not been turned on, or determines at step 8035 that the value of the Y coordinate is "10", the control passes to the process at step 8037.

At step 8037, CPU 101 determines whether left switch 205 has been turned on. If so, at step 8038 CPU 101 determines whether the value of the coordinate X of the coordinates (X, Y) indicative of the display position of the letter on the designated letter display is not "0". If not, CPU 101 decrements the X value at step 8039 and the control passes to the process at step 8040. When CPU 101 determines at step 8037 that left switch 205 has not been turned on, or determines at step 8038 that the value of the coordinate X is "0", the control passes to the process at step 8040.

At step 8040, CPU 101 determines whether right switch 206 has been turned on. If so, CPU 101 determines at step 8041 whether value of the coordinate X of the coordinates (X, Y) indicative of the display position of the designated letter in the letter display is not "10". If so, CPU 101 increments the value of the coordinate X at step 8042 and the control passes to the process at step 8043. When CPU 101 determines at step 8040 that left switch 205 has not been turned on, or when it determines at step 8041 that the value of the coordinate X is "10", the control passes to the process at step 8043.

CPU 101 displays the letters emphatically in the letter display in accordance with the coordinates X and Y obtained by the processing at step 8031–8042. Then, the series of process ends. As just described above, the letter in the letter display designated by the operations of cursor switches 203–206 is displayed emphatically and the letter displayed emphatically is input as a speech by turning on ENTER switch 202 of FIG. 2.

Operational Flow of SEL Switching Operation

Figure 83:
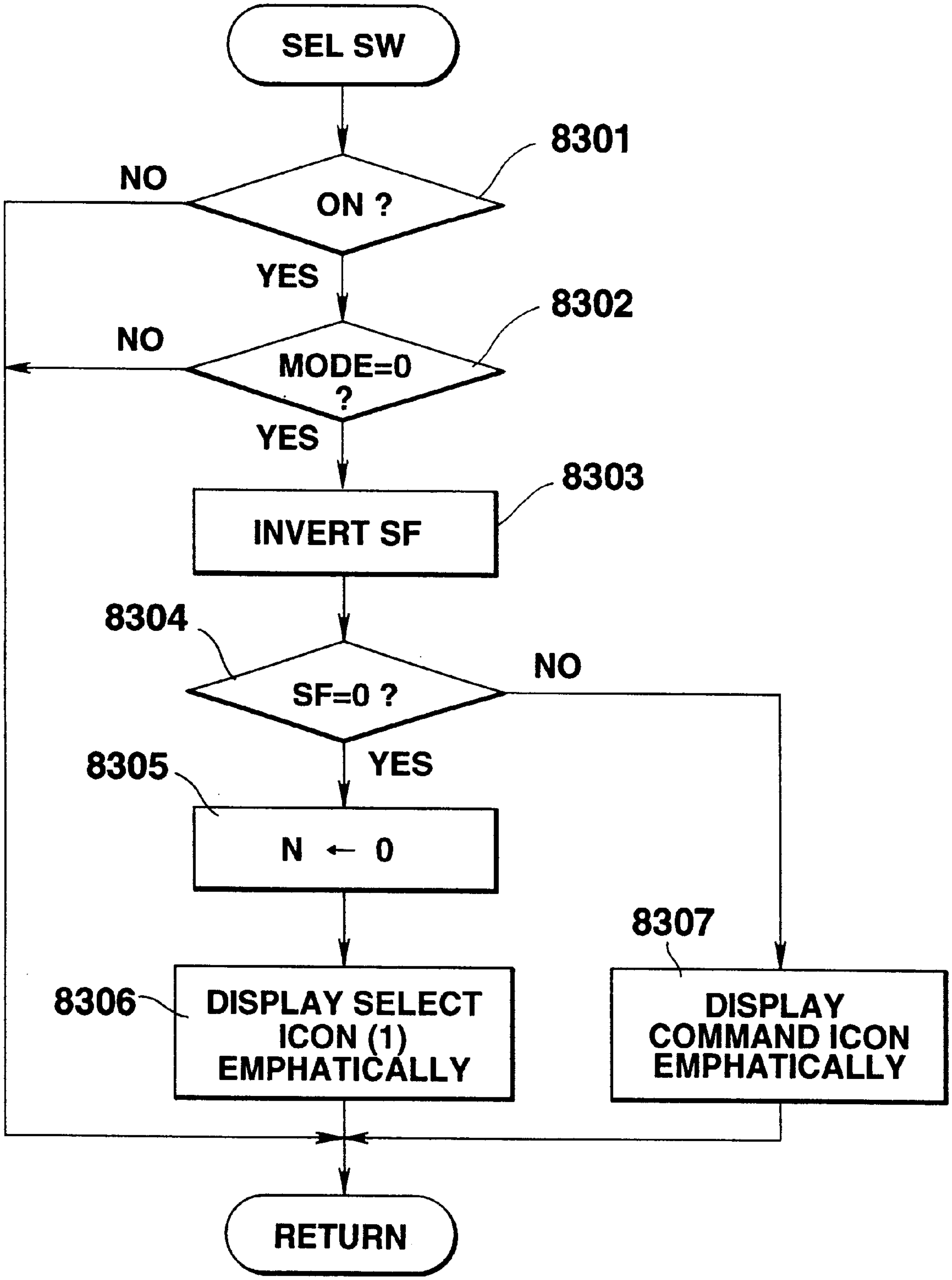
FIG. 83 is a flow chart for a SEL switch operating process.

The SEL switching process is performed in accordance with the contents of the operation of SEL switch 201 provided on control pad 112 of FIG. 2. FIG. 83 is an operational flow chart indicative of a series of processes performed in accordance with the contents of the operation of SEL switch 201.

First, CPU 101 determines at step 2301 whether SEL switch 201 has been turned on. If so, CPU 101 performs the process at step 2002. Conversely, when the CPU 101 determines that SEL switch 201 has not been turned on, it terminates the series of processes.

CPU 101 determines at step 8302 whether the mode number (the value of variable MODE) is "0", that is, whether the letter input mode has been set. If so, that is, if CPU 101 determines that the basic input mode (portrait creation mode) has been set, the CPU 101 performs the process at step 8303. Conversely, if not, the CPU terminates the series of processes.

At step 8303, the CPU 101 inverts the value of variable SF (If the value of variable SF is "1", it is inverted to "0" and vice versa.). Thereafter, at step 8304, the CPU 101 determines whether the value of variable SF is "0" on.

When the CPU 101 determines at step 8304 that the value of variable SF is "0", it substitutes "0" into variable N at step 8305. Then, at step 8306, CPU 101 displays a select icon corresponding to the value of variable N and then terminates the series of processes.

When the CPU 101 has performed the process at step 8306, the select icon displayed at the left end of the display screen is then displayed emphatically.

When the CPU 101 determines at step 8304 that the value of variable SF is not "0", it displays a command icon emphatically at step 8307 and then terminates the series of processes.

Flow of ENTER Switching Operation

FIGS. 84–89 are an operational flow chart indicative of an ENTER switch 202 operation at step 7805 of FIG. 78, which is performed in accordance with the contents of the operation of ENTER switch 202 provided on control pad 112 of FIG. 2.

First, at step 8401, the CPU 101 determines whether ENTER switch 202 of FIG. 2 has been turned on. If not, the CPU 101 terminates the series of processes. Conversely, if so, the control passes to the process at step 8402.

At step 8402, the CPU 101 determines whether the mode number (the number of variable MODE) is "0", that is, whether the basic input mode (portrait creation mode) has been set. If so, the CPU 101 passes to a process at step 8403. If not, the CPU 101 passes to a process at step 8428 of FIG. 88.

At step 8403, the CPU 101 determines whether the value of variable SF is "1", that is, whether the function of the select icon has been effective. If so, the CPU 101 passes to a process at step 8404. Conversely, if not, the CPU 101 passes to a process at step 8406 of FIG. 85.

At step 8404, the CPU 101 stores data on select icons numbers indicated by (00)–(60) in program/data ROM 107 of FIG. 74 in respective areas AD2 to AD2+6 of work RAM 108 of FIG. 77. Thereafter, at step 8405, the CPU 101 substitutes "1" and "0" into variables ICF and M, respectively, to thereby terminate the series of processes. Variable M is the one into which the value of a hierarchy number is substituted to control the advancement of creation of a portrait in the basic input mode (portrait creation mode).

After the process at step 8405 has been performed, the select icons for the part kinds are displayed on the basic system display screen. More specifically, when the user turns on ENTER switch 202 in a state where the command icons have been displayed emphatically, the select icons for the part kinds are displayed on the basic system screen.

Figure 85:
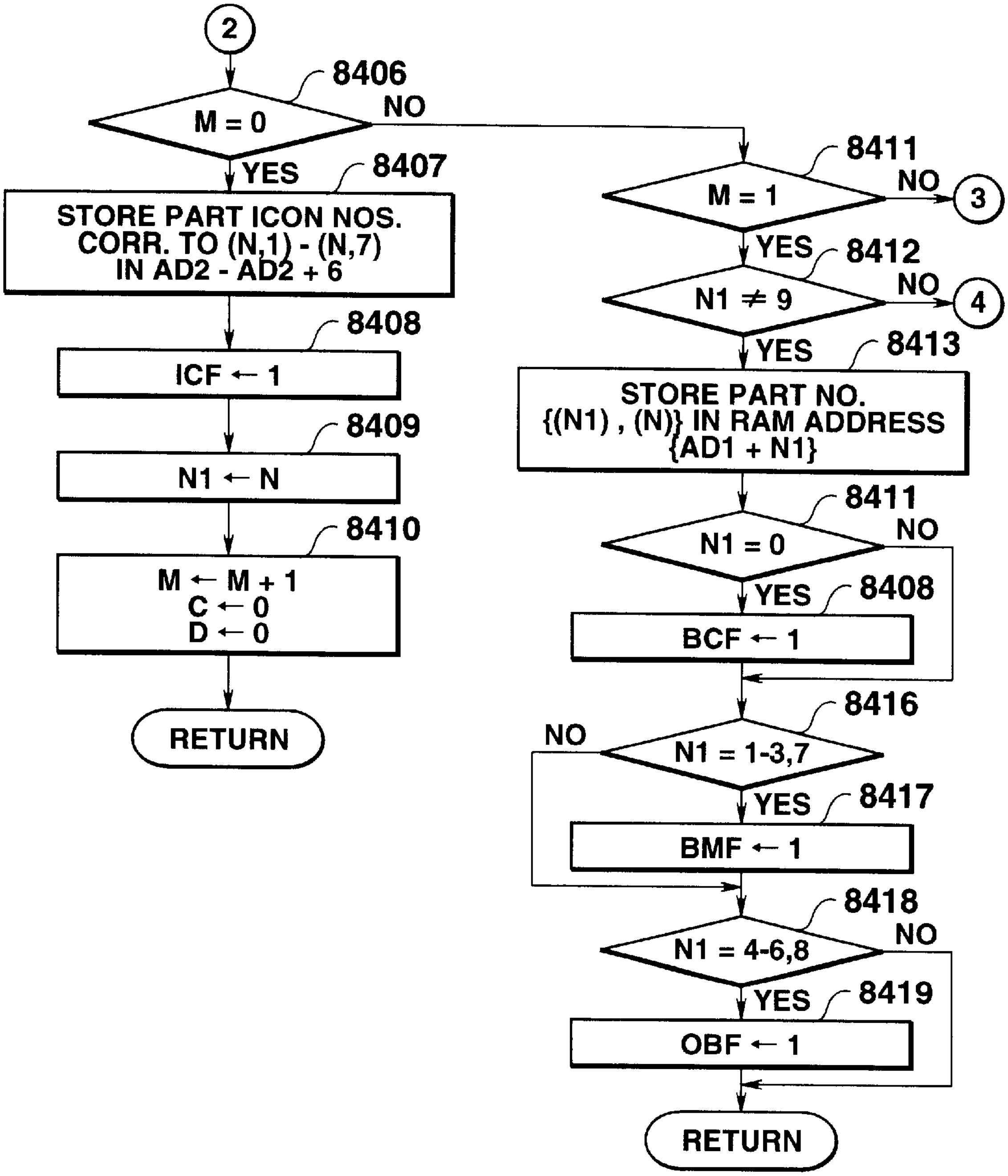
FIG. 85 is a flow chart for an ENTER switch operating process (part 2)

The CPU 101 then determines at step 8406 of FIG. 85 whether the value of variable M is "0". If so, the CPU stores data on an icon number indicated by any one of (N(the value of variable (N, 1) to (N, 7) in program/data ROM 107 of FIG. 72 or 73 in the respective areas AD2 to AD2+6 of work RAM 108 of FIG. 77 (step 2107). Thereafter, the CPU substitutes "1" into variable ICF at step 8408, and also substitutes the value of variable N into variable N1 at step 8409, and increments the value of variable M, and substitutes "0" into variables C and D at step 8410, and then terminates the series of processes.

When the user turns on ENTER switch 202 in a state where any one of the select icons has been displayed emphatically (FIGS. 99, 100), the CPU displays icons to select a desired one of parts prepared in the part kind for the emphatically displayed select icon, and increments variable M (hierarchy number) because the value of variable M at this time is "0". Thus, the creation of the portrait (hierarchy) advances. By substituting the value of variable N into variable N1, the number indicative of the part kind which the user designated is held in variable N1. Variables C and D are used to count the number of letters of an input speech in the letter input mode, which is set automatically after the speech frame has been selected, as will be described later.

When the CPU 101 determines at step 8406 that the value of variable M is not "0", it determines at subsequent step 8411 whether the value of variable M is "1". If so, the CPU 101 determines at step 8412 whether the value of variable N1 is not "9", that is, whether the part kind designated by the select icon is not a speech frame. If so, at step 8413, the CPU 101 stores data on a part number indicated by (N1, N) of program/data ROM 107 of FIG. 73 or 74 in area AD1+N1 (the value of variable N1) of work RAM 108 of FIG. 77. Thus, a part used in the part kind corresponding to the value of variable N1 is fixed.

When the process at step 8413 ends, the CPU 101 determines at step 8414 whether the value of variable N1 is "0", that is, whether the background as the part kind has been selected. If so, the CPU 101 substitutes "1" into variable BGF at step 8415, and then passes to a process at step 8416. Conversely, if not, the CPU 101 passes directly to a process at step 8416. The variable BGF is a flag which indicates whether image data in the BG-B and -A planes should be transferred. If the value of variable BGF is "1", the CPU 101 transfers the corresponding image data from program/data ROM 107 to SRAM 103.

The CPU 101 determines at step 8411 whether the value of variable N1 is any one of "1"–"3" and "7". If so, the CPU 101 substitutes "1" into variable BGF at step 8417 and then passes to a process at step 8418. Conversely, if not, the CPU 101 passes directly to a process at step 8418. Like variable BGF, the variable BGF is a flag which indicates whether image data in the BM-A and -B plane memory areas should be transferred. If the value of variable BGF is "1", the CPU 101 transfers the corresponding image data from program/data ROM 107 to DP-RAM 104.

Figure 102:
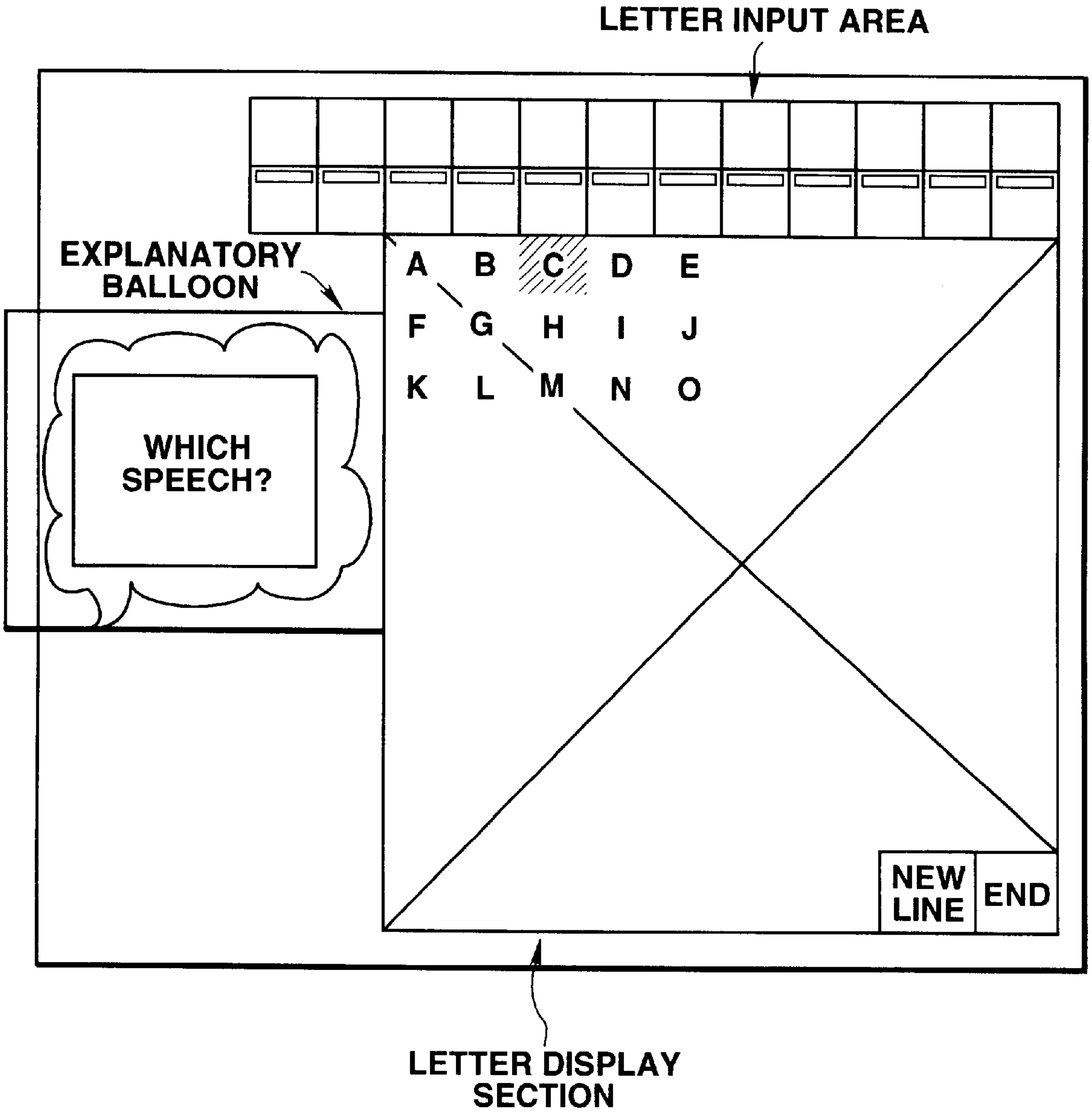
FIG. 102 shows the layout of a letter input screen (part 1)

The CPU 101 determines at step 8418 whether the value of variable N1 is any one of "4"–"6" and "8". If so, the CPU 101 substitutes "1" into variable OBF at step 8419 and then terminates the series of processes. Conversely, if not, the CPU 101 terminates the series of processes. Like BGF, variable OBF is a flag which indicates whether image data in the OBJ-A and -B plane memory areas should be transferred. If the value of variable OBF is "1", the CPU 101 transfers the corresponding image data from program/data ROM 107 to SRAM 103. When the CPU 101 determines at step 8412 that the value of variable N1 is "9", the CPU 101 stores data on icon numbers indicated by (91)–(97) in program/data ROM 107 of FIG. 74 in areas AD2 to AD2+6 of work RAM 108 of FIG. 77 (step 8420) of FIG. 86. Thereafter, at step 8421, the CPU 101 substitutes the "1" into variable ICF, increments the value of variable M at step 8422 and then terminates the series of processes. The value of variable M is "2" after the value of the variable M has been incremented at step 8422. Thus, after the ENTER switching operation has been terminated, the display screen of FIG. 102 is displayed.

Figure 86:
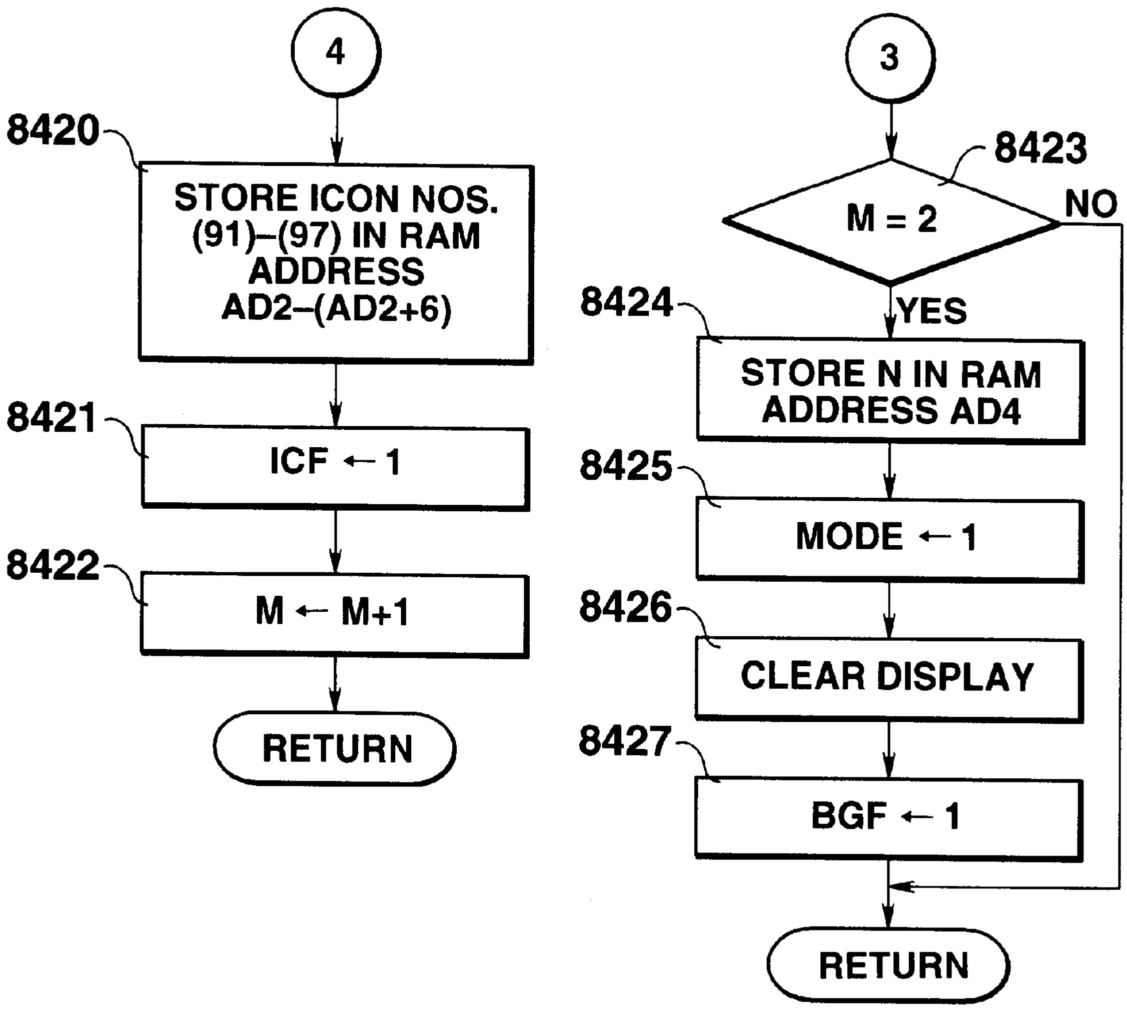
FIG. 86 is a flow chart for the ENTER switch operating process (part 3)

When the CPU 101 determines at step 8411 that the value of variable M is not "1", it determines at step 8423 of FIG. 86 whether the value of variable M is "2". If not, the CPU 101 terminates the series of processes. Conversely, when the CPU 101 determines that the value of variable M is "2", it passes to a process at step 8424.

Figure 103:
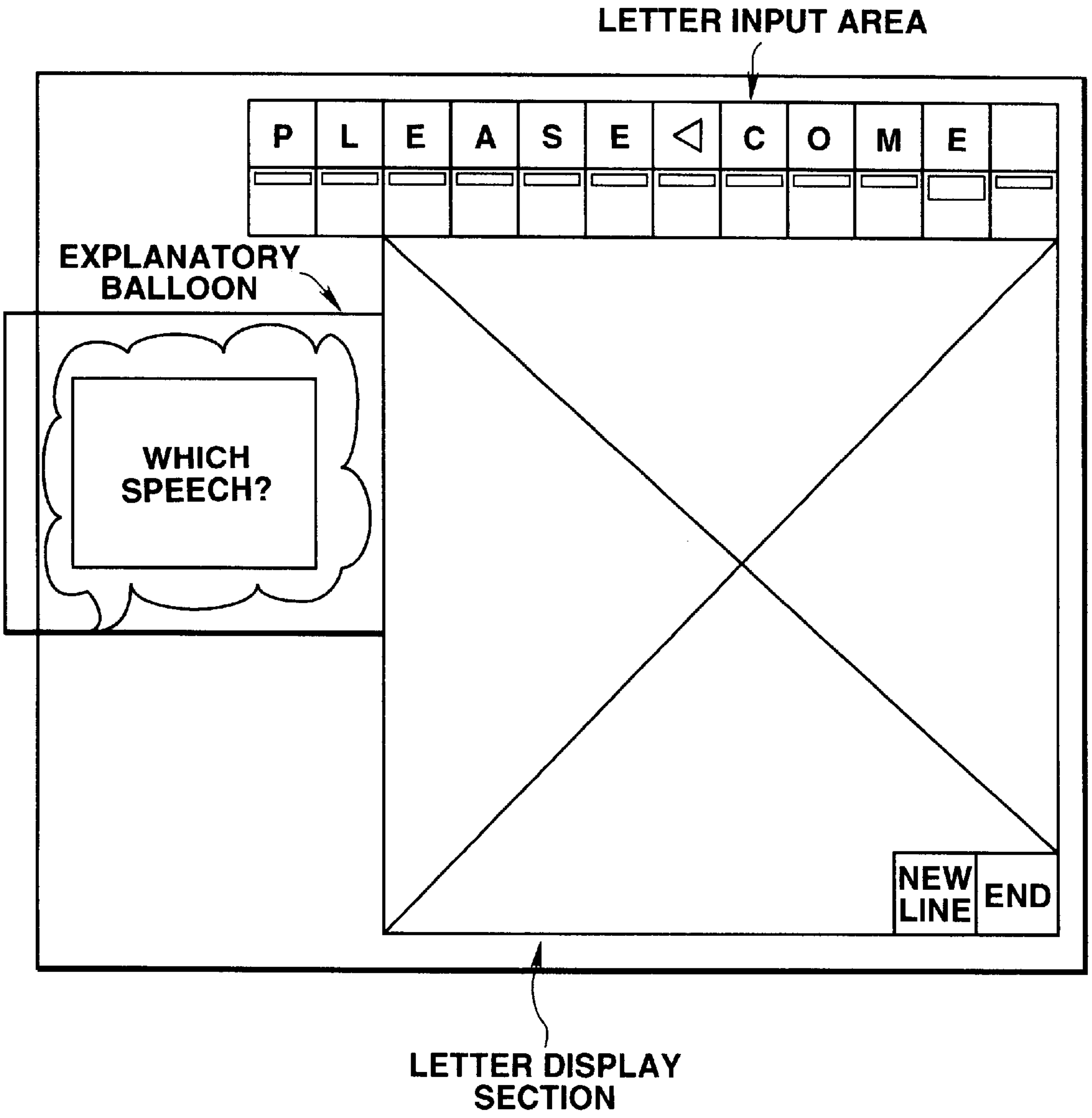
FIG. 103 shows the layout of the letter input screen (part 2)

At step 8424, the CPU 101 stores data on the value of variable N in an area AD4 of work RAM 108 of FIG. 77. Thereafter, the CPU 101 set the mode number (the value of variable MODE) at "1" at step 8425, clears the display screen at step 8426, substitutes "1" into variable BGF at step 2427 and terminates the series of processes. By setting the mode number (the value of variable MODE) at "1", the display screen is switched from that of FIG. 102 to that of FIG. 103 to thereby display a new letter input display screen.

Figure 84:
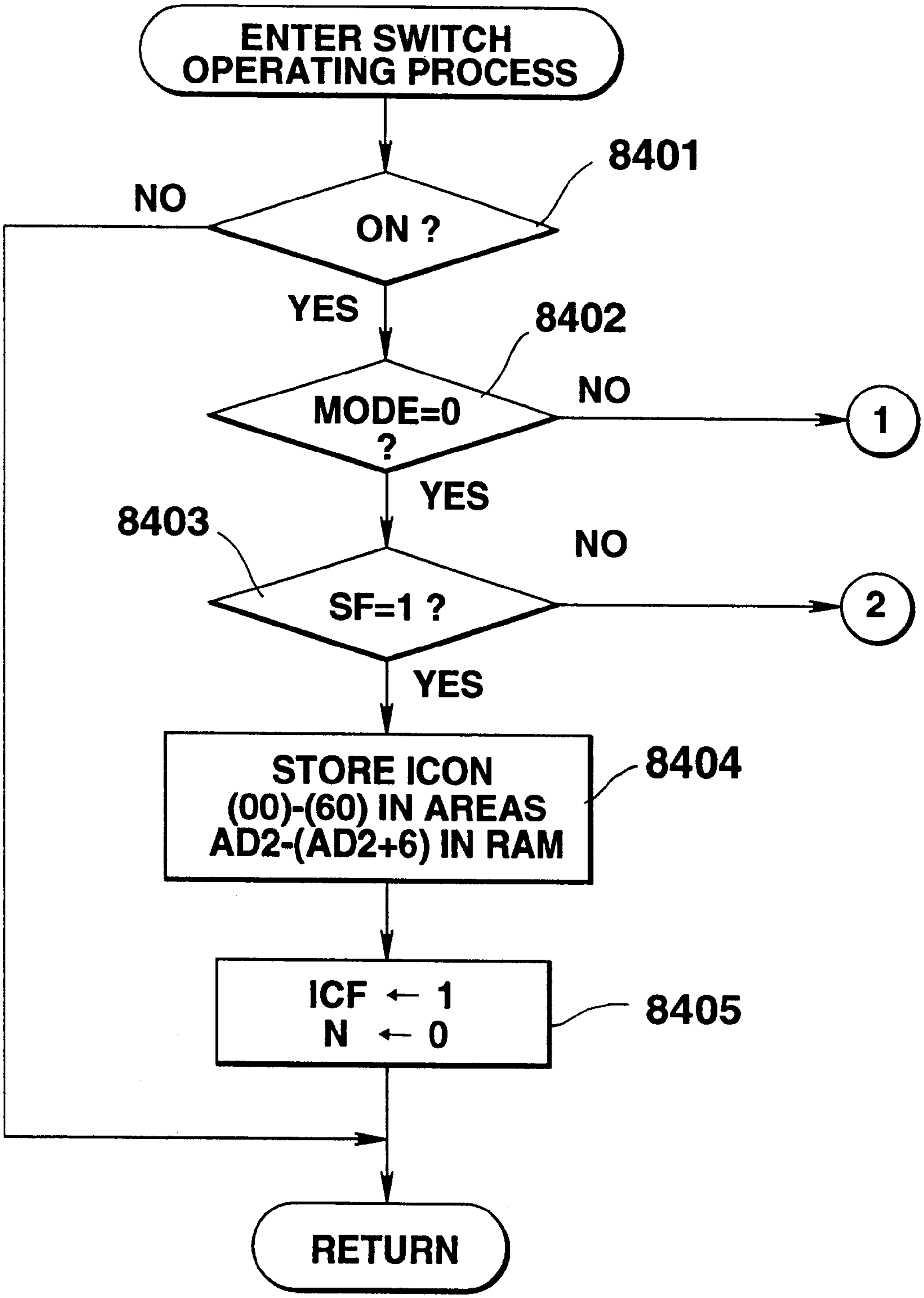
FIG. 84 is a flow chart for an ENTER switch operating process (part 1)
Figure 87:
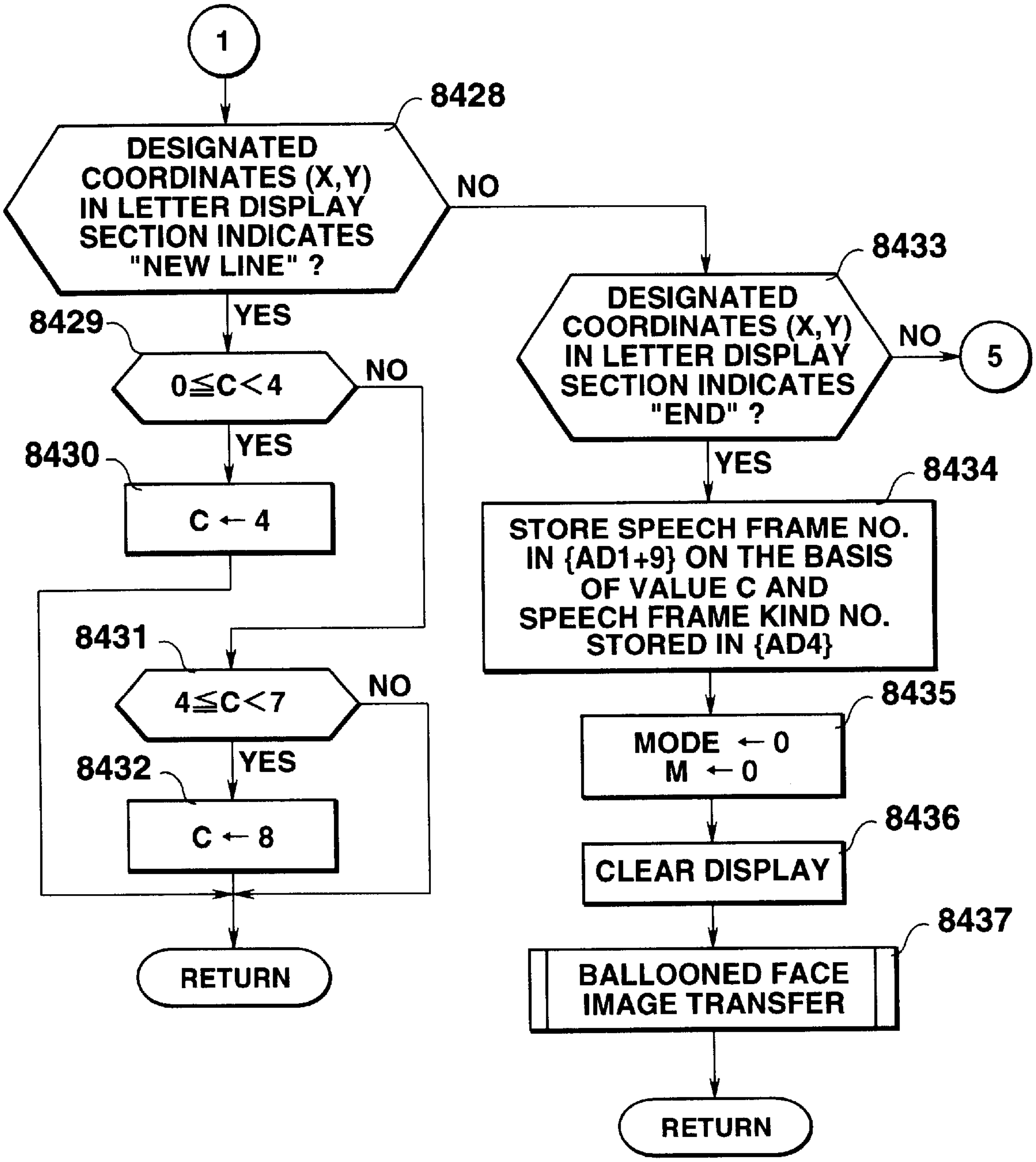
FIG. 87 is a flow chart for the ENTER switch operating process (part 4)

When the CPU 101 determines at step 8402 of FIG. 84 that the mode number (the value of the variable mode) is not "0", that is, that the letter input mode has been set, the CPU 101 passes to a process at step 8428 of FIG. 87.

The CPU 101 determines at step 8428 whether the current emphatically displayed letter or symbol involves "New line" (FIG. 102) on the basis of the coordinate data (X, Y) to be changed in the cursor switching process in accordance with the operation of any one of up, down, left and right cursor switches 203206. If so, that is, if the CPU 101 determines that "New line" has been input as a speech, the CPU 101 determines at step 8429 whether the value of variable C is not less than "0" and is less than "6". If so, the CPU 101 substitutes "6" into variable C at step 8430 and terminates the series of processes.

Figure 106:
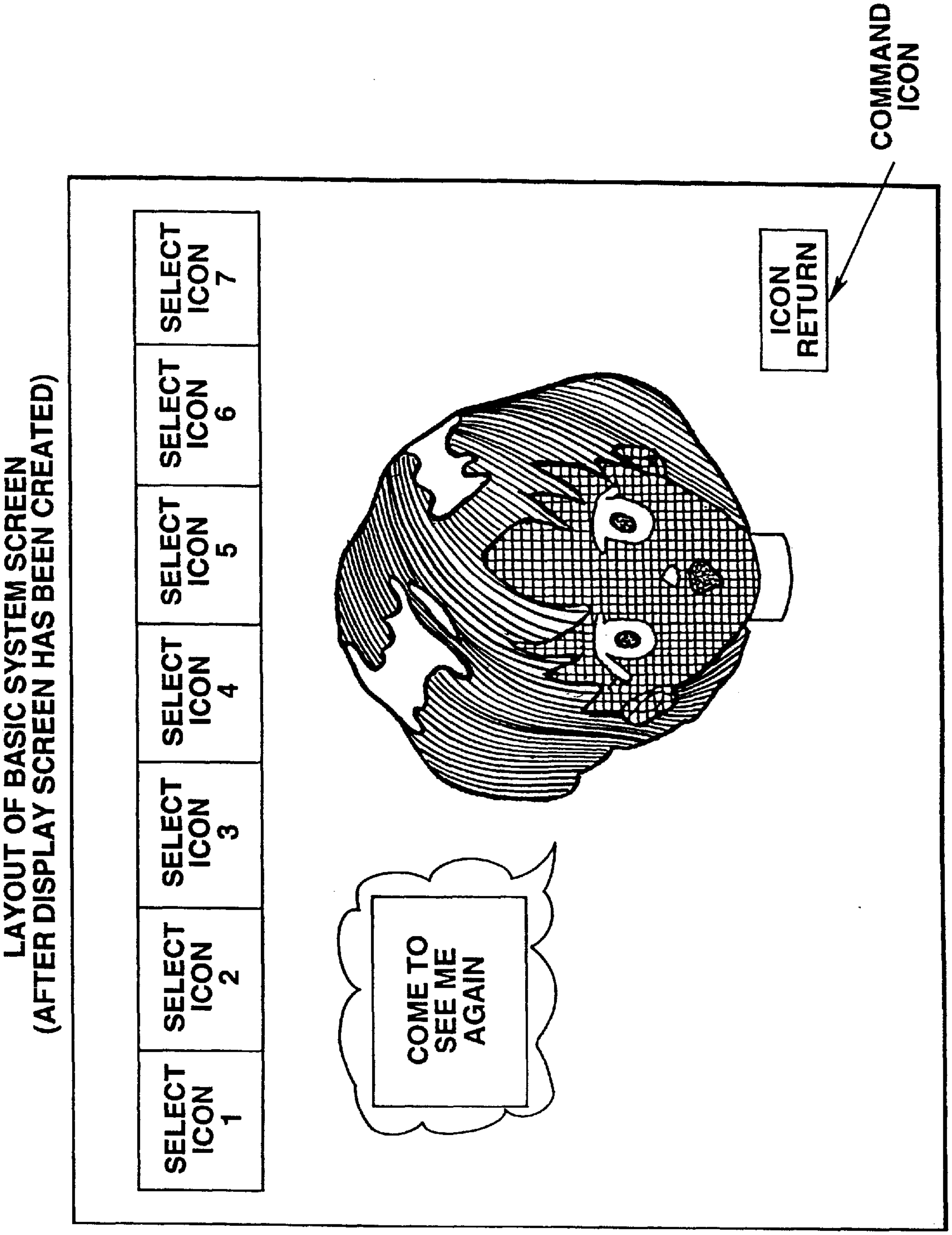
FIG. 106 shows the layout of a created basic system screen.

In the present embodiment, a speech displayed in a speech frame is composed of 6 letters per line, like a balloon shown in FIG. 102. Thus, for example, when the user has input a speech shown in the letter input area of FIG. 103 (the 7th symbol from left denotes the "New line"), the balloon displayed actually is as shown in FIG. 106.

If the value of variable C is 4 or more, the determination at step 8429 becomes YES. The CPU 101 then determines at step 8431 whether the value of variable C is "6" or more, and is less than "11", that is, that the new line symbol has been input at the second line of the speech. If so, by substituting "12" into variable C at step 8432, the CPU 101 terminates the series of processes. If the value of variable C is "11" or more, the determination at step 8431 becomes NO and the CPU 101 terminates the series of the processes here.

As described above, by inputting the "New line" symbol, the user can start a "New line" at any position in a speech in the balloon. Thus, the user is not required to grip the shape of a speech frame to create a desired balloon, so that operability is improved and the creation of the balloon is simplified and facilitated.

When the CPU 101 determines at step 8428 that "New line" has not been displayed emphatically on the basis of data on the coordinates (X, Y), the CPU 101 passes to a process at step 8433, where the CPU determines whether the "end" of the displayed letters has been input on the basis of data on the coordinates (X, Y). If so, at step 8434, the CPU 101 stores data on the number of the speech frame to be displayed actually in area AD1+9 of work RAM 108 on the basis of the value of variable C and a number indicative of the kind of the speech frame, data on which is stored in area AD4 of work RAM 108.

Figure 104A:
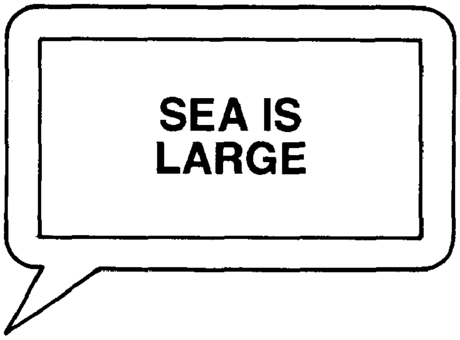
FIGS. 104A and 104B show a display example of balloon (part 1)
Figure 104B:
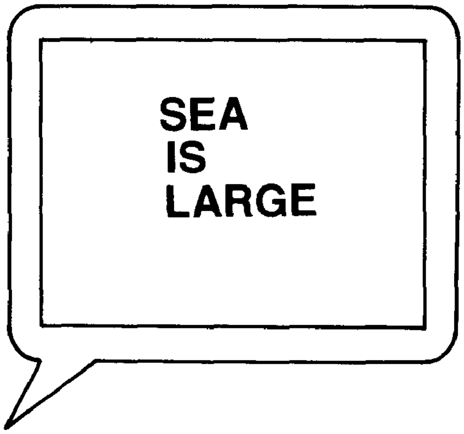

FIGS. 104A and B each show an example of a balloon. As shown, even when the contents (letters) of a speech are the same, the size of a speech frame and the arrangement of letters or words of the speech can differ due to the presence/absence of the "New line".

Figure 105A:
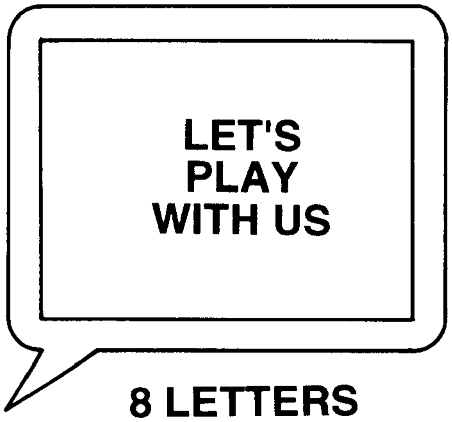
Figure 105B:
Figure 105C:
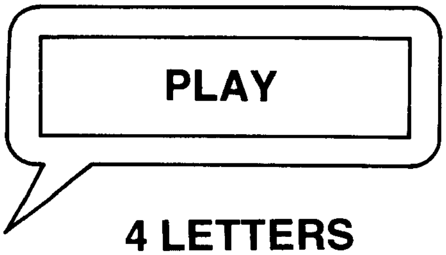
Figure 105D:
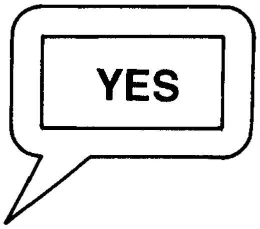

There are four different speech frame sizes for each of speech frame kinds depending on the number of speech letters. FIGS. 105A, B, C and D show different sizes of speech frames each selected in accordance with the number of speech letters. FIG. 105A shows the maximum number of letters of a speech to be input which is 21. In addition to a speech frame which can display a speech of a maximum of 21 letters, there are other three different sizes of speech frames in which the maximum number of letters displayable is 14, 4 and 3, as shown in FIGS. 105B–D. Data on the images of speech frames of the same kind and of different sizes are stored in areas (J–N–1) to (J–N–4) of program/data ROM 107 of FIG. 73. Data on a value corresponding to N is stored in AD4 of work RAM 108. At step 8434, the CPU 101 determines the size of a speech frame to be displayed, from among the four kinds of frame sizes corresponding to the value of N depending on the number of letters indicated by variable C.

As described above, a speech frame suitable for the number of speech letters used is determined automatically depending on the number of speech letters just mentioned. Thus, the display of an inappropriate-sized balloon such as a large balloon compared to an excessively small number of letters accommodated in the balloon to thereby produce an excessively large blank area in the balloon is avoided, so that the user can easily create a desired balloon in a short time. This applies in the case of the sizes of individual letters. The speech frame may change not only in whole shape, but also in the kind, color and thickness of a line indicative of the outline of the speech frame and the color of the inside of the speech frame.

When the process at step 8434 ends, the CPU 101 changes the mode number (the value of variable MODE) and the value of variable M at "0" at step 8435, clears the display at step 8436, transfers data on the ballooned face image at 8437 to display the created portrait on the display screen and terminates the series of processes. By the transfer of the ballooned face image data, for example, an image of FIG. 106 is displayed.

Figure 88:
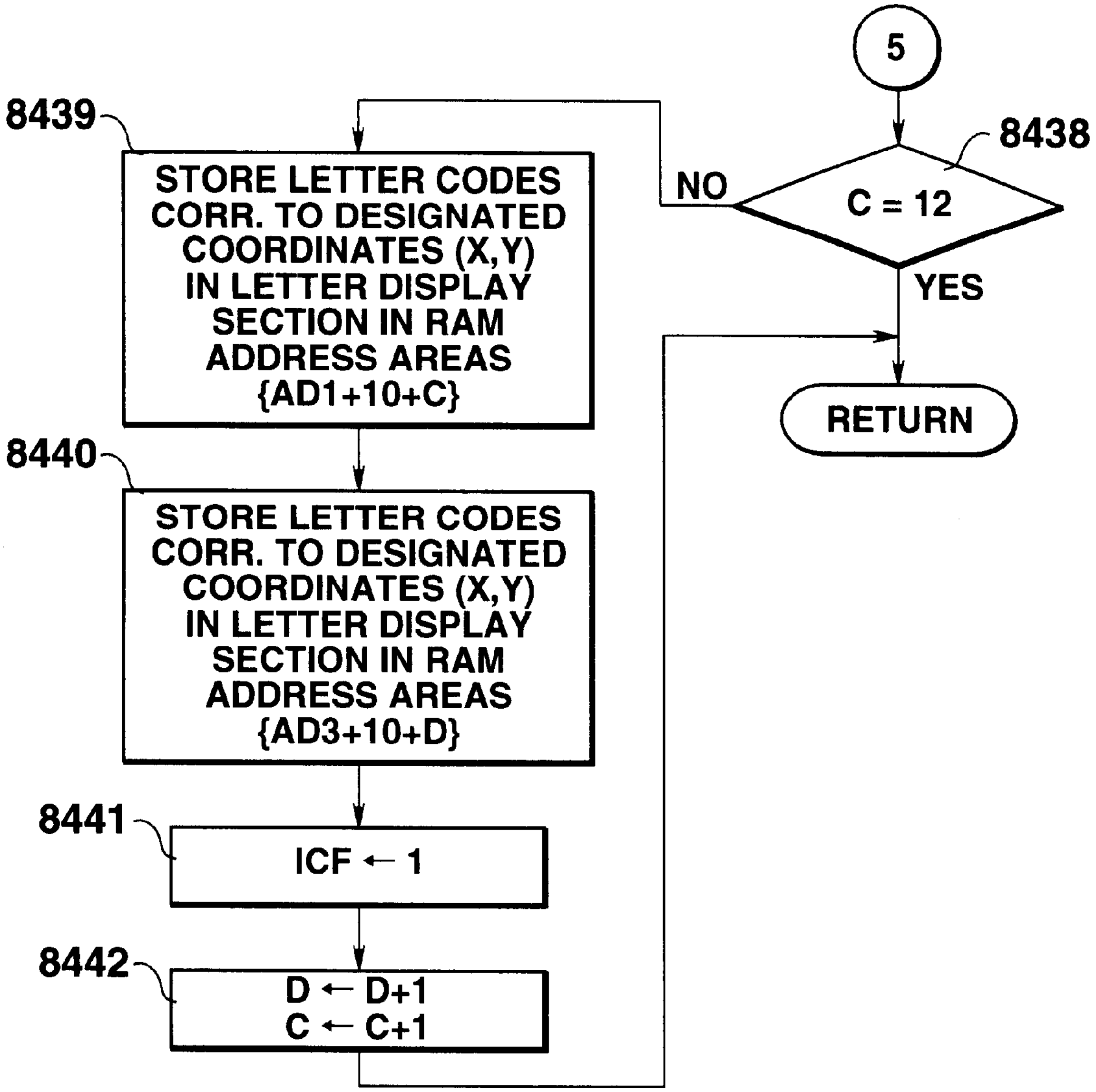
FIG. 88 is a flow chart for the ENTER switch operating process (part 5)

When the CPU 101 determines at step 8433 that no "end" has been input, the CPU 101 passes to a process at step 8438 of FIG. 88, where the CPU 101 determines whether the value of variable C is "21", that is, whether 21 letters as a maximum number of letters which make up a speech have been input (since variable C is initially set at "0", the value of variable C becomes "21" after the 21 letters have been input). When the CPU 101 determines that the value of variable C is "21", the CPU 101 terminates the series of processes. Conversely, if the CPU 101 determines that the value of variable C is less than "21", it passes to a process at step 8439.

At step 8439, the CPU 101 determines a letter designated by the coordinates (X, Y) in the letter display section and stores data on codes of the letter in an area AD1+10+C (the value of variable C) of work RAM 108 of FIG. 74. When this processing ends, the CPU 101 stores data on the codes of the letter in an area AD3+10+D (which is the value of variable D) of work RAM 108 of FIG. 74 (step 8440). Thereafter, the CPU 101 substitutes "1" into variable ICF at step 8441, increments the values of variables C and D at step 8442, and then terminates the series of processes.

Operational Flow of a Ballooned Face Image Transfer Process

Figure 89:
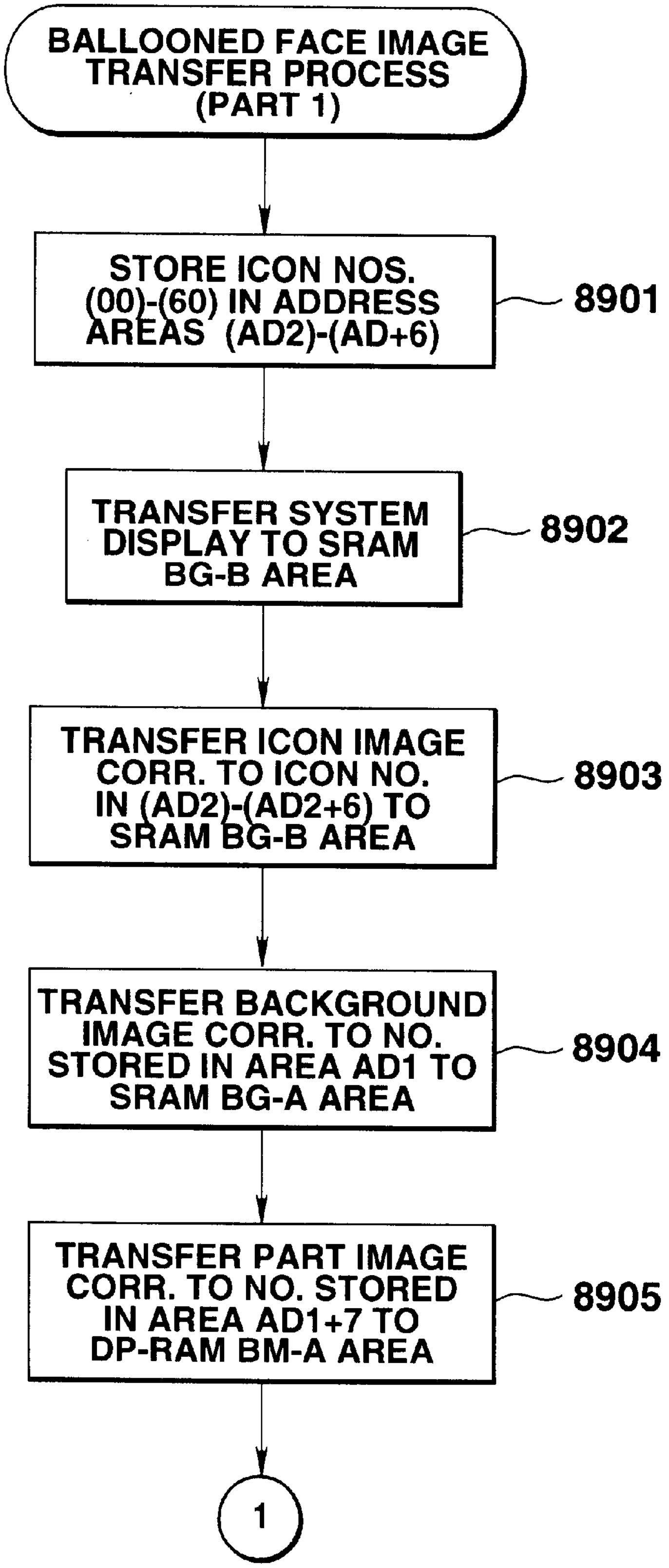
FIG. 89 is a flow chart for a ballooned face image display process (part 1)
Figure 90:
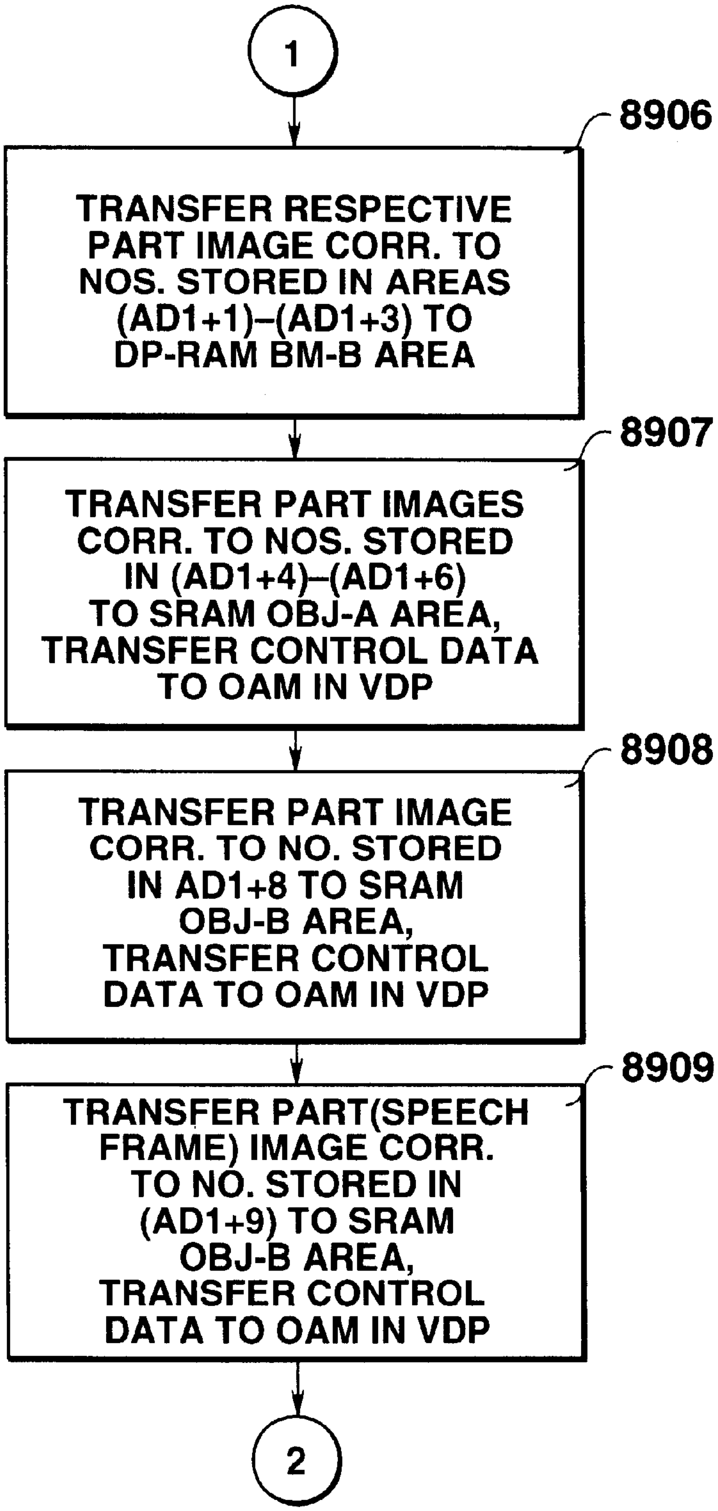
FIG. 90 is a flow chart for the ballooned face image display process (part 2)
Figure 91:
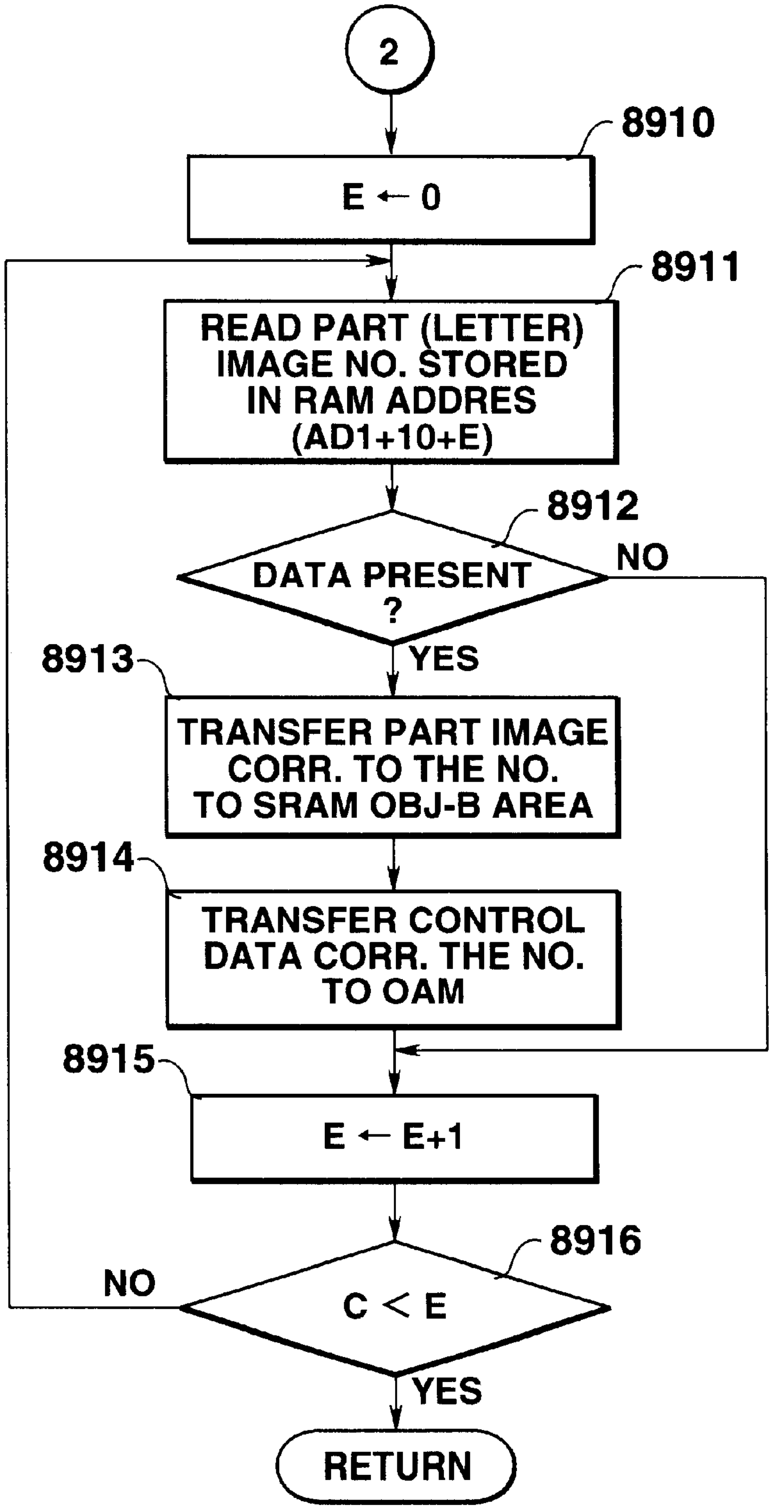
FIG. 91 is a flow chart for the ballooned face image display process (part 3)
Figure 92:
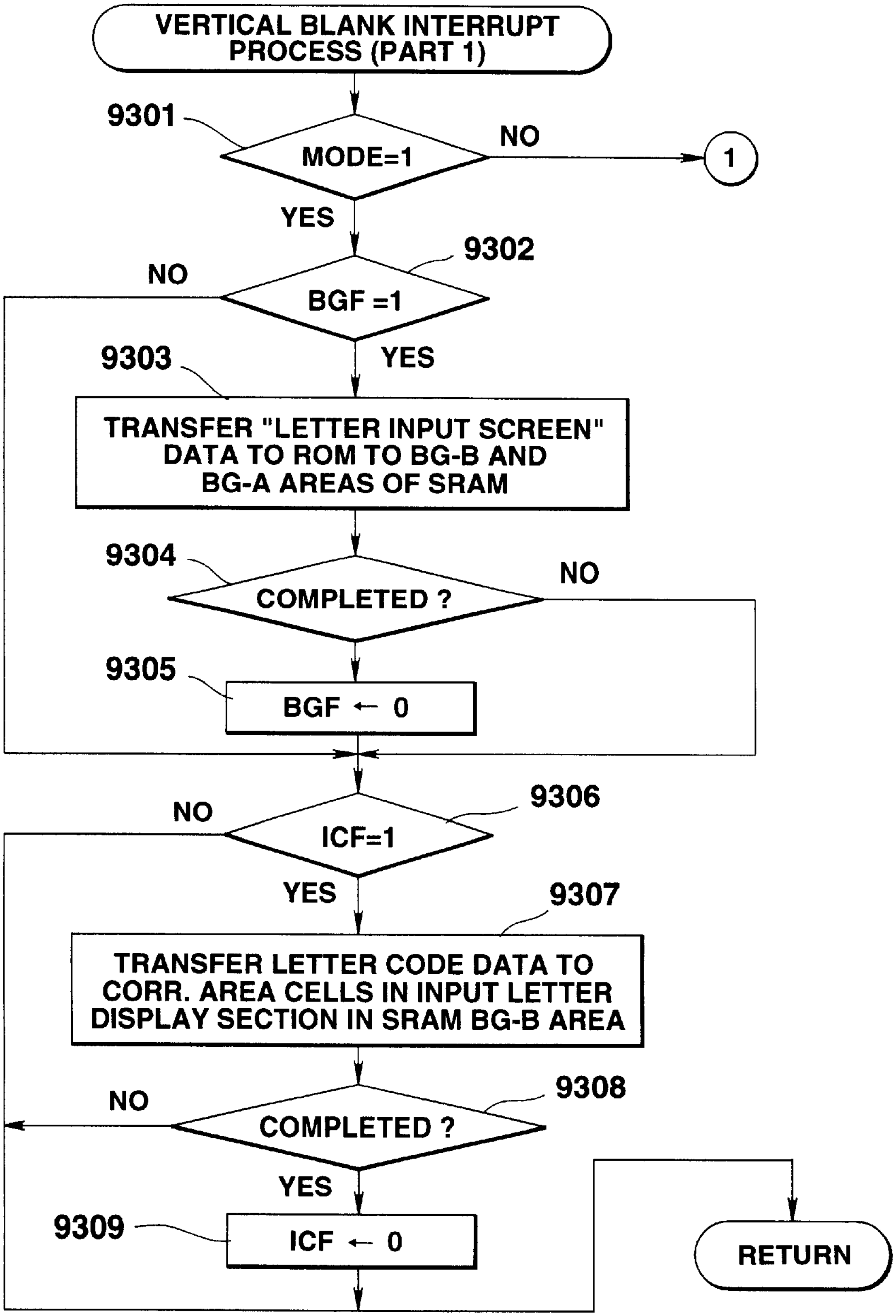
FIG. 92 is a flow chart for a V blank interrupt process (part 1)

FIGS. 89–91 are an operational flow chart indicative of a ballooned face image transfer at step 8437 of FIG. 87 in which data necessary for display of the portrait is transferred to the respective elements concerned. The actual transfer of the data is performed in an interrupt process which is executed in a vertical blank period, which interrupt process will be described later.

First, at step 8901, the CPU 101 stores data on part kind select icon numbers indicated by (00)–(60) in program/data ROM 107 of FIG. 74 in the respective areas AD2 to AD2+6 of work RAM 108 of FIG. 77. Thereafter, at step 8902, the CPU 101 transfers data on display images of a system display screen such as command icons from program/data ROM 107 to BG-B plane memory area of SRAM 103 (FIG. 75).

At step 8903 subsequent to 8902, the CPU 101 further transfers data on the images of the part kind select icons corresponding to the icon numbers, data on which is stored in the respective areas AD2 to AD+6 of work RAM 108 (FIG. 77) from program/data ROM 107 to the BG-B plane memory area of SRAM 103 (FIG. 75). Thereafter, at subsequent step 8904, the CPU 101 transfers data on the image of a background corresponding to the number, data on which is stored in area AD1 of work RAM 108 (FIG. 77), from program/data ROM 107 to the BG-A plane memory area of SRAM 103 (FIG. 75).

When the process at step 8904 ends, the CPU 101 transfers data on a part (front hair) image corresponding to the number, data on which is stored in area AD1+7 of work RAM 108, to the BM-A plane memory area of DP-RAM 104 (FIG. 76) (step 8905). The operation at step 8905 is realized by the transfer of the front image data read by CPU 101 from program/data ROM 107 to the BM-A plane memory area of DP-RAM 104 through VDP 102. When this processing ends, the CPU 101 passes to a process at step 8906 of FIG. 89.

Figure 76:
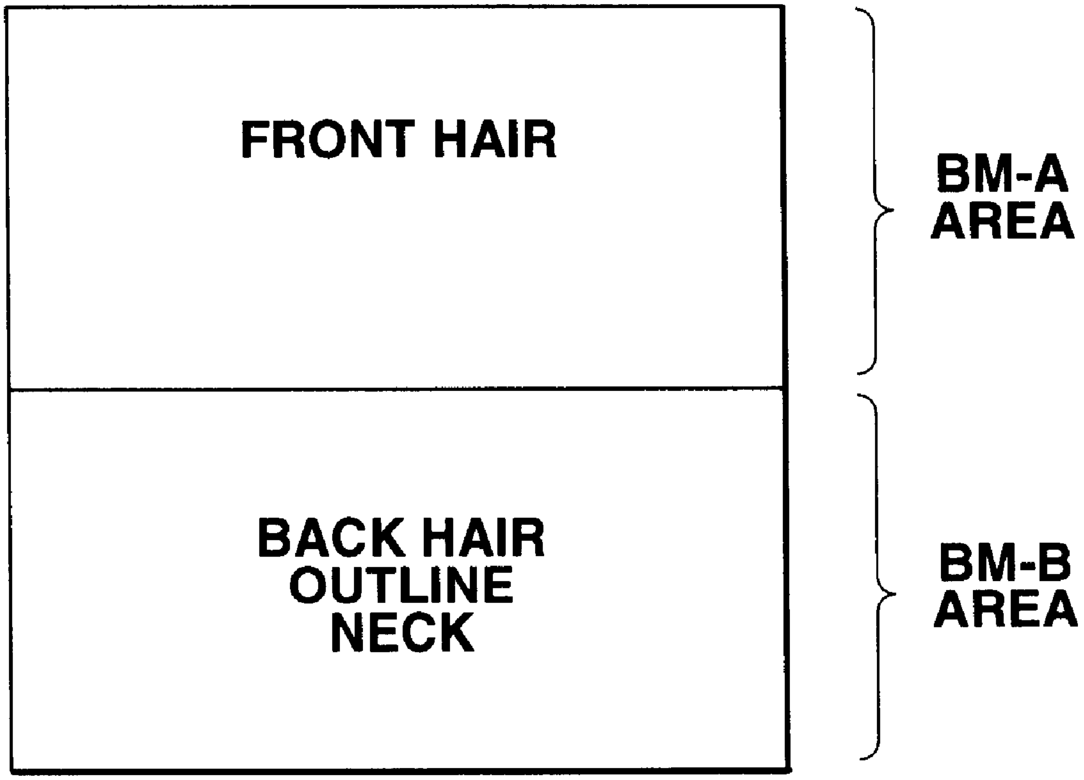
FIG. 76 illustrates a format of image data stored in DP-RAM.

At step 8906 the CPU 101 transfers data on the respective images of parts (front hair, outline,-and neck) corresponding to the numbers, data on which is stored in respective areas AD1+1 to AD1+3 of work RAM 108, to the BM-B plane memory area of DP-RAM 104 (FIG. 76). The operation at step 8906 is realized by the CPU 101 transfer of data on the respective images of the front hair, outline and neck read by CPU 101 from program/data ROM 107 to the BM-B plane memory area of DP-RAM 104 through VDP 102.

After the process at step 8906, the CPU 101 transfers at step 8907 data on the images of the respective parts (nose, eyes, mouth) corresponding to the numbers, data on which is stored in the respective areas AD1+4 to AD1+6 of work RAM 108, to the OBJ-A plane memory area of SRAM 103 (FIG. 75) and control data which designates the display positions of those part images to object attribute memory 307 of VDP 102. The transfer of this control data is realized by the transfer of control data read from program/data ROM 107 by CPU 101 to VDP 102.

At step 8908 subsequent to step 8907, the CPU 101 transfers data on the image of eyebrows corresponding to the number, data on which is stored at area AD1+8 of work RAM 108 (FIG. 77), to the OBJ-B plane memory area (FIG. 75) of SRAM 103 and also transfers control data which designates the display position of the part image to object attribute memory 307 of VDP 102.

At step 8909 subsequent to step 8909, the CPU 101 transfers data on the image of a speech frame corresponding to the number, data on which is stored at area AD1+9 of work RAM 108 (FIG. 77), to the OBJ-B plane memory area (FIG. 75) of SRAM 103 and also transfers control data which designates the display position of that part image to object attribute memory 307 of VDP 102.

At step 8910 of FIG. 89 subsequent to 8909, the CPU 101 substitutes "0" into variable E, which is used to transfer to SRAM 103 letter code data for the number of input letters which makes up a speech.

At step 8911 subsequent to step 8910, the CPU 101 reads data on a letter number, stored in area AD1+10+E (which is the value of variable E) of work RAM 108 (FIG. 77). Thereafter, at step 8912, the CPU 101 determines at step 8912 whether data on the letter number has been stored in that area. If not, the CPU 101 passes to a process at step 8915. Conversely, if so, CPU 101 passes to a process at step 8913.

At step 8913, the CPU 101 reads from work RAM 108 data on the letter image (codes) corresponding to the number, data on which is read from work RAM 108 at step 8911, and transfers it to the OBJ-B plane memory area of SRAM 103 (FIG. 25). Then, at step 8914, the CPU 101 transfers control data which designates the display position of the letter image, data on which was transferred, to object attribute memory 307 of VDP 102 (FIG. 11).

When the transfer of the control data ends, the CPU 101 increments the value of variable E at step 8914 and then determines whether variable E is larger in value than variable C at step 8916. If so, the CPU 101 determines that transfer of the letter image data has not been completed, and returns to the process at step 8911. Conversely, when the CPU 101 determines that value E is larger in value than variable C, the CPU 101 determines that the transfer of the letter image data has been completed and terminates the series of processes.

Operational Flow of an Interrupt Process

A vertical blanking interrupt process which executes the transfer of image data, etc., will be described in detail with reference to an operational flow chart of FIGS. 92–95. The vertical blanking interrupt process is performed during a vertical blank period (FIG. 12) of the screen display so as to prevent the occurrence of an undesirable matter on the display screen.

First, at step 9301, the CPU 101 determines whether the mode number (which is the value of variable MODE) is "1", that is, whether the letter input mode has been set. If so, the CPU 101 performs the processes at steps 9302–9309. Conversely, if not, that is, if the CPU 101 determines that the basic input mode (portrait creation mode) has been set, the CPU 101 performs processes at steps 9310 of FIG. 92–step 9351 of FIG. 95

At step 9302, the CPU determines whether the value of variable BGF is "1". If not, the CPU 101 passes to a process at step 9306. Conversely, if the CPU 101 determines that the value of variable BGF is "1", the CPU 101 determines that the transfer of image data to be stored in the BG-A and -B plane memory areas of SRAM 103 has not been completed, and passes to a process at step 9303.

At step 9303, the CPU 101 transfers image data for the letter input screen of program/data ROM 107 (FIG. 102) to the BG-A and -B screen memory areas of SRAM 103 (FIG. 75). Thereafter, at step 9314, the CPU 101 determines whether the transfer of the image data has ended. If so, the CPU 101 substitutes "0" into variable BGF at step 9305, and performs a process at step 9306. Conversely, when the CPU 101 determines that the transfer of the image data has not ended, it performs a process at step 9306.

If the transfer of the image data has not ended, the CPU 101 transfers the image data which has not yet been transferred in the vertical blanking interrupt process to be performed next. More specifically, by repetition of the vertical blanking interrupt process, the CPU 101 sequentially transfers data to SRAM 103, DP-RAM 104, and object attribute memory 307 of VDP 102. The processes at steps 9302–9305 involve the transfer of image data to the BG-A and -B plane memory areas. The transfer of image data in those display screen memories is iterated until the CPU 101 substitutes "0" into variable BGF, which applies to image data on other display screen memory areas.

At step 9306, the CPU 101 determines whether the value of variable ICF is "1". If not, the CPU 101 terminates the series of processes. Conversely, if so, the CPU 101 determines that the transfer of code data which displays letters input by the user has not been completed and passes to a process at step 9307.

At step 9307, the CPU 101 transfers code data on the letters to be input and displayed in the letter input area of the BG-B plane to area cells (not shown) provided in correspondence to the respective letters in the BG-B plane memory area (FIG. 75) of SRAM 103. Thereafter, at step 9308, the CPU 101 determines whether the transfer of the code data has ended. If so, the CPU 101 substitutes "0" into variable ICF at step 9309 and then terminates the series of processes. Conversely, if not, the CPU 101 terminates the series of processes directly.

Figure 93:
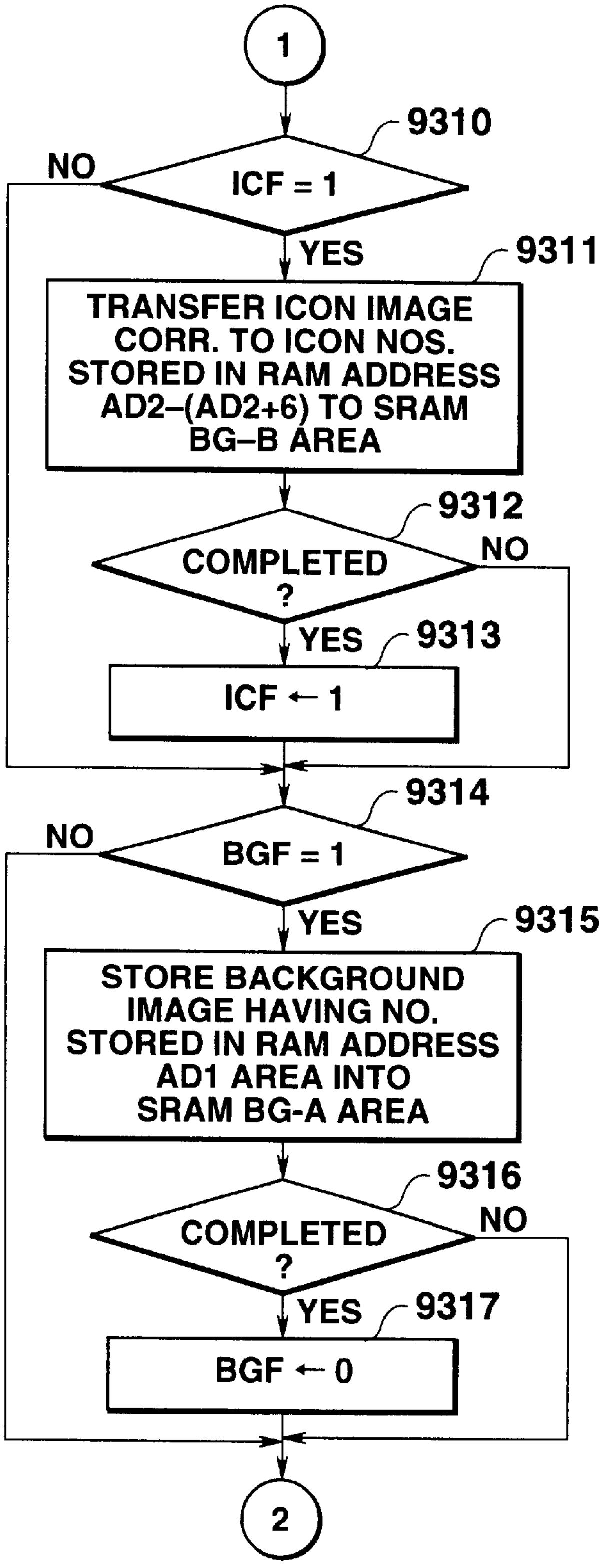
FIG. 93 is a flow chart for the V blank interrupt process (part 2)
Figure 95:
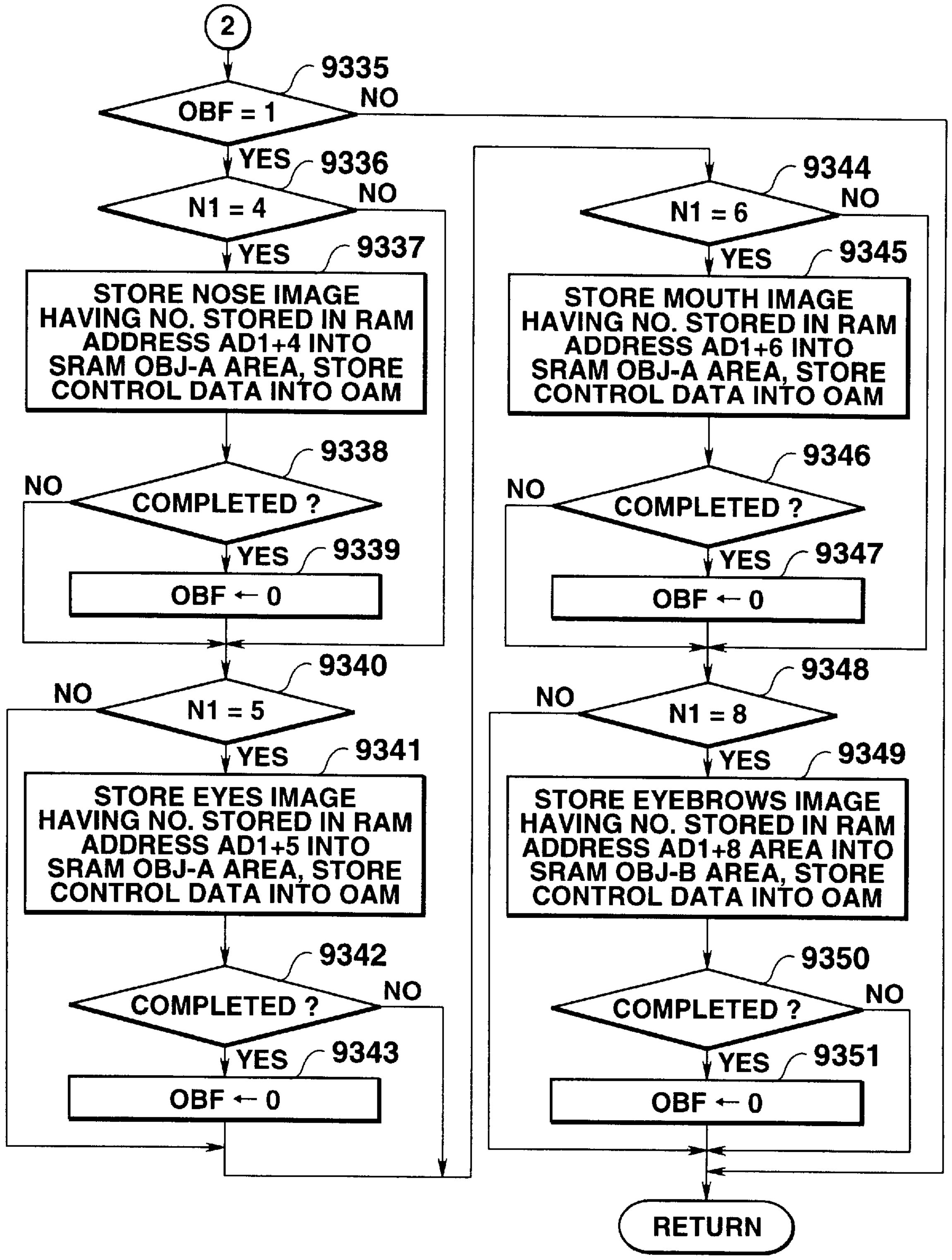
FIG. 95 is a flow chart for the V blank interrupt process (part 4)
Figure 96:
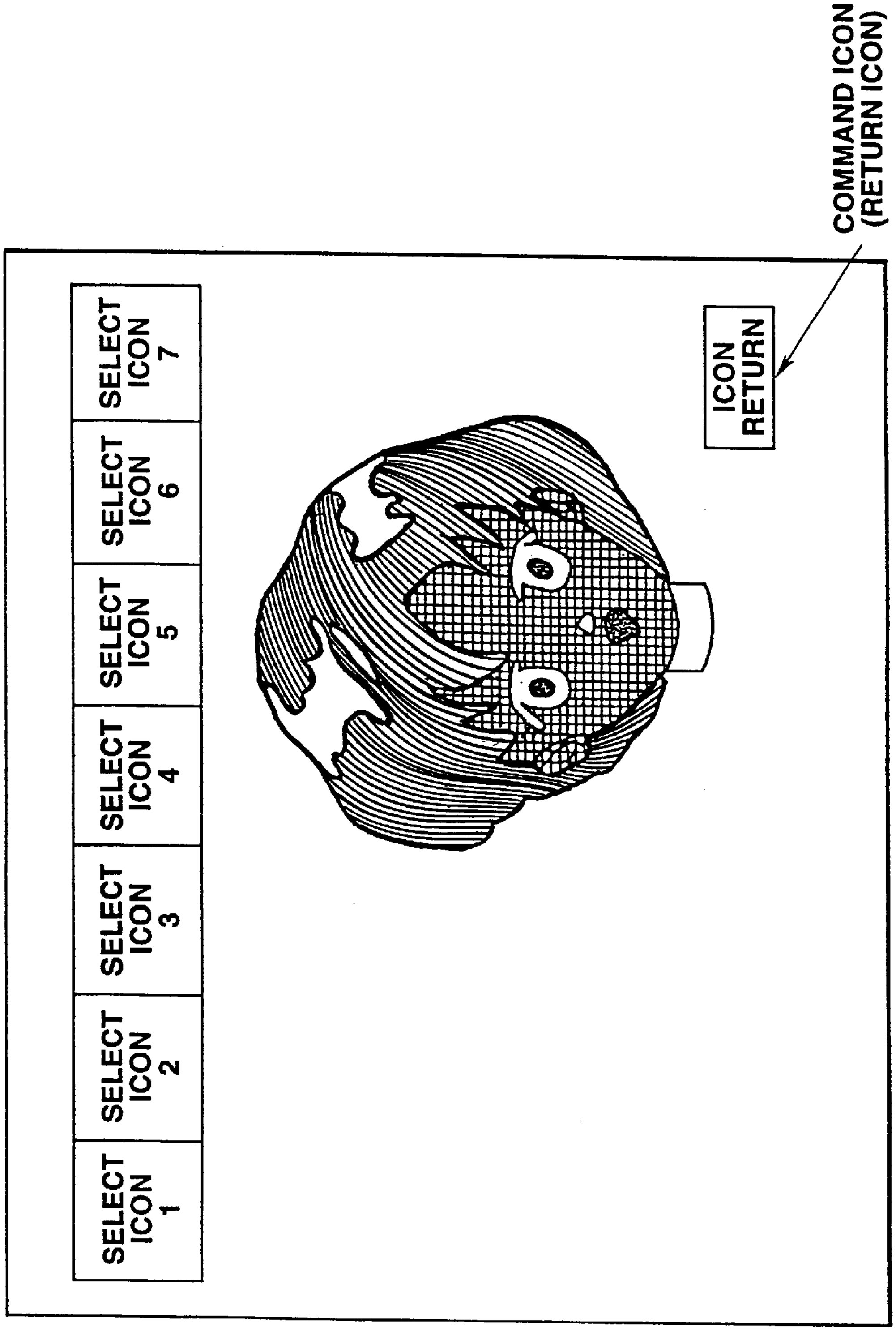
FIG. 96 shows the layout of a basic system screen (initial screen)

When the CPU 101 determines at step 9301 that the mode number (which is the value of variable MODE) is not "1", it performs a process at step 9310 of FIG. 93–step 9351 of FIG. 95, as described above.

At step 9310, the CPU 101 determines whether the value of variable ICF is 1. If not, the CPU 101 passes to a process at step 9314. Conversely, if so, the CPU 101 determines that the transfer of data on the image of the code kind select icon has not been completed and passes to the process at step 9311.

At step 9311, the CPU 101 transfers image data corresponding to the icon numbers, data on which is stored in areas AD2 to AD2+6 of work RAM 108 of FIG. 77), to the BG-B plane memory area of SRAM 103 (FIG. 25). Thereafter, at step 9312, the CPU 101 determines whether the transfer of the image data has ended. If so, at step 9313, the CPU 101 substitutes "0" into variable ICF, passes to the process at step 9314. If not, the CPU 101 passes to the process at step 9314. The process at step 9311 is realized by the transfer of the appropriate image data of program/data ROM 107 by the CPU 101 through CPU 101 interface 301, address bus 315, data bus 316 and SRAM interface 302 of FIG. 3 to SRAM 103.

Each time the CPU 101 iterates the vertical blanking interrupt process until the CPU 101 substitutes "0" into variable ICF at step 9313, the CPU 101 transfers data on the image of the select icon to the BG-B plane memory area of SRAM 103.

At step 9314, the CPU 101 determines whether the value of variable BGF is "1". If not, the CPU 101 passes to a process at step 9318 of FIG. 94. Conversely, if so, the CPU 101 determines that the transfer of the background image data has not been completed, and passes to a process at step 9315.

At step 9315, the CPU 101 transfers data on a background image corresponding to the number, data on which is stored in area AD1 of work RAM 108 of FIG. 77, to the BG-A plane memory area of SRAM 103 (FIG. 25). Thereafter, at step 9316, the CPU 101 determines whether the transfer of the image data has ended. If so, the CPU 101 substitutes "0" into variable BGF at step 9317, and passes to the process at step 9318. Conversely, if not, the CPU 101 passes directly to the process at step 9318. The process at step 9315 is realized by the transfer of the appropriate image data of program/data ROM 107 by CPU 101 through CPU interface 301, address bus 315, data bus 316 and SRAM interface 302 of FIG. 3 to SRAM 103.

Until the CPU 101 substitutes "0" into variable BGF at step 9317, the CPU 101 performs the transfer of the select icon image data into the BG-A plane memory area of SRAM 103 by iteration of the vertical blanking interrupt process.

Figure 94:
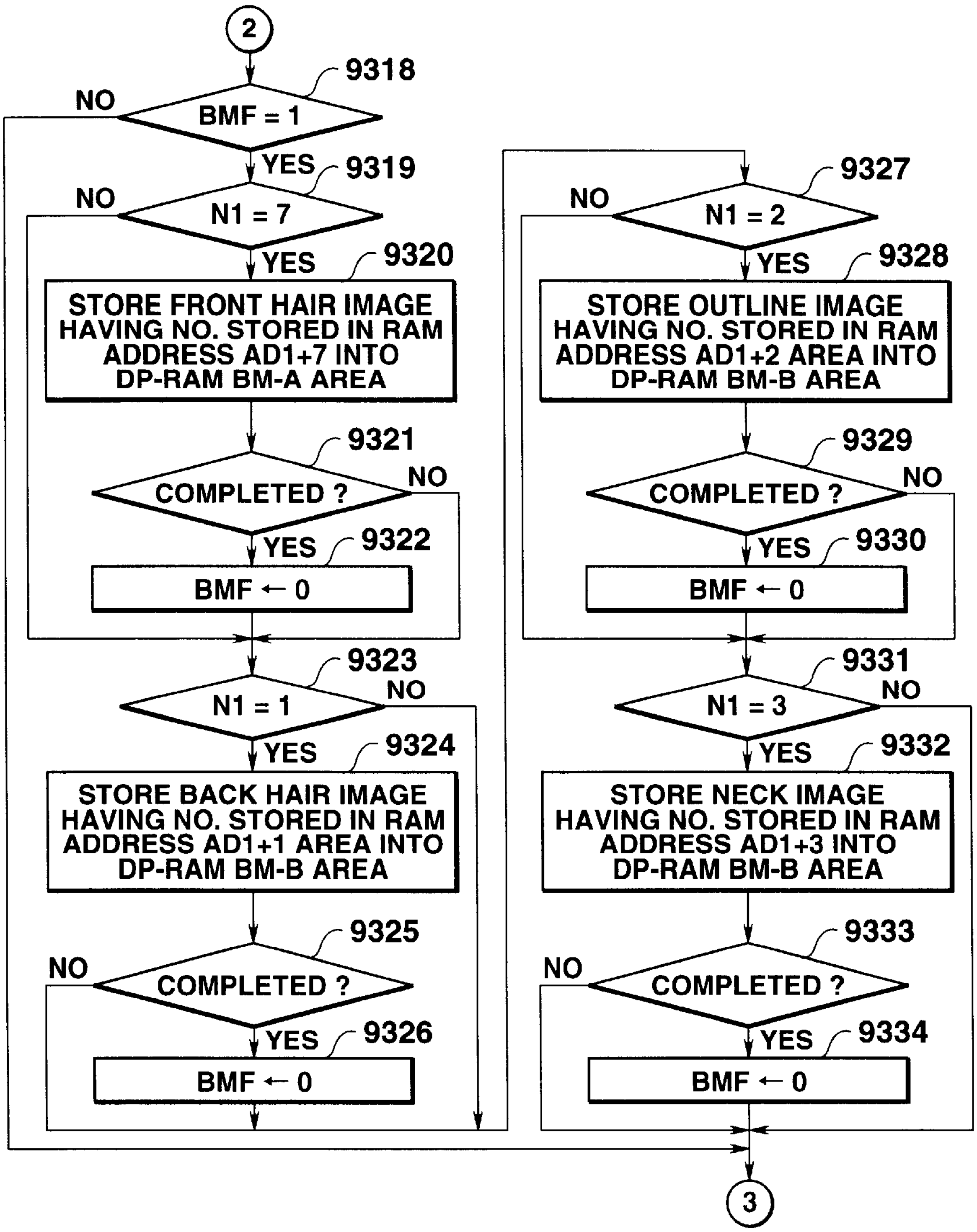
FIG. 94 is a flow chart for the V blank interrupt process (part 3)

The processes at steps 9318–9334 of FIG. 94 includes a series of processes performed in accordance with the value of variable BMF. When the value of variable BMF is "1", the CPU 101 transfers data on the image of a part transferred to DP-RAM 104 to DP-RAM 104 in accordance with data on the kind of that part transferred by DP-RAM 104.

First, at step 9318, the CPU 101 determines whether the value of variable BMF is "1", that is, whether data on the image of a bit map, for example, of back hair, outline, neck or front hair should be transferred. If not, the CPU 101 passes to a process at step 9335 of FIG. 95. Conversely, if so at step 9318, the CPU 101 determines at step 9319 whether the value of variable N1 in which a value indicative of the kind of that part, the image data on which should be transferred has been substituted, as describe above, is "7", that is, whether the kind of that part, the image data on which should be transferred is front hair. If not, the CPU 101 passes to a process at step 9323. Conversely, if so, the CPU 101 passes to a process at step 9320.

At step 9320, the CPU 101 transfers data on the image of front hair corresponding to the number, data on which has been stored in area AD1+7 of work RAM 108 (FIG. 77), from program/data ROM 107 to the BM-A area of DP-RAM 104 (FIG. 76). Thereafter, at step 9321, the CPU 101 determines whether the transfer of the image data has ended. If so, the CPU 101 substitutes "0" into variable BMF at step 9322, and then passes a process at step 9323. Conversely, if not at step 9321, the CPU 101 passes directly to the process at step 9323.

Until "0" is substituted into variable BMF at step 9322, the CPU 101 responds to the iteration of the vertical blanking interrupt process to sequentially transfer and store data on the front hair image read from program/data ROM 107 to and in the BM-A plane memory area of DA-RAM 104.

At step 9323, the CPU 101 determines whether the value of variable N1 is "1", that is, whether the kind of a part, image data on which is to be transferred is back hair. If not, the CPU 101 passes to a process at step 9327. Conversely, if so, the CPU 101 passes to a process at step 9324.

At step 9324, the CPU 101 transfers data on the image of back hair corresponding to the number, data on which has been stored in area AD1+1 of work RAM 108 (FIG. 77), from program/data ROM 107 to the BM-B area of DP-RAM 104 (FIG. 76). Thereafter, at step 9325, the CPU 101 determines whether the transfer of the image data has ended. If so, the CPU 101 substitutes "0" into variable BMF at step 9326, and then passes to a process step 9327. Conversely, if not, the CPU 101 passes directly to a process at step 9327.

Until "0" is substituted into variable BMF at step 9326, the CPU 101 responds to the iteration of the vertical blanking interrupt process to sequentially transfer and store data on the back hair image read from program/data ROM 107 to and in the BM-B plane memory area of DA-RAM 104.

At step 9327, CPU 101 determines whether the value of variable N1 is "2", that is, whether the kind of a part, image data on which is to be transferred, is outline. If not, the CPU 101 passes to a process at step 9331. Conversely, if so, the CPU 101 passes to a process at step 9328.

At step 9328, the CPU 101 transfers data on the image of an outline corresponding to the number, data on which has been stored in area AD1+2 of work RAM 108 (FIG. 77), from program/data ROM 107 to the BM-B area of DP-RAM 104 (FIG. 76). Thereafter, at step 9329, the CPU 101 determines whether the transfer of the image data has ended. If so, the CPU 101 substitutes "0" into variable BMF at step 9330, and then passes to a process at step 9331. Conversely, if not at step 9329, the CPU 101 passes directly to a process at step 9331.

Until "0" is substituted into variable BMF at step 9330, the CPU 101 responds to the iteration of the vertical blanking interrupt process to transfer and store data on the outline image read from program/data ROM 107 to and in the BM-B plane memory area of DA-RAM 104.

At step 9331, CPU 101 determines whether the value of variable N1 is "3", that is, whether the kind of part, image data on which is to be transferred, is neck. If not, the CPU 101 passes to a process at step 9335 of FIG. 95. Conversely, if so, the CPU 101 passes to a process at step 9332.

At step 9332, the CPU 101 transfers data on the image of a neck corresponding to the number, data on which has been stored in area AD1+3 of work RAM 108 (FIG. 77), from program/data ROM 107 to the BM-B plane memory area of DP-RAM 104 (FIG. 76). Thereafter, at step 9333, the CPU 101 determines whether the transfer of the image data has ended. If so, the CPU 101 substitutes "0" into variable BMF at step 9334, and then passes to a process at step 9335. Conversely, if not at step 9333, the CPU 101 passes directly to a process at step 9335.

Until "0" is substituted into variable BMF at step 9334, the CPU 101 responds to the iteration of the vertical blanking interrupt process to sequentially transfer and store data on the neck image read from program/data ROM 107 to and in the BM-B plane memory area of DA-RAM 104.

At step 9335 of FIG. 75, the CPU 101 determines whether the value of variable OBF is "1", that is, whether the CPU 101 should transfer data on the image of any one of the parts which are classified into objects (sprites) such as nose, eyes, mouth and eyebrows. If not, the CPU 101 terminates the series of processes. Conversely, if so, the CPU 101 passes to a process at step 9336. At steps 9336–9351, the CPU 101 transfers image data depending on the kind of that part (sprite).

At step 9326, the CPU 101 determines whether the value of variable N1 is "4", that is, whether the kind of a part, image data on which is to be transferred, is nose. If not, the CPU 101 passes to a process at step 9340. Conversely, if so, the CPU 101 passes to a process at step 9337.

At step 9337, the CPU 101 transfers data on the image of a neck corresponding to the number, data on which has been stored in area AD1+4 of work RAM 108 (FIG. 77), from program/data ROM 107 to the OBJ-A plane memory area of SRAM 103 (FIG.75) and also transfers control data which indicates the display position of the image data from program/data ROM 107 to object attribute memory 307 (FIG. 11) of VDP 102. Thereafter, at step 9338, the CPU 101 determines whether the transfer of the image data has ended. If so, the CPU 101 substitutes "0" into variable OBF at step 9339, and then passes a process at step 9340. Conversely, if not at step 9338, the CPU 101 passes directly to a process at step 9340.

Until "0" is substituted into variable OBF at step 9339, the CPU 101 responds to the iteration of the vertical blanking interrupt process to sequentially transfer data on the neck image or control data read from program/data ROM 107 to the OBJ-A plane memory area of SRAM 103 or object attribute memory 307 of VDP 102.

At step 9340, CPU 101 determines whether the value of variable N1 is "5", that is, the kind of a part, image data on which is to be transferred, is eyes. If not, the CPU 101 passes to a process at step 9344. Conversely, if so, the CPU 101 passes to a process at step 9341.

At step 9341, the CPU 101 transfers data on the image of eyes corresponding to the number, data on which has been stored in area AD1+5 of work RAM 108 (FIG. 77), from program/data ROM 107 to the OBJ-A plane memory area of SRAM 103 (FIG.75) and also transfers control data which indicates the display position of the image data from program/data ROM 107 to object attribute memory 307 (FIG. 11) of VDP 102. Thereafter, at step 9342, the CPU 101 determines whether the transfer of the image data has ended. If so, the CPU 101 substitutes "0" into variable OBF at step 9343, and then passes to a process at step 9344. Conversely, if not at step 9342, the CPU 101 passes directly to a process at step 9344.

Until "0" is substituted into variable OBF at step 9343, the CPU 101 responds to the iteration of the vertical blanking interrupt process to sequentially transfer data on the eyes image or control data read from program/data ROM 107 to the OBJ-A plane memory area of SRAM 103 or object attribute memory 307 of VDP 102.

At step 9344, CPU 101 determines whether the value of variable N1 is "6", that is, whether the kind of a part, image data on which is to be transferred, is mouth. If not, the CPU 101 passes to a process at step 9348. Conversely, if so, the CPU 101 passes to a process at step 9345.

At step 9345, the CPU 101 transfers data on the image of a mouth corresponding to the number, data on which has been stored in area AD1+6 of work RAM 108 (FIG. 77), from program/data ROM 107 to the OBJ-A area of SRAM 103 (FIG.75) and also transfers control data which indicates the display position of the image data from program/data ROM 107 to object attribute memory 307 (FIG. 11) of VDP 102. Thereafter, at step 9346, the CPU 101 determines whether the transfer of the image data has ended. If so, the CPU 101 substitutes "0" into variable OBF at step 9347, and then passes to a process at step 9348. Conversely, if not at step 9346, the CPU 101 passes directly to a process at step 9348.

Until "0" is substituted into variable OBF at step 9347, the CPU 101 responds to the iteration of the vertical blanking interrupt process to sequentially transfer data on the mouth image or control data read from program/data ROM 107 to the OBJ-A plane memory area of SRAM 103 or object attribute memory 307 of VDP 102.

At step 9348, CPU 101 determines whether the value of variable N1 is "8", that is, whether the kind of a part, image data on which is to be transferred, is eyebrows. If not, the CPU 101 terminates the series of processes. Conversely, if so, the CPU 101 passes to a process at step 9349.

At step 9349, the CPU 101 transfers data on the image of eyebrows corresponding to the number, data on which has been stored in area AD1+8 of work RAM 108 (FIG. 77), from program/data ROM 107 to the OBJ-B plane memory area of SRAM 103 (FIG.75) and also transfers control data which indicates the display position of the image data from program/data ROM 107 to object attribute memory 307 (FIG. 11) of VDP 102. Thereafter, at step 9350, the CPU 101 determines whether the transfer of the image data has ended. If so, the CPU 101 substitutes "0" into variable OBF at step 9351, and then terminates the series of processes. Conversely, if not at step 9350, the CPU 101 then terminates the series of process.

Until "0" is substituted into variable OBF at step 9351, the CPU 101 responds to the iteration of the vertical blanking interrupt process to sequentially transfer and store data on the eyebrows image or control data read from program/data ROM 107 to the OBJ-B plane memory area of SRAM 103 or object attribute memory 307 of VDP 102.

Figure 107:
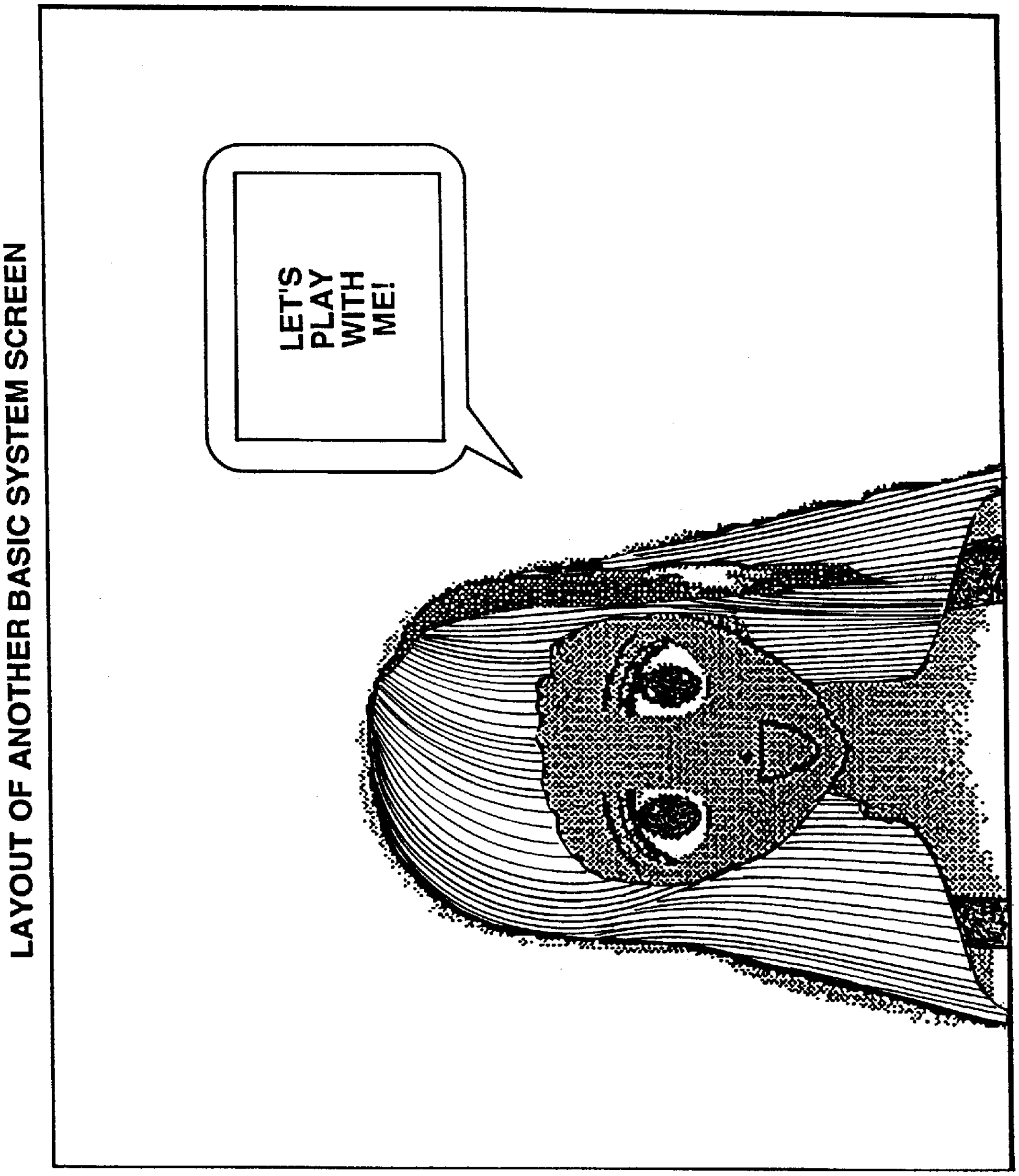
FIG. 107 shows the layout of another basic system screen.

As described above, when the data is transferred to SRAM 103, DP-RAM 104, and object attribute memory 307 of VDP 102, VDP 102 displays an image such as is shown, for example, in FIG. 100 on the display screen, using the transferred data. FIG. 107 shows another example of display of a portrait (basic system display screen) which the user created.

While in the second embodiment the starting position of a new line of a speech is designated by a new line symbol in the speech, the present invention is not limited to it. For example, the starting position of a new-line of a speech may be designated by indicating the number of letters to be displayed for each line in the speech frame.

While in the second embodiment the shape of a speech frame corresponding to a speech of three letters or more is illustrated as being changed in vertical width depending on the number of lines of the speech, a speech frame may be selected depending on the maximum number of letters per line of the speech and the number of lines of the speech from among a plurality of different speech frames, the horizontal length of each of which is changed depending on the number of line letters since the number of line letters is designated by a new line symbol.

Third Embodiments

In the third embodiment of the present invention, the individual letters which make up a letter string in a balloon are disposed on the basis of letter position storage information. The third embodiment is the same in structure and operation as the second embodiment except for the flow chart (parts 4 and 5) indicative of the ENTER switching operation of FIGS. 87 and 88, the flow chart indicative of the ballooned face image transfer process (part 3), and the layout of the letter input display screen (part 1) and (part 2) of FIGS. 102 and 103.

Therefore, only the points of the third embodiment different from the second embodiment will herein be described below.

Figure 108:
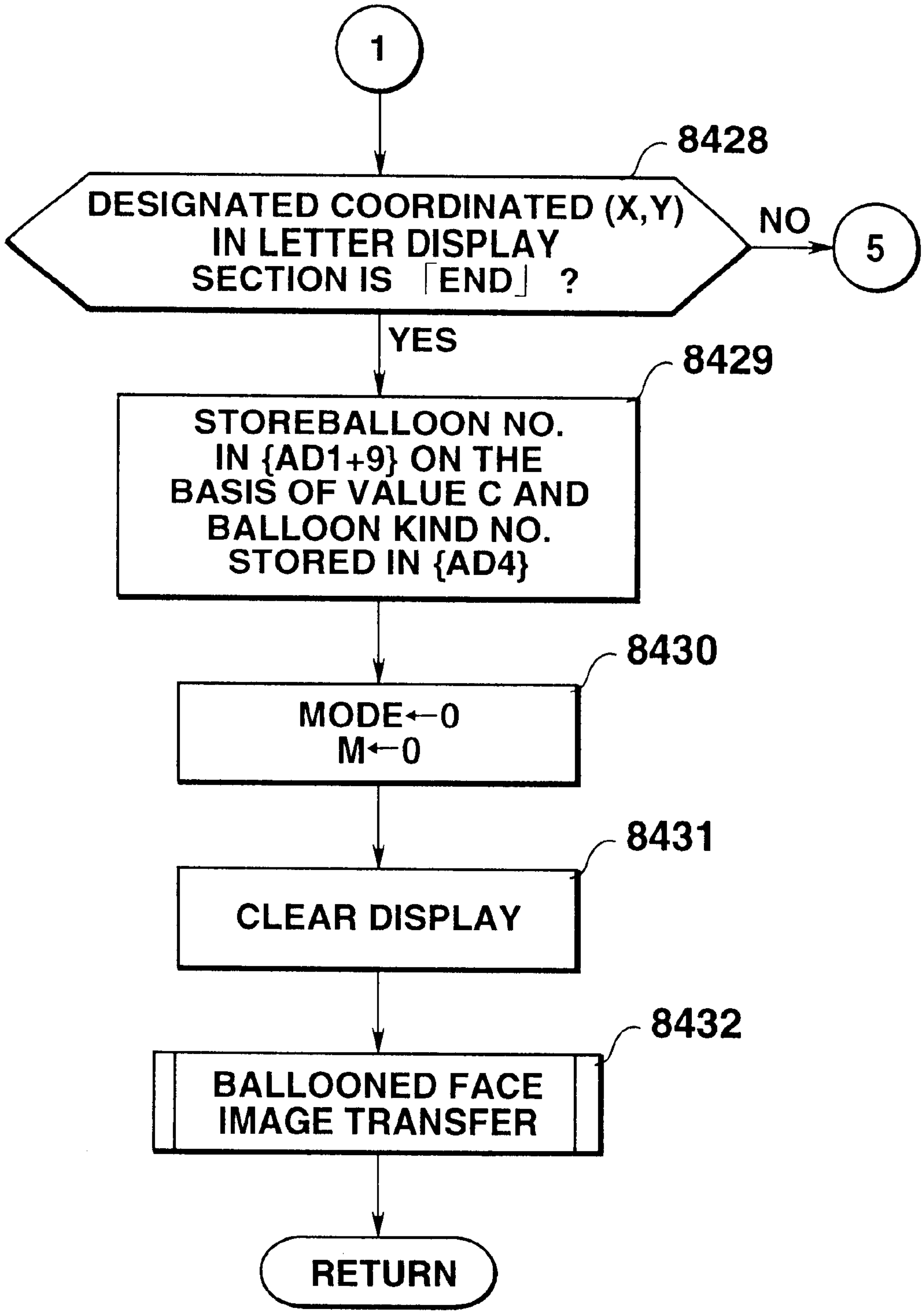
FIG. 108 is a flow chart for an ENTER switch operating process in a third embodiment of the present invention (part 4)
Figure 109:
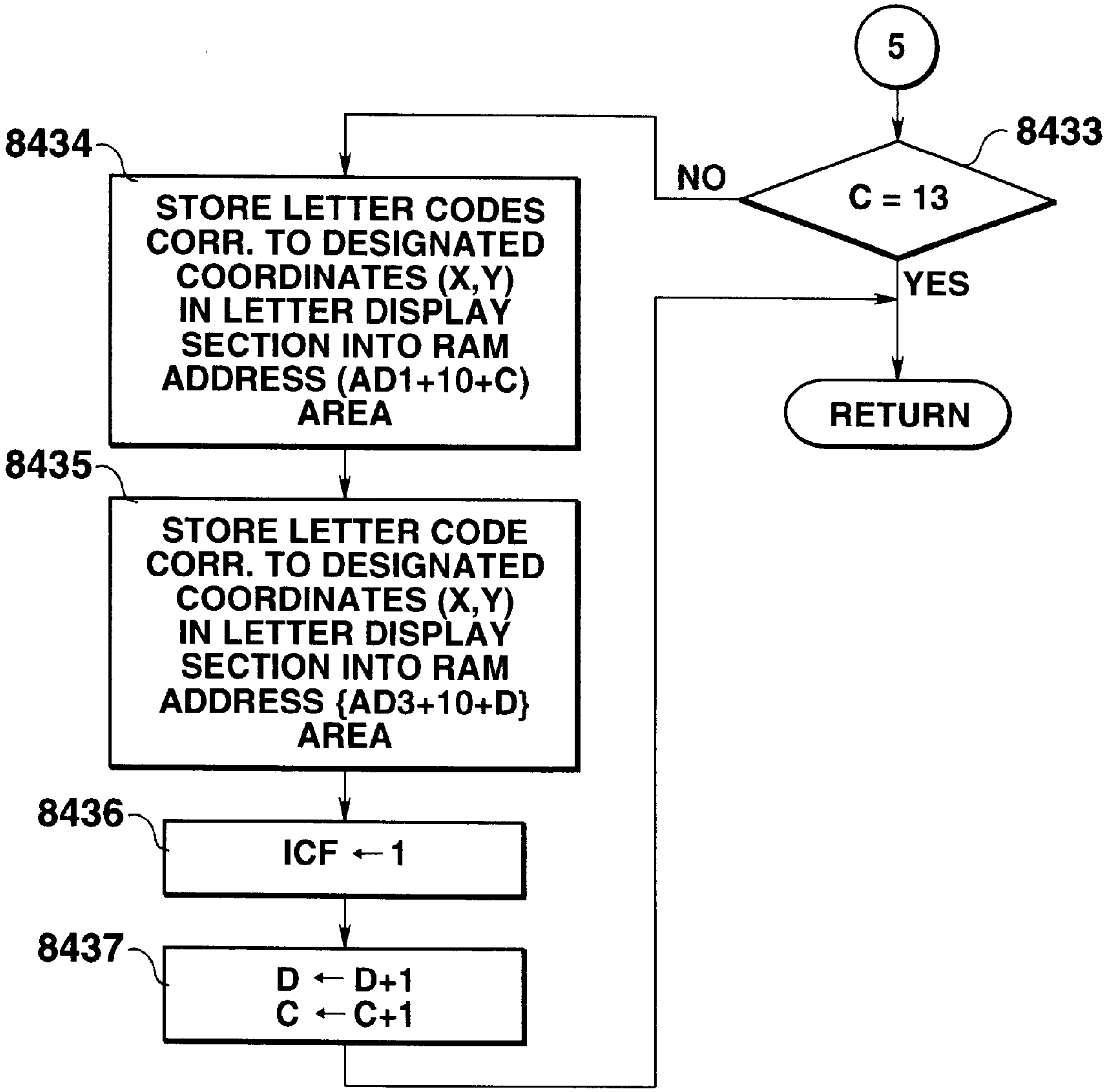
FIG. 109 is a flow chart for the ENTER switch process in the third embodiment of the present invention (part 5)

In the third embodiment, when the CPU 101 determines at step 8402 of FIG. 84 that the mode number (which is the value of the variable MODE) is not "0", that is, that the letter input mode has been set, the CPU 101 passes to a process at step 8428 of FIG. 108.

Figure 110:
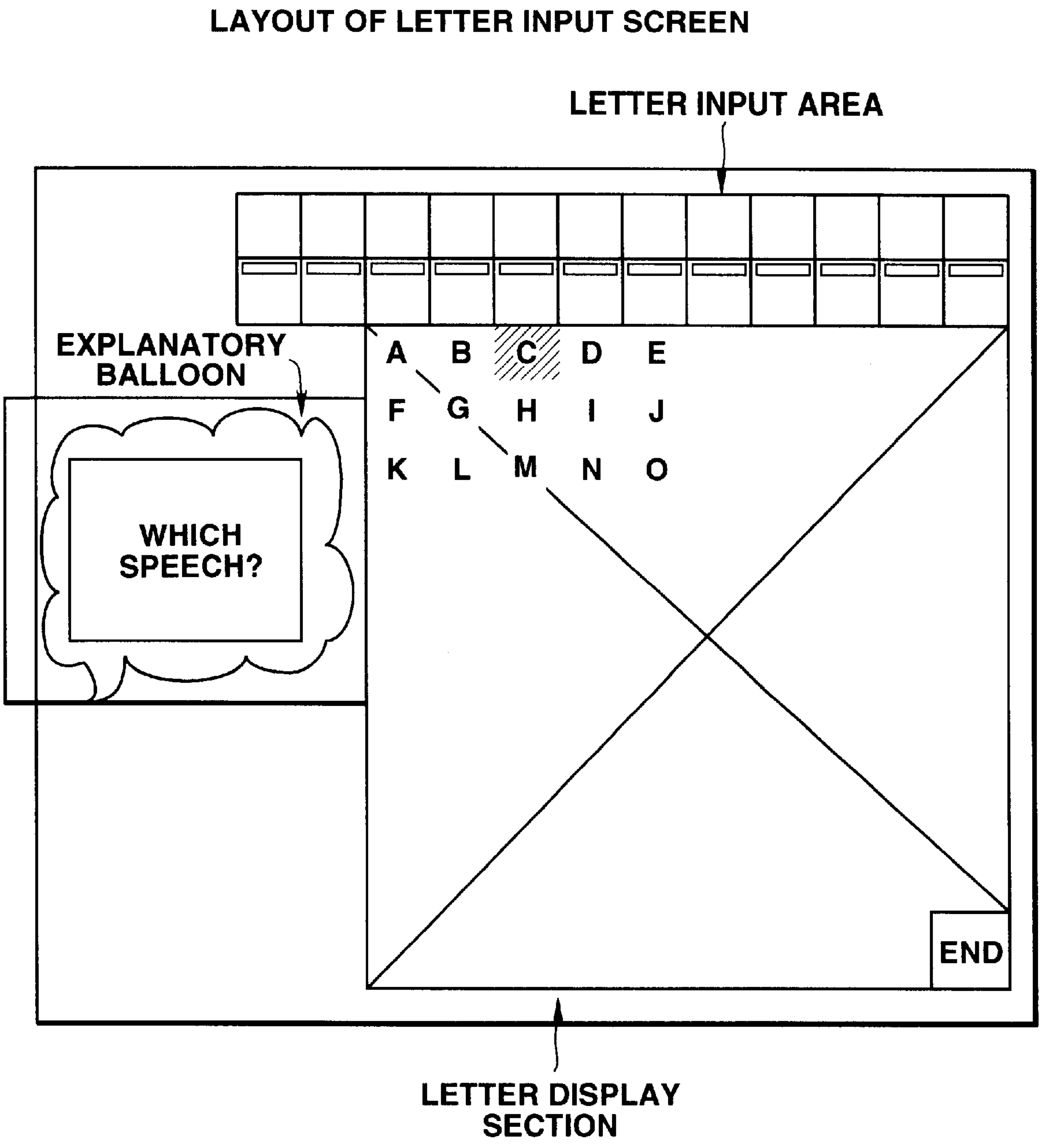
FIG. 110 shows the layout of a letter input screen in the third embodiment of present invention.

At step 8428, the CPU 101 determines whether the current emphatically displayed letter indicates "END" (FIG. 110), on the basis of the coordinates (X, Y) which will be changed in the cursor switching process by the operations of up, down, left and right cursor switches 203–206. If so, that is, the CPU 101 determines that the end of the input letters has been indicated by the user, the CPU 101 passes to a process at step 8429.

At step 8429, the CPU 101 stores data on a speech frame number to be displayed actually in an area AD1+9 of work RAM 108 on the basis of the value of variable C and the speech frame kind number, data on which is stored in area AD4 of work RAM 108.

Figure 111A:
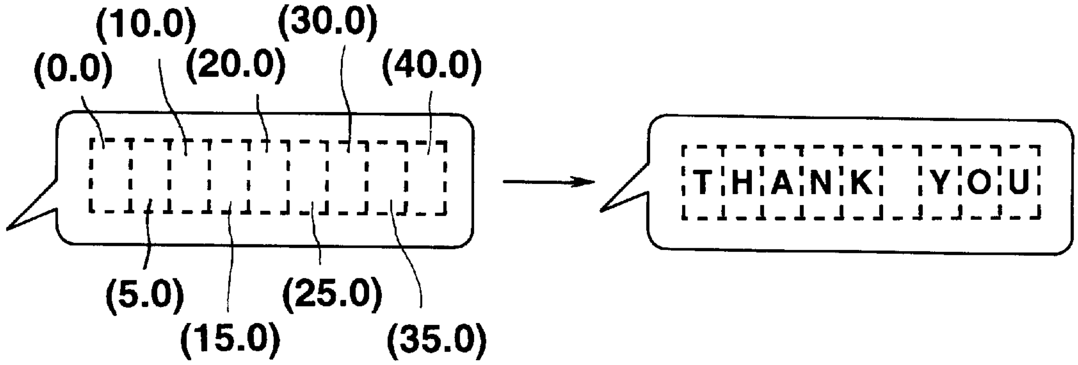
FIGS. 111A–111C each illustrate the arrangement of letters in a different speech frame.
Figure 111B:
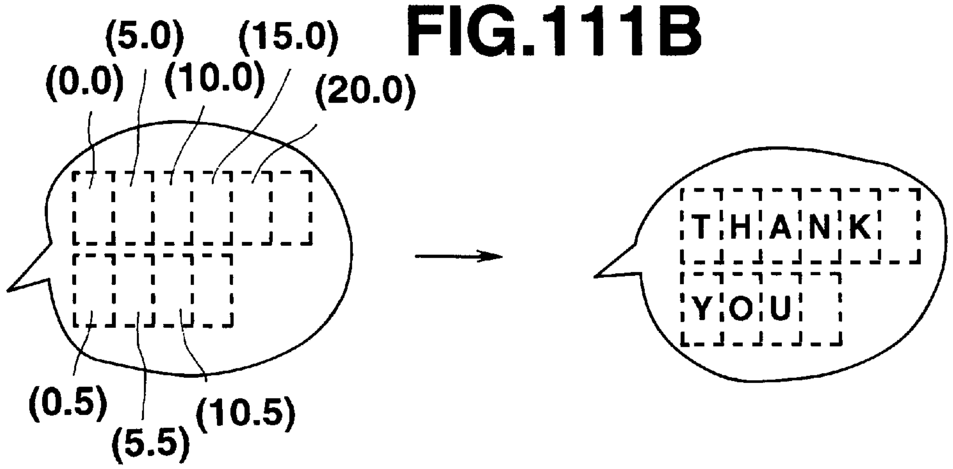
Figure 111C:
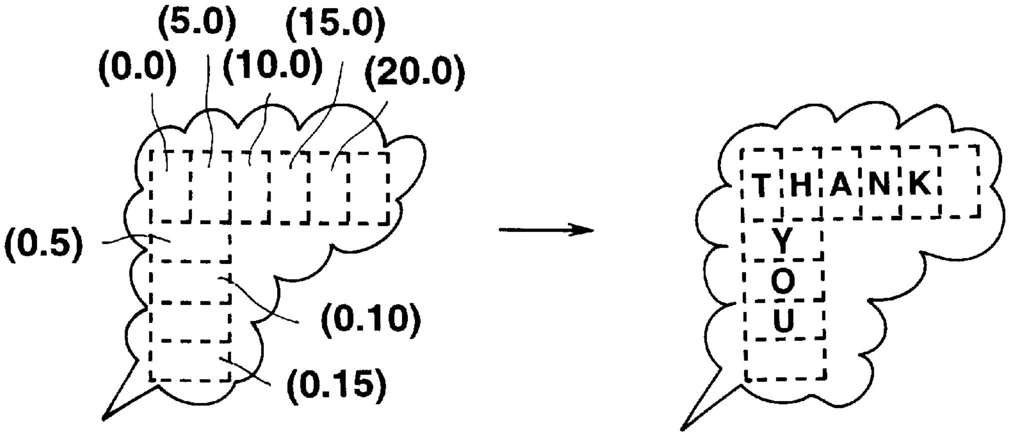

FIGS. 111A–111C each show an example of the same speech displayed in a different speech frame in which the display position of letters (that is, the number of letters displayable) is predetermined for each speech frame. Although the shapes of the speech frames are especially shown in the present embodiment, data on four images different in size for each kind of speech frame is stored as shown by (J–N–1) to (J–N–4) in FIG. 73 in program/data ROM 103. In the processing at step 8429, the CPU 101 determines a speech frame to be displayed in accordance with the number of letters of variable C from among four kinds of speech frames corresponding to the number of letters (N) of variable C.

When the processing ends at step 8429, the CPU 101 changes the mode number (value of variable MODE) and the value of variable M to "0" at step 8430, clears the display at step 8431, transfers data on the ballooned face image at 8432 to display the created image on the display screen, and terminates the series of processes. By the transfer of the ballooned face image data, for example, an image of FIG. 106 is displayed.

When the CPU 101 determines at step 8428 that no "end" is input, the CPU 101 passes to a process at step 8433 of FIG. 87, where the CPU 101 determines whether the value of variable C is "12", that is, whether 12 letters have been input which is a maximum number of letters to be input to make up a speech (since variable C is initially set at "0", the value of variable C becomes "12" after the 12 letters have been input). When the CPU 101 determines that the value of variable C is "12", the CPU 101 terminates the series of processes. Conversely, if the CPU 101 determines that the value of variable C is less than "12", it passes to a process at step 8434.

At step 8434, the CPU 101 determines a letter designated by coordinates (X,Y) in the letter display section and stores data on the codes of that letter in an area AD1+10+C (C is the value of variable C) of work RAM 108 of FIG. 74. When this processing ends, the CPU 101 stores data on the letter codes in an area AD3+10+D (D is the value of variable D) of work RAM 108 of FIG. 74 at step 8435. Thereafter, the CPU 101 substitutes "1" into variable ICF at step 8436, increments the values of variables C and D at step 8437, and then terminates the series of processes.

Figure 112:
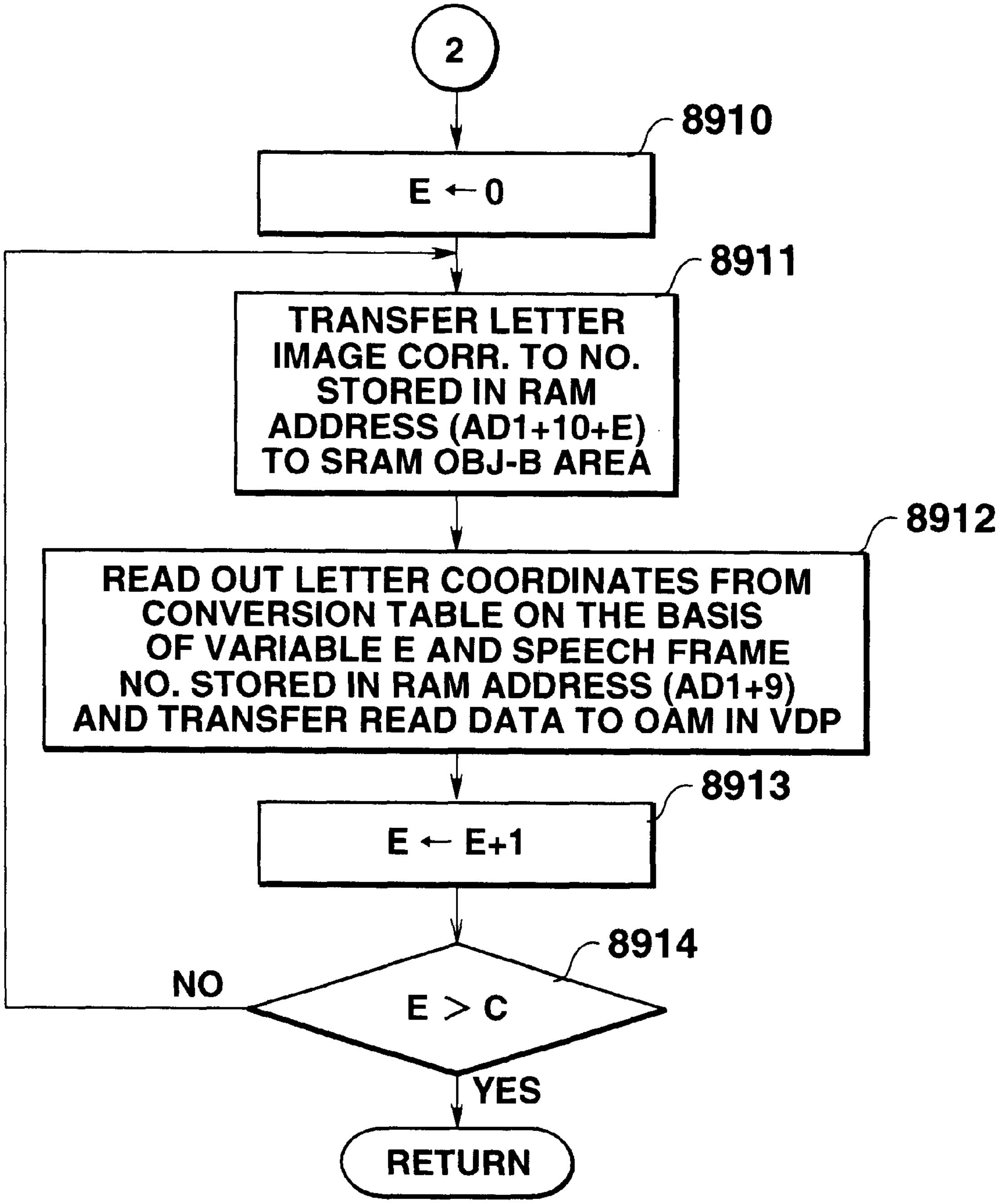
FIG. 112 is a flow chart for the transfer of a ballooned face image in the third embodiment of the present invention (part 3)

In the operational flow chart indicative of the ballooned face image transferring process, the CPU 101 substitutes "0" into variable E at step 8910 of FIG. 112 executed subsequently to step 8909. The variable E is used to transfer to SRAM 103 data on letter codes corresponding to the number of letters input to make up a speech.

At step 8911 subsequent to step 8910, the CPU 101 transfers image data corresponding to the number of a letter, data on which has been stored in area AD1+10+E (E is the value of variable E) of work RAM 108 of FIG. 77, to the OBJ-B plane memory area of SRAM 103. Thereafter, the CPU 101 passes to a process at step 8912.

At step 8912, the CPU 101 reads data on the letter coordinates from the letter coordinate conversion table, data on which is contained in program/data ROM 107, on the basis of the speech frame number and the value of variable E, data on which has been stored in area AD1+9 of work RAM 108, and transfers the read data as control data to object attribute memory 307 of VDP 102.

FIG. 113 shows the letter coordinate conversion table, data on which is contained in program/data ROM 107. In the conversion table, speech frame numbers "1 "–"3" correspond to three kinds of speech frames of FIGS. 111A–111C, respectively.

The conversion table contains data on the letter coordinates as data on coordinates X and Y relative to the display position of a speech frame. Object generator 304 reads data on a letter image in SRAM 103 at the timings calculated on the basis of the coordinate data (control data) stored in object attribute memory 307. Thus, as shown in each of FIGS. 111A–111C, letters are disposed and displayed in a left-hand speech frame as in the form of a right-hand framed speech.

As describe above, the display positions of letters to be displayed in a speech frame are determined automatically from the letter coordinate conversion table, so that the work of designating the display positions of letters is omitted. Thus, user's work of creating a balloon is facilitated and simplified.

When the process at step 8912 ends, the CPU 101 increments the value of variable E at step 8913. Thereafter, the CPU 101 determines at step 8914 whether the value of variable E is larger than the value of variable C. If not, the CPU 101 determines that transfer of the letter image data has not been completed, and returns to the process at step 8911. Conversely, if so, the CPU 101 determines that the transfer of the letter image data has been completed and terminates the series of processes.

While a single kind of data on the display position of letters is prepared for a speech frame in the present invention, the arrangement of letters in a speech frame may vary as the speech frames may have various shapes. Thus, data on a plurality of display positions may be prepared for a speech frame such that the user can select data on any display position from among them.

Fourth Embodiment

Figure 114:
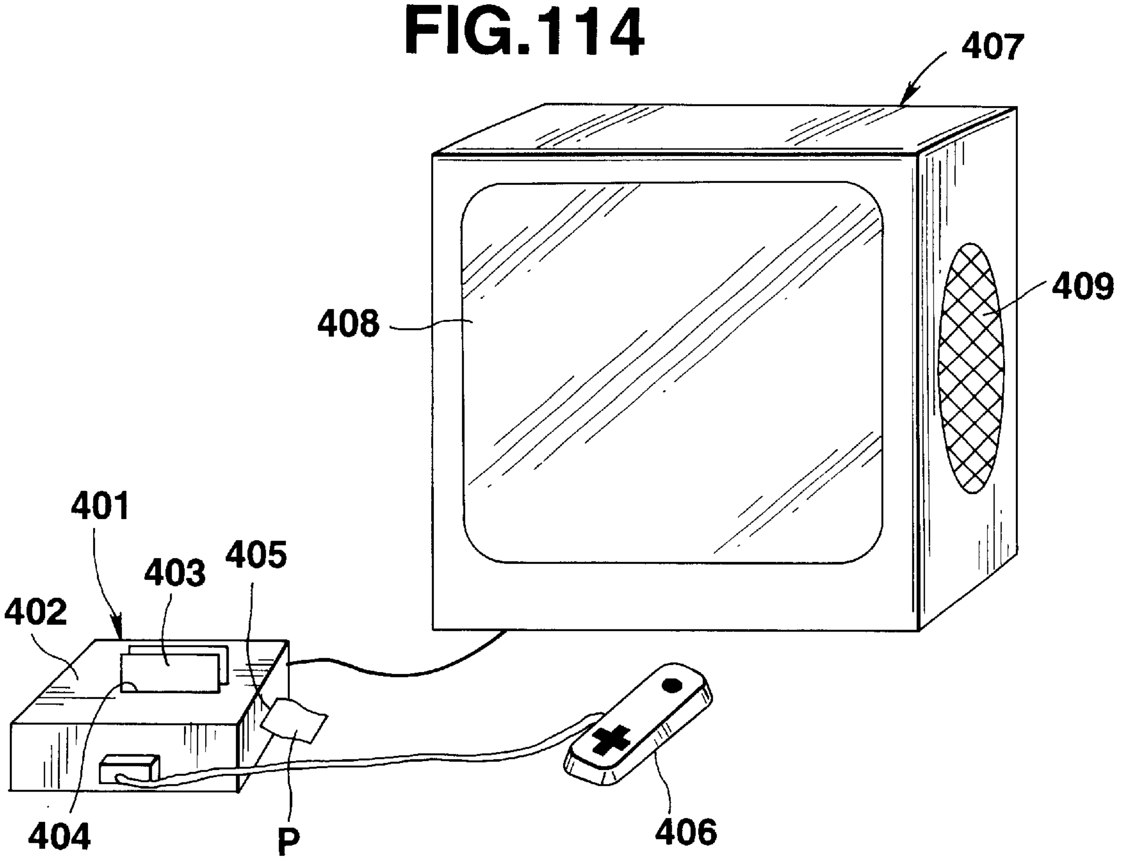
FIG. 114 is a perspective view of an image creation device as a fourth embodiment of the present invention connected with an external device.
Figure 115:
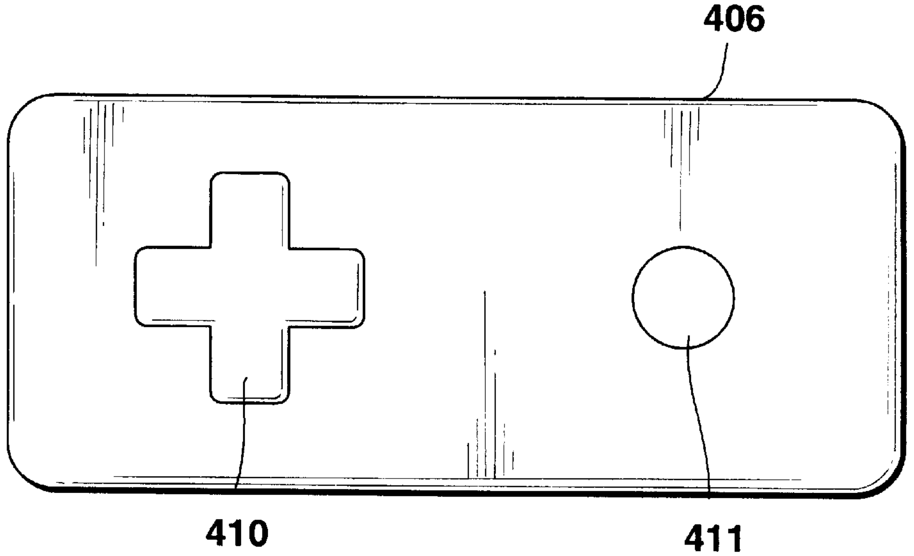
FIG. 115 is a plan view of a control pad.

FIG. 114 shows an image creation device 401 as a fourth embodiment of the present invention. The device includes a box-like body 402 which has an inlet 404 through which a ROM cassette 403 is inserted into the body 402 and an outlet 405 through which a printed sheet of paper P is discharged from the body. Connected to body 402 is a control pad 406 and an external display device 407 which is a general television set. External display device 407 includes a display 408 and a speaker 409. Control pad 406 has a cross key 410 as inputting means and a decision key 411, as shown in FIG. 115. Cross key 410 is operated to indicate a respective one of the up, down, right and left directions to select a desired icon and to select a desired letter from a letter list. Decision key 411 is used to decide a desired one of the various icons/letters selected by cross key 410.

Figure 116:
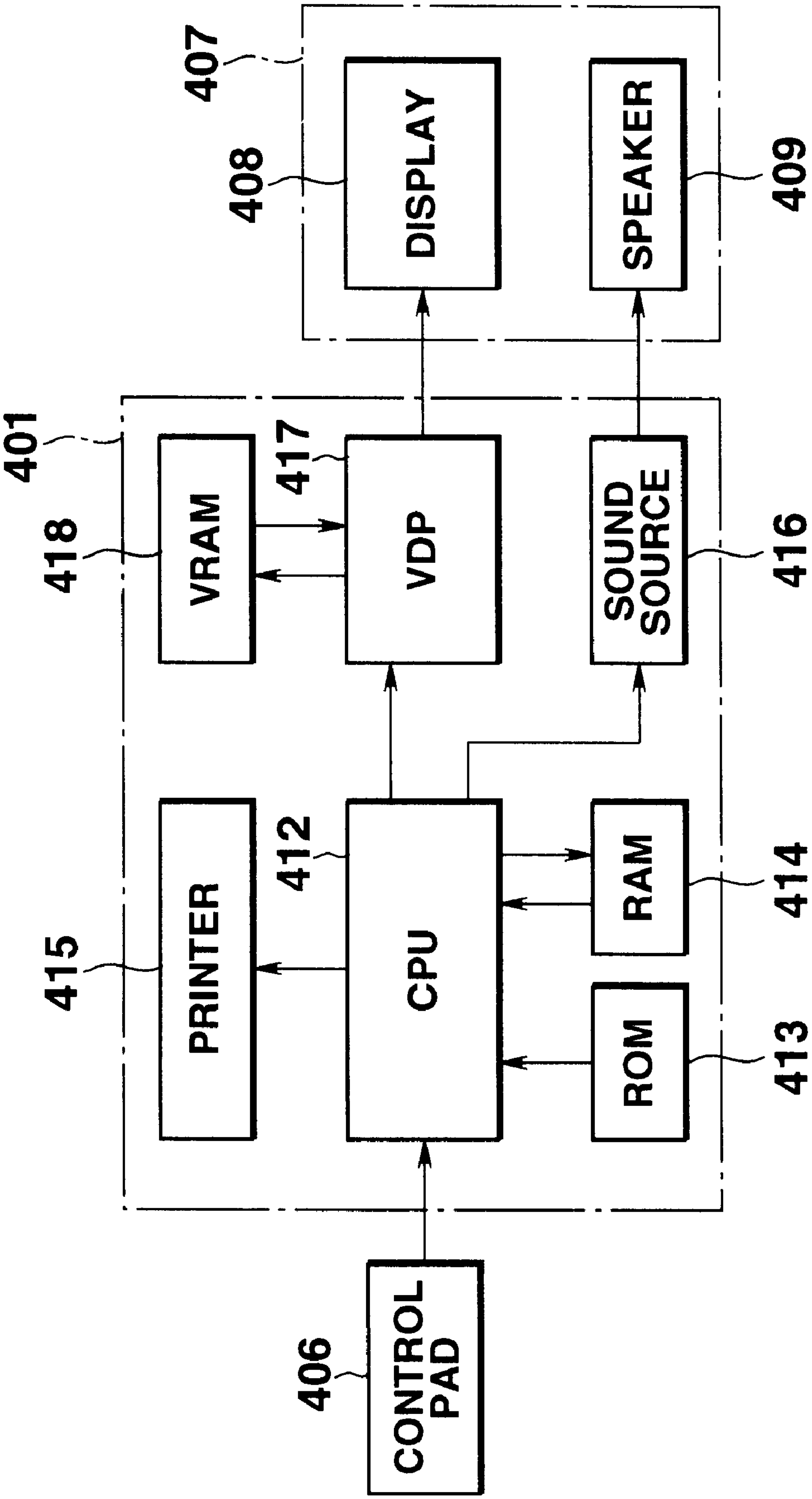
FIG. 116 is a block diagram of the fourth embodiment.

FIG. 116 is a block diagram of the whole structure of the present embodiment. Information on the operation of the respective keys 410, 411 provided on control pad 406 is stored in a key buffer (not shown) provided in CPU 412 of image creation device 401. CPU 412 operates in accordance with input information on keys 410, 411, processing programs contained in ROM 413 of ROM cassette 403, and data stored in work RAM 414 to perform all processes necessary for image creation device 401.

Printer 415 is controlled by CPU 412 to store for one line at a time data sent sequentially from an image data stock area in RAM 414 in a line buffer while driving elements of an internal printing mechanism such as a motor/a printing head to thereby print an image on a sheet of paper P set. A sound source 416 generates a music tone signal and voice signal in accordance with a command from CPU 412. Those signals are applied to speaker 409 of external display device 407 to generate an alarm sound, effective sound or BGM necessary for processing/displaying an image.

VDP (Video Display Processor) 417 performs processes necessary for display of an image on display 408 in accordance with a command from CPU 412 and sends/receives data to and from RAM 418 in the course of the processes. More specifically, CPU 412 writes graphic data through VDP 417 into VRAM 418, so that VRAM 418 temporarily stores graphic data to be displayed on display 408 into predetermined separate areas thereof. In response A to a read request from VDP 417 VRAM 418 sends dot data corresponding to the current display position through VDP 417 to display 408, which then displays a corresponding image.

Figures 117A, 117B, 117C, 117D:
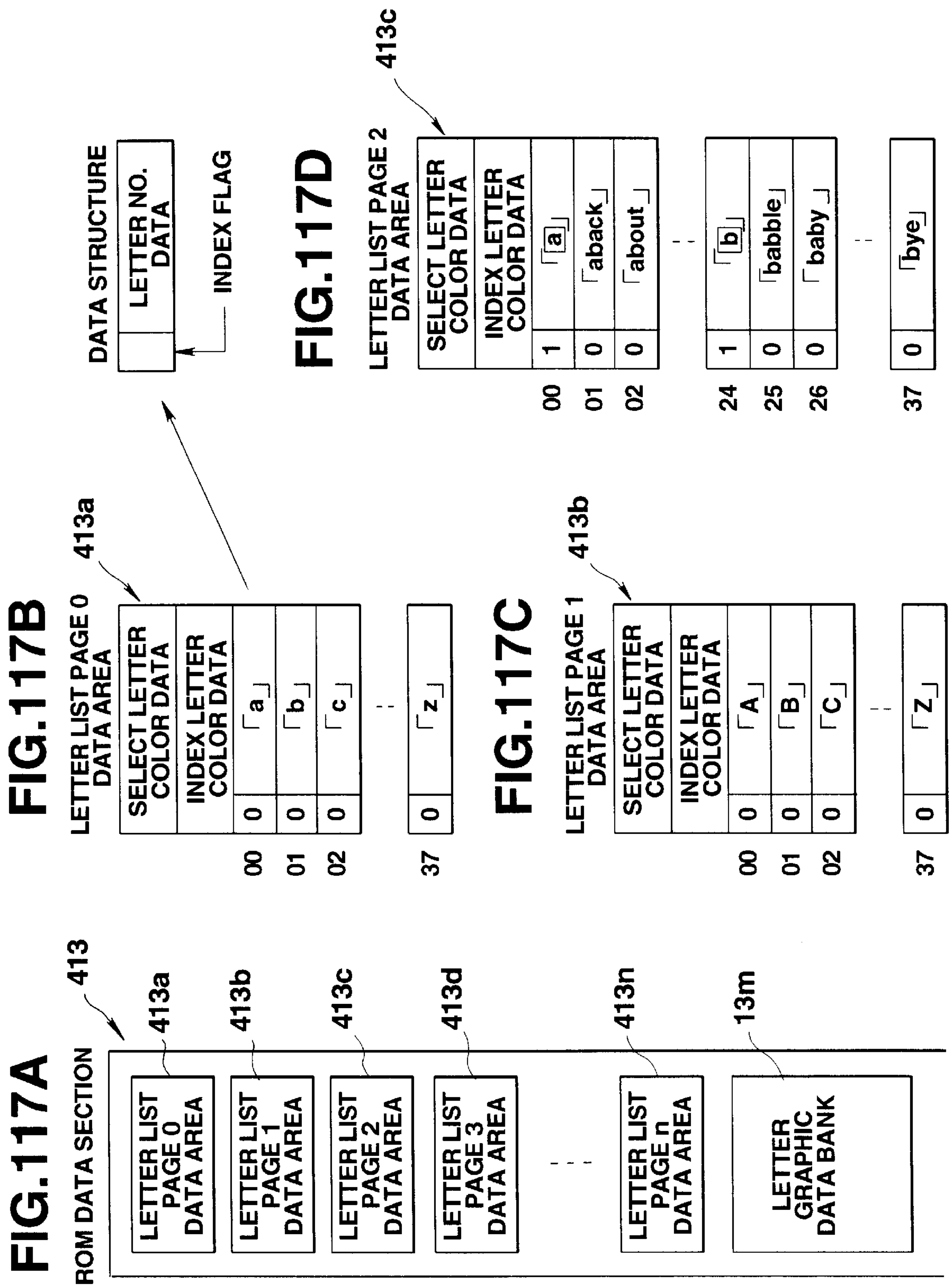
FIGS. 117A–117D illustrate a portion of ROM Data.

ROM 413 contains an area where the programs are contained, as well as n letter list page data areas (letter list page 0 data area 413*a*-letter list page n data area 413*n*), and a letter graphic data bank 413*m*, as shown in FIG. 117A. Letter list page data areas 413*a*–413*n* each contains select letter color as well as and index letter color data and an index flag and letter number data at each of addresses 00–37. The select letter color data designates the color of a letter selected by the moved position of the cursor when a letter list corresponding to data in each letter list page is displayed on display 408. The index letter color data designates the color of letters other than the selected letter. The index flag "1" indicates data on the letter number of an index letter while the index flag "0" indicates data on a letter number corresponding to a selectable letter.

Figure 118:
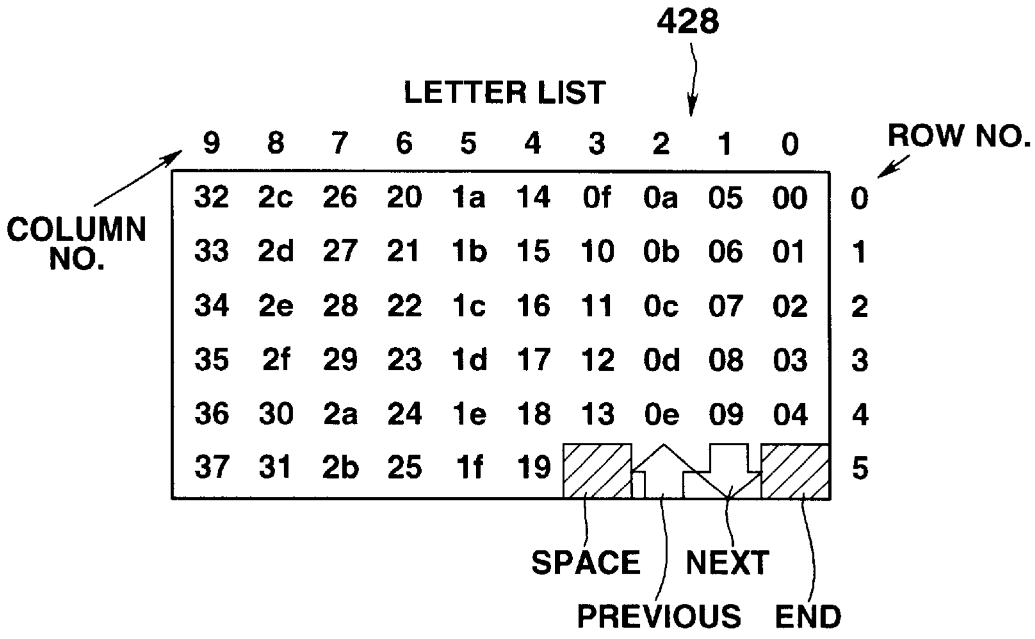
FIG. 118 illustrates the arrangement of letter list data.

Each letter number data is stored at a respective one of addresses "00 "–"37", each of which includes a combination of a column and a row number of a letter list composed of 6 rows×10 columns. That is, as shown in FIG. 118, each letter list is composed of a two-dimensional matrix composed of 60 letters and symbols. In order that the number of letter kinds selectable in the present embodiment is 60 or more, there is a plurality of letter list pages "0"–"n" and data corresponding to each letter list is stored in each of letter list page data areas 413*a*–413*n* (only data areas 413*a*–413*n* are shown in detail in corresponding FIGS. 117B–117D, respectively).

Respective list page data areas 413*a*–413*n* stores data on letters or words of the same system such as small letters, capital letters or words. For example, letter list pages 0 data area 413*a* and letter list page 1 data area 413*b* are data areas for small letters and capital letters, respectively, and contain data on letter numbers in alphabetical order in correspondence to addresses "00"–"37". Letter list page 2 data area 413*c* and subsequent data areas are for words and have stored data on the letter numbers of words in alphabetical order with index letter number data indicating that the index flag is "1" being stored at the head of a word which is different in head letter from the preceding word.

In addition, in correspondence to respective control symbols "end E" at column "0" and row "5"; "next page NP" at column "1" and row "5"; "previous page OP" at column 2 and row "5"; and "space S" at column "3" and row "5" in FIG. 118, letter number data for the respective control symbols are stored in the respective letter list page data areas 413*a*–413*n*. The "space S" is a symbol of a high frequency of use, "next page NP" is an operation control symbol designated to change the letter list from that on the displayed page to that on the next page, "page OP" is an operation control symbol designated to change the letter list from that on the displayed page to that on the previous page, and "end E" is an operation control symbol designated to terminate the process.

Figure 119:
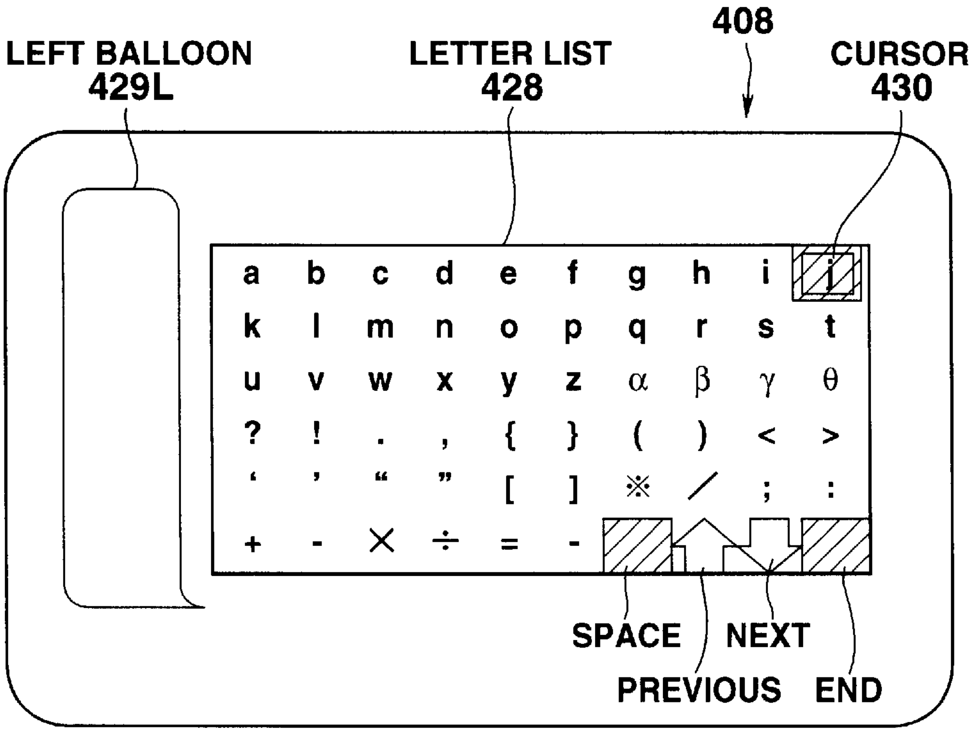
FIG. 119 illustrates a display example of a balloon and a letter list.

Stored in letter graphic data bank 413*m* is graphic data indicative of the shapes of letters and symbols corresponding to all letter number data stored in letter list page data areas 413*a*–413*n*. Thus, CPU 412 reads from ROM 413 data on 60 letter numbers and graphic data on corresponding 60 letters (inclusive of symbols) stored, for example, in letter list page 0 data area 413*a*, stores the read data through VDP 417 into VRAM 418, and also transfers data read from VRAM 418 to display 408, alphabetic letter list 428 on page "0" which is composed of 60 letters (inclusive of the operation control symbols) of 6 rows×10 columns is displayed on display 408, as shown in FIG. 119.

In addition, ROM 13 includes balloon image data area 413*p* and balloon coordinate data area 413*q*, as shown in FIG. 120A. Balloon image data area 413*p* contains graphic data which can display upper balloon 429U of FIG. 120B. As shown in FIGS. 121A–121D, in the present embodiment, upper horizontally long balloon 429U, lower horizontally long balloon 429D, left-hand vertically long balloon 429L and right-hand vertically long balloon 429R are arranged to be displayed in display 408.

Balloons 429U–429R each are a frame which defines an area where a letter string which makes up a speech is displayed. Lower balloon 429D, left-hand balloon 429L, and right-hand balloon 429R can each be displayed by inverting upper balloon 429U. Thus, in the present embodiment, only graphic data on upper balloon 429U is contained in balloon image data area 413*p* to thereby reduce the required storage capacity. The respective upper left X and Y coordinate values of each of the balloons 429U, 429D, 429L and 429R relative to the origin of an upper left end of display 408 and used to display balloons 429U, 429D, 429L and 429R at the four places of FIG. 121 are contained at corresponding addresses "00"–"03" in the balloon image data area 413*q*, as shown in FIG. 120C.

Figure 122:
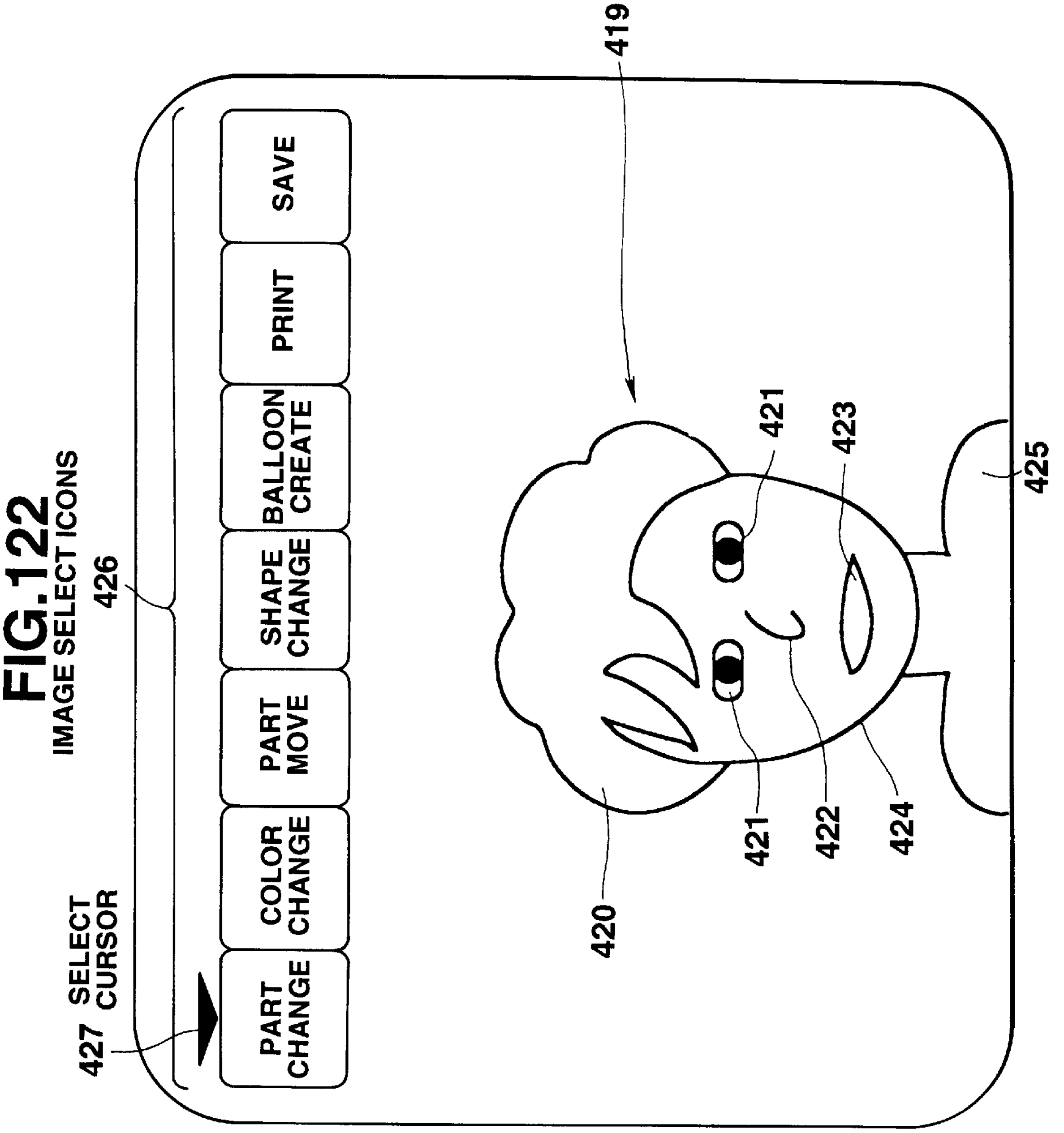

In addition to data on those letters, etc., ROM 413 contains graphic data on a plurality of different images of each of parts of a character such as hair 420, eyes 421, nose 422, mouth 423, outline 424 and clothes 425 which make up the character image 419 such as is illustrated in FIG. 122 along with data on a part number, color and position of each part image. In addition, ROM 413 contains graphic data to display select icons 426 which make up an image processing icon group and a select cursor 27 of FIG. 122.

As shown in FIG. 123A, RAM 414 contains character part data area 414*a*, balloon control data area 414*b*, balloon letter data area 414*c*, letter list control data area 414*d*, intra-CPU work area 414*e*, and image data stock area 414*f*. As shown in FIG. 123B, character part area 414*a* stores data on the images of character parts which are the hair, eyes, nose and clothes which make up character image 419 such as data on their numbers, colors and positions. As shown in FIG. 123C, balloon control data area 414*b* tores data on balloon on/off flag, balloon display position coordinates, and balloon graphics-related data. The balloon on/off flag indicates a balloon when it is on and no balloon when it is off. The balloon display position coordinates indicate the coordinates of the position of the upper left end of each of balloons 429U–429R (FIGS. 121A–121D) displayed on display 408 relative to the origin which is the upper left end of display 408. The balloon graphics-related data relates to balloon graphics about vertical writing, horizontal writing, shape, color and whether the balloon should be displayed in an inverted manner.

As shown in FIG. 123D, balloon letter data area 414*c* stores data on codes of letters which make up a speech to be displayed in a balloon. As shown in FIG. 123E, letter list control data area 414*d* stores data on the page number of a letter list to be displayed, row and column numbers of cursor 430 (119) to be displayed in the letter list, and letter list display position coordinates indicative of a display position of the letter list on display 8. The color number indicates data on the colors of a select letter and an index letter in each letter list page data area.

Intra-CPU processing work area 414*e* stores data on flags and others necessary for CPU 414 to perform any processing. Image data stock area 414*f* stores data for one display screen with which printer 415 prints an image. By feeding graphic data for one line at a time from image data stock area 414*f* to the line buffer of printer 415, the image displayed on display 408 is printed out.

The operation of this embodiment having the above structure will be described with reference to flow charts of FIGS. 124 and subsequent FIGS. When a power supply (not shown) for external display 407 and image creation device 401 is turned on, CPU 412 of image creation device 401 starts to perform a processing operation in accordance with a main flow of FIG. 124 to thereby perform an initial process (step SA1), which is performed in accordance with the flow of FIG. 125. First, the system is initialized (SB1). In this initialization, the respective registers of CPU 412 are set at their respective initial values and also RAM 414, VDP 417, VRAM 418, sound source 416, etc., are initialized. When character data is then loaded on RAM 414 (step SB2). That is, the CPU 412 reads from ROM 413 data on the numbers colors, and positions of the parts (hair 420-clothes 425) which make up a character image 419 to be displayed as an initial picture and stores those data into character area 414*a* of FIG. 123B.

In addition, the CPU 412 performs a data initial setting operation (step SB3) to set processing parameters for the system portions related to the display of the initial display screen. More specifically, the CPU 412 sets at predetermined values the column numbers of the respective select icons 426 which make up the image processing icon group and a select icon number indicative of the initial position of select cursor 427 at predetermined corresponding values. Thus, when the initial display screen of FIG. 122 is displayed, the CPU 412 sets the column number of "PART CHANGE" icon at "1", the column number of "COLOR CHANGE" icon at "2", . . . and the column number of "SAVE" icon at "7" and sets the number of "PART CHANGE" icon as a select icon number indicative of the initial position of select cursor 427.

In a character delineating process (step SB4), the CPU 412 reads data on the respective images of parts (hair 420-clothes 425) corresponding to parts numbers data on which are set in character areas 414*a* of RAM 414 from the appropriate area of ROM 413 in accordance with the respective part numbers. Thereafter, the CPU 412 writes the image data through VDP 417 into the corresponding part areas of VRAM 418 and enables the display status on the character display screen. Thus, by the processing at step SB4, an initial display character image 419 which is made up of the images of the respective parts (hair 420-clothes 425) is displayed on display 408, as shown in FIG. 122.

In the next system delineating process (step SB5), the CPU 412 displays select icons 426 which makes up the image processing icon group set at step SB3 and select cursor 427 in accordance with the numbers of the select icons 426 and the select icon number indicative of the initial position of select cursor 427. More specifically, the CPU 412 reads data on the images of select icons corresponding to the select icon column numbers from ROM 413 and writes the data into processing areas of VRAM 418 through VDP 417 as in the case of the character data processed at step SB4. That is, in the case of the display example of FIG. 122, the CPU 412 writes data on seven icon images and image data for display of select cursor 427 at a position corresponding to the "part change" icon into the predetermined areas of VRAM 418. Subsequently, the CPU 412 sets data into VRAM 418 such that the respective icons, data on which was transferred to VRAM 418, are displayed at predetermined corresponding positions, and that select cursor 427 is displayed above the appropriate icon in accordance with the icon number set at step SB3. By this process at step SB5, "PART CHANGE"-"SAVE" icons are displayed above the initial display screen character image 419 and select cursor 427 is displayed above "PART CHANGE", as shown in FIG. 122.

Figure 126:
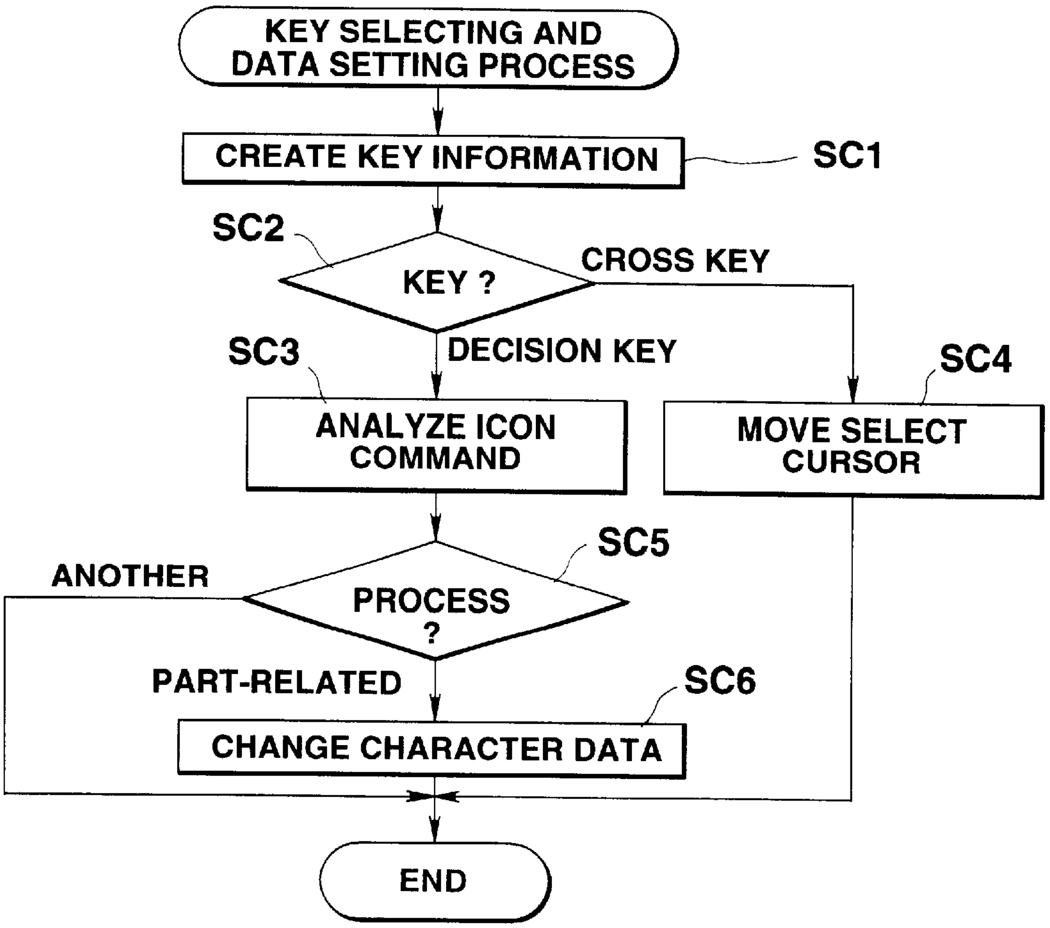

In the mean flow of FIG. 124, a key selection and data setting process (step SA2) is performed subsequently to the initial processing (step SA1). In the key selection and data setting process (step SA2) is performed in accordance with the flow of FIG. 126 to perform a key information creation process (step SC1), in which data stored in the key buffer in response to the operations of keys 410 and 411 is fetched from the key buffer and information on the operated key is created. On the basis of this information, the CPU 412 then determines whether which of the keys 410 and 411 on the control pad 406 has been operated (step SC2). As a result, if cross key 410 has been operated, the CPU 412 passes from the process at step SC2 to that at step SC4, where it performs a select cursor moving process (step SC4) in which the corresponding icon number is changed to move select cursor 424 horizontally in accordance with the operation of cross key 410. Thus, select cursor 427 moves horizontally in accordance with the operation of cross key 410 to be displayed on the appropriate icon.

If decision key 411 is operated as the result of the determination at step SC2, the CPU 412 performs an icon command analysis process (step SC3) to analyzes a command of select icon 426 corresponding to the position of select cursor 427. As a result, the CPU 412 determines whether the command relates to the parts or others (step SC5). As a result, if the command relates to the parts, for example, "PART CHANGE", "COLOR CHANGE", "PART MOVE", "SHAPE CHANGE", the CPU 412 performs a character data changing process (step SC6) where the CPU 412 changes data on the number, color and position of a part stored in a corresponding part area of character part data area 414*a* to a desired data.

Figure 124:
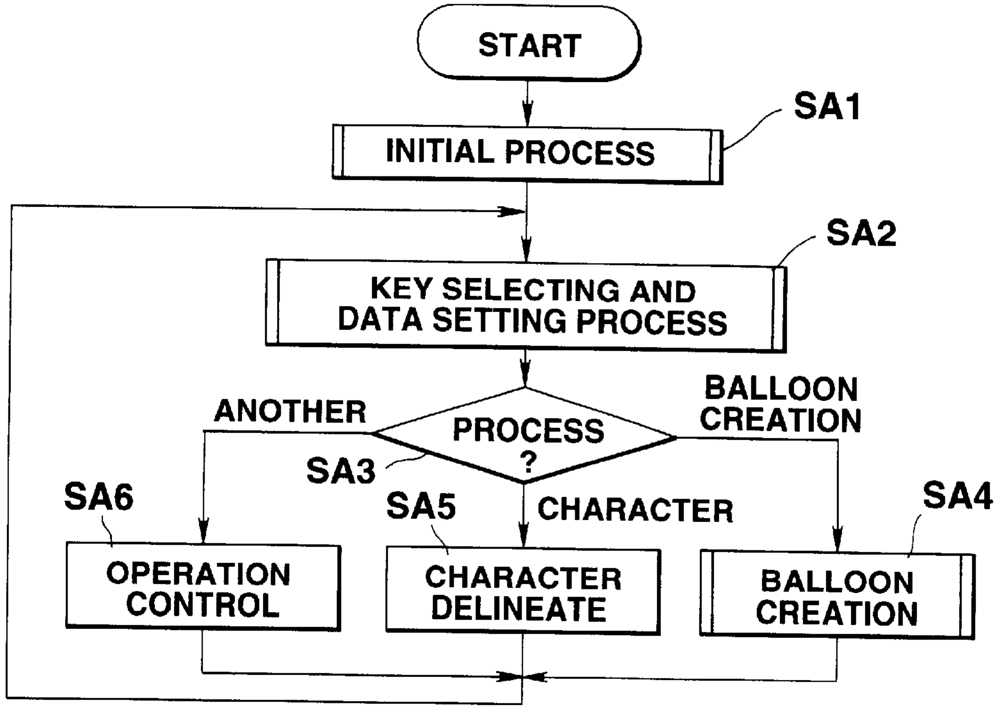
Figure 125:
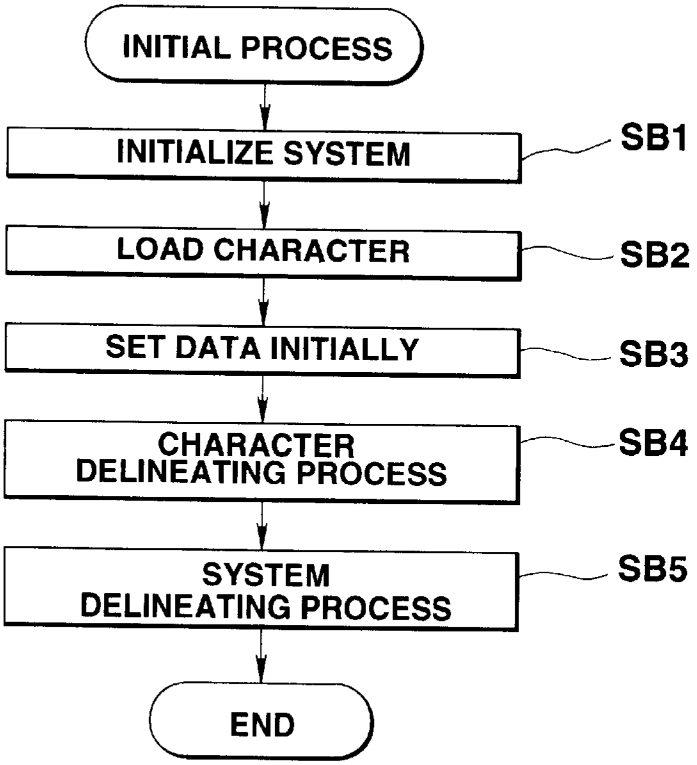

In the main flow of FIG. 124, at step SA3 subsequent to step SA2, the CPU 412 determines the command analyzed and the process performed at step SA2, more particularly, whether the command analyzed in the icon command analyzing process was "BALLOON CREATION" or another and whether the character data changing process at step SC6 has been performed. As a result of the determination at step SA3, when the CPU 412 determines that the analyzed command is the balloon creation command, the CPU 412 passes from the process at step SA3 to that at step SA4, where the CPU 412 performs a balloon creation process.

If the character data changing process was performed at step SC6, the CPU 412 passes from the process at step SA3 to that SA5, where the CPU 412 performs a character delineating process (step SA5), where the CPU 412 displays a character image 419 on display 408 on the basis of data on the part number, color, position in character part area 414*a* obtained as the result of the changing in the character data changing process (step SC6). Thus, by the process at step SA5, the character image 419 is displayed with its images of hair, eyes, nose, etc., being changed.

If the analyzed command was other than "BALLOON CREATION", the CPU 412 passes from the process at step SA3 to that at step SA6 to perform an operation control process. If, for example, the command selected at step SC3 was "PRINT", the CPU 412 controls the operation of printer 415 such that an image excluding the icon displayed on display 408 is printed on a sheet of paper P, which is then discharged from outlet 405.

Figure 127:
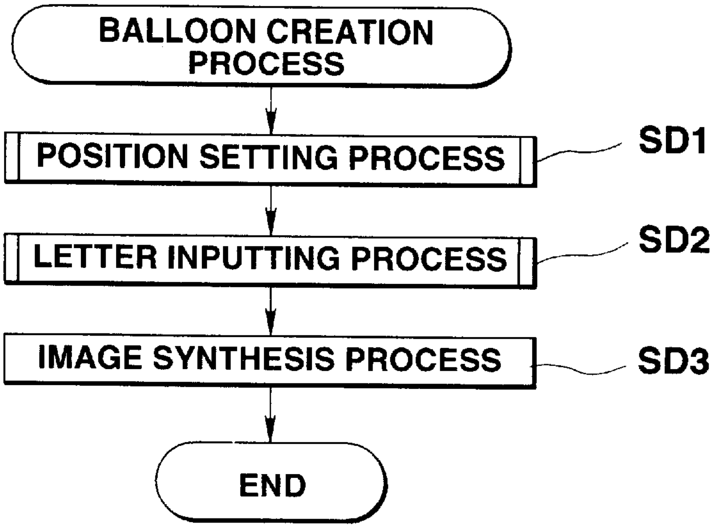
Figure 128:
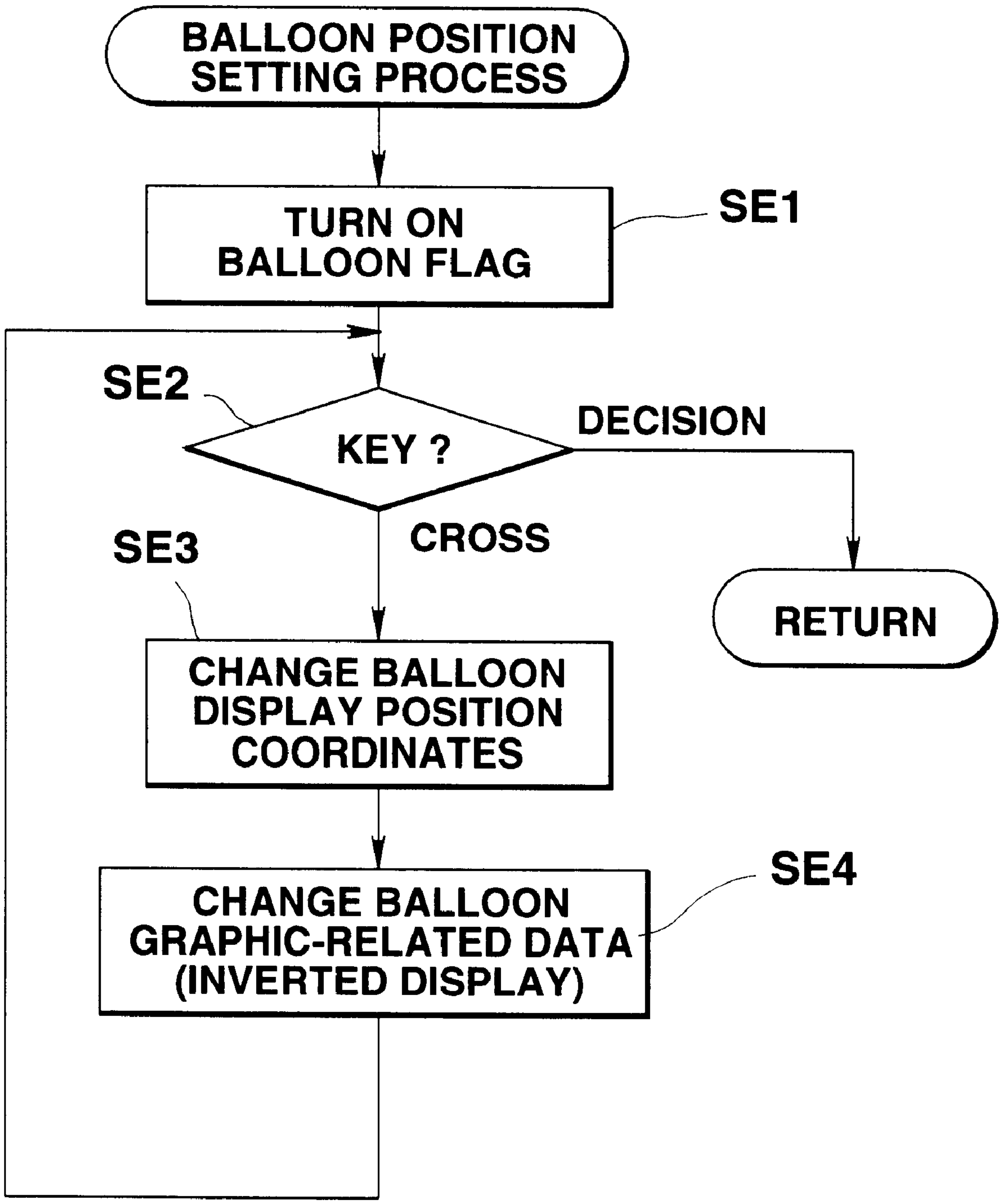

The balloon creation process (step SA4) is performed in accordance with the flow of FIG. 127, and thus, a position setting process (step SD1), a letter inputting process (step SD2), and an image synthesis process (step SD3) are performed sequentially. The position setting process (step SD1) is performed in accordance with the flow of FIG. 128 to turn on the balloon on/off flag of balloon control data area 414*b* of FIG. 123C (step SE1). The CPU 412 then determines whether which of cross key 410 and decision key 411 has been operated (step SE2). If the cross key 410 has been operated, the CPU 412 changes the balloon display position coordinates in balloon control data area 414*b* (step SE3).

As shown by arrows in FIGS. 121A–121D, when the upper end of cross key 410 is depressed, the display position of the balloon is changed to the display position coordinates of upper balloon 429U; when the lower end of cross key 410 is depressed, it is changed to the display position coordinates of lower balloon 429D; when the left end of cross key 410 is depressed, it is changed to the display position coordinates of left balloon 429L; and when the right end of cross key 410 is depressed, the display position coordinates of the right balloon 429R. The CPU 412 performs a change of these display position coordinates by reading X and Y coordinate data stored at addresses "00"–"03" corresponding to the left, right, upper and lower ends of the cross key 410 from balloon coordinate data area 413*q* of ROM 413 of FIG. 120C and writing the data over old data on balloon control data area 414*b* of RAM 414.

Subsequently, the CPU 412 changes balloon graphics-related data in balloon control data area 414*b* (step SE4). As described above in FIG. 120B, balloon image data area 413*p* of ROM 413 contains only graphic data with which upper balloon 429U is displayable. Thus, for example, in order to change the balloon from upper balloon 429U to lower balloon 429D and display the lower balloon, the graphic data is required to be changed in balloon control data area 414*b* such that the balloon image is changed from its non-inverted state to its inverted state. Thus, the appropriate one of the upper, lower, left and right balloons 429U, 429D, 429L and 429R of FIGS. 121A–121D is displayed along with the character image 419 on display 408.

Figure 129:
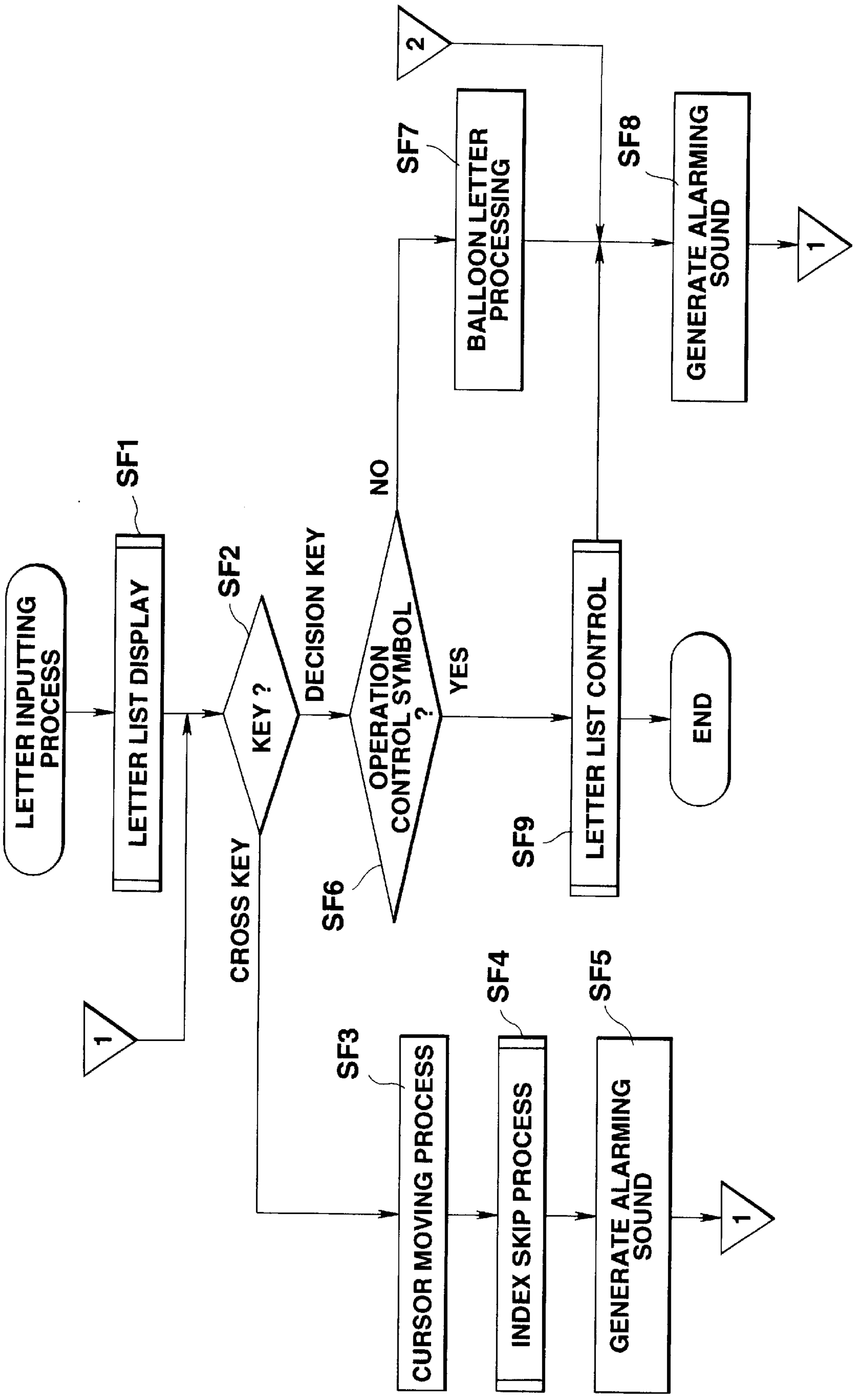

When decision key 411 is operated after the balloon display position coordinate change (step SE3) and the balloon graphics-related data change (step SE4) were performed in accordance with the operation of cross key 410, as described above, the CPU 412 returns its processing from step SE2 to the flow of FIG. 127, in which the CPU 412 then starts a letter inputting process (step SD2), which is performed in accordance the flow of FIG. 129. In this case, first, the CPU 412 performs a letter list display process (step SF1).

Figure 130:
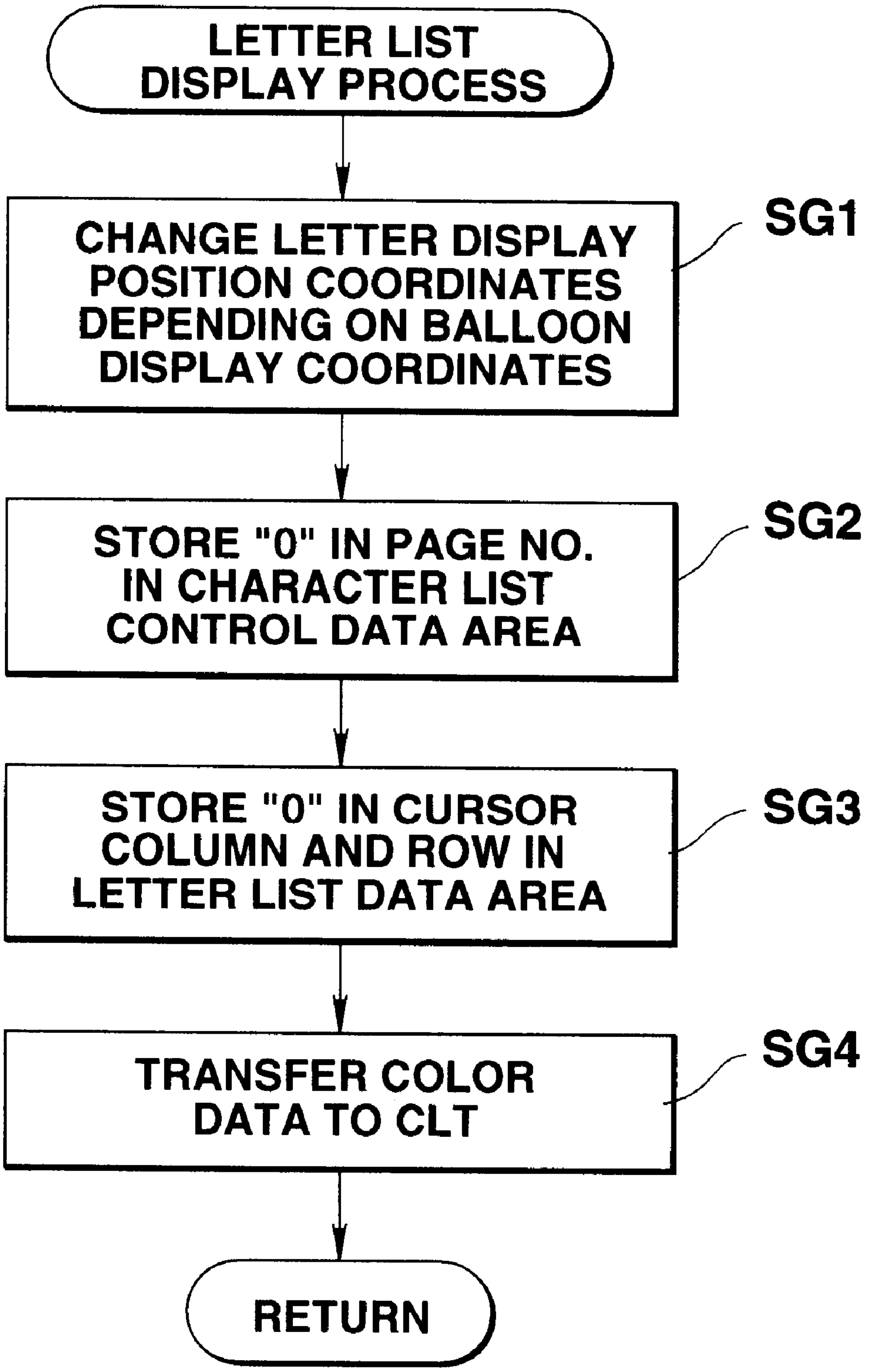

In this letter list display process (step SF1), the CPU 412 changes the letter list display position coordinates in accordance with the balloon display position coordinates, as shown in the flow of FIG. 130 (step SG1). More specifically, if data on the display position coordinates of the upper balloon 429U of FIG. 121A is stored in balloon control data area 414b, the CPU 412 changes the letter list display position coordinates, data on which is stored in letter list control data area 414*d* (FIG. 123E), such that the letter list 428 is displayed below its balloon without overlapping with same in accordance with the display position coordinates of the upper balloon 429U.

Figures 121A, 121B, 121C, 121D:
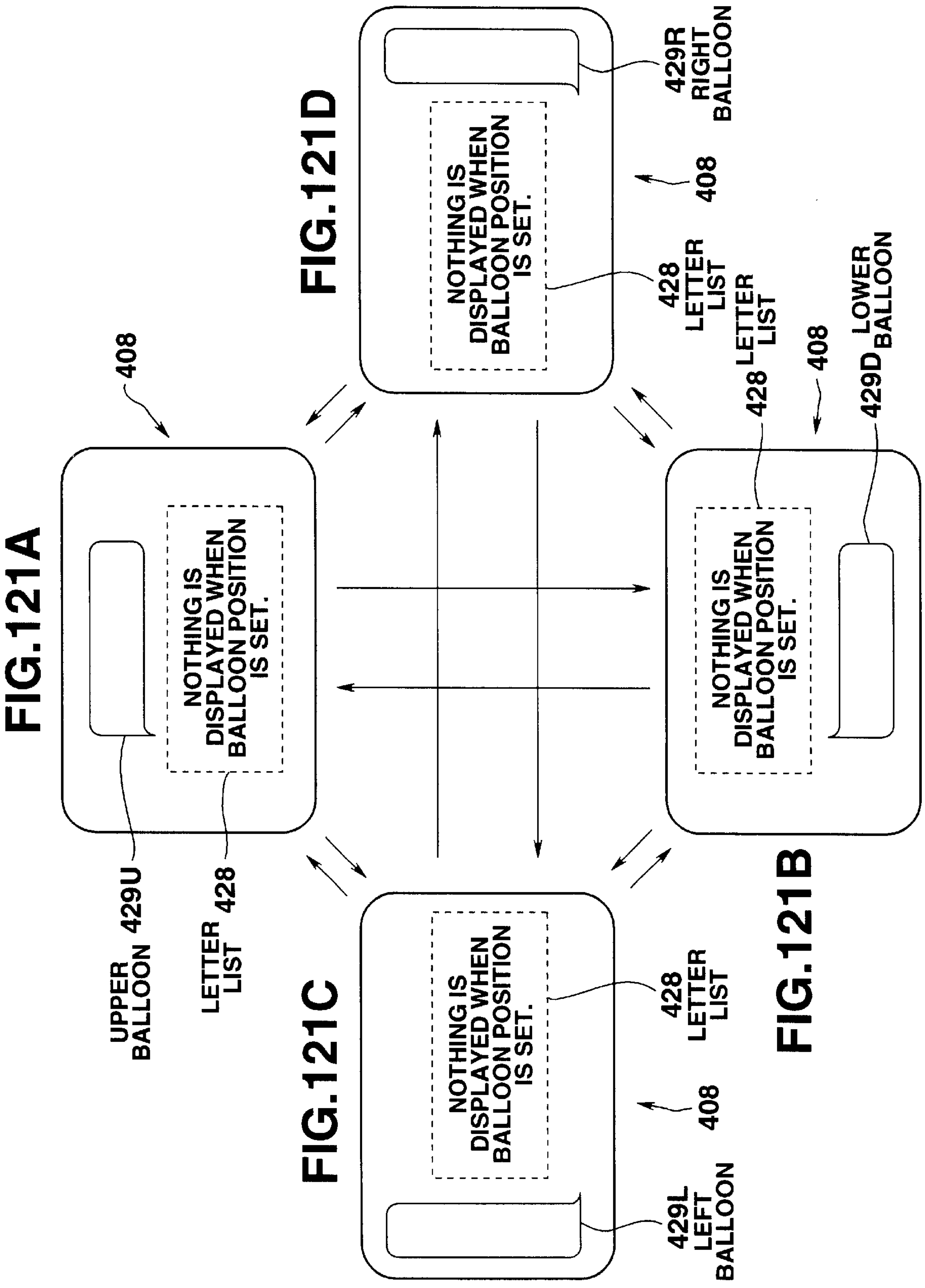

Similarly, when data on the display position coordinates of the lower balloon 429D of FIG. 121B is stored, the CPU 412 changes the letter list display position coordinates in the letter list control data areas 414*d* such that the letter list 428 is displayed above the balloon without overlapping with same. When data on the display position coordinates of the left balloon 429L of FIG. 121C is stored, the CPU 412 changes the letter list display position coordinates in the letter list control data areas 414*d* such that the letter list 428 is displayed on the right side of the balloon without overlapping with same. When data on the display position coordinates of the right balloon 429R of FIG. 121D is stored, the CPU 412 changes the letter list display position coordinates in the letter list control data areas 414*d* such that the letter list 428 is displayed on the left side of the balloon without overlapping with same.

The CPU 412 then stores "0" in the page number area of letter list control data area 414*d* (step SG2). In addition, the CPU 412 stores "0" in the respective areas of letter list control data area 414*d* defined by the respective cursor row and column numbers (step SG3). Thereafter, the CPU 412 transfers the select letter color data and index letter color data stored in letter list page 0 data area of FIG. 117B to a CLT (Color Lookup Table) of VDP 417. Thus, by referring to the data stored in letter list control data area 414*d* and the color data transferred beforehand to the CLT, VDP 417 operates, as described above, to display letter list 428 of a page number "0" at a position on the right-hand side of left balloon 429L and where the letter list 428 does not overlap with the left balloon 429L. At this time, an index letter of letter list 428 (on page "0", there is no index letter) is displayed in a color indicated by the index letter color data and other letters are displayed in the color which the select letter color data indicates. In the letter list 428, cursor 430 is displayed at the position of "a" at row "0" and column "0".

In the flow of FIG. 129, at step SF2 subsequent to SF1, the CPU 412 determines whether which of cross key 410 and decision key 411 has been operated. If cross key 410 has been operated, the CPU 412 performs a cursor moving process (step SF3). In the cursor moving process, the CPU 412 changes the cursor row and column numbers, data on which is stored in letter list control data area 414*d*, in accordance with the depressed end of cross key 410 and displays cursor 430 at the coordinate position indicated by the row and column numbers on the basis of the graphic data concerned. Thus, the cursor 430 moves horizontally and vertically on the respective letters of letter list 428 in accordance with the depressed ends of cross key 410.

Figure 131:
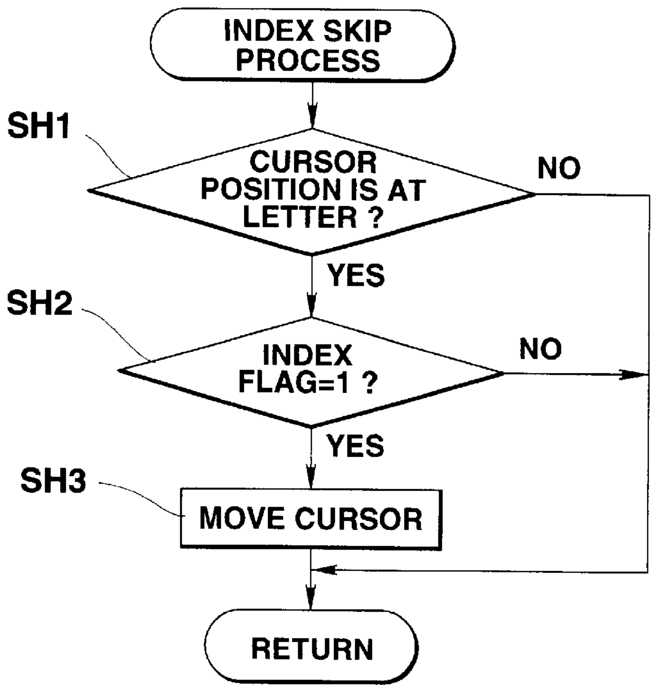

At step SF4 subsequent to step SF3, the CPU 412 performs an index skip process, which is performed in accordance with the flow of FIG. 131 to determine whether the position of cursor 430 moved at step SF3 is on a letter (step SH1). When cursor 430 is on the respective symbols of space S, previous page OP, next page NP and end E, the CPU 412 returns to the flow of FIG. 129 to perform the subsequent processes. When the cursor 430 is on a letter, the CPU 412 determines whether the index flag of that letter is "1" (step SH2).

As described above with reference to FIGS. 117B–117D, the index flag "1" indicates that the appropriate letter data indicates an index letter number, and the index flag "0" indicates that the letter data indicates a selectable letter. When as the result of the determination at step SH2 the index flag is "0" which indicates a selectable letter, the CPU 412 returns its process to the flow of FIG. 129. Thus, when the cursor 430 moves to a selectable letter, it stops there.

When the index flag is "1" which indicates an index letter, the CPU 412 subsequently moves the cursor in the same direction (step SH3). More specifically, by further changing the row number or column number, the CPU 412 moves cursor 430 to the next letter. Thus, when the cursor 430 is at an index letter "a", data on which is stored at address "32" of FIG. 118 or "b", data on which is stored at address "2c" of FIG. 118, cursor 430 does not stop at this index letter, but moves to a horizontally or vertically selectable letter. Thus, cursor 430 stops only at an always selectable letter.

After the CPU 412 has performed the index skip process, it then performs an alarm sound generating process (step SF5) in which the CPU 412 instructs sound source 416 to generate an effect sound having a pitch varying in accordance with the row and column of a destination of cursor 430 in letter list 428 displayed on display 408. When the destination of cursor 430 is "end E", "next page NP", "previous page OP", or "space S", the CPU 412 instructs sound source 416 to generate an effect sound different from that for a letter. Thus, by successively changing the row and column of the destination for cursor 430, a melody can be produced from speaker 409. If the destination is a symbol such as "end E", "next page NP", "previous page OP" or "space S", a different effect sound is produce from speaker 409 to thereby fulfill the operation guiding function, using the sound.

After the process at step SF5, the CPU 412 iterates the processes from SF2 to SF5. If as the result of the determination at step SF2 decision key 411 is operated, the CPU 412 passes from the process at step SF2 to the process at step SF6, where the CPU 412 determines whether cursor 430 is any one of the operation control symbols "space S", "previous page OP", "next page NP" and "end E". If as the result of the determination, cursor 430 is not at any of the operation control symbols, the CPU 412 determines that cursor 430 is at a letter and performs a balloon letter processing operation (step SF7) and also perform an alarm sound producing process (step SF8) similar to that mentioned above.

In this balloon letter processing (step SF7), the CPU 412 sequentially reads data on a letter code in a letter list page data area corresponding to the current page number and the position of cursor 430 and sequentially stores data on the read letter codes as a balloon letter code in balloon letter data area 414*c* of FIG. 123D. Thus, by reading letter graphic data corresponding to the balloon letter codes from letter graphic data bank 413*m* and displaying the graphic data, the CPU 412 sequentially displays letters at predetermined coordinate positions corresponding to the current number of letters in the balloon displayed on display 408.

Figure 132:
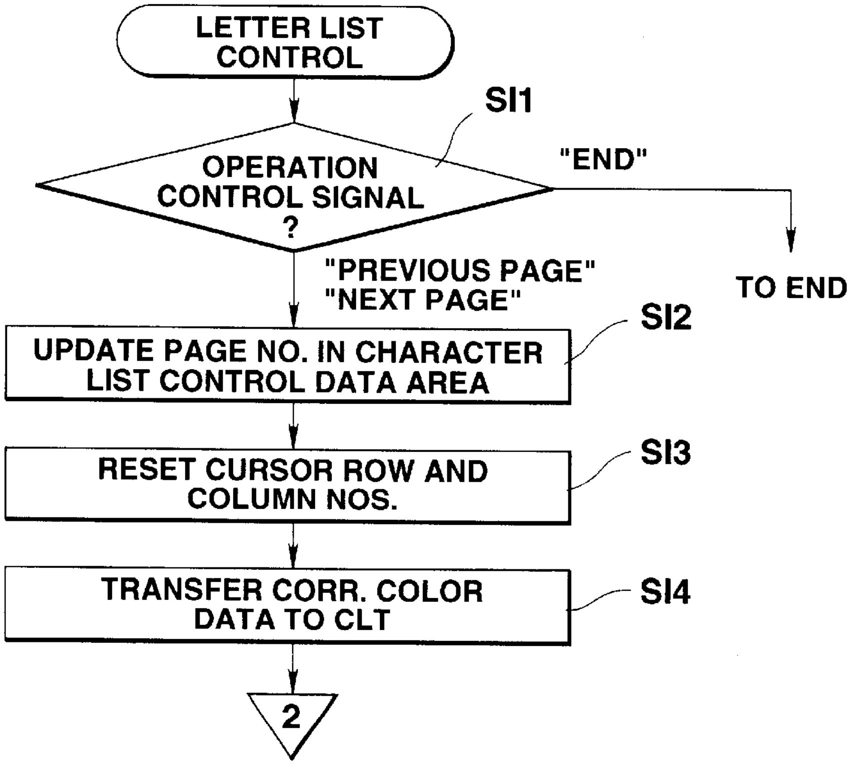

When as the result of the determination at step SF6 the cursor 430 is at any one of the operation control symbols which are "previous page OP", "next page NP" and "end E", the CPU 412 performs a letter list control process (step SF9), which is performed in accordance with the flow of FIG. 132 to determine which of "previous page OP", "next page NP" and "end E" the cursor 430 is at (step SI1). If as the result of this determination, cursor 430 is at any one of "previous page OP" and "next page NP", CPU 412 updates the page number of letter list control data area 414*d* of FIG. 123E (step SI2). More specifically, if the cursor 430 is at "previous page OP", it decrements the page number while if the cursor is at "next page NP", it increments the page number.

In addition, the CPU 412 resets the cursor row and column numbers of letter list control data area 414*d* (step SI3) to thereby store "0" as the cursor row and column numbers. Subsequently, the CPU 412 transfers the corresponding color data, that is, the select letter color data and index letter color data stored in the appropriate letter list page data area, to the CLT of VDP 417 (step SI4). In response, by referring the data stored in letter list control data area 414*d* and the color data transferred beforehand to the CLT, VDP 417 operates, as described above to change the letter list 428 displayed on display 408 and displays selectable letters and an index letter in the colors which the corresponding select letter color data and index letter color data indicate in letter list 428, and further displays cursor 430 at the position of row "0" and column "0" in the changed and displayed letter list 428.

After the process at step SI4, the CPU 412 passes to the process at step SF8 of FIG. 129 to perform an alarm sound producing process similar to that described above, and iterates the process at step SF2 and subsequent steps. Thus, by placing cursor 430 at "previous page OP" or "next page NP" and depressing decision key 411, the user can display a different letter list page on display 408. In addition, by moving cursor 430 to a desired letter and depressing decision key 411, the user can select that letter. By this letter selection, the selected letters are sequentially disposed in the balloon displayed on display 408. Thus, the user can recognize the number and layout of letters while creating a sentence (speech) to be displayed in the balloon.

When the user places cursor 430 at "end E" and depresses decision key 411 after the desired sentence has been formed in the balloon, the CPU 412 passes from the process at step SI1 of FIG. 132 to "END" to thereby terminate the letter inputting process at step SD2 of FIG. 127. Thus, in the flow of the balloon creation process of FIG. 127, the next image synthesis process (step SD3) starts, in which letter list 428 is erased and a balloon with a sentence composed of letters therein, created by the balloon creation process mentioned above, is placed so as to overlap with the display on which a character image 419 is displayed such that the balloon with the sentence therein is displayed in the vicinity of the character image 419 on display 418 as if the character image 419 utters a speech.

What is claimed is:

1. An image control device comprising:

letter string inputting means for inputting a letter string in accordance with operations of a user;

frame displaying means for displaying a frame image for surrounding the inputted letter string;

parting information inputting means for inputting parting information between desired letters of the inputted letter string in accordance with operations of the user; and letter string displaying means for parting the inputted letter string into a plurality of partial letter strings, each of which includes a predetermined number of letters, when the parting information is not inputted, and for parting the inputted letter string into a plurality of partial letter strings in accordance with the inputted parting information when the parting information is inputted, and for allocating and displaying images of the partial letter strings to different lines in the frame image displayed by the frame displaying means.

2. An image control device according to claim 1, wherein said frame displaying means determines an attribute of the frame image based on a number of letters in the inputted letter string and the inputted parting information, and displays the frame image in accordance with the determined attribute.

* * * * *